(12) United States Patent
Kondo et al.

(10) Patent No.: US 8,164,638 B2
(45) Date of Patent: Apr. 24, 2012

(54) COMMUNICATION SYSTEM AND METHOD THEREOF

(75) Inventors: Tetsujiro Kondo, Tokyo (JP); Takashi Sawao, Tokyo (JP); Junichi Ishibashi, Saitama (JP); Takahiro Nagano, Kanagawa (JP); Naoki Fujiwara, Tokyo (JP); Toru Miyake, Tokyo (JP); Seiji Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/544,717

(22) Filed: Aug. 20, 2009

(65) Prior Publication Data
US 2010/0073505 A1    Mar. 25, 2010

Related U.S. Application Data

(63) Continuation of application No. 10/362,725, filed as application No. PCT/JP02/06386 on Jun. 26, 2002, now Pat. No. 7,619,655.

(30) Foreign Application Priority Data

Jun. 27, 2001 (JP) .................. 2001-195592

(51) Int. Cl.
*H04N 5/228* (2006.01)
(52) U.S. Cl. ................... 348/208.4
(58) Field of Classification Search .... 348/208.4–208.6, 348/208.13, 208.14
See application file for complete search history.

(56) References Cited

U.S. PATENT DOCUMENTS 5,815,601 A * 9/1998 Katata et al. .................. 382/232
5,886,743 A * 3/1999 Oh et al. .................. 375/240.02

(Continued)

FOREIGN PATENT DOCUMENTS
EP    0 833 515    4/1998
(Continued)

OTHER PUBLICATIONS

Cavallaro A et al.: "Video Object Extraction Based on Adaptive Background and Statistical Change Detection" Proceedings of the SPIE, SPIE, Bellingham, VA, US, vol. 4310, Jan. 24, 2001, pp. 465-475, XP001061316ISSN: 0277-786X.

(Continued)

*Primary Examiner* — Anthony J Daniels
(74) *Attorney, Agent, or Firm* — Frommer Lawrence & Haug LLP; William S. Frommer; Thomas F. Presson

(57) ABSTRACT

The present invention makes it possible to process at high speed the foreground component image and the background component image of picked up images on a network platform. A client computer 27 outputs information specifying image data desired to separate to a separation server 11. The separation server 11 obtains the specified image data from a storage server 18 and outputs it to a motion detecting server 12 to perform motion detection processing. Thereafter, the image data, motion vector and positional information are output to an area specifying server 13. The area specifying server 13 generates area information of the image data and outputs the area information to a mixture ratio calculating server 14 in addition to the image data, the motion vector and the positional information. The mixture ratio calculating server 14 calculates a mixture ratio on the basis of the image data, the motion vector, the positional information and the area information, and a foreground/background image separation server 15 separates foreground and background of the input image on the basis of such information. The present invention may be employed in a business model for image processing.

6 Claims, 137 Drawing Sheets

U.S. PATENT DOCUMENTS

| | | | |
|---|---|---|---|
| 5,915,044 A | 6/1999 | Gardos et al. | |
| 6,075,875 A | 6/2000 | Gu | |
| 6,128,046 A * | 10/2000 | Totsuka et al. | 348/590 |
| 6,249,613 B1 | 6/2001 | Crinon et al. | |
| 6,404,901 B1 * | 6/2002 | Itokawa | 382/103 |
| 6,822,760 B1 * | 11/2004 | Spaulding et al. | 358/1.9 |
| 2008/0107344 A1 * | 5/2008 | Blake et al. | 382/199 |

FOREIGN PATENT DOCUMENTS

| | | |
|---|---|---|
| EP | 0 933 727 | 8/1999 |
| JP | 3 62692 | 3/1991 |
| JP | 5 153493 | 6/1993 |
| JP | 6-113338 | 4/1994 |
| JP | 6-319130 | 11/1994 |
| JP | 7-336688 | 12/1995 |
| JP | 9 37153 | 2/1997 |
| JP | 9 245091 | 9/1997 |
| JP | 10 124651 | 5/1998 |
| JP | 10-164436 | 6/1998 |
| JP | 10 260808 | 9/1998 |
| JP | 10 290463 | 10/1998 |
| JP | 11 55686 | 2/1999 |
| JP | 11 112871 | 4/1999 |
| JP | 11 224285 | 8/1999 |
| JP | 2000-30040 | 1/2000 |
| JP | 2000-59758 | 2/2000 |
| JP | 2000 82145 | 3/2000 |
| JP | 2000 106681 | 4/2000 |
| JP | 2000 168187 | 6/2000 |
| JP | 2000 175118 | 6/2000 |
| JP | 2000 187478 | 7/2000 |
| JP | 2000 190669 | 7/2000 |
| JP | 2000 278633 | 10/2000 |
| JP | 2001 43398 | 2/2001 |
| JP | 2001 503895 | 3/2001 |
| JP | 2001-250119 | 9/2001 |
| JP | 2002-190015 | 7/2002 |
| JP | 2002-190016 | 7/2002 |
| JP | 2002-190028 | 7/2002 |
| JP | 4596227 | 10/2010 |

OTHER PUBLICATIONS

Mech R et al.: "A noise robust method for 2D shape estimation of moving objects in video sequences considering a moving camera" Signal Processing, Elsevier Science Publishers B.V. Amsterdam, NL, vol. 66, No. 2, Apr. 30, 1998, pp. 203-217, XP004129641 ISSN: 0165-1684.

Patent Abstract of Japan, 08-163406, date of publication Jun. 21, 1996.

\* cited by examiner

FIG. 28
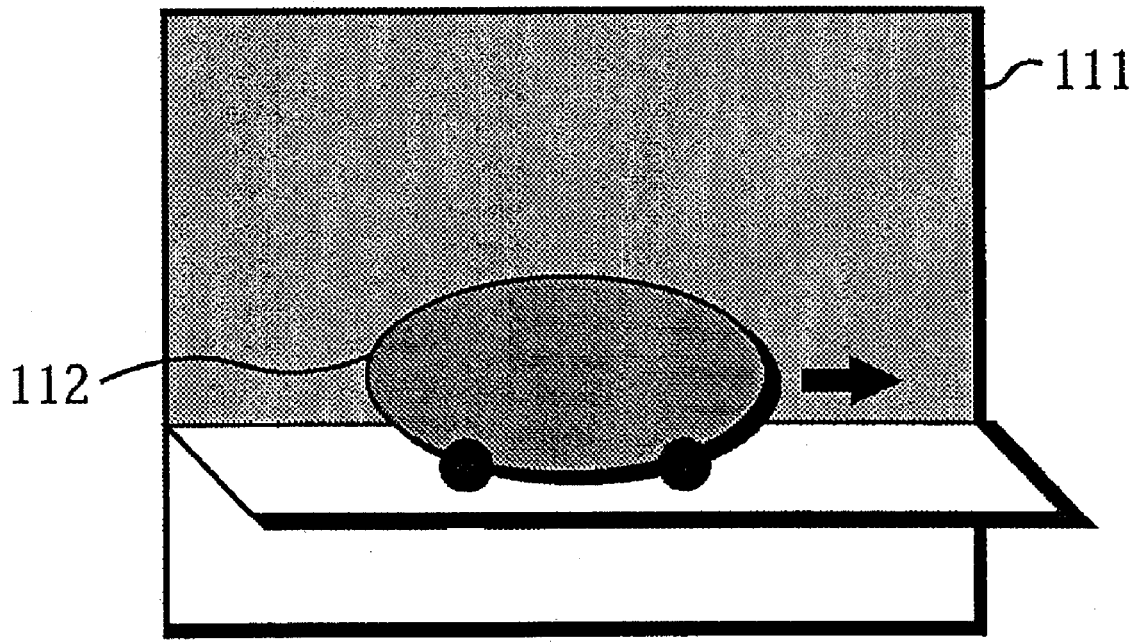
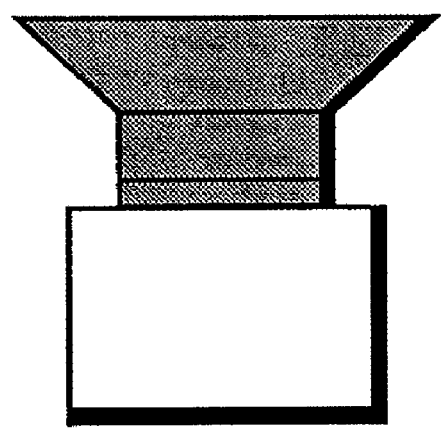

| AREA | | DESCRIPTION |
|---|---|---|
| BACKGROUND AREA | | STATIONARY PORTION |
| FOREGROUND AREA | | MOVING PORTION |
| MIXED AREA | COVERED BACKGROUND AREA | PORTION CHANGING FROM BACKGROUND TO FOREGROUND |
| | UNCOVERED BACKGROUND AREA | PORTION CHANGING FROM FOREGROUND TO BACKGROUND |

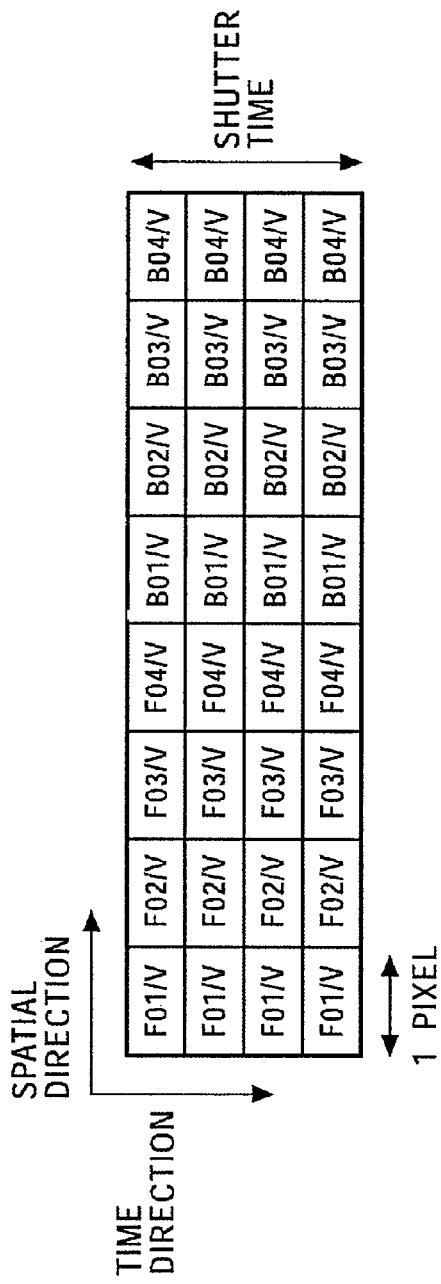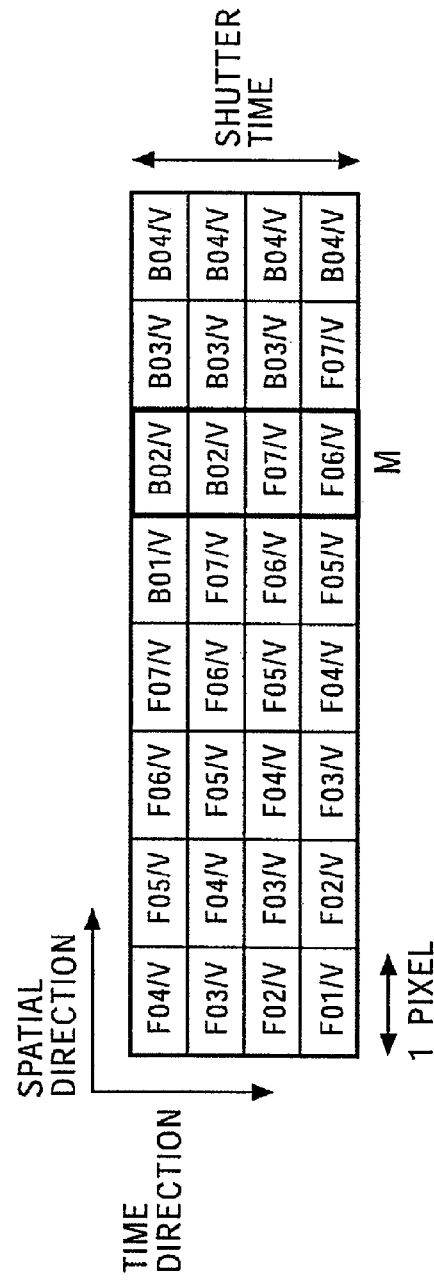

FIG. 50

| AREA DETERMINATION | STATIONARY/MOVING DETERMINATION BETWEEN FRAME #n 2 AND FRAME #n 1 | STATIONARY/MOVING DETERMINATION BETWEEN FRAME #n 1 AND FRAME #n | STATIONARY/MOVING DETERMINATION BETWEEN FRAME #n AND FRAME #n+1 | STATIONARY/MOVING DETERMINATION BETWEEN FRAME #n+1 AND FRAME #n+2 |
|---|---|---|---|---|
| COVERED BACKGROUND AREA DETERMINATION | STATIONARY | MOVING | — | — |
| STATIONARY AREA DETERMINATION | — | STATIONARY | STATIONARY | — |
| MOVING AREA DETERMINATION | — | MOVING | MOVING | — |
| UNCOVERED BACKGROUND AREA DETERMINATION | — | — | MOVING | STATIONARY |

FIG. 58A

| $X_0$ | $X_1$ | $X_2$ |
|---|---|---|
| $X_3$ | $X_4$ | $X_5$ |
| $X_6$ | $X_7$ | $X_8$ |

FIG. 58B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 59A

| $X_0$ | $X_1$ | $X_2$ |
|---|---|---|
| $X_3$ | $X_4$ | $X_5$ |
| $X_6$ | $X_7$ | $X_8$ |

FIG. 59B

| $Y_0$ | $Y_1$ | $Y_2$ |
|---|---|---|
| $Y_3$ | $Y_4$ | $Y_5$ |
| $Y_6$ | $Y_7$ | $Y_8$ |

FIG. 62

| | BACKGROUND AREA | FOREGROUND AREA | COVERED BACKGROUND AREA | UNCOVERED BACKGROUND AREA |
|---|---|---|---|---|
| FRAME #n-1 | — | 1 | 0 | — |
| FRAME #n | 0 | 1 | 1 | 1 |
| FRAME #n+1 | — | 1 | — | 0 |

FIG. 90A
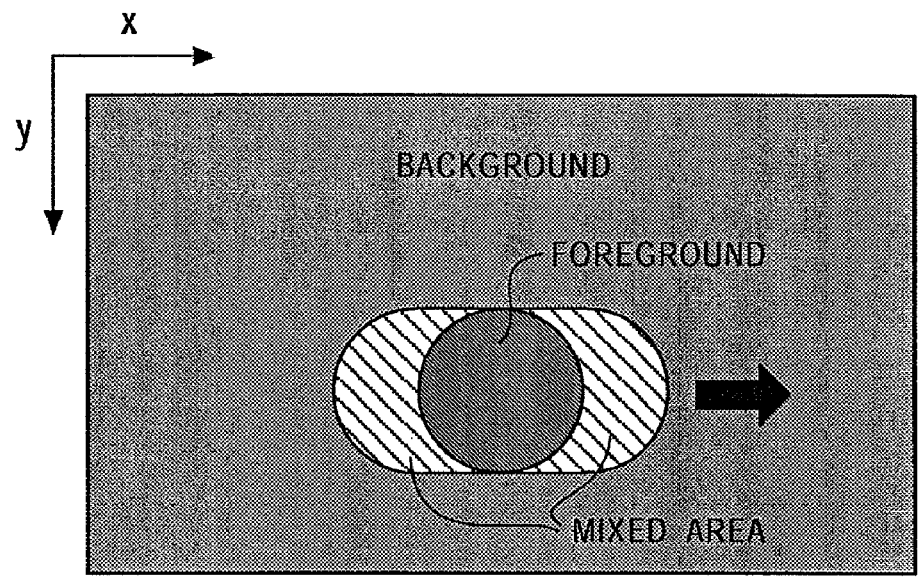
SEPARATE FOREGROUND AND BACKGROUND
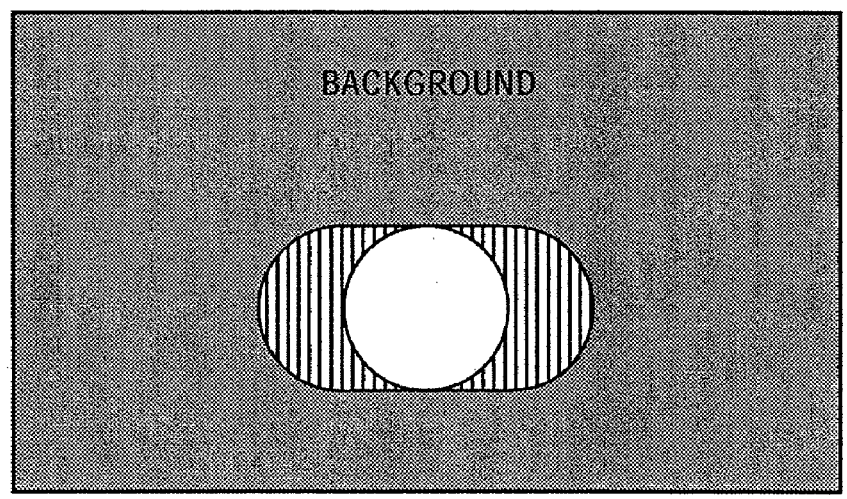
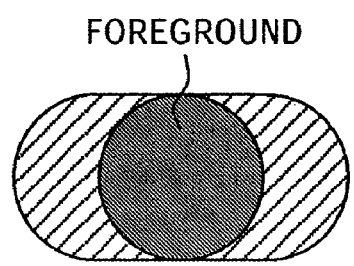

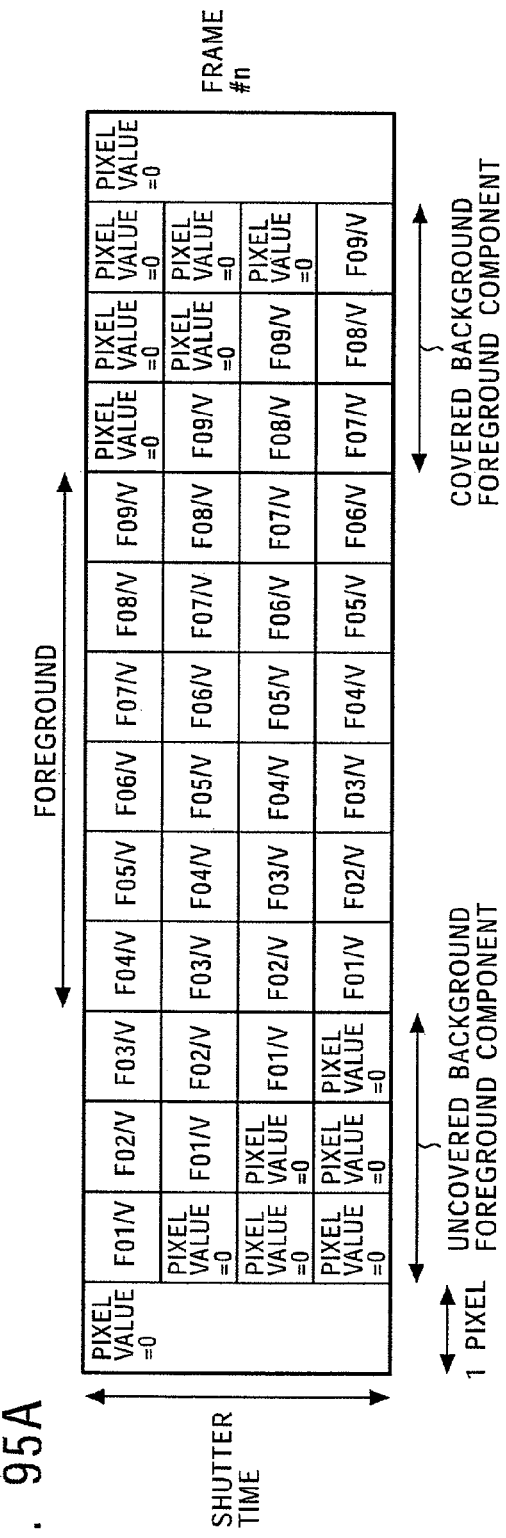
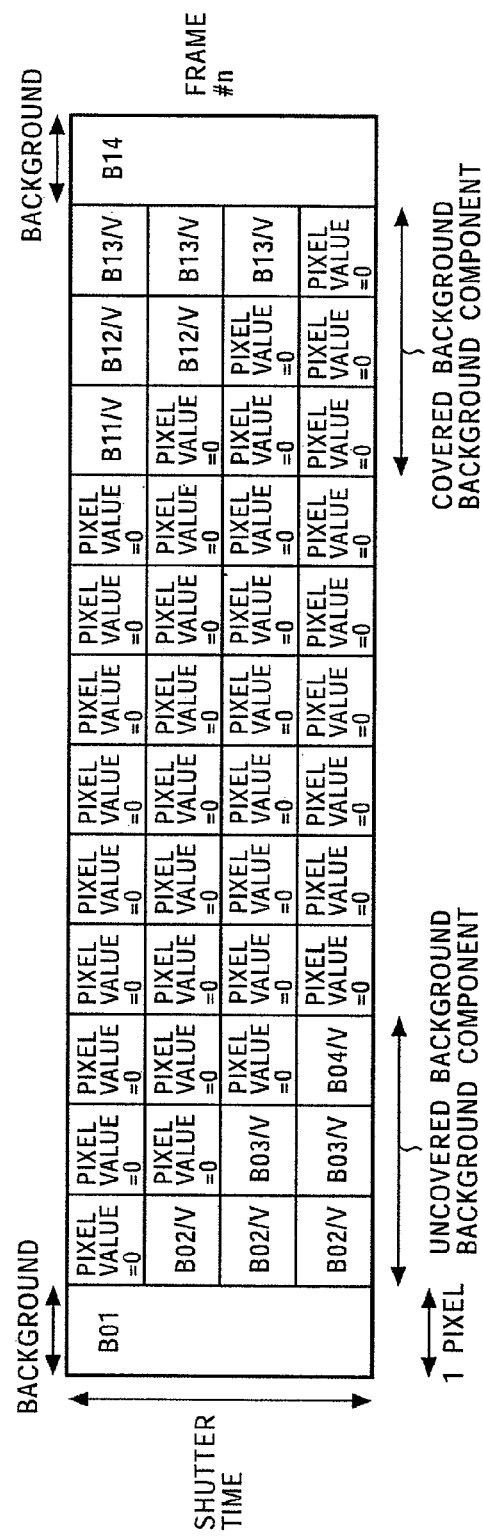
FIG. 95A
FIG. 95B

FIG. 139

| a0 | b0 | c0 | d0 | e0 |
|----|----|----|----|----|
| a1 | b1 | c1 | d1 | e1 |
| a2 | b2 | c2 | d2 | e2 |
| a3 | b3 | c3 | d3 | e3 |
| a4 | b4 | c4 | d4 | e4 |

| B0 | B1 | B2 | B3 | B4 | B5 | B6 | B7 | B8 |

FIG. 148

| ax0 | fx0 | kx0 | px0 | ux0 | B5x1/5 | B6x2/5 | B7x3/5 | B8x4/5 |
|---|---|---|---|---|---|---|---|---|
| | ax1 | fx1 | kx1 | px1 | ux1 | | | |
| B0x4/5 | | ax2 | fx2 | kx2 | px2 | ux2 | | |
| | B1x3/5 | | ax3 | fx3 | kx3 | px3 | ux3 | |
| | | B2x2/5 | B3x1/5 | ax4 | fx4 | kx4 | px4 | ux4 |

# COMMUNICATION SYSTEM AND METHOD THEREOF

This is a Continuation of U.S. application Ser. No. 10/362,725, filed Oct. 27, 2003 now U.S. Pat. No. 7,619,655, which is a 371 of PCT/JP02/06386 filed on Jun. 26, 2002, which claims the benefit of JAPAN 2001-195592, filed on Jun. 27, 2001, all of which are hereby incorporated by reference in their entirety herein.

TECHNICAL FIELD

The present invention relates to a communication system and a method thereof, and more particularly, to a communication system and a method for distributing image processing to a plurality of servers on a network to perform separated or isolated image processing desired by a user, wherein the communication system and the method make it possible to improve the speed of image processing on a network platform at reduced costs.

BACKGROUND ART

In general, techniques for synthesizing images desired by a user on a network are widely known.

Synthesized image is usually generated by overlapping and joining a number of pre-existing images such as images having already been stored in a server connected through a network or images having been made available from digital still cameras. In some cases, the synthesized image may be generated by a texture mapping.

However, there are problems in that synthesized images generated by using the above conventional methods give rise to the occurrences of motion blur. For example, motion blur commonly occurs with a moving body that cannot be accurately adjusted into the synthesized images. Consequently, synthesizing processes are performed with low accuracy and unnatural appearances are frequently generated in the synthesized images.

Additionally, if one server performs synthesizing process in a multiple bundle task, a significant duration of time is required for the process. For example, even when the same background images are to be overlapped, the overlapping process is repeated as many times as the number of images desired. This poses a problem to users in that when the processing services are charged by time, the cost can be a considerable burden.

DISCLOSURE OF INVENTION

In view of the foregoing, it is an object of the present invention to provide a communication system and a method for distributing image processing characterized by having multiple tasks to a plurality of servers on a network to perform separated or isolated image processing desired by a user, wherein the communication system and the method make it possible to improve the speed of image processing on a network platform at reduced costs.

A first communication apparatus of the present invention comprises a separating means for separating a predetermined image data that is obtained by an image pickup element having a predetermined number of pixels, each having a time integration effect, and that is comprised of pixel values determined every pixel in accordance with an amount of light forming an image integrated over time, into a foreground component image having foreground object components constituting a foreground object and a background component image having background object components constituting a background object; a requested information input means for inputting requested information of a user; and an encoded data output means for outputting encoded data generated when the image is separated into a foreground component image and a background component image by the separating means on the basis of the requested information input by the requested information input means.

A charging means may be further comprised for performing a charge processing in accordance with the requested information.

The charging means may generate charge information including a user ID, a communication system ID and cost information corresponding to the requested information in accordance with the requested information.

The charging means may perform a charge processing with respect to a financial account of the user on the basis of the charge information.

The charging means may perform the charge processing by deducting the number of points corresponding to the cost information from the number of points of each user used in the charge processing.

The encoded data output means may output the encoded data in a way obtainable only to a user having finished the charge processing after the charge processing has been finished by the charging means.

The requested information input means may input a predetermined image data in addition to the requested information of a user. The encoded data output means may output the encoded data as a significant information generated when the image is separated into the foreground component image and the background component image by the separating means on the basis of the requested information input by the requested information input means and the predetermined image data, in a way obtainable only to the user having finished the charge processing after the charge processing has been finished by the charging means.

An area information generating means for generating area information for discerning any of a foreground area having foreground object components constituting the foreground object of the predetermined image data, a background area having background object components constituting the background object of the predetermined image data and a mixed area in which the foreground area and the background area are mixed may be further comprised. The significant information may include the area information and the encoded data output means may output the encoded data as the area information generated when the image is separated into the foreground component image and the background component image by the separating means on the basis of the requested information input by the requested information input means and the predetermined image data, in a way obtainable only to the user after the charge processing has been finished by the charging means.

A mixture ratio generating means for generating a mixture ratio indicating a ratio in which the foreground area and the background area are mixed in the mixed area of the predetermined image data may be further comprised. The significant information may include the mixture ratio and the encoded data output means may output the encoded data as the mixture ratio generated when the image is separated into the foreground component image and the background component image by the separating means on the basis of the requested information input by the requested information input means and the predetermined image data, in a way obtainable only to the user after the charge processing has been finished by the charging means.

The separating means may separate a predetermined image data that is obtained by an image pickup element having a predetermined number of pixels, each having a time integration effect, and that is comprised of pixel values determined every pixel in accordance with an amount of light forming a predetermined image integrated over time, into a foreground component image having foreground object components constituting the foreground object and a background component image having background object components constituting the background object on the basis of the area information and the mixture ratio. The significant information may include the foreground component image and the background component image and the encoded data output means may output the requested information input by the requested information input means and the encoded data as the foreground component image and the background component image generated when the image is separated into the foreground component image and the background component image by the separating means, in a way obtainable only to the user after the charge processing has been finished by the charging means.

The requested information input means may input an image data ID for discerning a predetermined image data in addition to the requested information of a user, and the encoded data output means may output the encoded data as the significant information generated when the predetermined image is separated into the foreground component image and the background component image by the separating means on the basis of the requested information input by the requested information input means and the predetermined image data corresponding to the image data ID, in a way obtainable only to the user after the charge processing has been finished by the charging means.

An area information generating means for generating area information for discerning any of a foreground area having foreground object components constituting the foreground object of the predetermined image data corresponding to the image data ID, a background area having background object components constituting the background object of the predetermined image data corresponding to the image data ID and a mixed area in which the foreground area and the background area are mixed may be further comprised. The significant information may include the area information and the encoded data output means may output the encoded data as the area information generated when the predetermined image is separated into the foreground component image and the background component image by the separating means on the basis of the requested information input by the requested information input means and the predetermined image data, in a way obtainable only to the user after the charge processing has been finished by the charging means.

A mixture ratio generating means for generating a mixture ratio of the mixed area in the predetermined image data corresponding to the image data ID may be further comprised. The significant information may include the mixture ratio and the encoded data output means may output the encoded data as the mixture ratio generated when the predetermined image is separated into the foreground component image and the background component image by the separating means on the basis of the requested information input by the requested information input means and the predetermined image data corresponding to the image data ID, in a way obtainable only to the user after the charge processing has been finished by said charging means.

The separating means may separate a predetermined image data that is obtained by an image pickup element having a predetermined number of pixels, each having a time integration effect, and that is comprised of pixel values determined every pixel in accordance with an amount of light forming an image integrated over time, into a foreground component image having foreground object components constituting the foreground object and a background component image having background object components constituting the background object on the basis of the area information and the mixture ratio. The significant information may include the foreground component image and the background component image and the encoded data output means may output the requested information input by the requested information input means and the encoded data as the foreground component image and the background component image generated when a predetermined image is separated into the foreground component image and the background component image by the separating means, in a way obtainable only to a user after the charge processing has been finished by the charging means.

A first communication method of the present invention comprises: a separating step of separating a predetermined image data that is obtained by an image pickup element having a predetermined number of pixels, each having a time integration effect, and that is comprised of pixel values determined every pixel in accordance with an amount of light forming an image integrated over time, into a foreground component image having foreground object components constituting a foreground object and a background component image having background object components constituting a background object; a requested information input step of inputting requested information of a user; and an encoded data output step of outputting encoded data generated when an image is separated into the foreground component image and the background component image in the separating step on the basis of the requested information input in the requested information input step.

A program of a first recording medium of the present invention comprises: a separation control step of controlling separation of an image data that is obtained by an image pickup element having a predetermined number of pixels, each having a time integration effect, and that is comprised of pixel values determined every pixel in accordance with an amount of light forming an image integrated over time, into a foreground component image having foreground object components constituting a foreground object and a background component image having background object components constituting a background object; a requested information input control step of controlling input of requested information of a user; and an encoded data output control step of controlling output of encoded data generated when an image is separated into the foreground component image and the background component image in the separation control step on the basis of the requested information input in the requested information input control step.

A first program of the present invention makes a computer perform: a separation control step of controlling separation of a predetermined image data that is obtained by an image pickup element having a predetermined number of pixels, each having a time integration effect, and that is comprised of pixel values determined every pixel in accordance with an amount of light forming an image integrated over time, into a foreground component image having foreground object components constituting a foreground object and a background component image having background object components constituting a background object; a requested information input control step of controlling input of requested information of a user; and an encoded data output control step of controlling output of encoded data generated when an image is separated into the foreground component image and the background component image in the separation control step on the basis of the requested information input in said requested information input control step.

In the first communication system, the method thereof and the first program, an image data that is obtained by an image pickup element having a predetermined number of pixels, each having a time integration effect, and that is comprised of pixel values determined every pixel in accordance with an amount of light forming an image integrated over time is separated into a foreground component image having foreground object components constituting a foreground object and a background component image having background object components constituting a background object; requested information of a user is input; and encoded data generated when an image is separated into the foreground component image and the background component image on the basis of the requested information input is output.

BRIEF DESCRIPTION OF THE DRAWINGS

FIG. 28 is a diagram illustrating image pickup by a sensor;

FIG. 34 is a modeling diagram in which pixel values are expanded in the time direction and shutter time which is divided into a time interval;

FIG. 35 is a modeling diagram in which pixel values are expanded in the time direction and shutter time which is divided into a time interval;

FIG. 50 is a diagram illustrating conditions of an area determination;

FIG. 51A is a diagram illustrating an example of an area specification result in the area specifying unit 103;

FIG. 51B is a diagram illustrating an example of an area specification result in the area specifying unit 103;

FIG. 58A is a diagram illustrating calculation of correlation value;

FIG. 58B is a diagram illustrating calculation of correlation value;

FIG. 59A is a diagram illustrating calculation of correlation value;

FIG. 59B is a diagram illustrating calculation of correlation value;

FIG. 62 is a diagram illustrating a determination in an area determining portion 342;

FIG. 90A is a diagram showing an input image, a foreground component image and a background component image;

FIG. 95A is a diagram showing an example of a foreground component image and a background component image separated;

FIG. 95B is a diagram showing an example of a foreground component image and a background component image separated;

FIG. 112 is a block diagram showing another configuration of a function of the separation server;

FIG. 113 is a block diagram showing a configuration of a mixture ratio calculator 1101;

FIG. 114 is a block diagram showing a configuration of a foreground/background separator 1102;

FIG. 115 is a block diagram showing another configuration of a function of the separation server;

FIG. 116 is a diagram showing a configuration of a synthesizer 1201;

FIG. 117 is a flowchart illustrating a separating service;

FIG. 118 is a flowchart illustrating a charge processing;

FIG. 119 is a diagram illustrating a charge processing;

FIG. 120 is a flowchart illustrating another example of the charge processing;

FIG. 121 is a flowchart illustrating a motion detecting service;

FIG. 122 is a flowchart illustrating an area specifying service;

FIG. 123 is a flowchart illustrating a mixture ratio calculating service;

Figure 124:
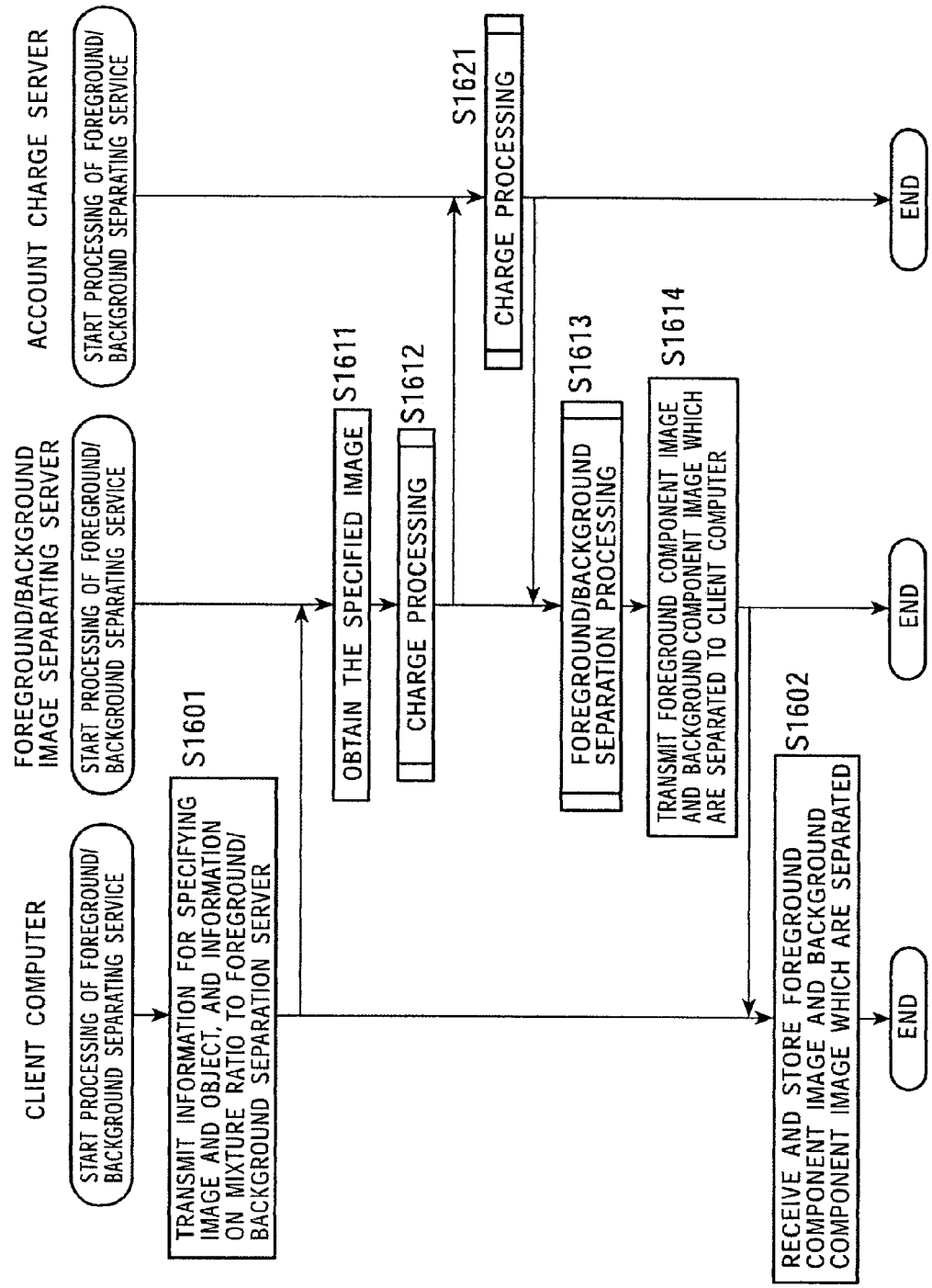
Figure 125:
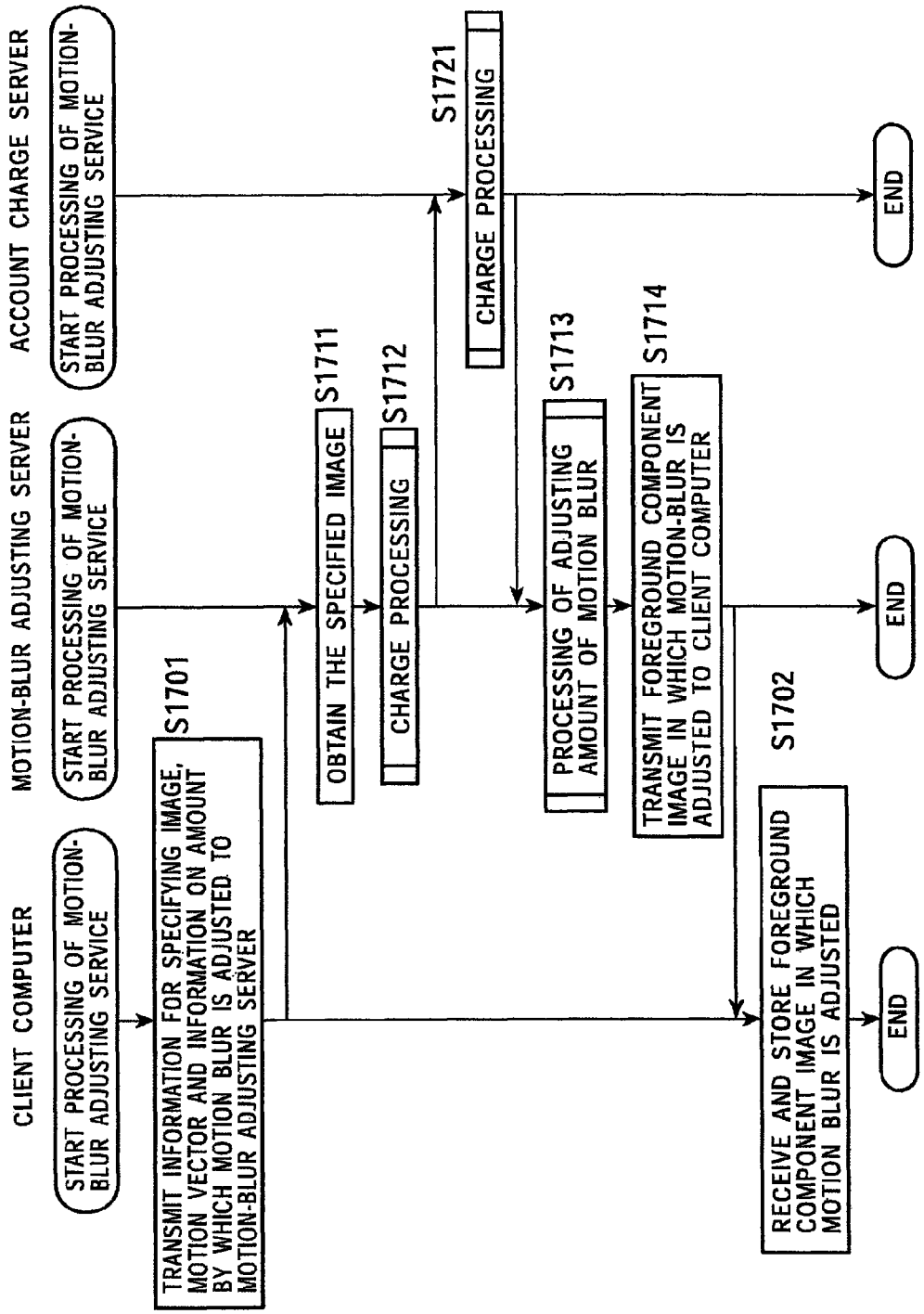
Figure 126:
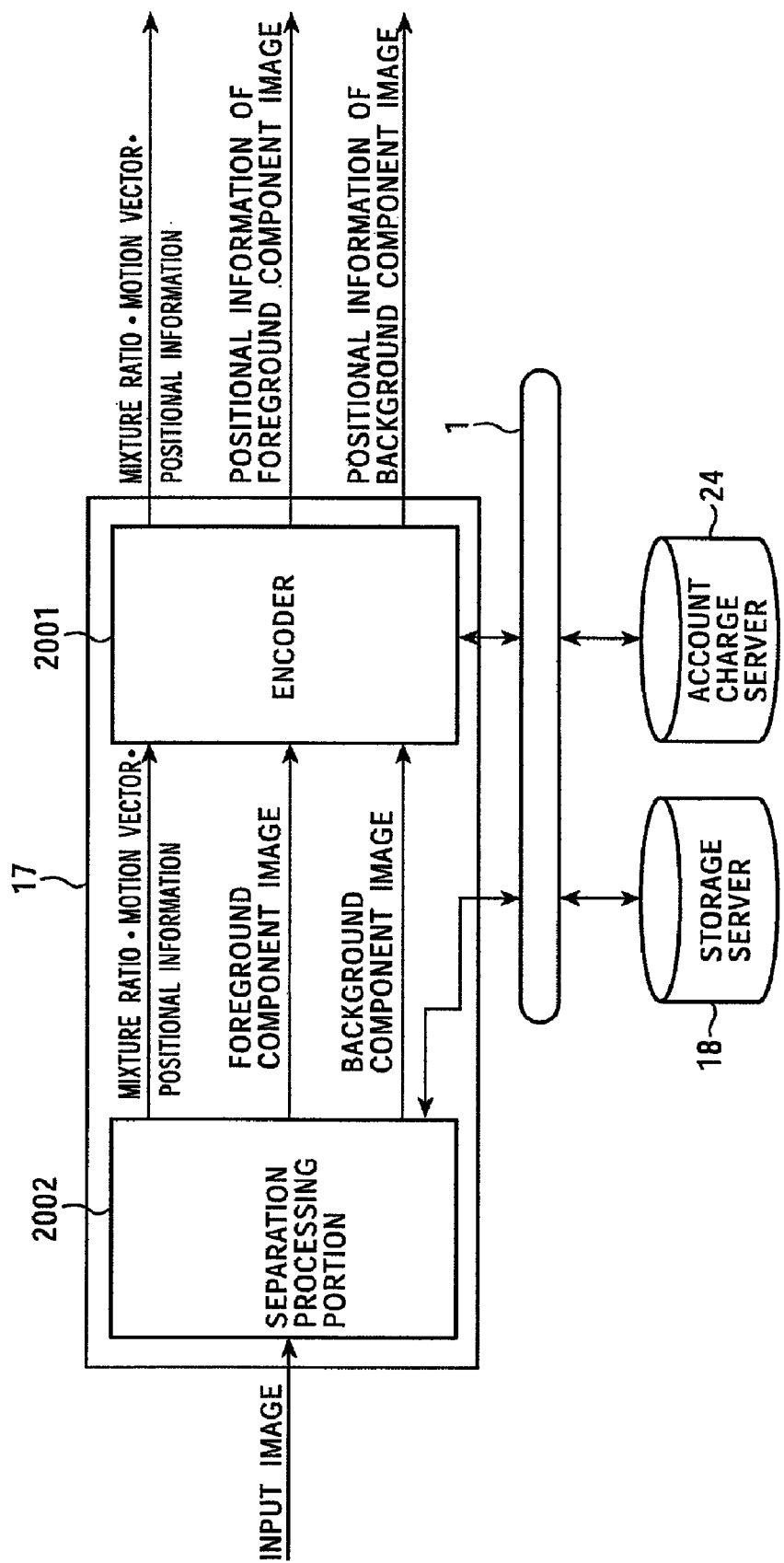
Figure 127:
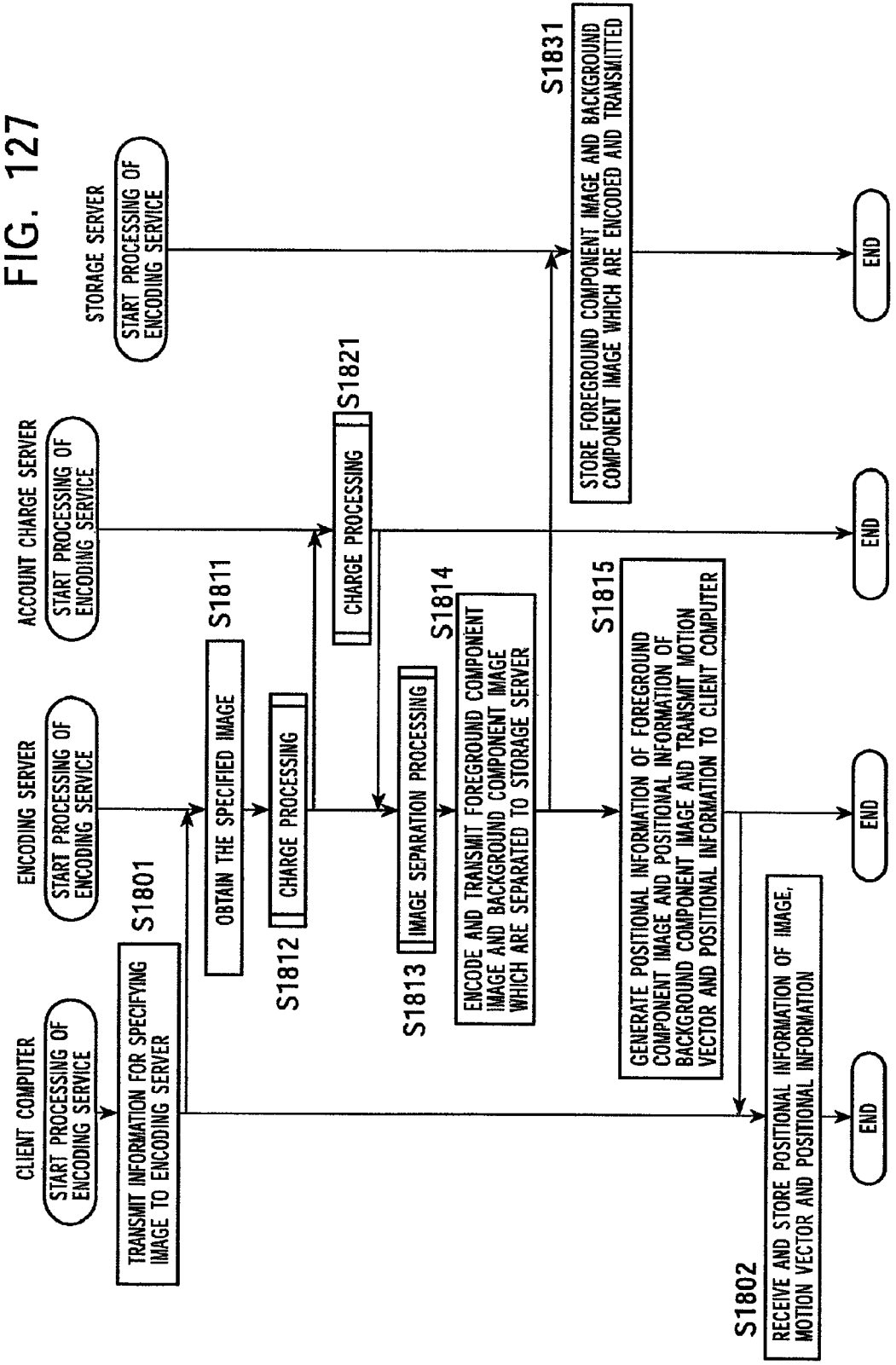
Figure 128:
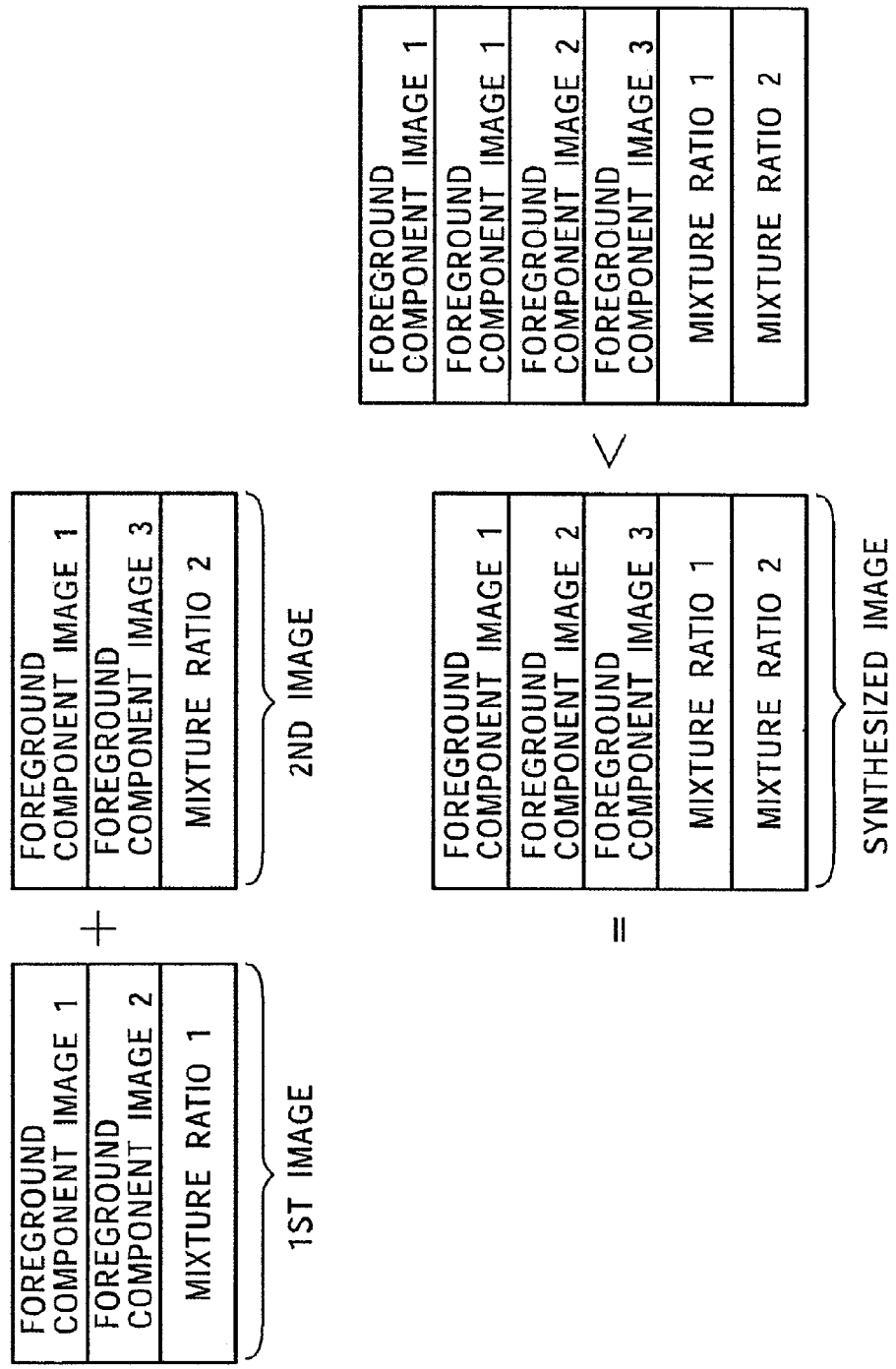
Figure 129:
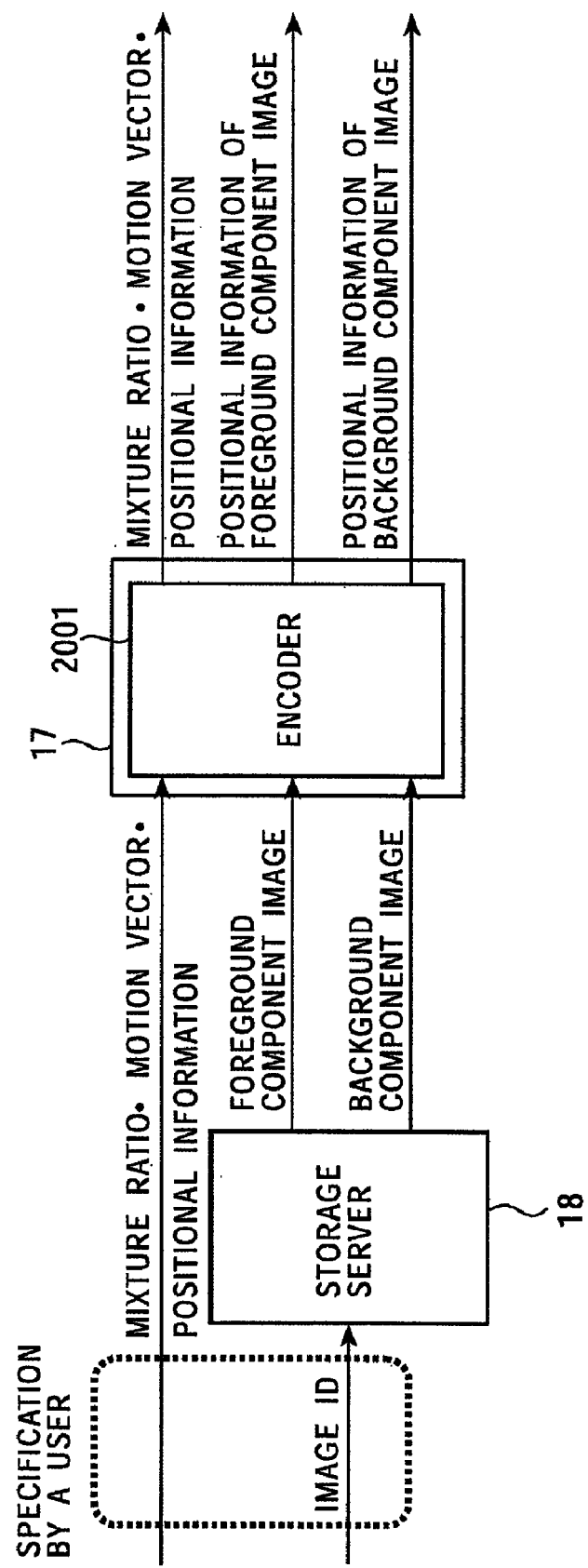
Figure 130:
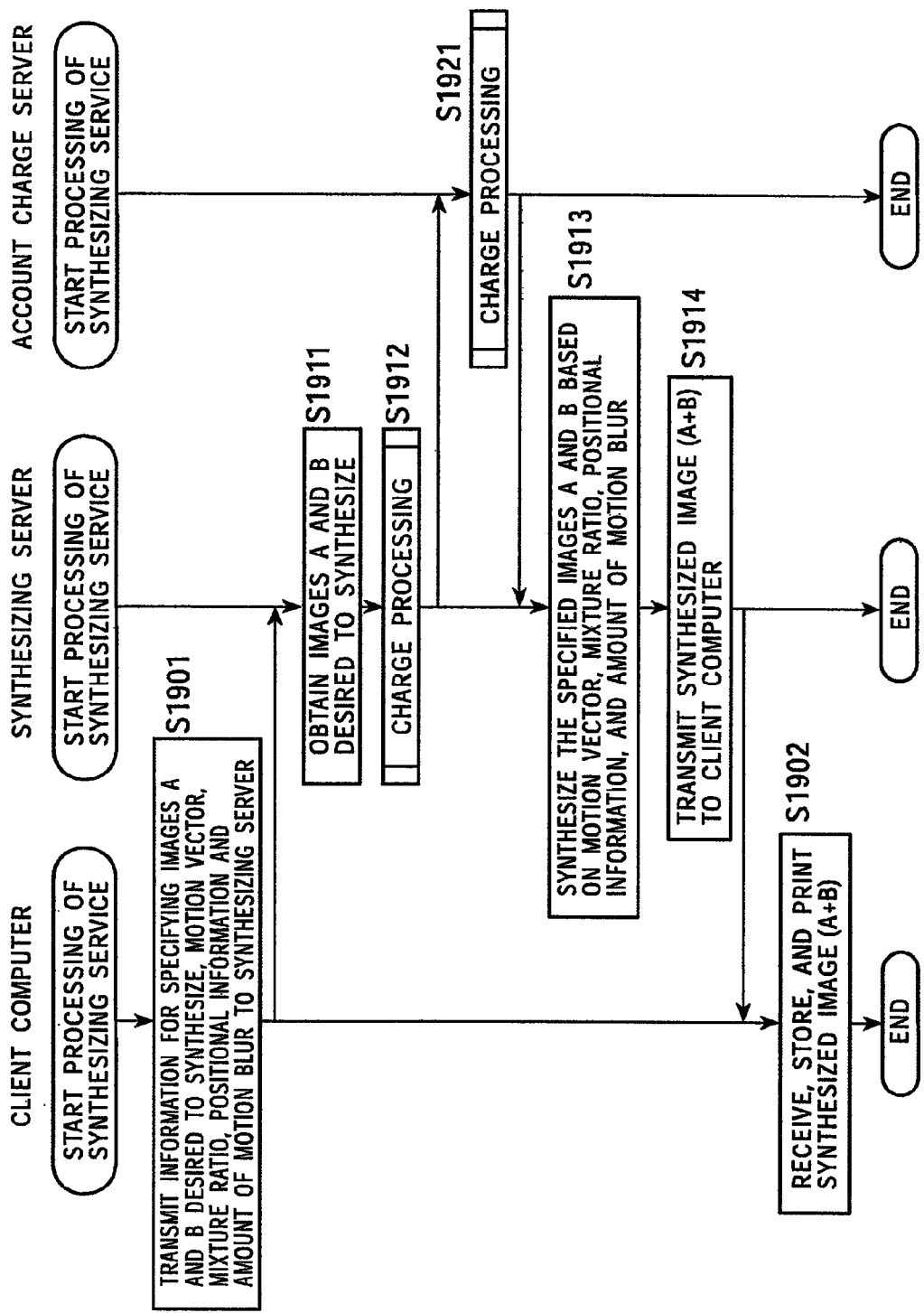
Figure 131:
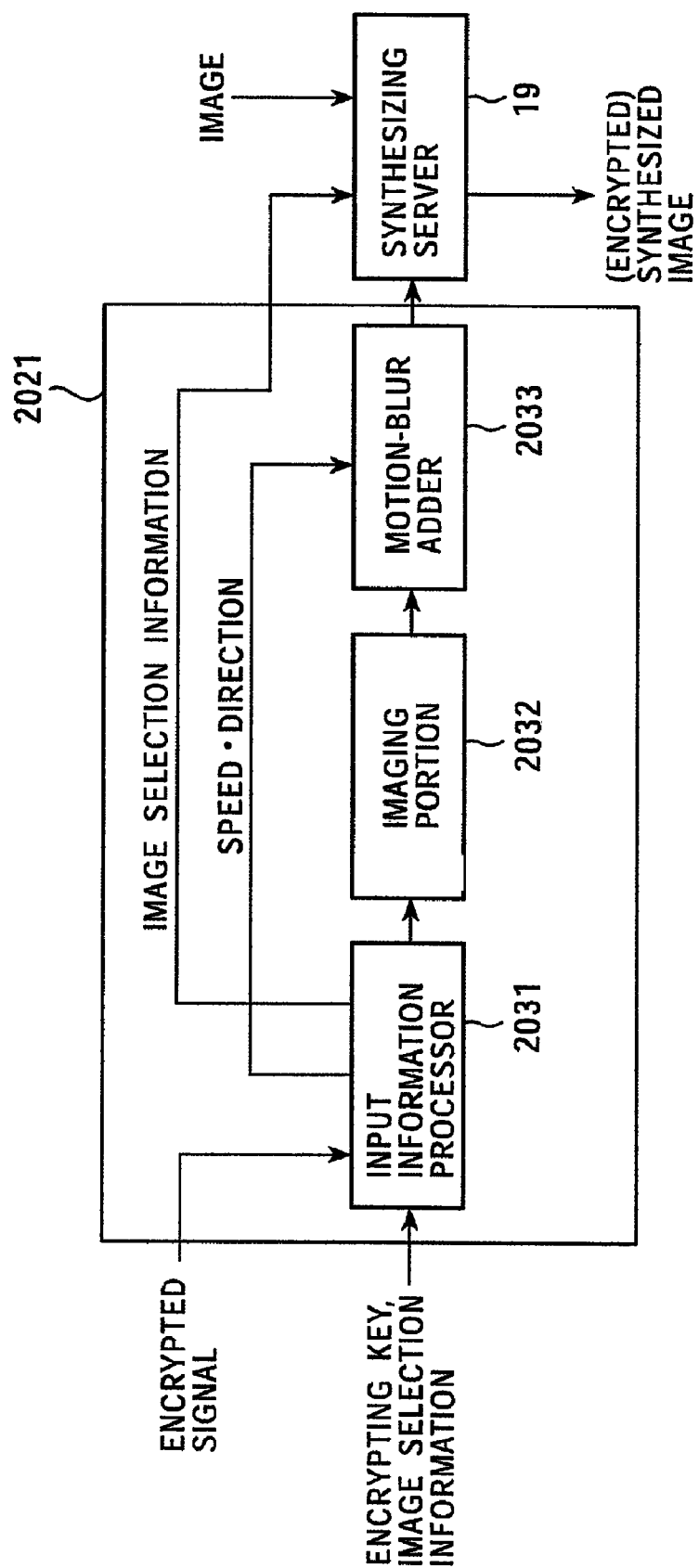
Figure 132:
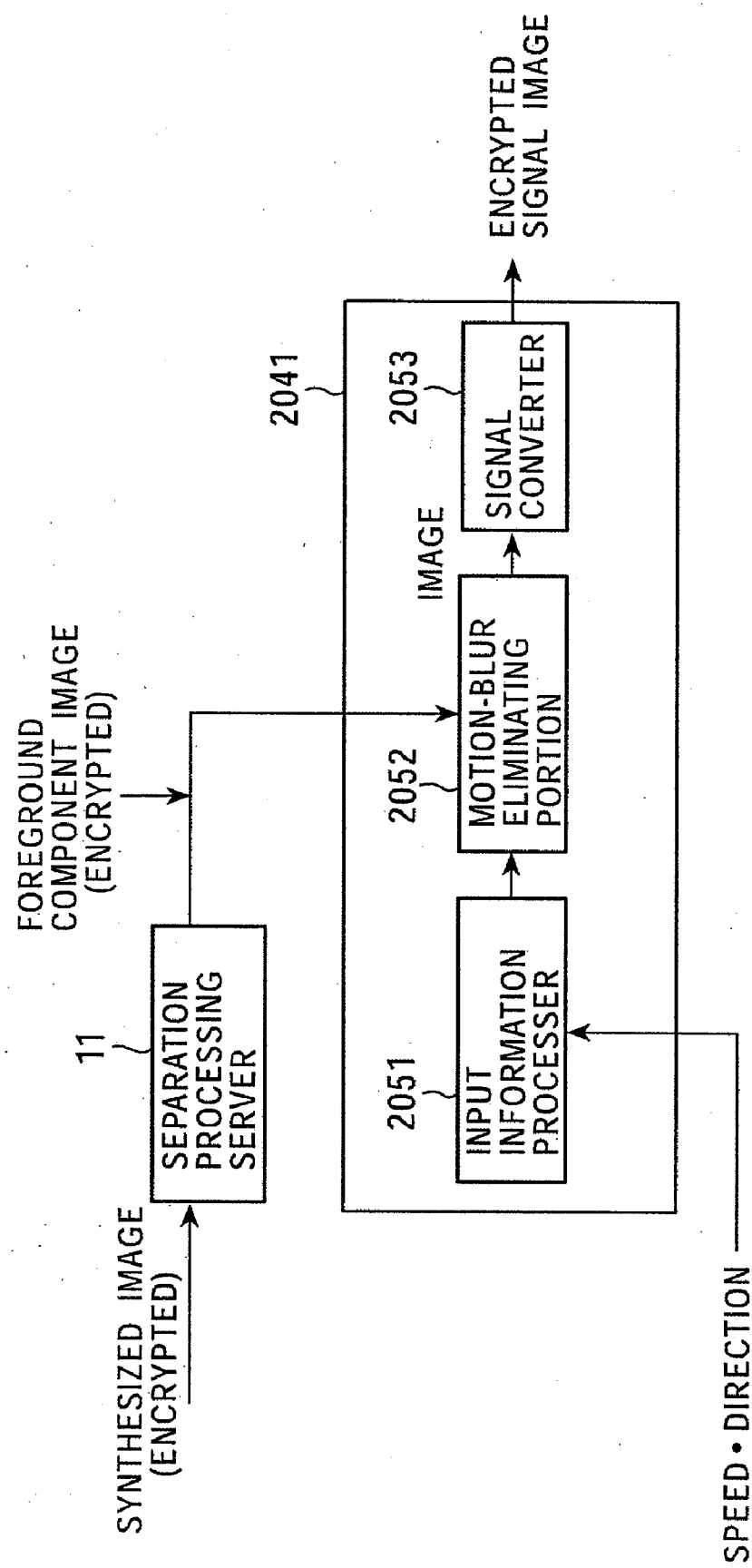
Figure 133:
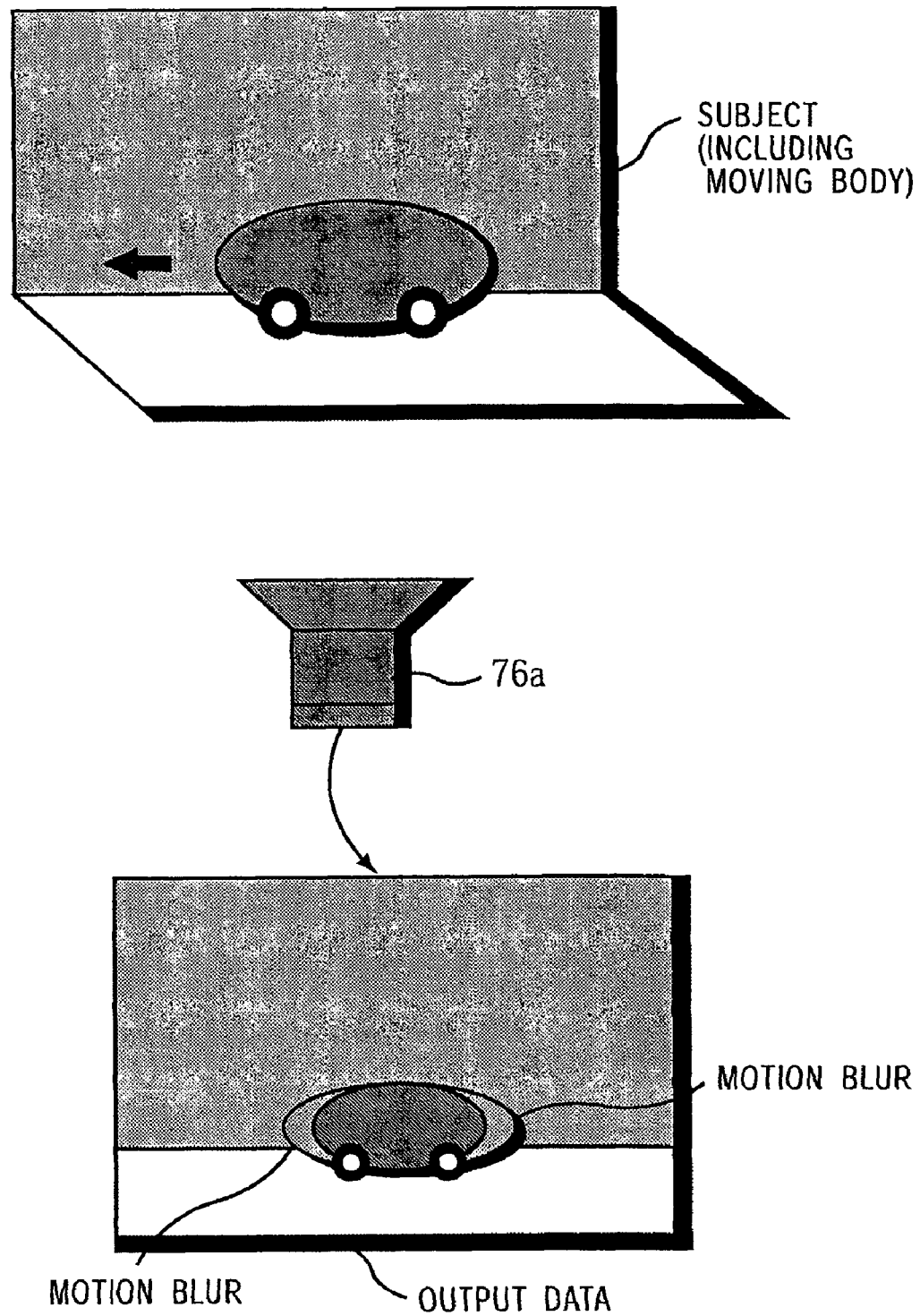
Figure 134:
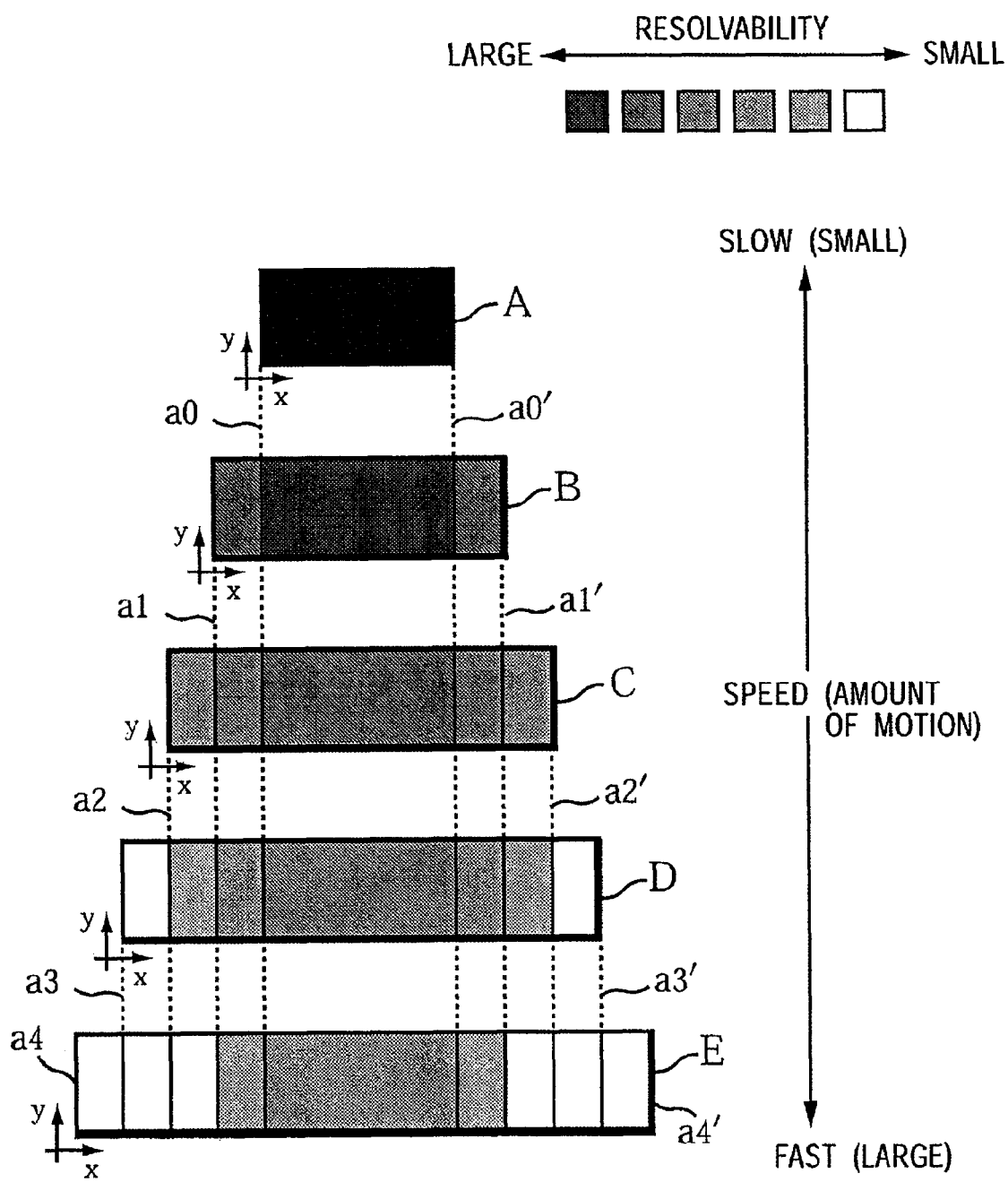
Figure 135:
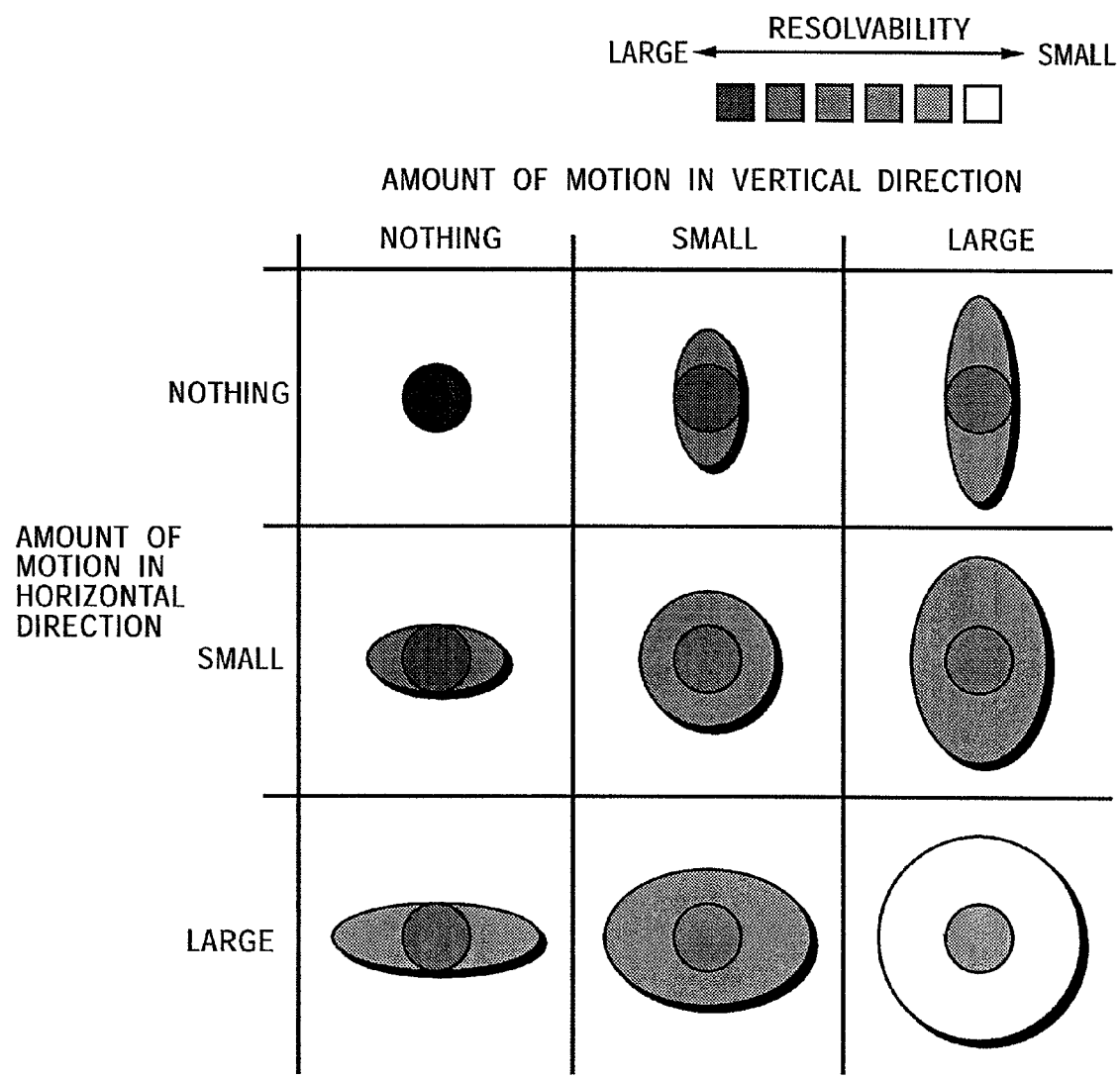
Figure 136:
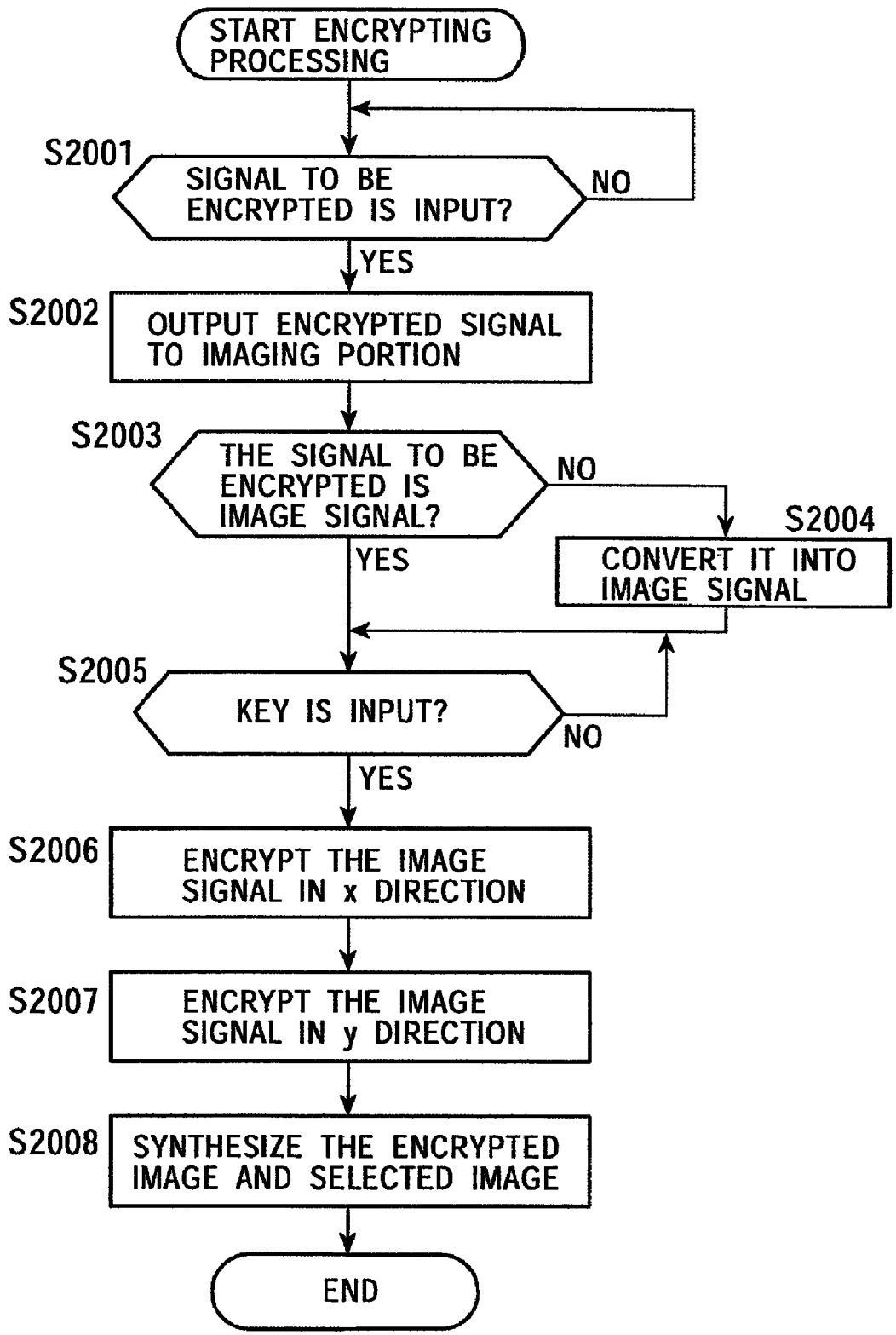
Figure 137:
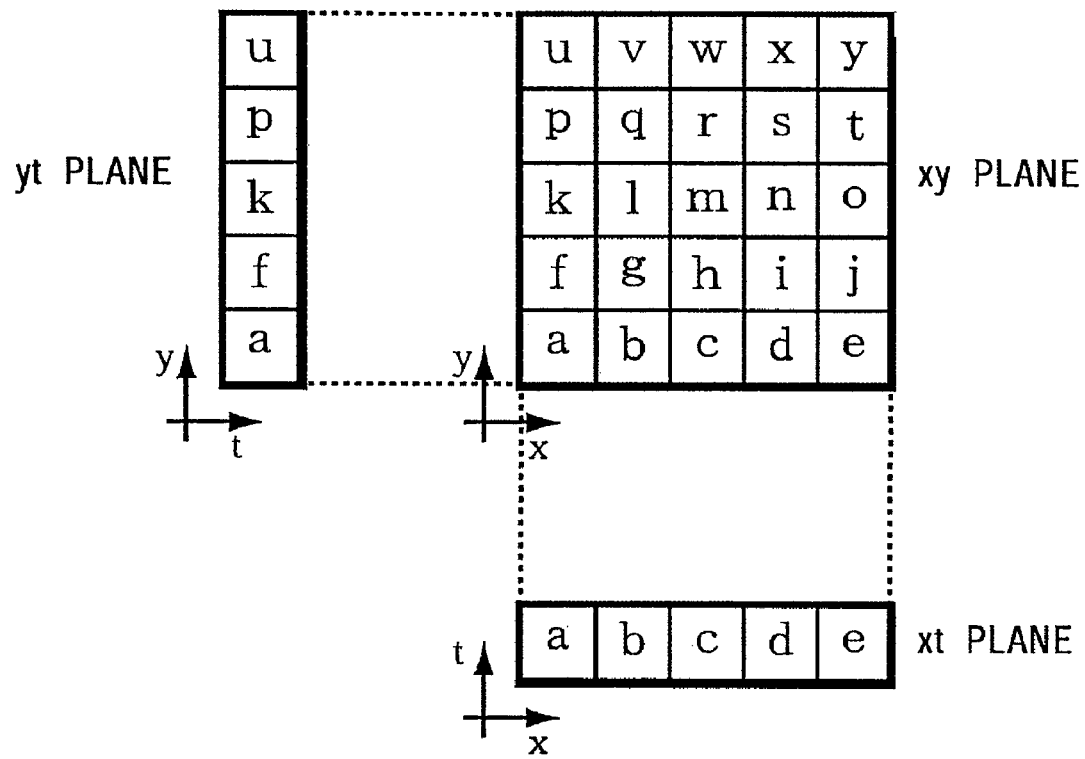
Figure 138:
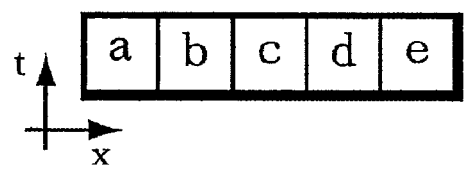
Figure 141:
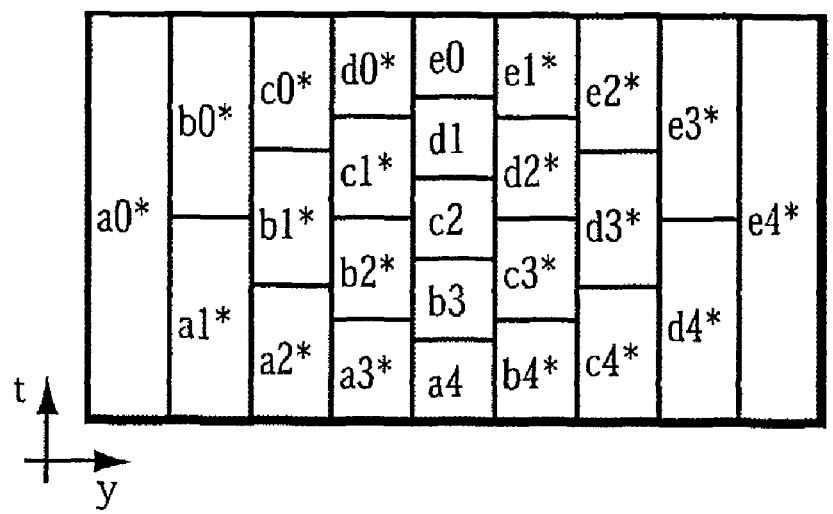
Figure 142:
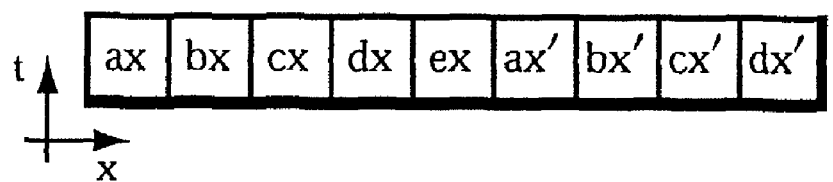
Figure 143:
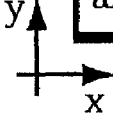
Figure 144:
Figure 145:
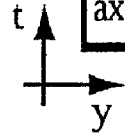
Figure 146:
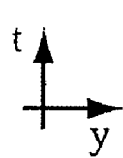
Figure 149:
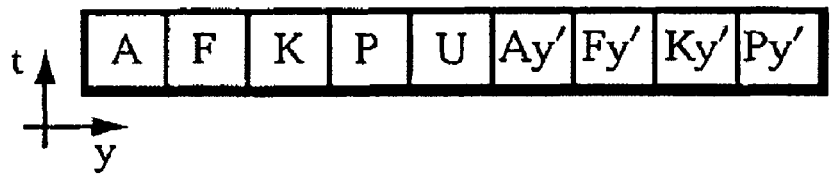
Figure 150:
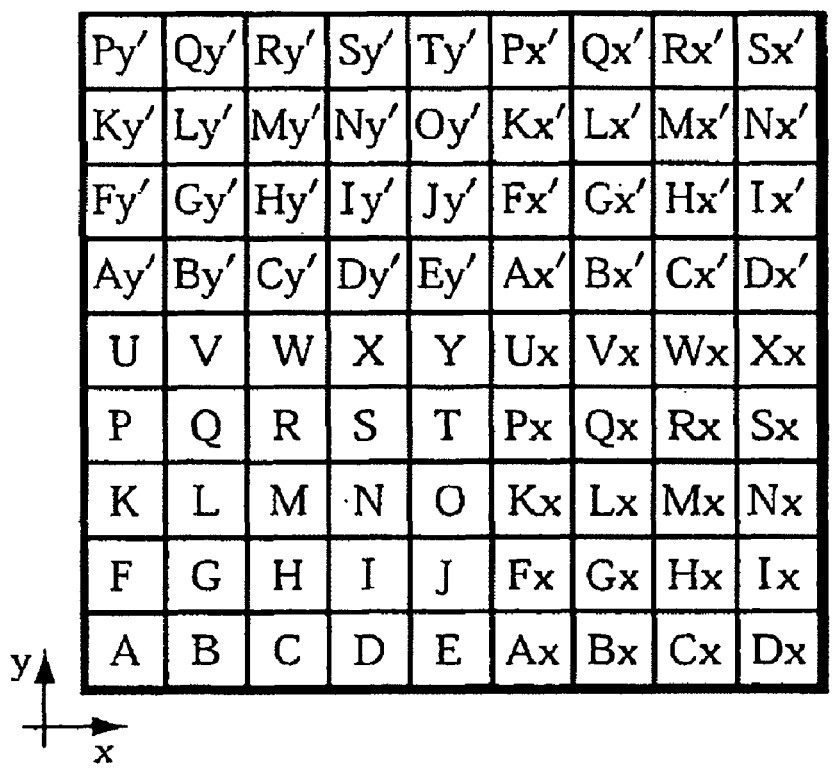
Figure 151:
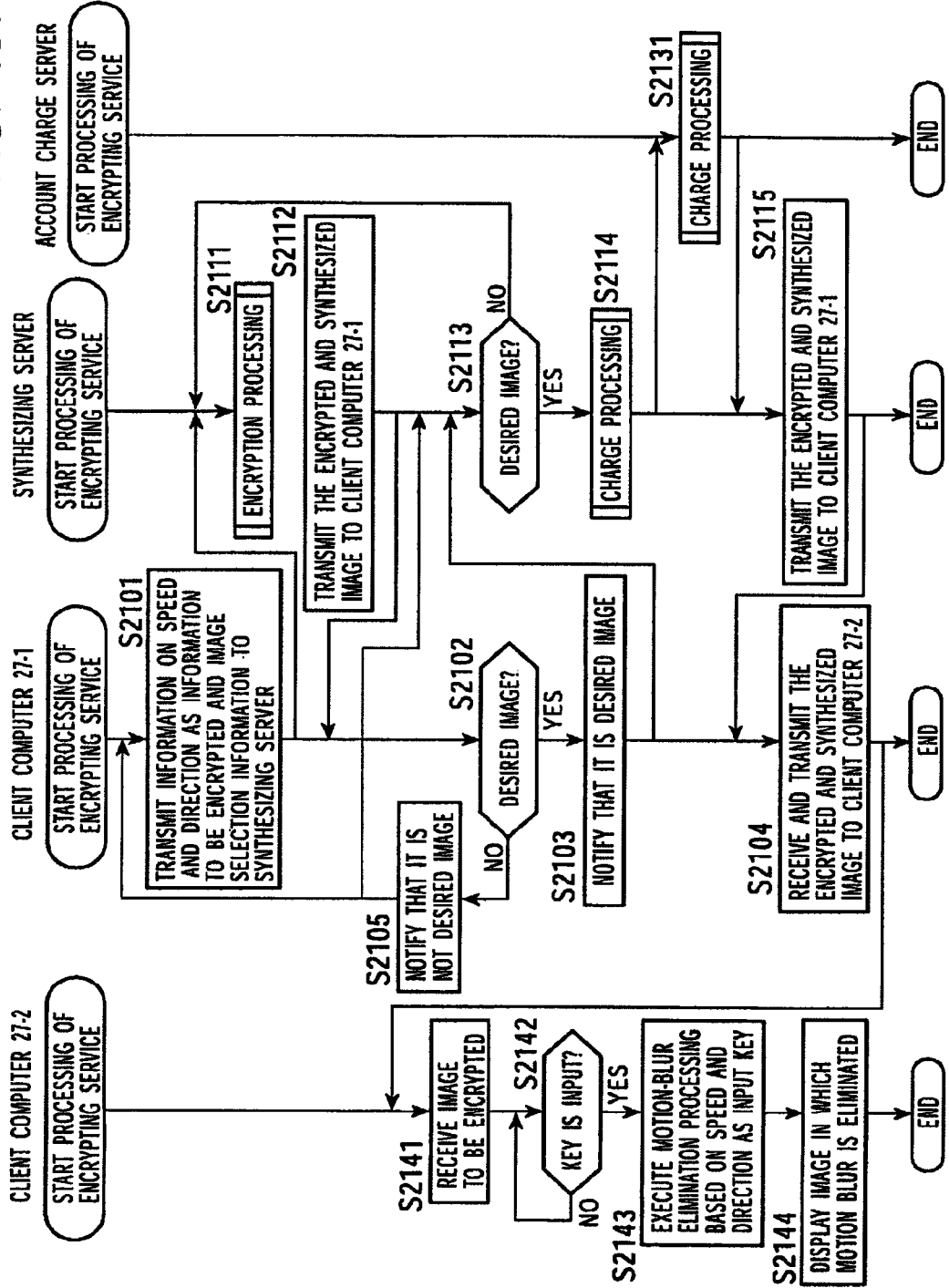
Figure 152:
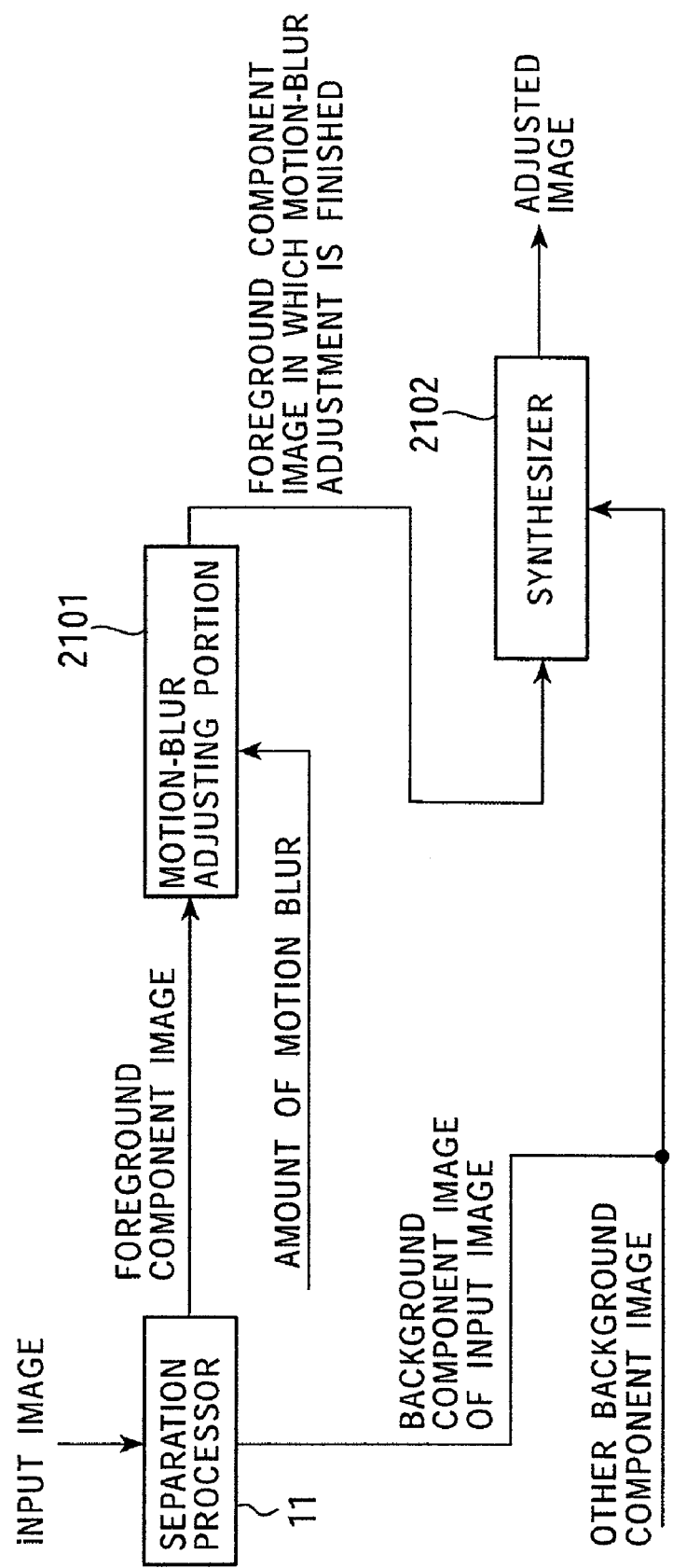
Figure 153A:
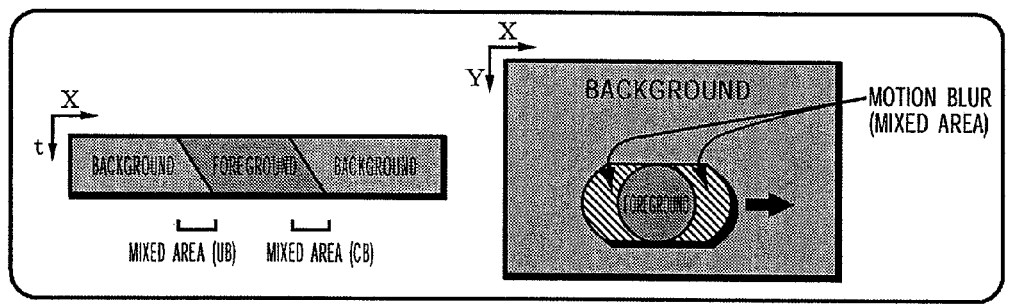
Figure 153B:
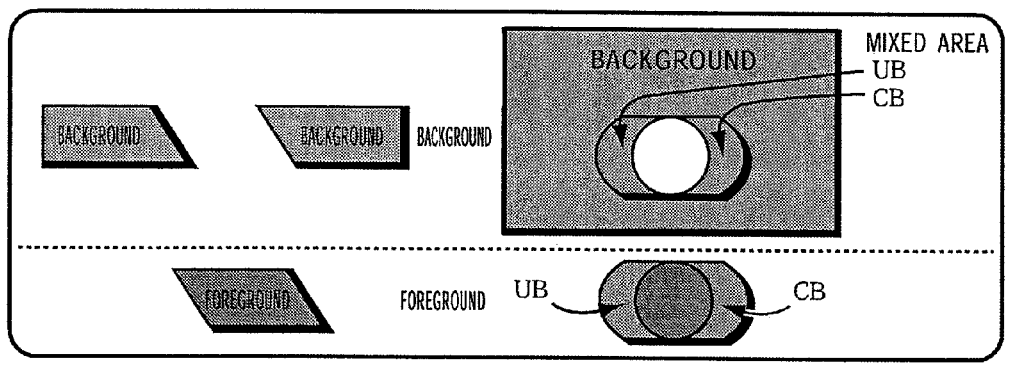
Figure 153C:
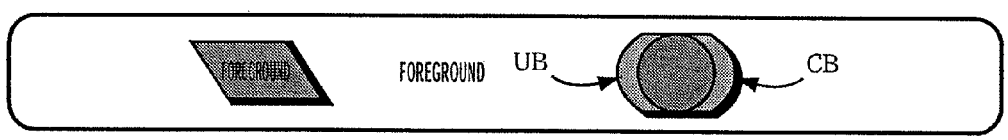
Figure 153D:
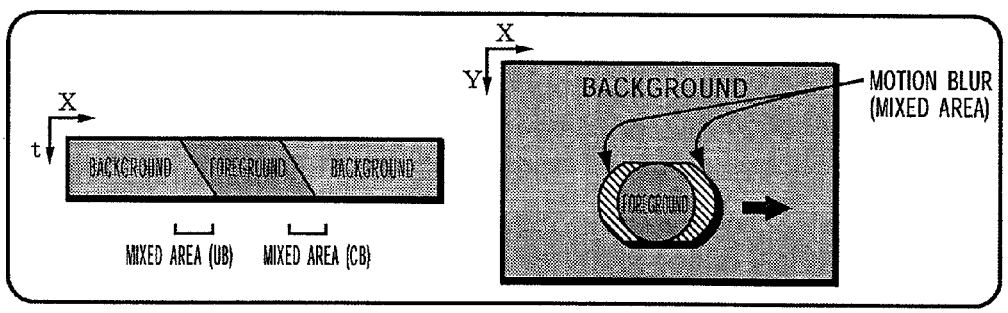
Figure 154:
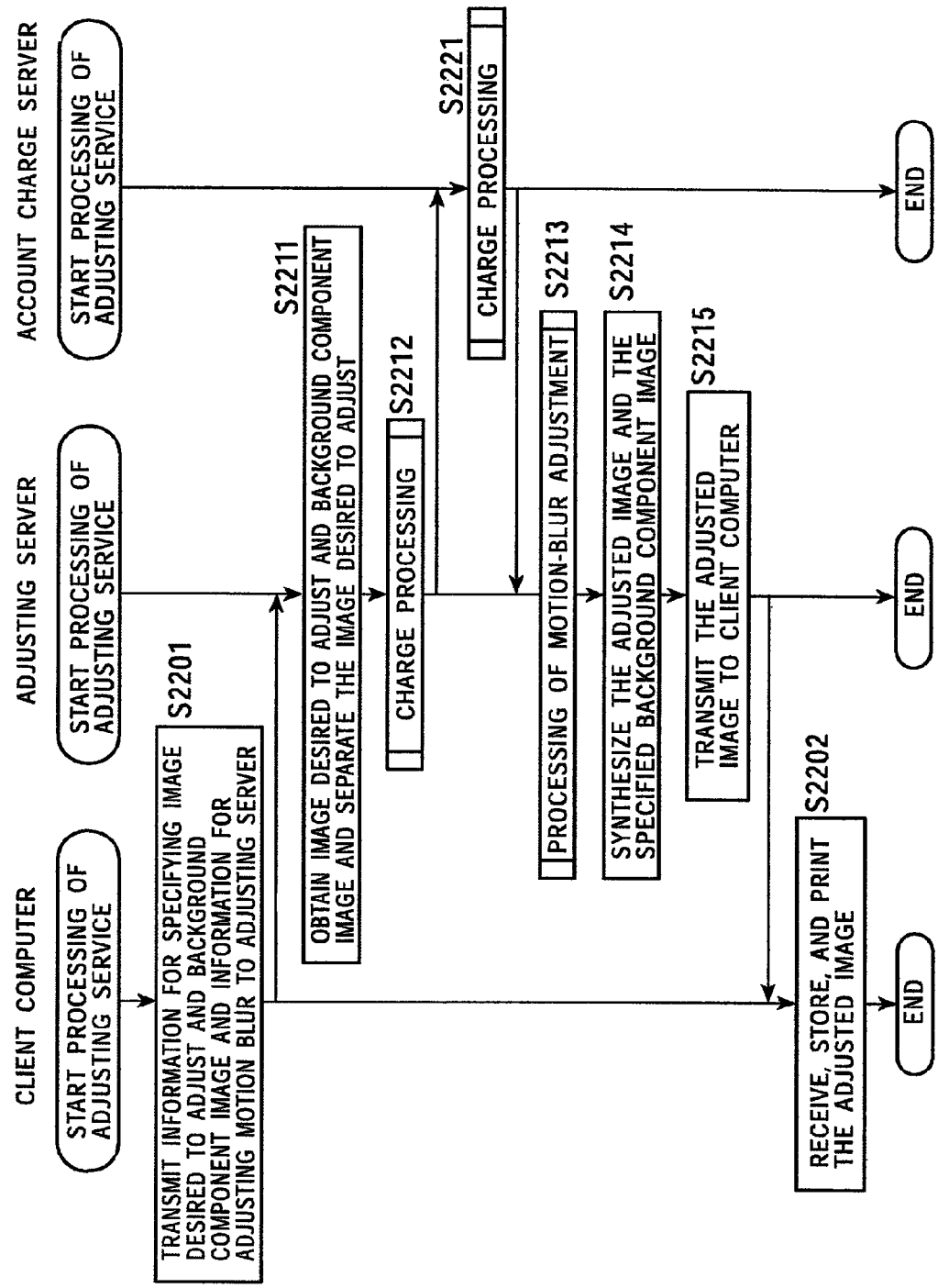
Figure 155:
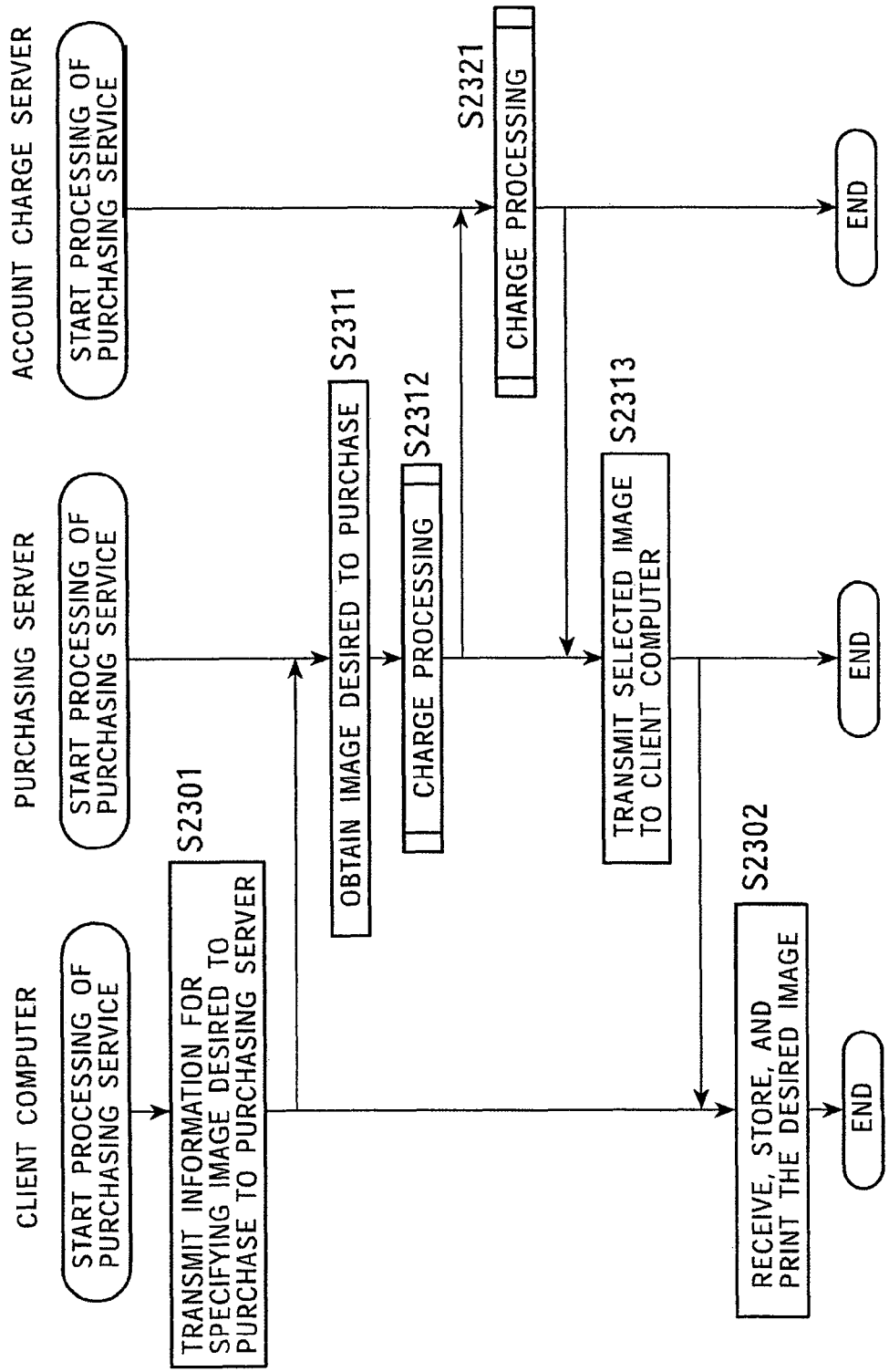
Figure 156:
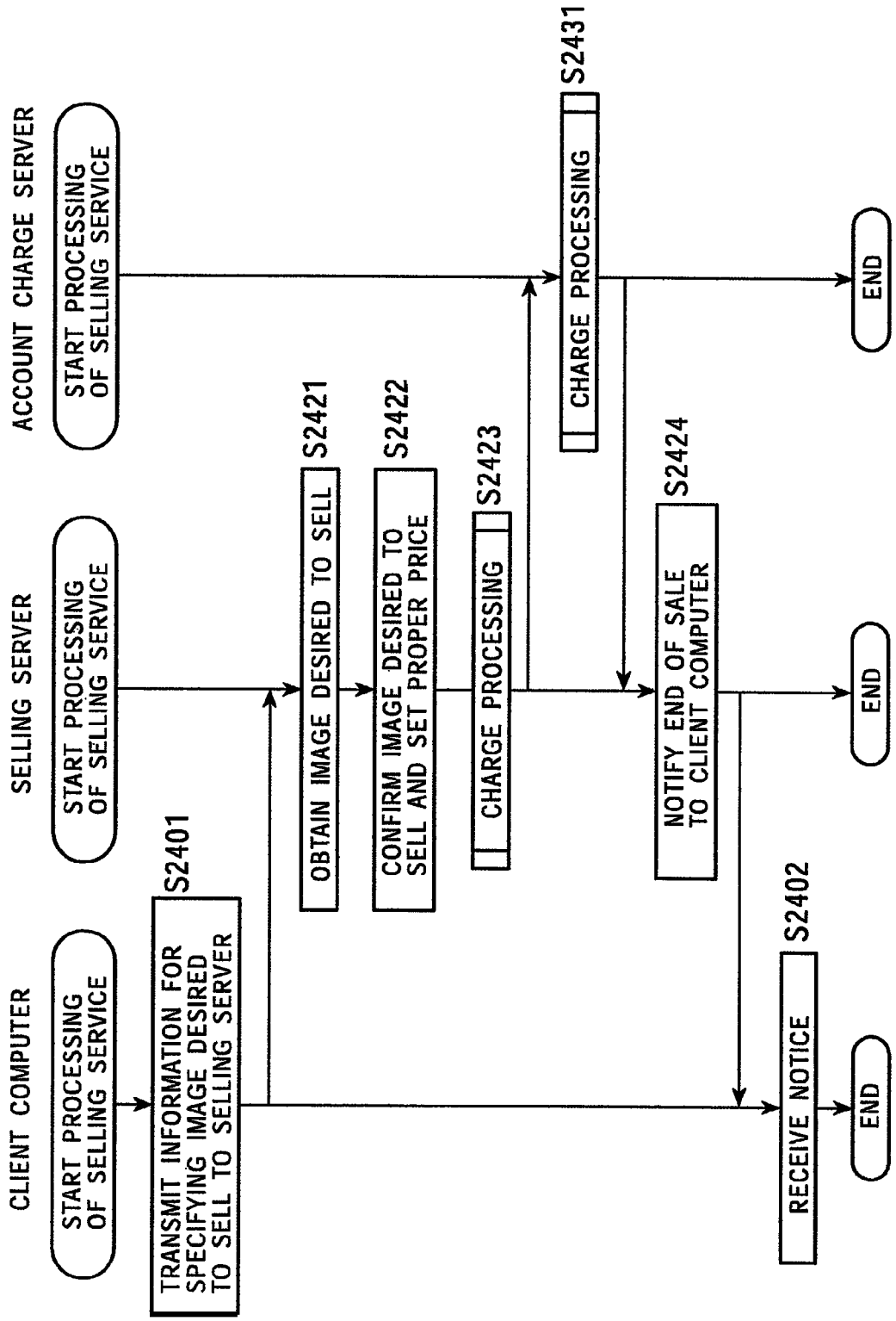
Figure 157:
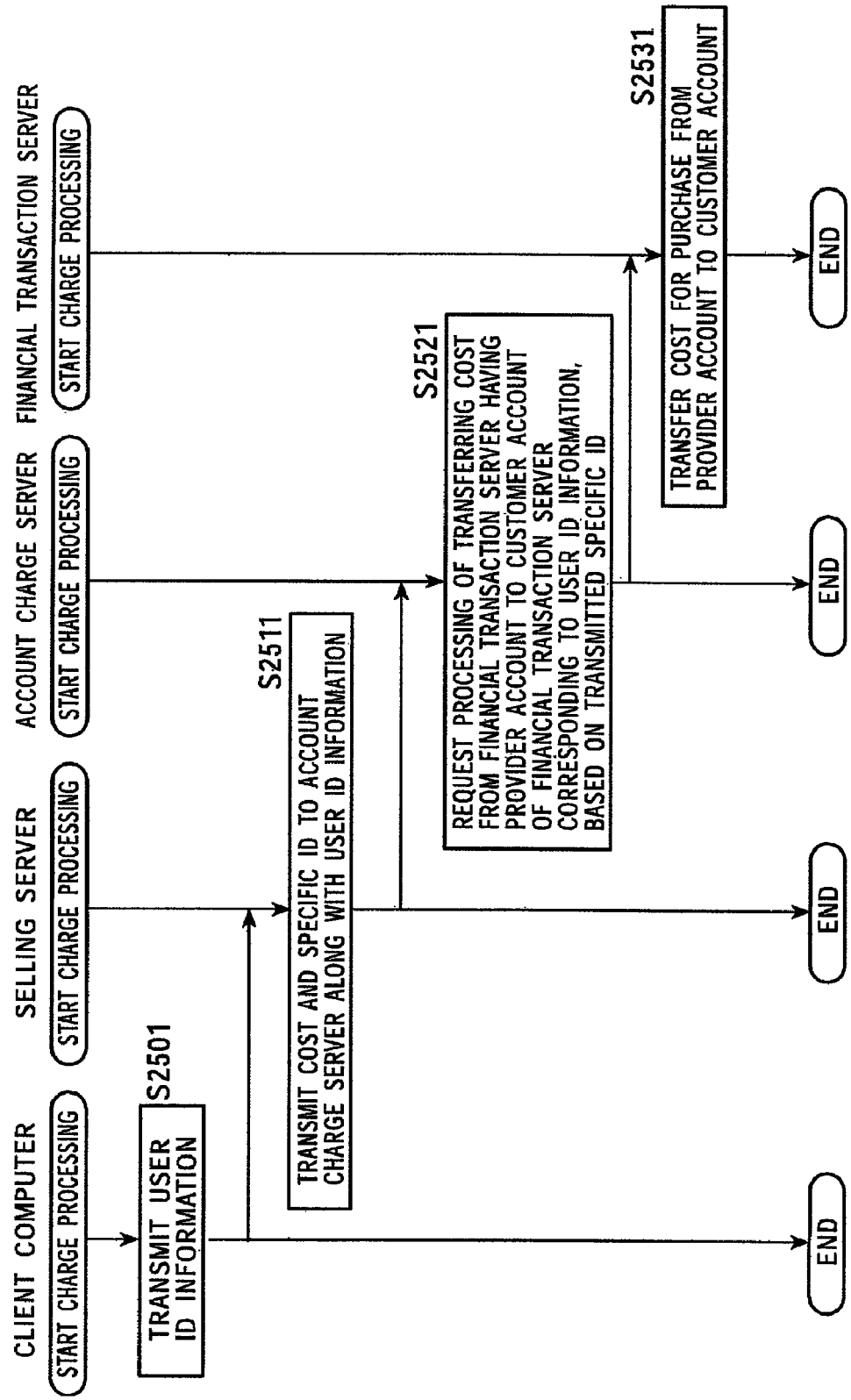
Figure 158:
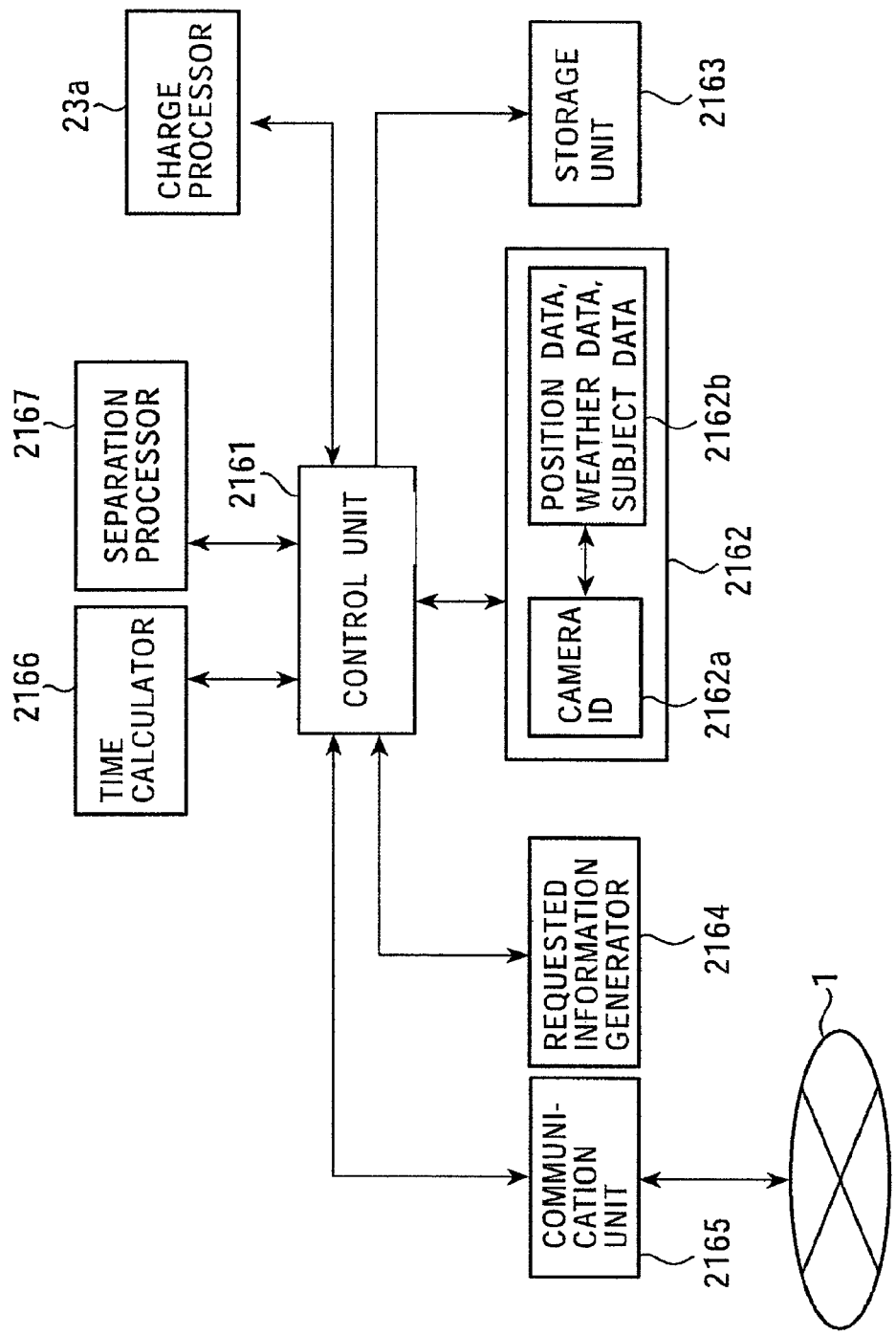
Figure 159:
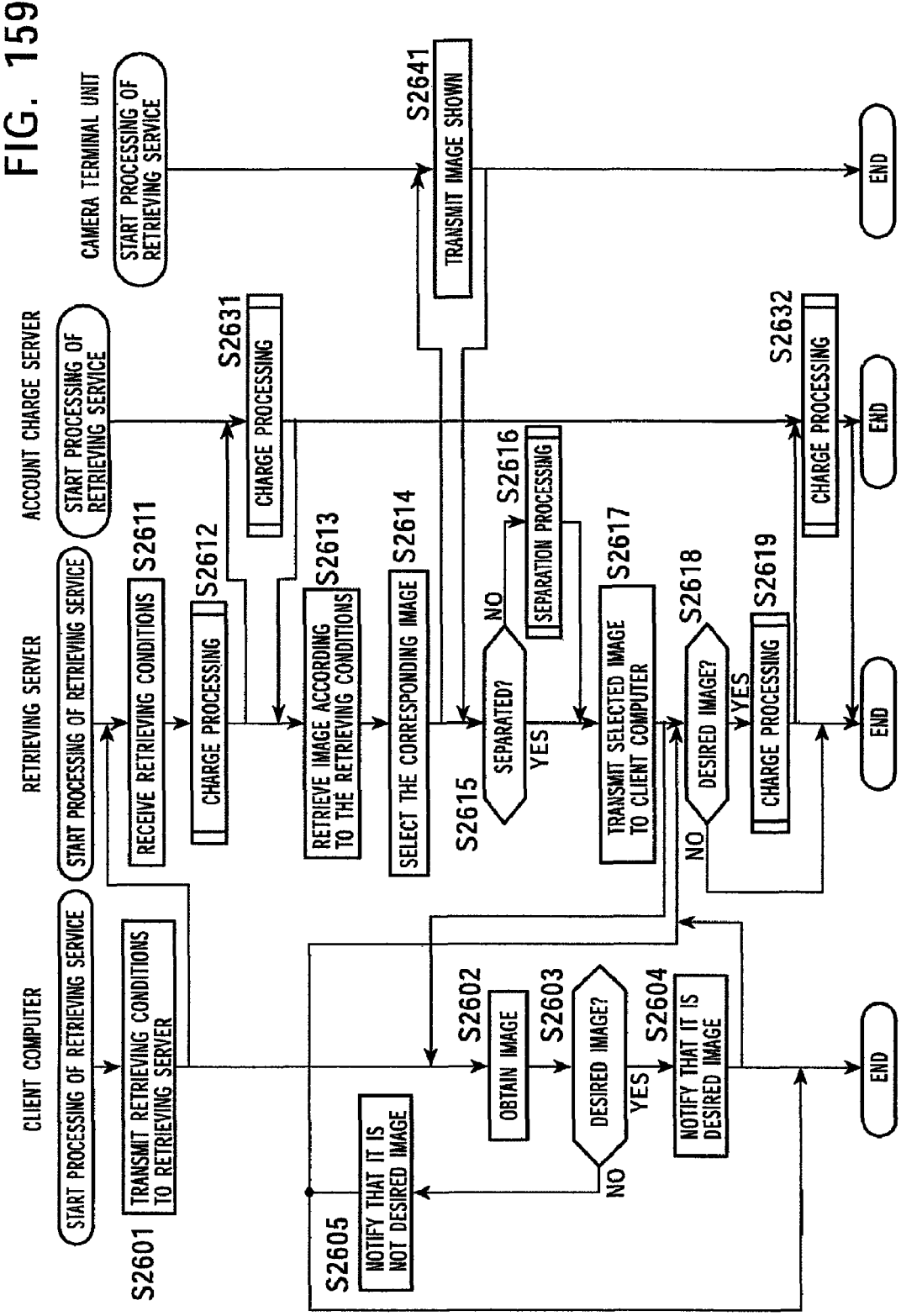

FIG. 124 is a flowchart illustrating a foreground/background separating service;

FIG. 125 is a flowchart illustrating a motion blur adjusting service;

FIG. 126 is a diagram illustrating an encoding server;

FIG. 127 is a flowchart illustrating an encoding service;

FIG. 128 is a diagram illustrating a compressing ability by a means of the encoding processing;

FIG. 129 is a diagram illustrating another example of the encoding server;

FIG. 130 is a flowchart illustrating a synthesizing service;

FIG. 131 is a diagram illustrating an encrypting motion blur adding unit;

FIG. 132 is a diagram illustrating an encrypting motion blur eliminating unit;

FIG. 133 is a diagram illustrating a process of adding an encrypting motion blur;

FIG. 134 is a diagram illustrating a process of adding an encrypting motion blur;

FIG. 135 is a diagram illustrating a process of adding an encrypting motion blur;

FIG. 136 is a flowchart illustrating an encryption processing;

FIG. 137 is a diagram illustrating a process of adding an encrypting motion blur;

FIG. 138 is a diagram illustrating a process of adding an encrypting motion blur;

FIG. 139 is a diagram illustrating a process of adding an encrypting motion blur;

FIG. 140 is a diagram illustrating a process of adding an encrypting motion blur;

FIG. 141 is a diagram illustrating a process of adding an encrypting motion blur;

FIG. 142 is a diagram illustrating a process of adding an encrypting motion blur;

FIG. 143 is a diagram illustrating a process of adding an encrypting motion blur;

FIG. 144 is a diagram illustrating a process of adding an encrypting motion blur;

FIG. 145 is a diagram illustrating a process of adding an encrypting motion blur;

FIG. 146 is a diagram illustrating a process of adding an encrypting motion blur;

FIG. 147 is a diagram illustrating a process of adding an encrypting motion blur;

FIG. 148 is a diagram illustrating a process of adding an encrypting motion blur;

FIG. 149 is a diagram illustrating a process of adding an encrypting motion blur;

FIG. 150 is a diagram illustrating a process of adding an encrypting motion blur;

FIG. 151 is a flowchart illustrating an encrypting service;

FIG. 152 is a diagram illustrating a correcting server;

FIG. 153A is a diagram illustrating an adjusting process;

FIG. 153B is a diagram illustrating an adjusting process;

FIG. 153C is a diagram illustrating an adjusting process;

FIG. 153D is a diagram illustrating an adjusting process;

FIG. 154 is a flowchart illustrating an adjusting process;

FIG. 155 is a flowchart illustrating a purchasing service;

FIG. 156 is a flowchart illustrating a selling service;

FIG. 157 is a flowchart illustrating a charging service;

FIG. 158 is a diagram illustrating the retrieving server;

FIG. 159 is a flowchart illustrating a retrieving service; and

Figure 160:
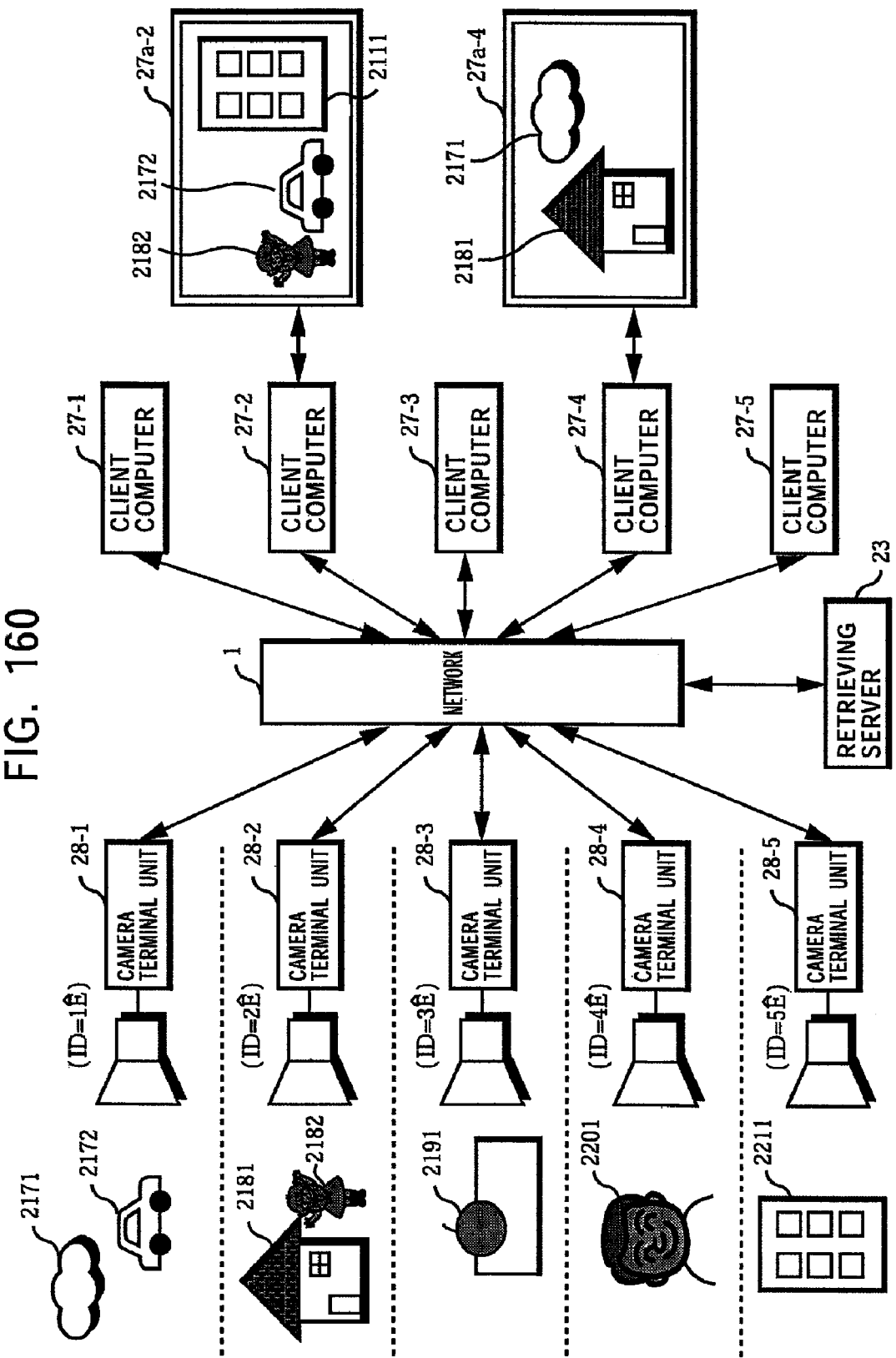

FIG. 160 is a diagram illustrating a retrieving service.

BEST MODE FOR CARRYING OUT THE INVENTION

Figure 1:
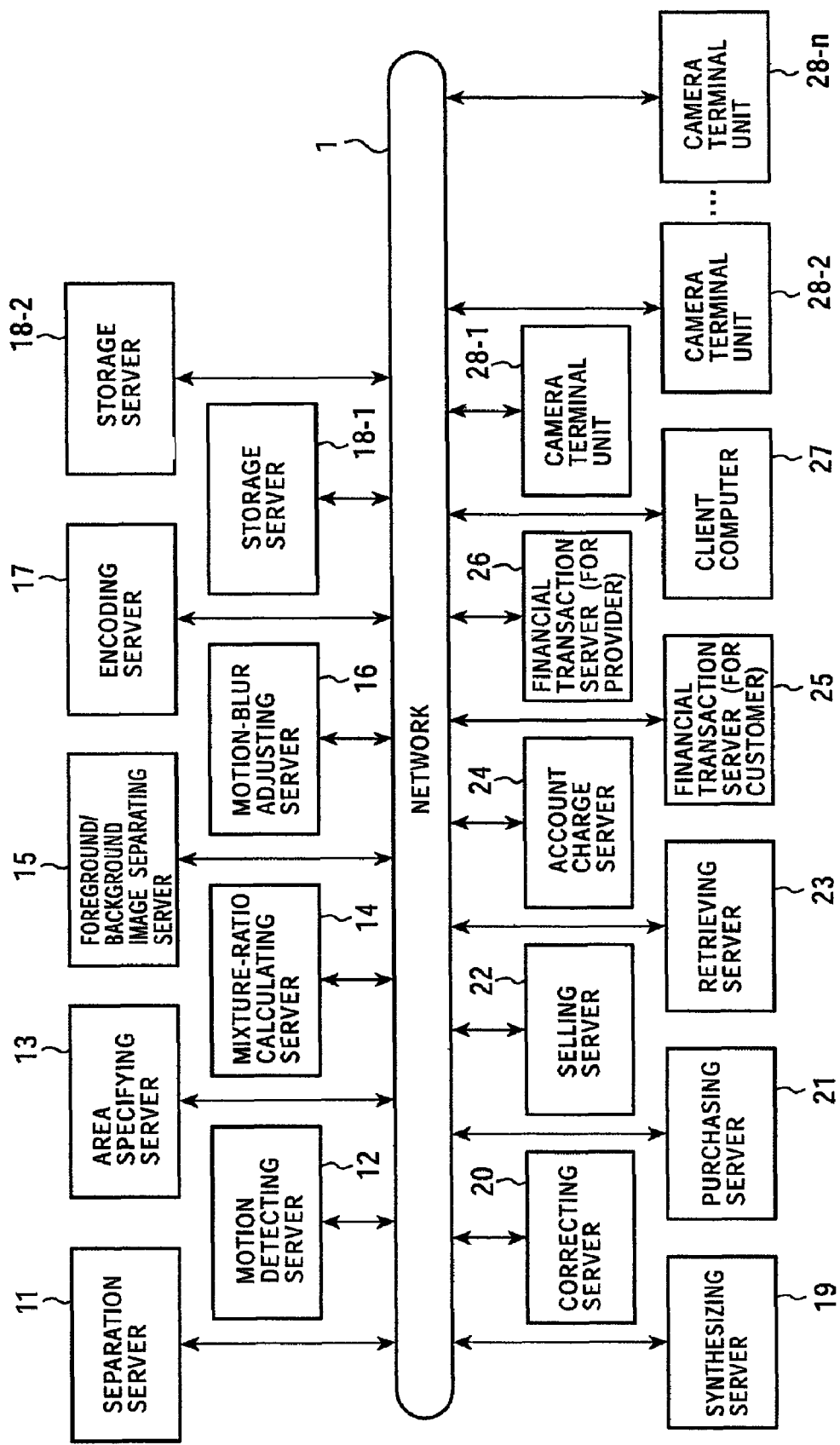
FIG. 1 is a configuration view of an embodiment of an image processing system to which the present invention is applied.

FIG. 1 is a drawing showing an embodiment of an image processing system according to the present invention.

The image processing system of the present invention is constructed such that a separation server 11, a motion detecting server 12, an area specifying server 13, a mixture ratio calculating server 14, a foreground/background image separating server 15, a motion blur adjusting server 16, an encoding server 17, storage servers 18-1, 18-2, a synthesizing server 19, a correcting server 20, a purchasing server 21, a selling server 22, a retrieving server 23, an account charge server 24, a financial transaction server (for customer) 25, a financial transaction server (for provider) 26, client computers 27 and camera terminal units 28-1~28-n are connected over a network 1 such as the Internet to mutually exchange data. The separation server 11, the motion detecting server 12, the area specifying server 13, the mixture ratio calculating server 14, the foreground/background image separating server 15, the motion blur adjusting server 16, the encoding server 17, the synthesizing server 19, the correcting server 20, the purchasing server 21, the selling server 22, the retrieving server 23, the account charge server 24 and the financial transaction servers (for customer and for provider) 25, 26 are managed or administrated by a provider who provides separating service, motion detecting service, area specifying service, mixture ratio calculating service, foreground/background separating service, motion blur adjusting service, encoding service, synthesizing service, correcting service, purchasing service, selling service, retrieval service, charging service and financial transaction services (for client and provider), respectively. Further, in the following description, the storage servers 18-1, 18-2 or the camera terminal units 28-1 to 28-n are simply named the storage server 18 or the camera terminal unit 28 when there is no need to distinguish them. Further, it is true of other servers and units.

Figure 2:
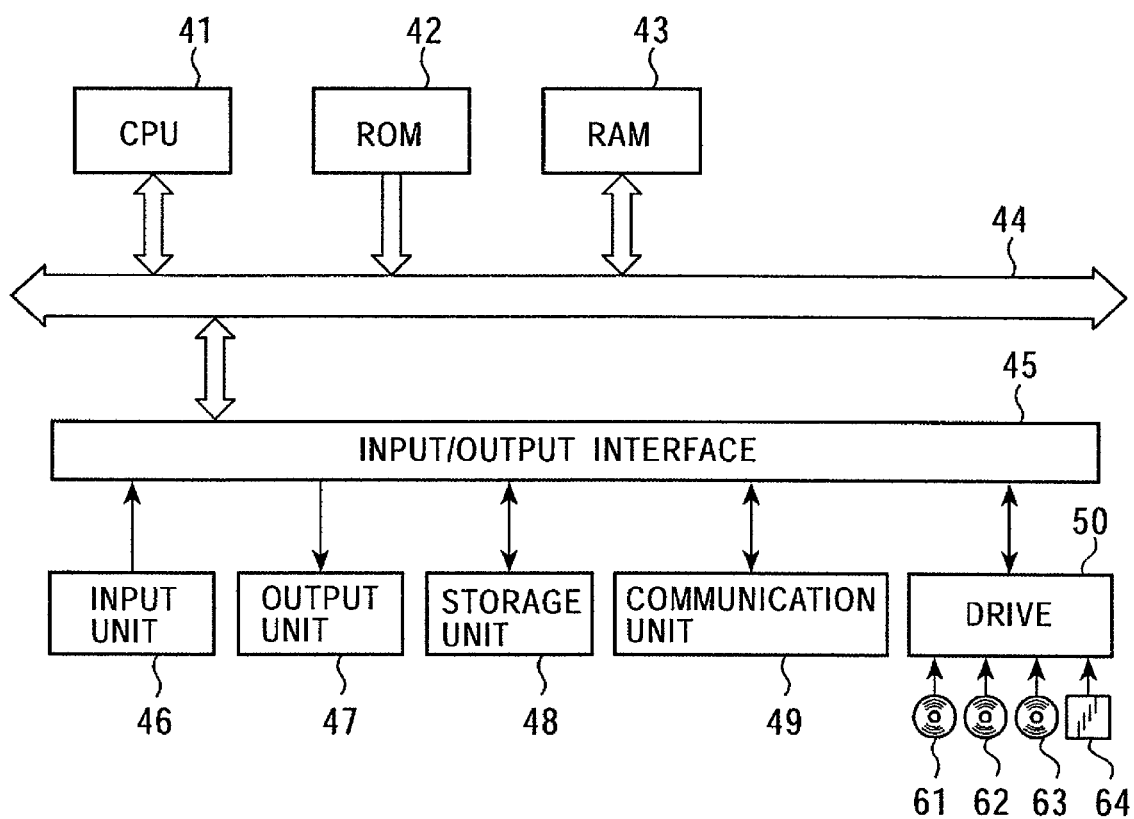
FIG. 2 is a configuration view of a separation server in FIG. 1.

FIG. 2 is a configuration view of the separation server 11 of the present invention.

A CPU (Central Processing Unit) 41 performs various kinds of processing in accordance with programs stored in a ROM (Read Only Memory) 42 or a storage unit 48. Data or programs executed by CPU 41 are stored in a RAM (Random Access Memory) 43 as needed. These CPU 41, ROM 42 and RAM 43 are connected to one another via a bus 44.

An input/output interface 45 is connected to CPU 41 via bus 44. An input unit 46 including a keyboard, a mouse, microphone, etc. and an output unit 47 including a display, speakers, etc. are connected to the input/output interface 45. The CPU 41 performs various kinds of processing according to instructions input from the input unit 46. The CPU 41 outputs images, voices, etc. obtained as a result of processing to the output unit 47.

The storage unit 48 connected to the input/output interface 45 comprises, for example, a hard disk and stores programs executed by CPU 41 or various kinds of data. A communication unit 49 communicates with external devices via the Internet or other networks.

Further, programs may be obtained through the communication unit 49 and be stored in a storage unit 48.

When a magnetic disk 61, an optical disk 62, an optical magnetic disk 63, a semiconductor memory, etc. are mounted, a drive 50 connected to the input/output interface 45 drives them to obtain programs or data stored therein. The obtained programs or data are transferred and stored in the storage unit 48 as needed.

Further, since the basic configuration of the motion detecting server 12, the area specifying server 13, the mixture ratio calculating server 14, the foreground/background image separating server 15, the motion blur adjusting server 16, the encoding server 17, the storage servers 18-1, 18-2, the synthesizing server 19, the correcting server 20, the purchasing server 21, the selling server 22, the retrieving server 23, the account charge server 24, the financial transaction server (for customer) 25, the financial transaction server (for provider) 25 and the client computers 27 are the same as that of the separation server 11, the description thereof will be omitted.

Figure 3:
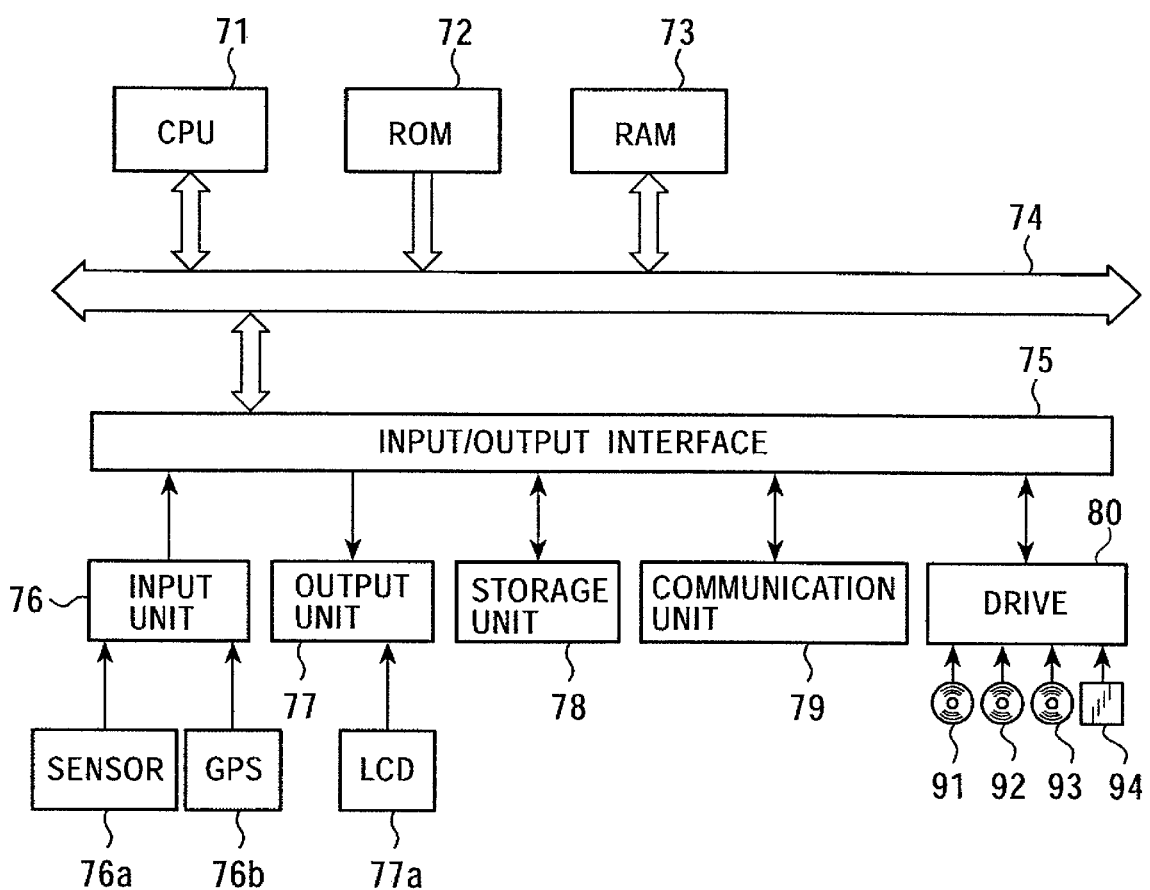
FIG. 3 is a configuration view of a camera terminal unit in FIG. 1.

FIG. 3 is a drawing showing a configuration of the camera terminal unit 28 of the present invention. The camera terminal unit 28 is constructed such that a sensor 76a and a GPS (Global Positioning System) 76b are provided in an input unit 76, an LCD (Liquid Crystal Display) 77a is provided in an output unit 77 and the other structures are the same as that of the separation server 11. That is, a CPU 71, a ROM 72, a RAM 73, a bus 74, an input/output interface 75, an input unit 76, an output unit 77, a storage unit 78, a communication unit 79, a drive 80, a magnetic disk 91, an optical disk 92, an optical magnetic disk 93 and a semiconductor memory 94 of the camera terminal unit 28 correspond to the CPU 41, the ROM 42, the RAM 43, the bus 44, the input/output interface 45, the input unit 46, the output unit 47, the storage unit 48, the communication unit 49, the drive 50, the magnetic disk 61, the optical disk 62, the optical magnetic disk 63 and the semiconductor memory 64 of the separation server 11, respectively.

The sensor 76a is an image pickup element and outputs the picked up image to the input unit 76. The GPS 76b detects positional information on earth (latitude and longitude) based on signals transmitted from a stationary satellite (not shown) and outputs the detected positional information to the input unit 76. The LCD 77a displays the image output from the output unit 77.

Next, referring to FIGS. 4 and 5, the separation server 11 will be described.

Figure 4:
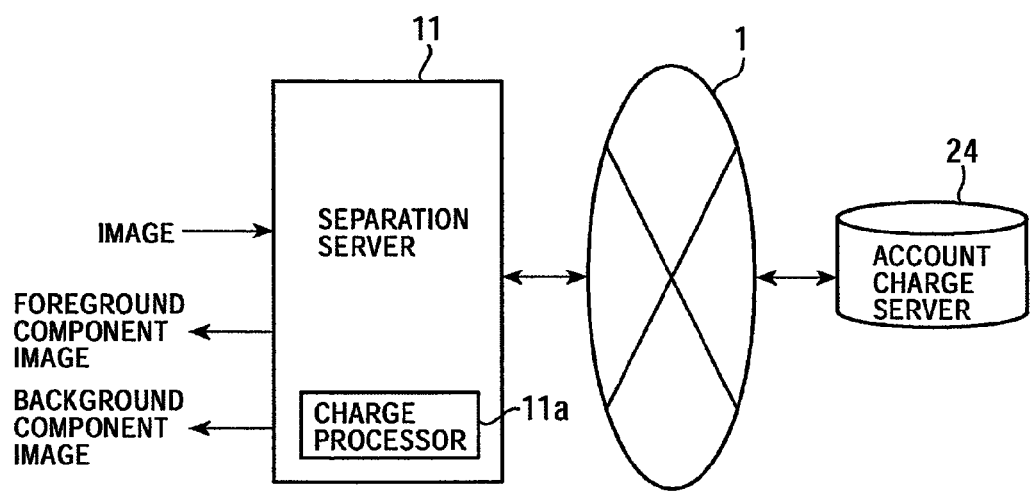
FIG. 4 is a functional view of the separation server in FIG. 1.
Figure 5:
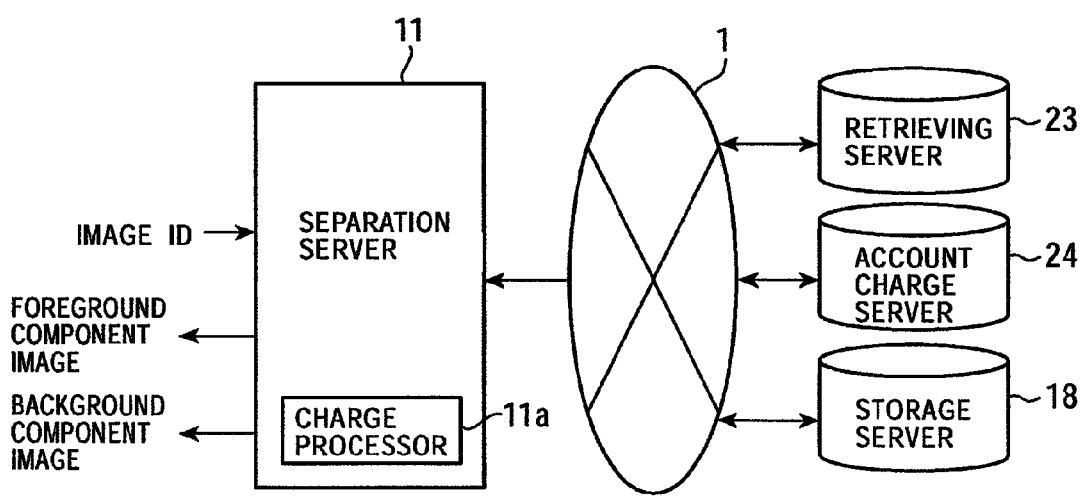
FIG. 5 is another functional view of the separation server in FIG. 1.

As shown in FIG. 4, the separation server 11 separates an image input from, for example, the client computers 27 via the network 1, into a foreground component image and a background component image by means of the method to be mentioned later, generates ID for the input image, the foreground component image and the background component image and then, outputs them to the client computers 27, stores them in its own storage unit, outputs them to the storage server 18 to be stored, or outputs them to other servers on the network to be stored via the network 1. Here, the foreground component image means an image having a moving component of the input image and the background component image means an image of stationary part not having the moving component. At this time, a charge processor 11a makes the account charge server 24 perform charge processing for the cost of the separation processing via the network 1. Further, as shown in FIG. 5, if an image ID specifying an image is input in place of an image, the separation server 11 accesses the retrieving server 23 to be described later or the storage server 18 on the network 1 or retrieves its own storage unit (for example, the storage unit 78 of FIG. 3) to read the image data corresponding to the input image ID and separates the image data into a foreground component image and a background component image. Thereafter, the separation server 11 generates ID for each image, which is stored in its own storage unit, or outputs them to other servers on the network 1 so as to perform their respective processing.

Further, in the following description, the image ID is explained as an example of image specifying information. However, any other information capable of specifying an image, for example, positional information of image to be described later may be used as the image specifying information.

Next, referring to the FIGS. 6 and 7, the motion detecting server 12 will be explained.

Figure 6:
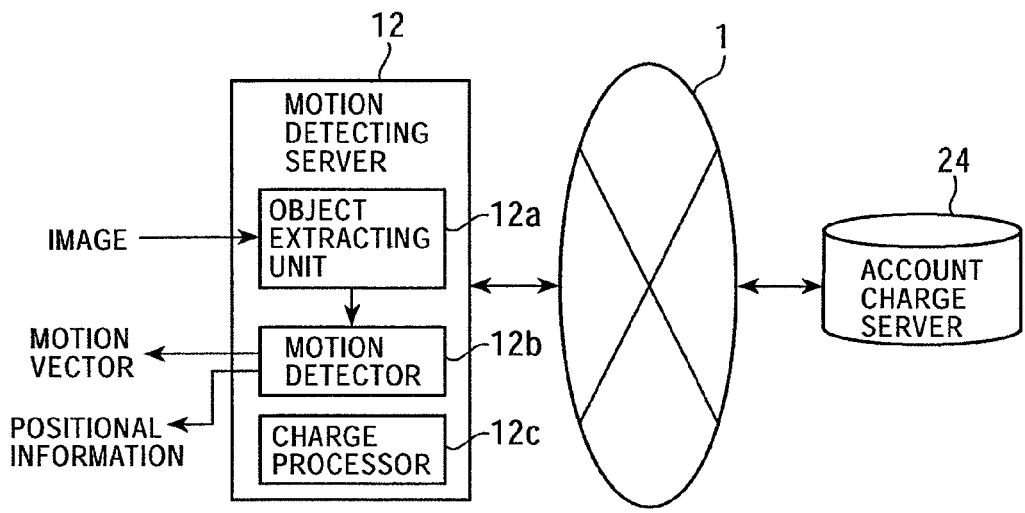
FIG. 6 is a functional view of a motion detecting server in FIG. 1.

As shown in FIG. 6, an object extracting unit 12a of the motion detecting server 12 extracts, for example, an image object of image input from the client computer 27, etc. and outputs them to a motion detector 12b. The motion detector 12b detects the motion vector and the positional information of the input image object and then, outputs them the client computers 27, stores them in its own storage unit or outputs them to other servers on the network 1 so as to perform their respective processing. At this time, a charge processor 12c makes the account charge server 24 perform the charge processing of cost for detecting the motion vector and the positional information of each image object via the network 1. An image that is a target of image pickup and corresponds to an object in the real world is referred to as an object in this specification.

Figure 7:
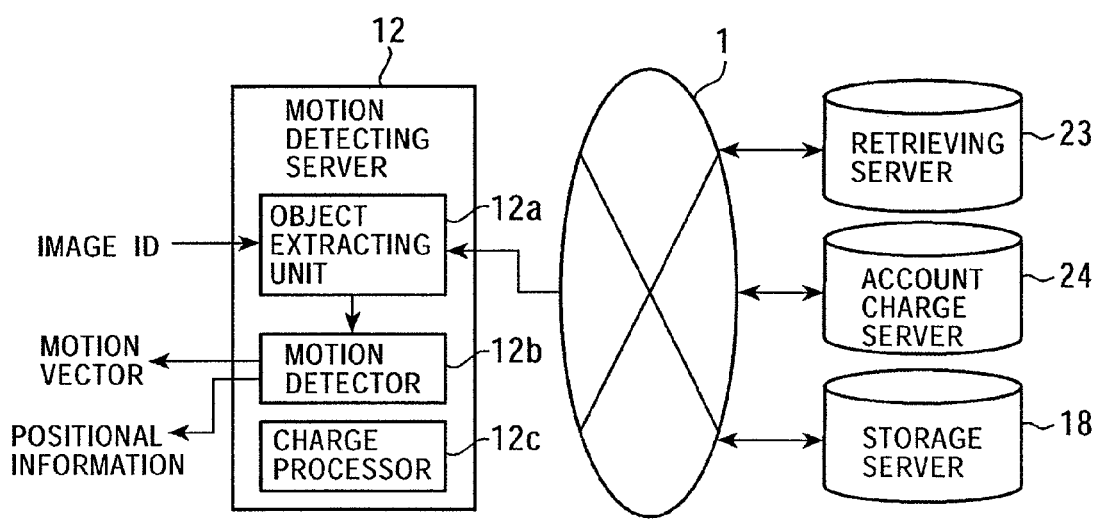
FIG. 7 is another functional view of the motion detecting server in FIG. 1.

Also, as shown in FIG. 7, if an image ID specifying an image is input instead of the image, the motion detecting server 12 accesses the retrieving server 23 to be described later or the storage server 18 on the network 1 or retrieves its own storage unit (for example, the storage unit 78 of FIG. 3) to read out the image data corresponding to the input image ID and then, performs the same processing as mentioned above.

Next, referring to FIGS. 8 and 9, the area specifying server 13 will be explained.

Figure 8:
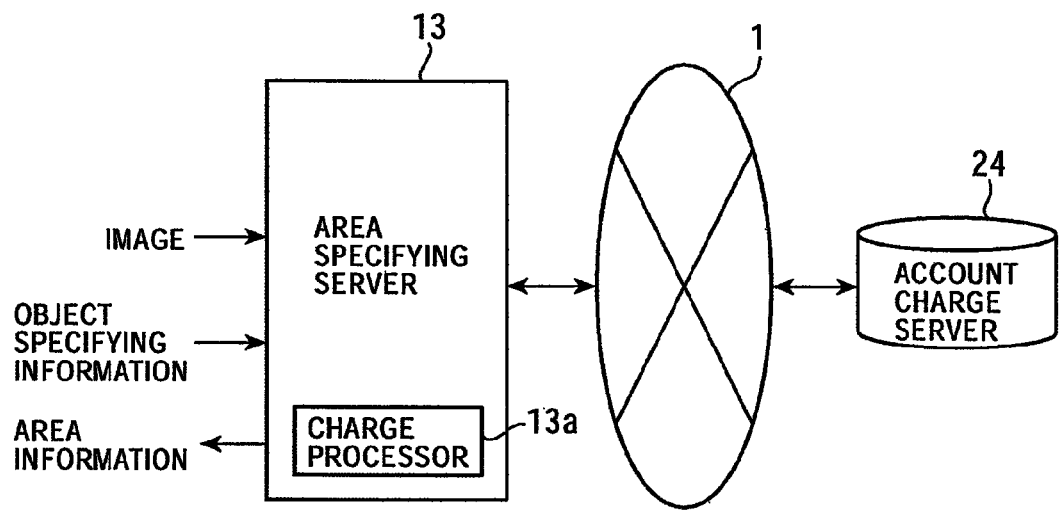
FIG. 8 is a functional view of an area specifying server in FIG. 1.
Figure 9:
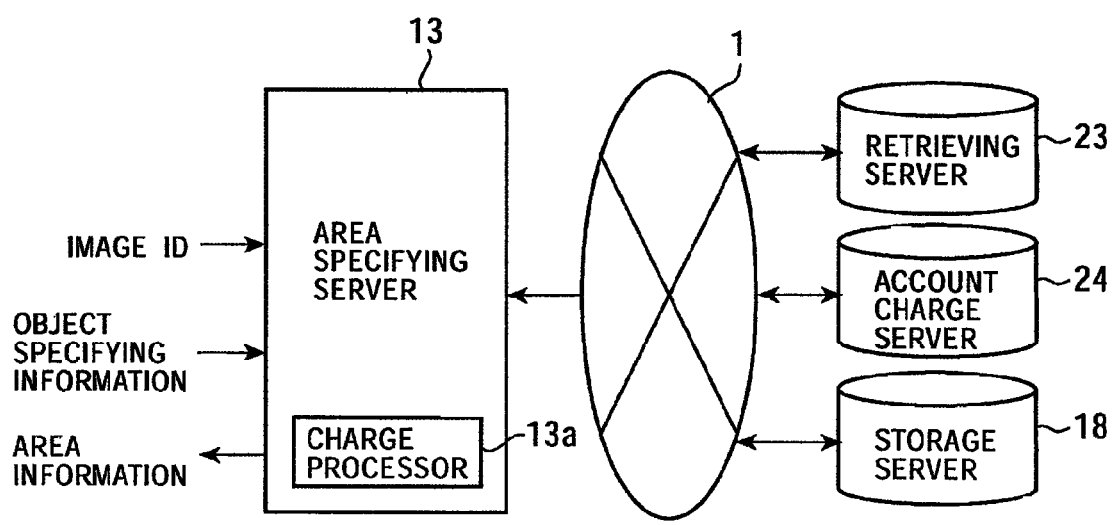
FIG. 9 is another functional view of the area specifying server in FIG. 1.

As shown in FIG. 8, the area specifying server 13 specifies the foreground area, the background area, the mixed area with respect to each pixel of the input image on the basis of an image input from the client computer 27 via the network 1, and object specifying information specifying object of the input image, generates information (hereinafter, referred to as area information) specifying which pixel is included of the foreground area, the background area and the mixed area and then, outputs it to the client computer 27, stores it in its own storage unit or outputs it to other servers on the network 1 so as to perform their respective processing. At this time, a charge processor 13a makes the account charge server 24 perform the charge processing of cost for the area specification processing via the network 1. Further, as shown in FIG. 9, if an image ID specifying an image is input instead of the image, the area specifying server 13 accesses the retrieving server 23 to be described later or a storage server 18 on the network 1, or retrieves its own storage unit (for example, the storage unit 78 of FIG. 3) to call out the image corresponding to the input image ID and then, outputs an area information corresponding to object specifying information of the image.

Next, referring to FIGS. 10 and 11, the mixture ratio calculating server 14 will be explained.

Figure 10:
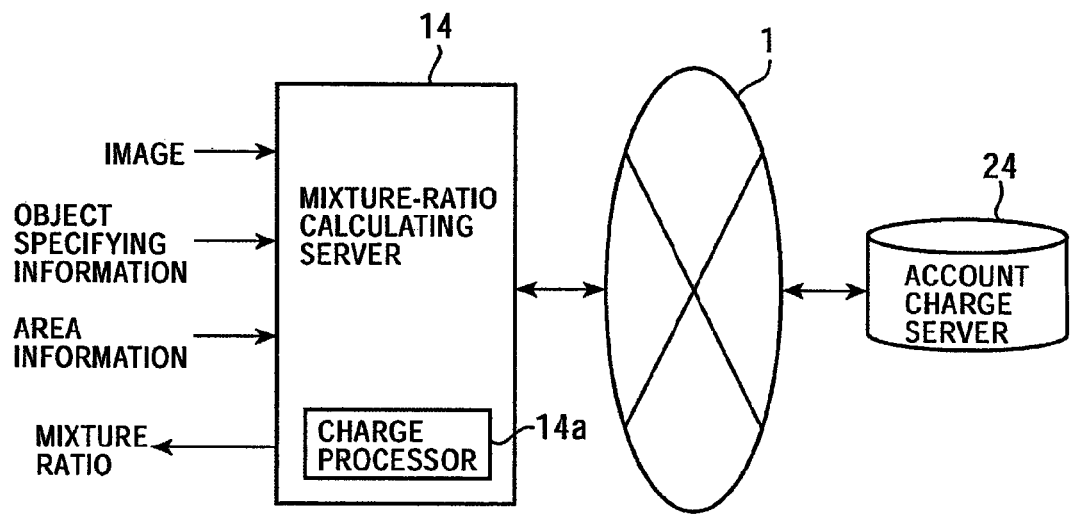
FIG. 10 is a functional view of a mixture ratio calculating server in FIG. 1.
Figure 11:
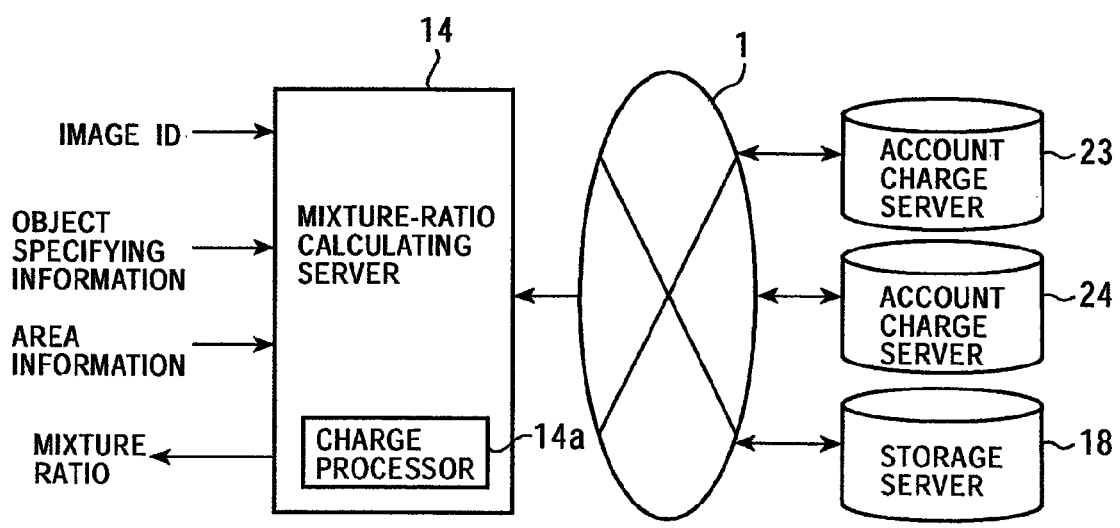
FIG. 11 is another functional view of the mixture ratio calculating server in FIG. 1.

As shown in FIG. 10, the mixture ratio calculating server 14 calculates mixture ratios (hereinafter, referred to as mixture ratio α) corresponding to pixels that is included in the mixed area on the basis of an image input from the client computer 27 via the network 1, etc., the object specifying information for specifying the object of the image, and the area information and then, outputs them to the client computer 27, stores them in its own storage unit or outputs to other servers via the network 1 so as to perform their respective processing via the network 1. At this time, the charge processor 14a makes the account charge server 24 perform the charge processing of cost for the mixture ratio calculation processing via the network 1. Further, as shown in FIG. 11, if an image ID specifying an image is input instead of the image, the mixture ratio calculating server 14 accesses the retrieving server 23 to be described later or the storage server 18 on the network 1 or retrieves its own storage unit (for example, the storage unit 78 by FIG. 3) to call out the image corresponding to the input image ID and then, performs the same process as mentioned above.

Next, referring to FIGS. 12 and 13, the foreground/background image separating server 15 will be explained.

Figure 12:
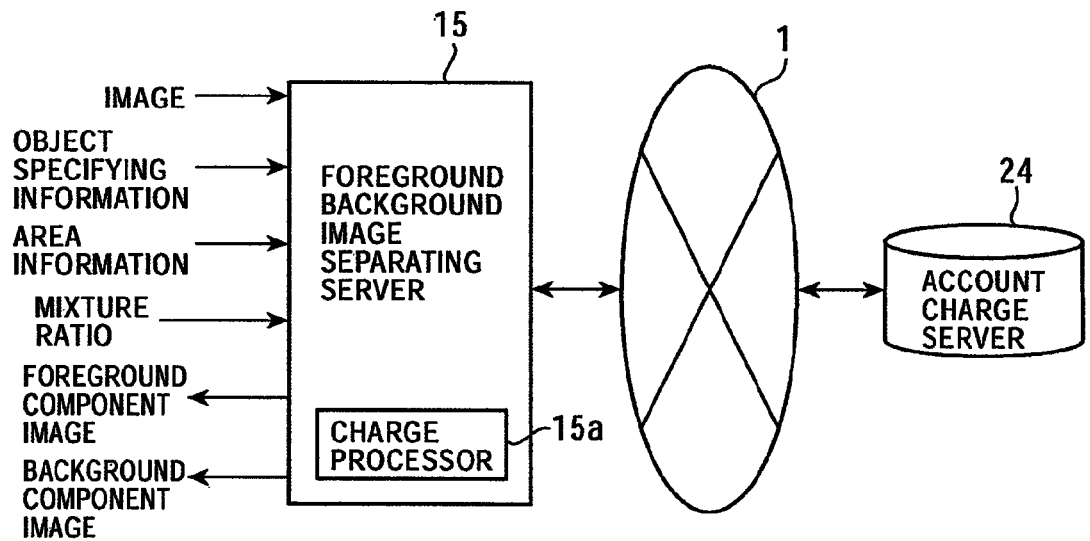
FIG. 12 is a functional view of a foreground/background image separating server in FIG. 1.
Figure 13:
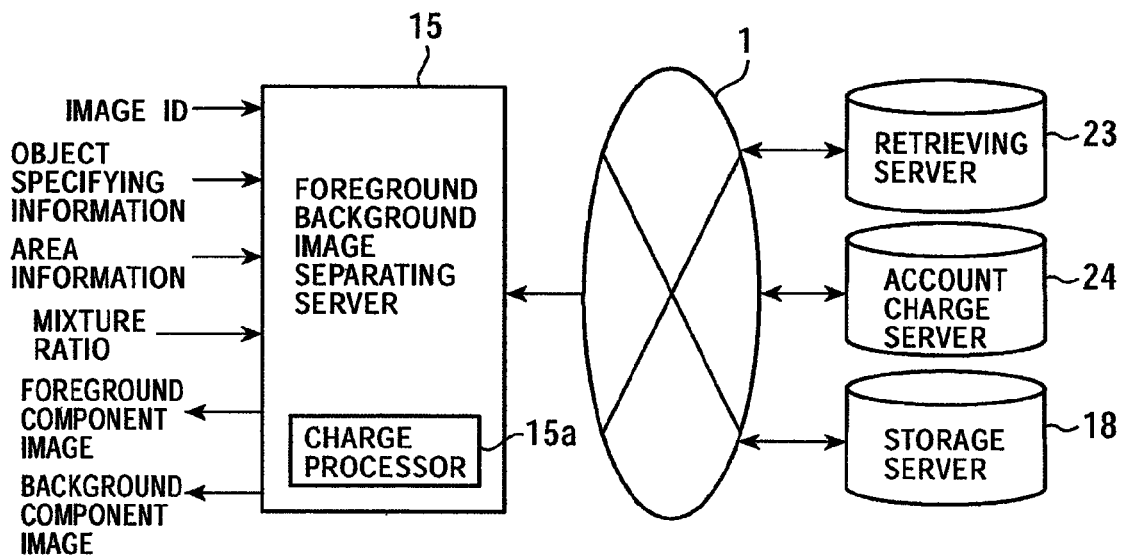
FIG. 13 is another functional view of the foreground/background image separating server in FIG. 1.

As shown in FIG. 12, the foreground/background image separating server 15 separates the input image into a foreground component image having only the image components (hereinafter, referred to as foreground components) corresponding to the foreground objects and a background component image having only the background components (hereinafter, referred to as background components) on the basis of the input image from the client computer 27, etc., the object specifying information specifying object of the image, the area information and the mixture ratio α, generates an ID for each image and then, outputs them to the client computer 27, stores them in its own storage unit, or outputs them to other servers on the network 1 so as to perform their respective processing via the network 1. At this time, a charge processor 15a makes the account charge server 24 perform the charge processing of cost for the foreground/background separation processing via the network 1. Further, as shown in FIG. 13, if an image ID specifying the image is input instead of the image, the foreground/background image separating server 15 accesses the retrieving server 23 to be described later or the storage server 18 on the network 1 or retrieves its own storage unit (for example, the storage unit 78 of FIG. 3) to call out the image corresponding to the input image ID and then, performs the same processing as mentioned above.

Next, referring to FIGS. 14 and 15, the motion blur adjusting server 16 will be explained.

Figure 14:
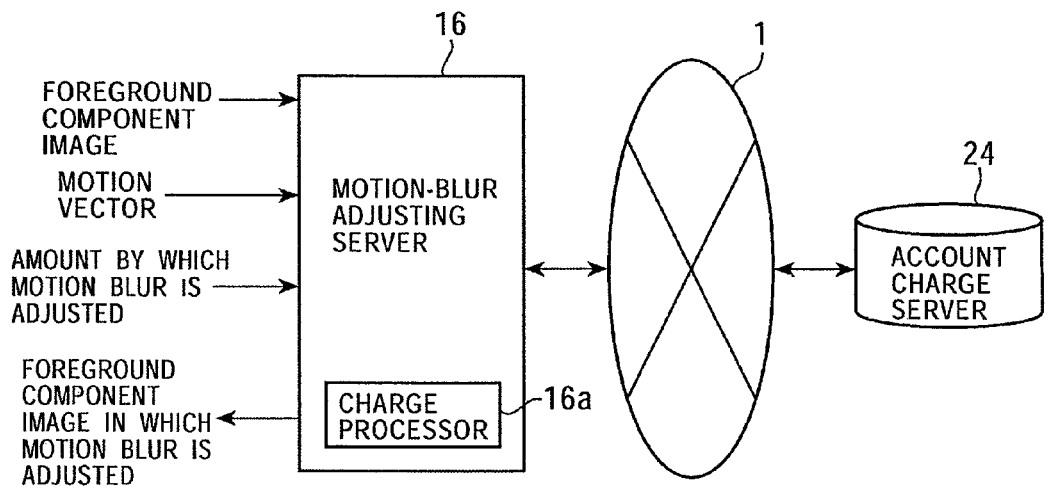
FIG. 14 is a functional view of a motion blur adjusting server in FIG. 1.
Figure 15:
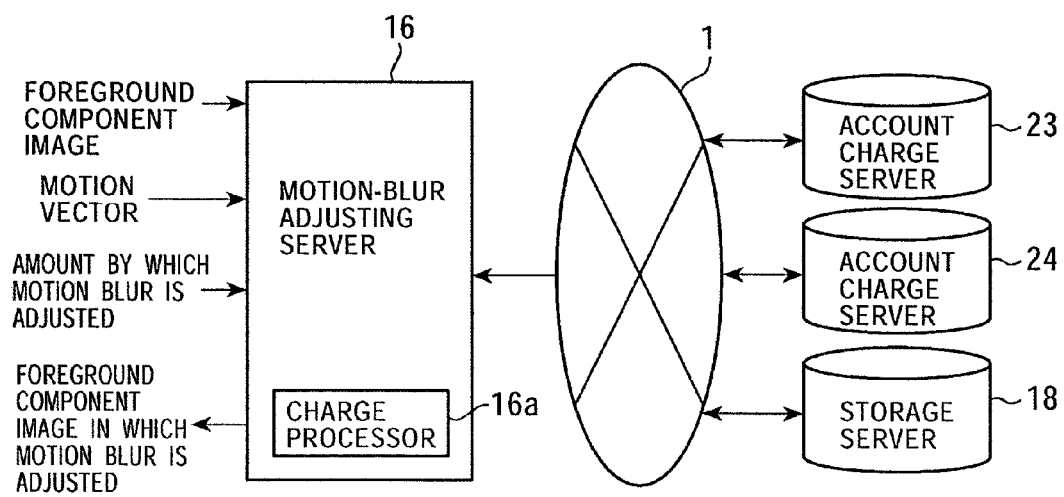
FIG. 15 is another functional view of the motion blur adjusting server in FIG. 1.

As shown in FIG. 14, the motion blur adjusting server 16 adjusts the amount of motion blur in the foreground image component by eliminating the motion blur in the foreground image component and decreasing or increasing the amount of motion blur in the foreground component image on the basis of the foreground component image input from the client computer 27, etc., the motion vector, and the amount of motion blur so as to generate the foreground component image of which the amount of motion blur is adjusted, and generates an ID for each image to output them to the client computer 27, to store them in its own storage unit or to output them to other server on the network 1 so as to perform their respective processing. At this time, the charge processor 16a makes the account charge server 24 perform the charge processing of cost for the motion blur adjusting processing via the network 1. Further, as shown in FIG. 15, if a foreground component image ID specifying the foreground component image is input instead of the foreground component image, the motion blur adjusting server 16 accesses the retrieving server 23 to be described later or the storage server 18 on the network 1 or retrieves its own storage unit (for example, the storage unit 78 of FIG. 3) to call out the foreground component image corresponding to the input foreground components image ID and then, performs the same processing as mentioned above.

Next, referring to FIGS. 16 and 17, the encoding server 17 will be explained.

Figure 16:
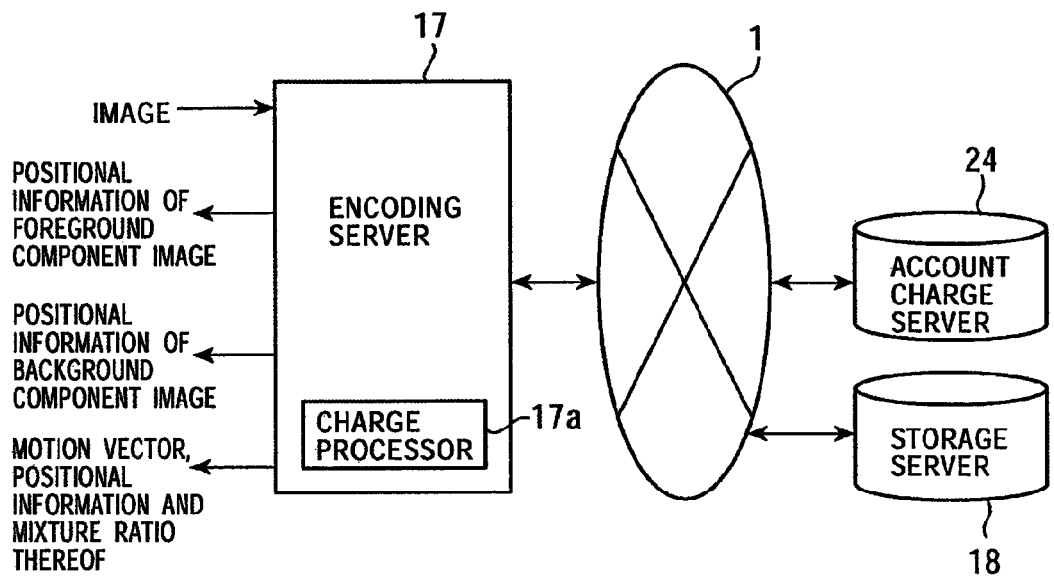
FIG. 16 is a functional view of an encoding server in FIG. 1.
Figure 17:
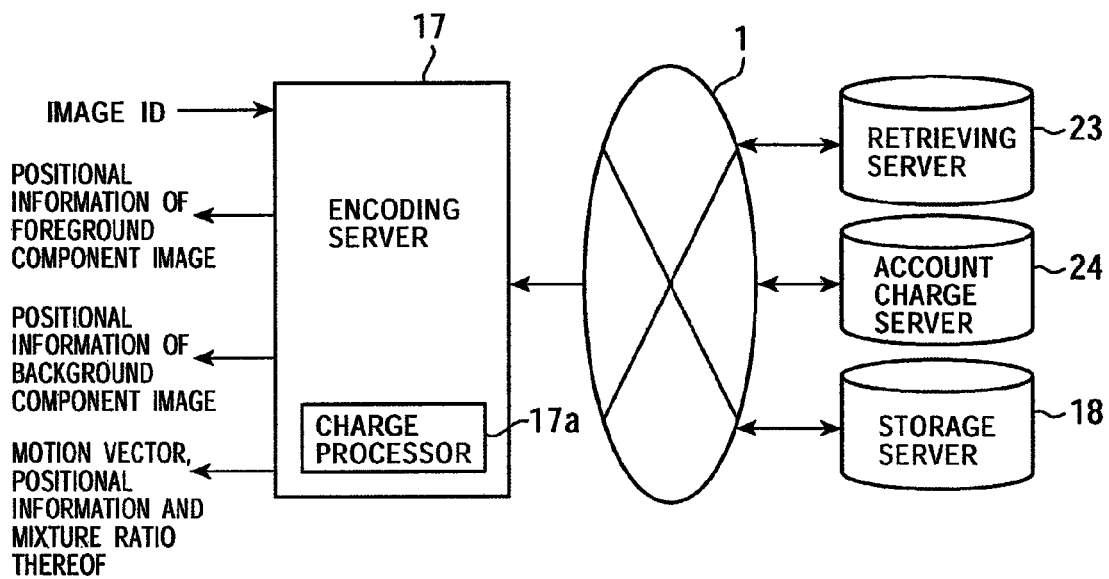
FIG. 17 is another functional view of the encoding server in FIG. 1.

As shown in FIG. 16, the encoding server 17 separates an image input from the client computers 27, etc. into a foreground component image and a background component image, generates ID for each image, stores them in its own storage unit or outputs them to other server on the network 1, generates positional information of the foreground component image and positional information of the background component image having a code indicating the position of the server on the network 1, such as URL (Universal Resource Locator) of the server to which the foreground component image and the background component image were output (stored) and then, outputs them along with information having motion vectors, positional information and mixture ratio for the images via the network 1. Further, the information output from the encoding server may be the encoding information, the image and the encoding information, or the image itself and may be changed as needed. At this time, a charge processor 17a makes the account charge server 24 perform the charge processing of cost for the encoding processing via the network. Further, as shown in FIG. 17, if an image ID specifying an image is input instead of an image, the encoding server 17 accesses the retrieving server 23 to be described later or the storage server 19 on the network 1 or retrieves its own storage unit (for example, the storage unit 78 of FIG. 3) to call out the image corresponding to the input image ID, and then performs the same processing as mentioned above.

Next, referring to FIGS. 18 and 19, the storage server 18 will be explained.

Figure 18:
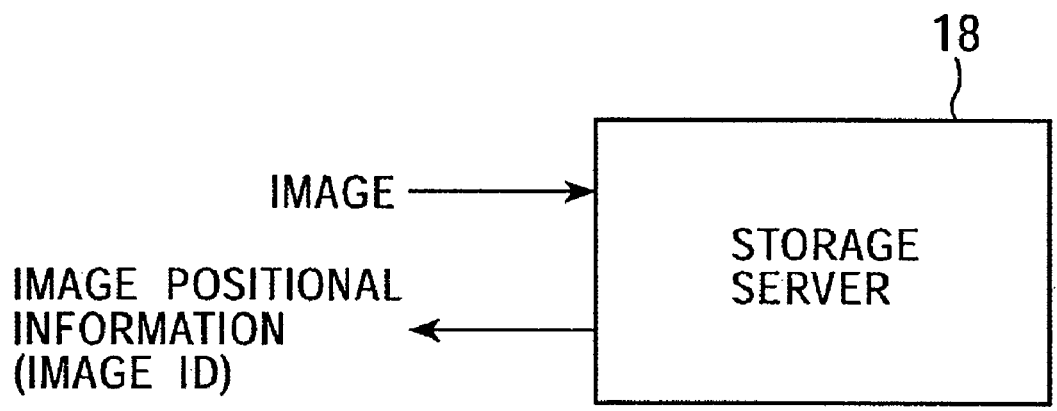
FIG. 18 is a functional view of a storage server in FIG. 1.
Figure 19:
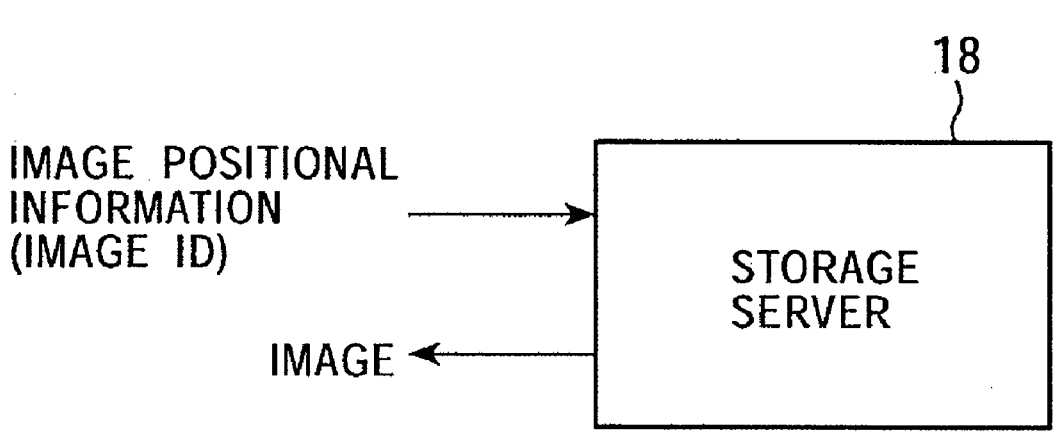
FIG. 19 is another functional view of the storage server in FIG. 1.

As shown in FIG. 18, the storage server 18 is connected via the network 1, stores the image transmitted from various kinds of servers, and outputs an image positional information corresponding to the stored image along with an image ID. For example, the client computer 27 can access via the network 1 and call out the desired image using the image positional information. That is, as shown in FIG. 19, for example, the client computer 27 can access the storage server 18 on the network 1 on the basis of the image positional information and read out the desired image by specifying the image ID corresponding to the desired image. Further, the image positional information and the image ID are explained separately in this specification but the image positional information may be a part of the image ID. In this case, the image positional information and the server on the network 1 in which the image positional information is stored (memorized or processed) can be recognized from the image ID. Further, the storage server 18 may store the motion vector, the positional information, the mixture ratio and the amount of motion blur as well as the image data.

Next, referring to FIGS. 20 and 21, the synthesizing server 19 will be explained.

Figure 20:
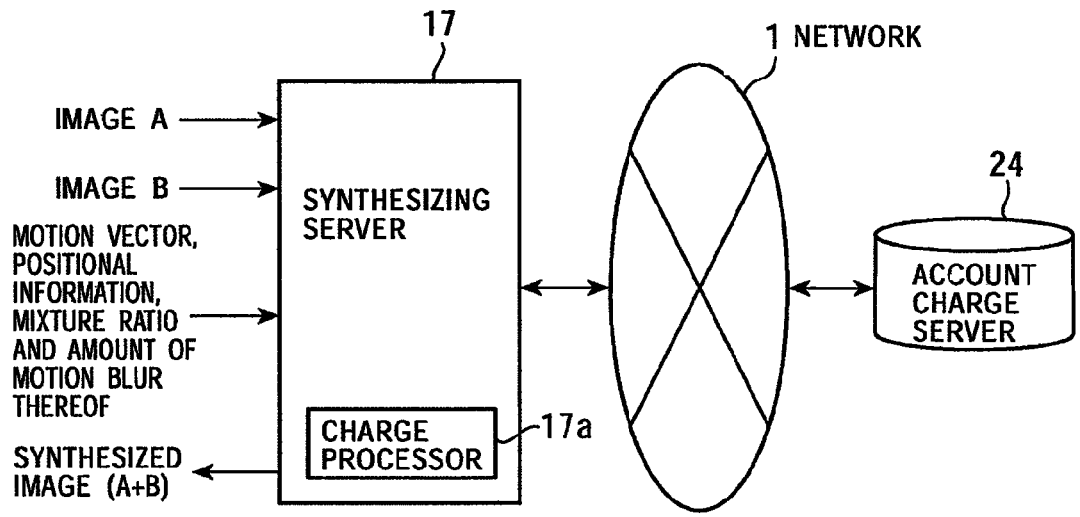
FIG. 20 is a functional view of a synthesizing server in FIG. 1.
Figure 21:
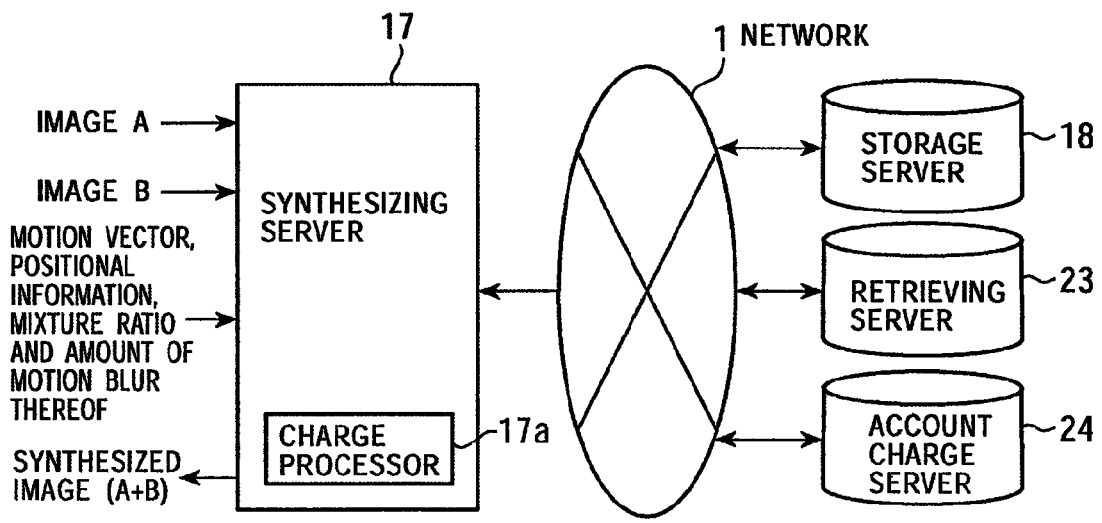
FIG. 21 is another functional view of the synthesizing server in FIG. 1.

As shown in FIG. 20, the synthesizing server 19 synthesizes images A and B by using two images A, B input from, for example, the client computer 27, etc., the motion vector, the positional information, the mixture ratio and the amount of motion blur to generate a synthesized image A+B and then, outputs them to the client computer 27, stores it in its own storage unit or outputs it to other servers on the network so as to perform their respective processing via the network 1. In this case, the images A, B are synthesized by treating one of the images as the foreground component image and the other as the background component image. At this time, a charge processor 19a makes the account charge server 24 perform the charge processing of cost for the synthesizing process via the network 1. Further, as shown in FIG. 21, if an image A ID and an image B ID specifying the image A and B are input instead of the images A and B, the synthesizing server 19 accesses the retrieving server 23 to be described later, the storage server 18 on the network or retrieves its own storage unit (for example, the storage unit 78 of FIG. 3) to call out the images corresponding to the input image A ID and image B ID and then, performs the same processing as mentioned above.

Next, referring to FIGS. 22 and 23, the correcting server 20 will be explained.

Figure 22:
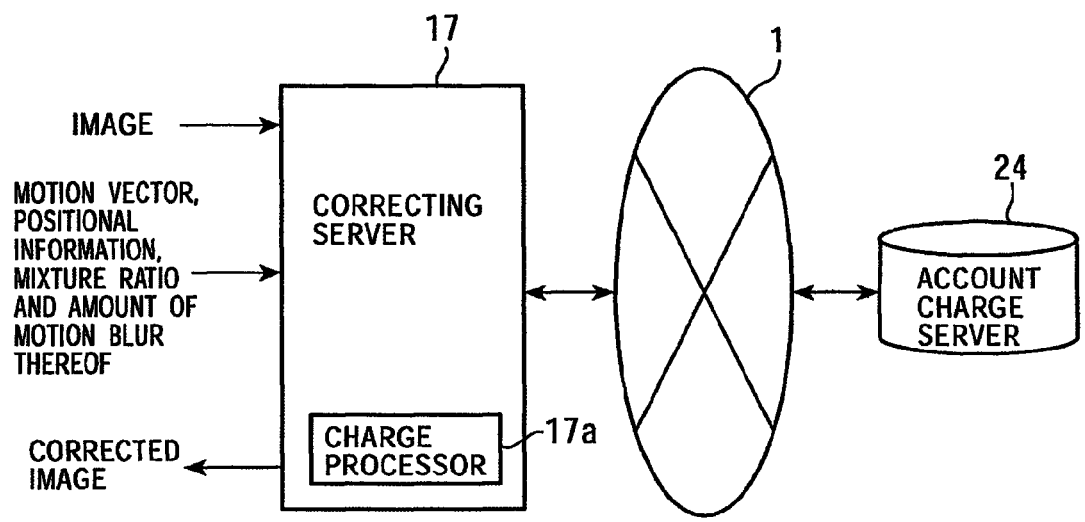
FIG. 22 is a functional view of a correcting server in FIG. 1.
Figure 23:
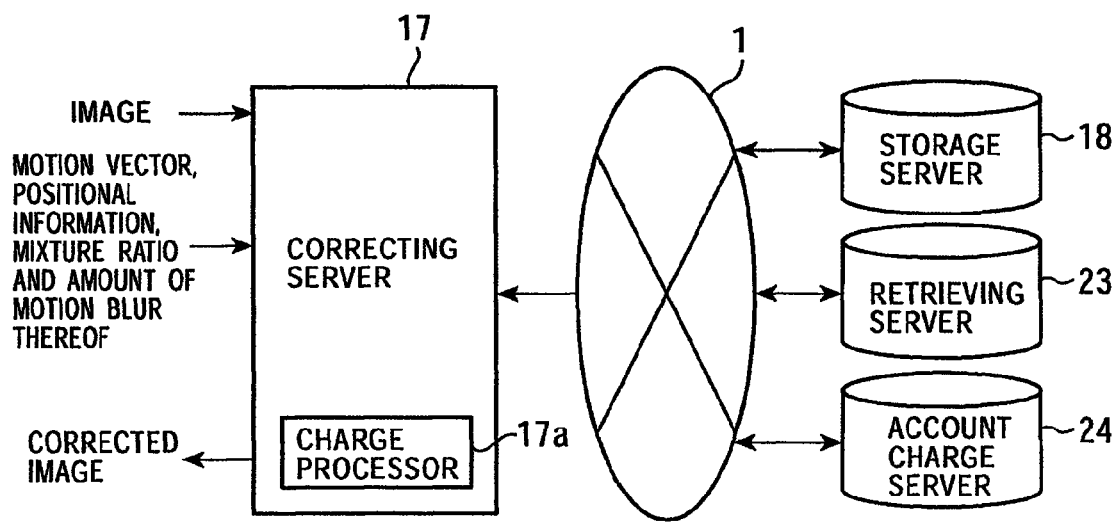
FIG. 23 is another functional view of the correcting server in FIG. 1.

As shown in FIG. 22, the correcting server 20 corrects the image input from, for example, the client computer 27, etc. on the basis of the motion vector, the positional information, the mixture ratio and the amount of motion blur, generates and outputs the corrected image to the client computer 27, to store its own storage unit or to other servers on the network 1 so as to perform their respective processing. At this time, the charge processor 20a makes the account charge server 24 perform the charge processing of cost for the correction processing via the network 1. Further, as shown in FIG. 23, if an image ID specifying the image is input instead of the image, the correcting server 20 accesses the retrieving server 23 to be described later or the storage server 18 or retrieves its own storage unit (for example, the storage unit 78 of FIG. 3) to call out the image corresponding to the input image ID and then, performs the same processing as mentioned above.

Next, referring to FIG. 24, the purchasing server 21 will be explained.

Figure 24:
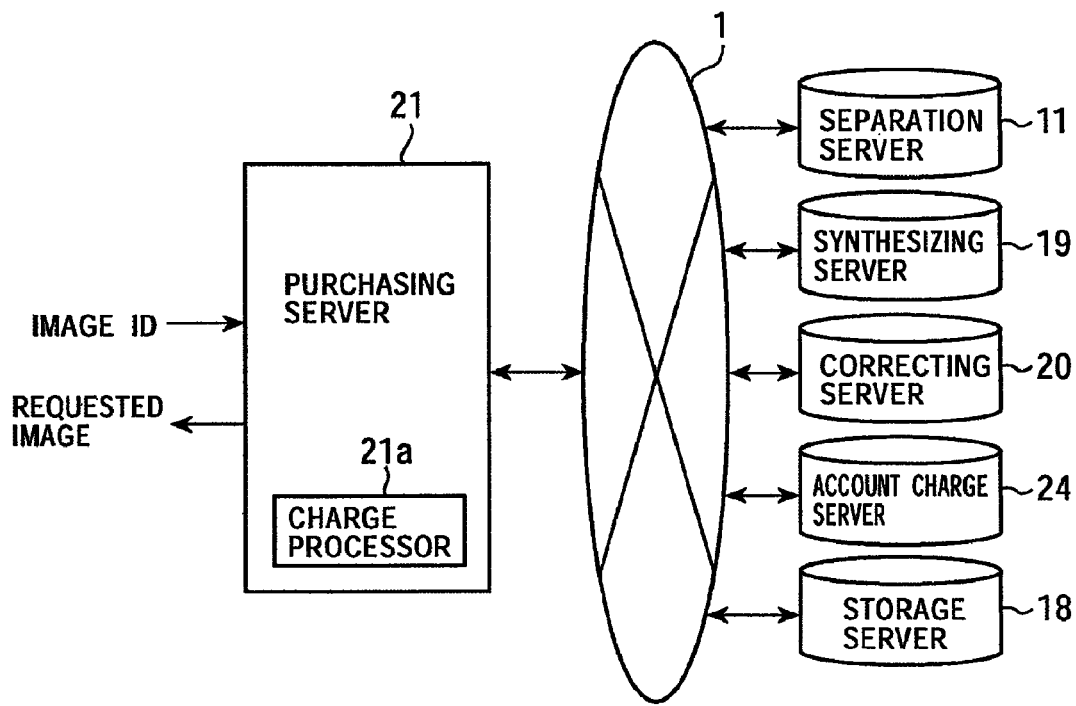
FIG. 24 is a functional view of a purchasing server in FIG. 1.

As shown in FIG. 24, if an image ID specifying an image desired to be purchased is input from, for example, the client computer 27, etc. by a user who wants to purchase the image, the purchasing server 21 accesses the separation server 11, the storage server 18, the synthesizing server 19 or the correcting server 20 on the network 1 to call out the corresponding image and outputs that image to, for example, the client computer 27 via the network. At this time, the charge processor 21a makes the account charge server 24 perform the charge processing of cost for the purchasing processing via the network 1.

Next, referring to FIG. 25, the selling server 22 will be explained.

Figure 25:
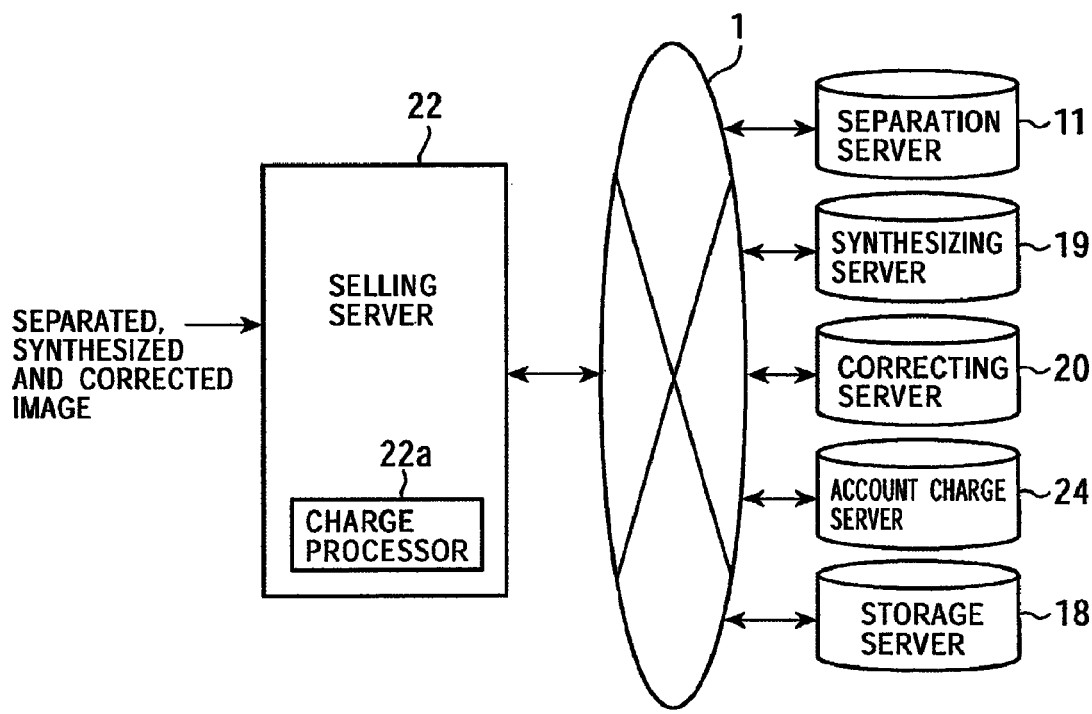
FIG. 25 is a functional view of a selling server in FIG. 1.

As shown in FIG. 25, if an image which may be a separated image, a synthesized image or a corrected image generated, for example, by means of the separation server 11, the synthesizing server 19 or the correcting server 20 is input via the network 1 by a user who wants to sell the image, the selling server 22 stores the image in the separation server 11, the storage server 18, the synthesizing server 19 or the correcting server 20 on the network 1, and the charge processor 22a makes the account charge server 24 perform the charge processing of cost for the sold image via the network 1 (in this case, the provider of processing of the selling service make the user desiring the sale perform the payment processing of the processing fee corresponding to the sold image).

Figure 26:
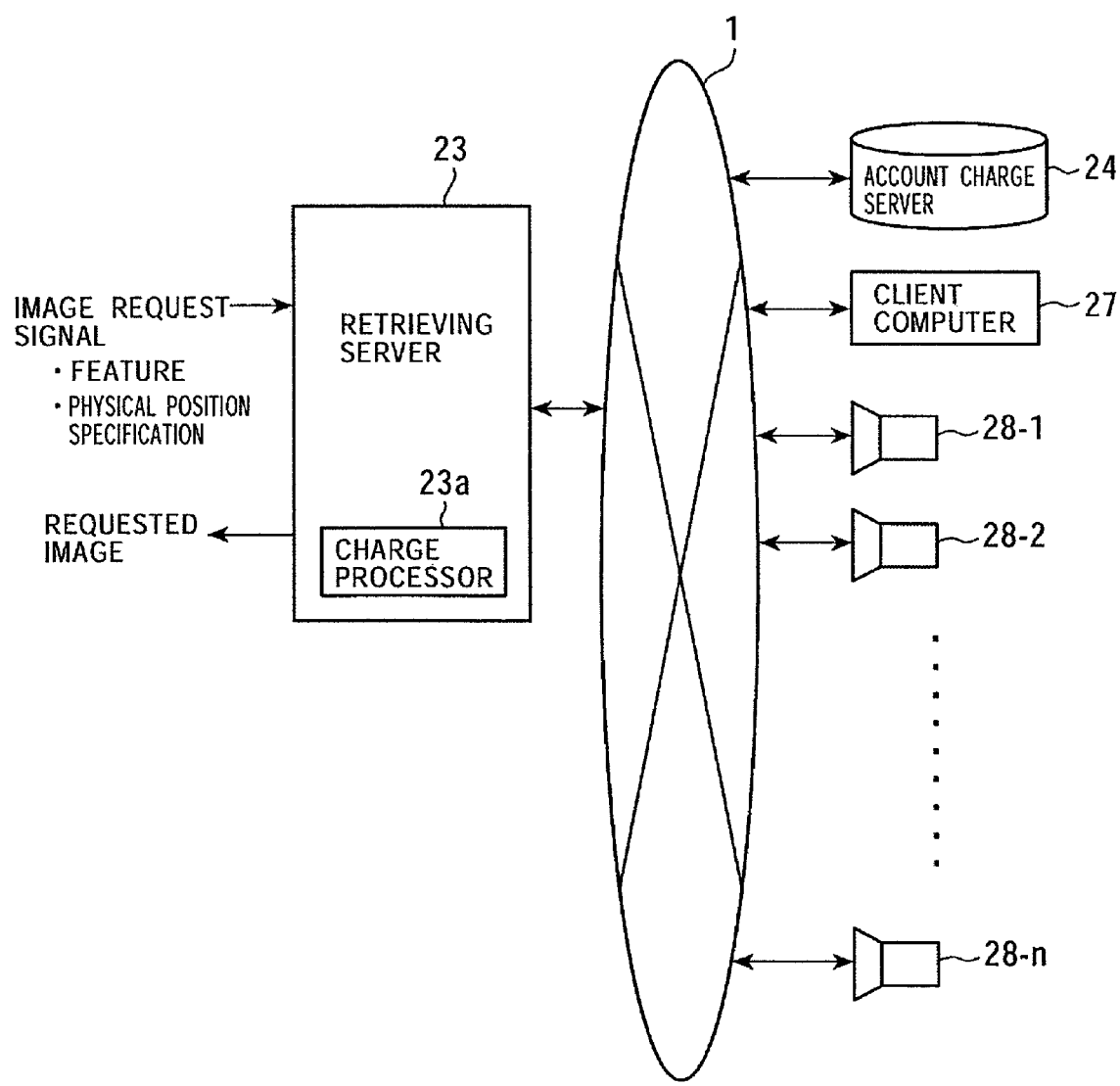
FIG. 26 is a functional view of a retrieving server in FIG. 1.

Next, referring to FIG. 26, the retrieving server 26 will be explained. The retrieving server 26 retrieves an image which is being picked up or has been picked up by the camera terminal units 28-1 to 28-n on the network 1 on the basis of information specifying the features of an image desired by a user from the client computer 27 and the physical positional information of the camera terminal units 28-1 to 28-n to output it to, for example, the client computer 27 as the requested image. At this time, the charge processor 23a makes the account charge server 24 perform the charge processing of cost for the retrieval process via the network 1.

Further, in this specification, encoding means to convert the image data into data of the foreground component image, the background component image, the motion vector, the positional information, the amount of motion blur and the mixture ratio information, and the data thereof is referred to as encoded data.

Figure 27:
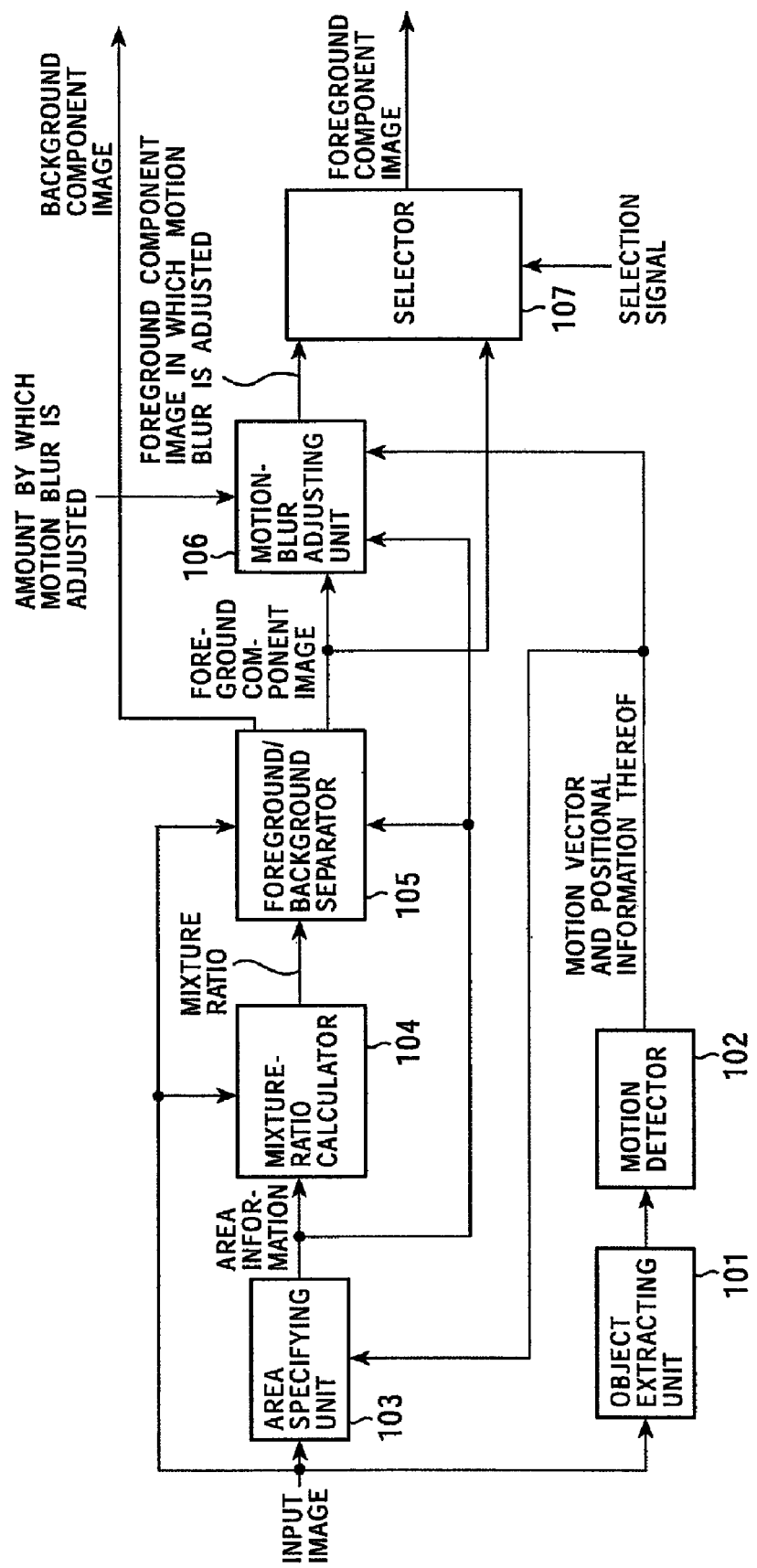
FIG. 27 is a block diagram showing the separation server.

FIG. 27 is a block diagram showing the separation server 11.

Further, it does not matter whether each function of the separation server 11 is implemented by hardware or software. That is, each block diagram of the present invention may be considered as a block diagram of hardware or as a functional block diagram of software.

The input image supplied to the separation server 11 is supplied town object extracting unit 101, an area specifying unit 103, a mixture ratio calculator 104 and a foreground/background separator 105.

The object extracting unit 101 roughly extracts an image object corresponding to the foreground object of the input image and supplies the extracted image object to the motion detector 102. The object extracting unit 101 detects, for example, the outline of the image object corresponding to the foreground object of the input image and roughly extracts the image object corresponding to the foreground object.

The object extracting unit 101 roughly extracts an image object corresponding to the background object of the input image and supplies the extracted image object to the motion detector 102. The object extracting unit 101 roughly extracts the image object corresponding to the background object on the basis of, for example, the difference between the input image and the image object corresponding to the extracted foreground object.

Further, for example, the object extracting unit 101 may roughly extract the image object corresponding to the foreground object and the image object corresponding to the background object on the basis of the difference between the background image stored in an internally provided background memory and the input image.

The motion detector 102 calculates a motion vector for a roughly extracted image object corresponding to the foreground object by using techniques such as a block matching method, an equally-dividing method, a phase correlating method or a pixel recursive method to supply the calculated motion vector and the positional information of the motion vector (information specifying positions of pixels corresponding to the motion vector) to the area specifying unit 103 and the motion blur adjusting unit 106. The motion vector output from the motion detector 102 includes information corresponding to the amount of movement v.

Further, for example, the motion detector 102 may output the motion vector of each image object to the motion blur adjusting unit 106 along with the pixel positional information specifying pixels of image object.

The amount of movement v which indicates the positional variation of the image corresponding to the moving object is expressed in units of pixel interval. For example, when the object image corresponding to the foreground is moved and displayed at a position that is separated by 4 pixels in a frame following a reference frame, the amount of movement v of the object image corresponding to the foreground is 4.

Further, the object extracting unit 101 and the motion detector 102 are required for adjusting the amount of motion blur corresponding to the moving object.

The area specifying unit 103 specifies the foreground area, the background area or the mixed area for each pixel of the input image and supplies information indicating the foreground area, the background area or the mixed area for each pixel, to the mixture ratio calculator 104, the foreground/background separator 105 and the motion blur adjusting unit 106.

The mixture ratio calculator 104 calculates a mixture ratio corresponding to pixels in the mixed area on the basis of the input image and the area information supplied from the area specifying unit 103 and supplies the calculated mixture ratio to the foreground/background separator 105.

The mixture ratio $\alpha$ is a value indicating a ratio of image component (hereinafter, referred to as background component) corresponding to the background object in pixel values as shown in equation (3) to be described later.

The foreground/background separator 105 separates the input image into a foreground component image having only the image component (hereinafter, referred to as foreground component) corresponding to the foreground object and a background component image having only the background component on the basis of the area information supplied from the area specifying unit 103 and the mixture ratio $\alpha$ supplied from the mixture ratio calculator 104 to supply the foreground component image to the motion blur adjusting unit 106 and the selector 107. Further, it may be considered that the separated foreground component image is the final output. Compared to the conventional methods where only the foreground and background are specified and separated without considering the mixed area, more accurate foreground and background can be obtained.

The motion blur adjusting unit 106 determines a unit of processing which specifies one or more pixels in the foreground component image, based on the amount of movement v known from the motion vector and the area information. The unit of processing is a data specifying a group of pixels that is a target of motion blur adjusting process.

The motion blur adjusting unit 106 adjusts the amount of motion blur in the foreground component image by removing the motion blur in the foreground component image, decreasing the amount of motion blur, increasing the amount of motion blur, etc. based on the amount of motion blur input to the separation server 11, the foreground component image supplied from the foreground/background separator 105, the motion vector and the positional information thereof supplied from the motion detector 102 and the unit of processing, and outputs the foreground component image of which the amount of motion blur is adjusted to the selector 107. The motion vector and the positional information thereof may not be used.

Here, the motion blur means distortion included in an image corresponding to a moving object, generated by the motion of object in real society which is a target of picking up an image and by picking up characteristics of sensors.

The selector 107 selects the foreground component image supplied from the foreground/background separator 105 or the foreground component image supplied from the motion blur adjusting unit 106 of which the amount of motion blur is adjusted, based on, for example, a selection signal corresponding to a selection made by a user and then, outputs the selected foreground component image.

Next, with reference to FIGS. 28 through 43, an input image supplied to the separation server 11 will be described.

FIG. 28 is a diagram illustrating an image taken by a sensor 76a. The sensor 76a comprises, for example, a CCD video camera, etc having a CCD (Charge Coupled Device) area sensor that is a solid state image pickup device. An object 112 corresponding to a foreground in a real world is moved, for example, horizontally from left to right in the drawing between the sensor and an object 111 corresponding to a background in a real world.

The sensor 76a picks up the image of the object 112 corresponding to the foreground along with the object corresponding to the background. The sensor 76a outputs the picked up in a frame unit. For example, the sensor 76a outputs an image having 30 frames per second. The exposure time of the sensor 76a may be set to 1/30 second. The exposure time means a time interval which starts at the point of converting the input light into charges and ends at the point when the input light has converted into charges. Hereinafter, the exposure time is referred to as a shutter time.

Figure 29:
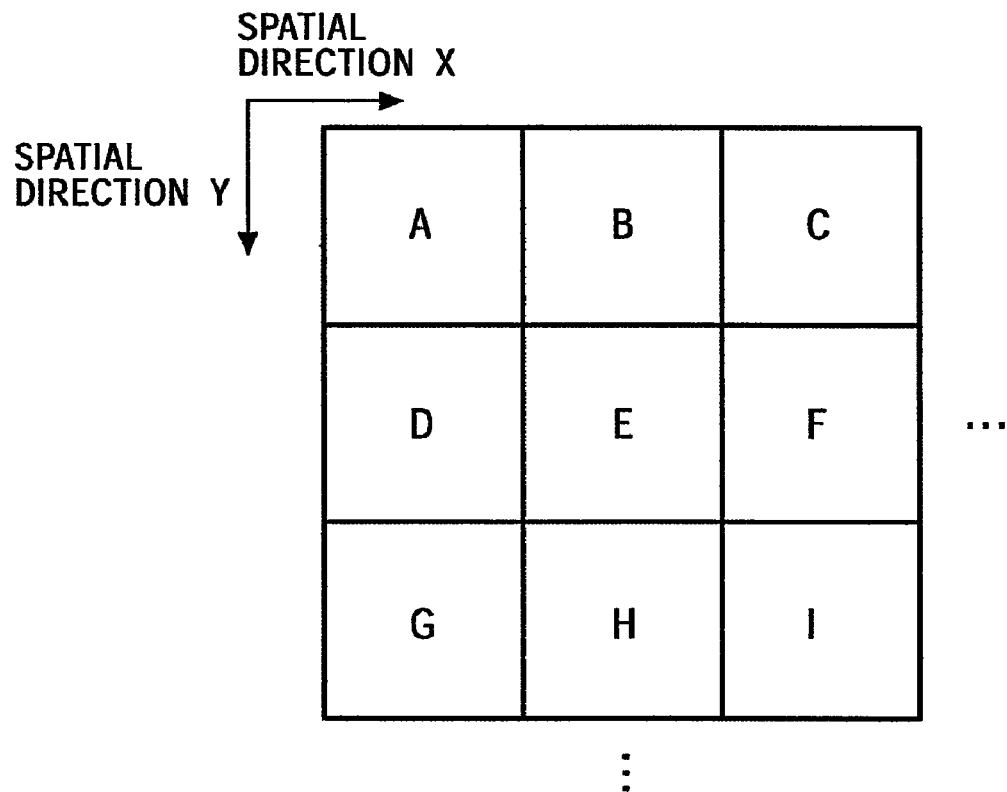
FIG. 29 is a diagram illustrating an arrangement of pixels.

FIG. 29 is a diagram illustrating an arrangement of pixels. In FIG. 29, 'A' through 'I' indicate the respective pixels. The pixels are arranged on a plane corresponding to an image. A detection element corresponding to one pixel is arranged on the sensor 76a. When the sensor 76a picks up an image, the detection element outputs a pixel value corresponding to one pixel, constituting the image. For example, a position of the detection element in X direction corresponds to a horizontal position on an image and a position of the detection element in Y direction corresponds to a vertical position on an image.

Figure 30:
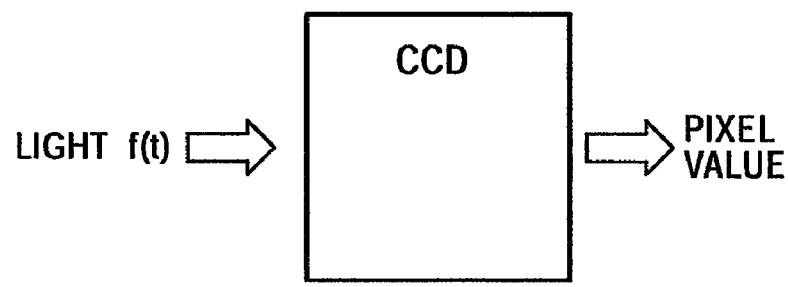
FIG. 30 is a diagram illustrating operation of a detecting element.

As shown in FIG. 30, for example, the CCD detection element converts the input light into a charge for the time interval corresponding to the shutter time and stores the converted charge. The amount of charge is approximately proportional to the intensity of input light and time interval when light is input. The detection element adds the charge converted from the input light to the charge already stored for the time interval corresponding to the shutter time. That is, the detection element integrates the input light for the time interval corresponding to the shutter time to store the amount of charge corresponding to the integrated light. The detection element can be mentioned to have integration effect with time.

The charge stored in the detection element is converted into a voltage value by means of a circuit not shown and the voltage value is converted into a pixel value such as digital data, etc. to be output. Therefore, each pixel value output from the sensor 76a has a value projected to one-dimensional space as a result of integrating some portion having spatial extension of an object corresponding to foreground or background with respect to the shutter time.

The separation server 11 extracts any significant information, for example, mixture ratio α, hidden in the output signal by means of storing operation of such sensor 76a. The separation server 11 adjusts the amount of distortion, for example, the amount of motion blur resulting from the mixture of the same image object of the foreground. Further, the separation server 11 adjusts the amount of distortion resulting from the mixture of image object of the foreground and image object of the background.

Figure 31A:
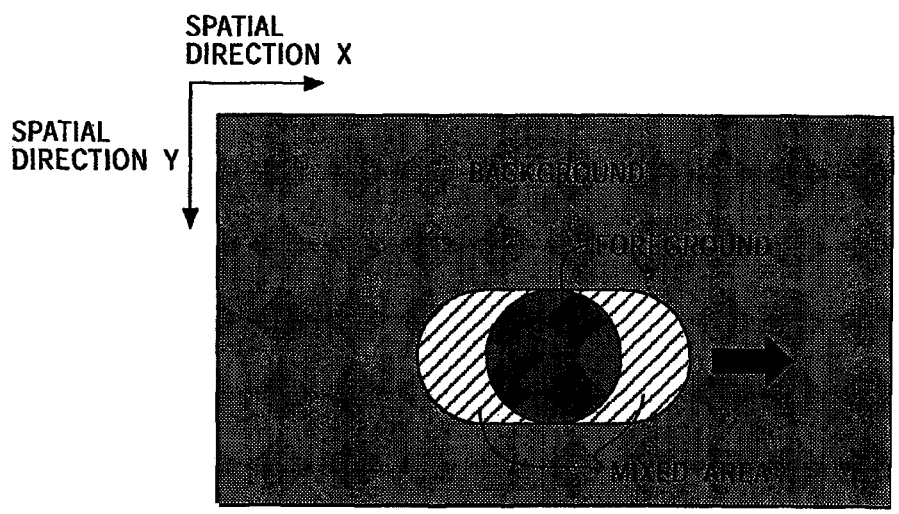
FIG. 31A is a diagram illustrating an image obtained by picking up an image of an object corresponding to a moving foreground and an object corresponding to a stationary background.

FIG. 31A through 31D are diagrams showing an image obtained by taking picture of an object corresponding to a moving foreground and an object corresponding to a stationary background. FIG. 31A shows an image obtained by taking picture of an object corresponding to a moving foreground and an object corresponding to a stationary background. In the example shown in FIG. 31A, the object corresponding to the foreground moves horizontally from left to right with respect to the screen.

Figure 31B:
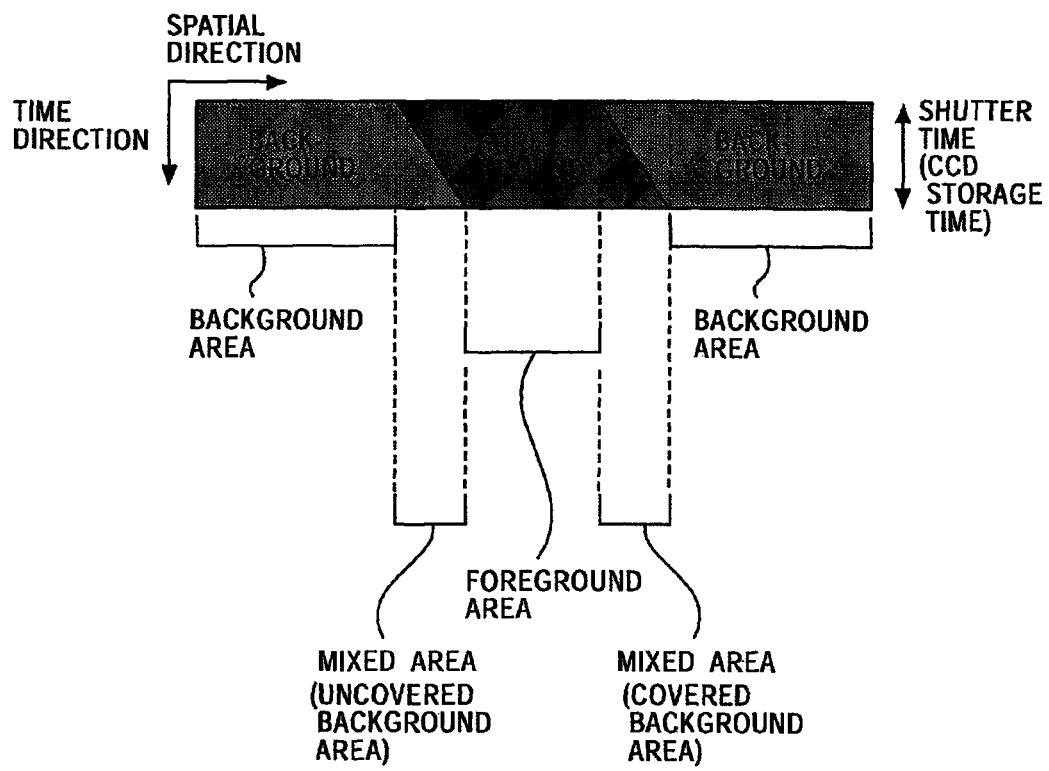
FIG. 31B is another diagram illustrating an image obtained by picking up an image of an object corresponding to a moving foreground and an object corresponding to a stationary background.

FIG. 31B is a model diagram in which the pixel values corresponding to one line of the image shown in FIG. 31A are expanded in the time direction. The horizontal direction in FIG. 31B corresponds to the spatial direction X in FIG. 31A.

The pixel values of pixels in the background area comprise only the components of the background, that is, the components of the image corresponding to the background object. The pixel values of pixels in the foreground area comprise only the components of the foreground, that is, the components of the image corresponding to the foreground object.

The pixel values of pixels in the mixed area comprise the components of the background and the components of the foreground. Since the pixel values of pixels in the mixed area comprise the components of the background and the components of the foreground, the mixed area can be mentioned as a distortion area. Further, the mixed area is classified into a covered background area and an uncovered background area.

The covered background area is a mixed area corresponding to a front end portion in a direction in which the foreground object moves in respect to the foreground area and is an area in which the background components is hidden behind the foreground with time elapsing.

In contrast, the uncovered background area is a mixed area corresponding to the rear end portion in a direction in which the foreground object moves in respect to the foreground area and is an area in which the background components appear with time elapsing.

As such, the image including the foreground area, the background area, the covered background area or the uncovered background area is input to the area specifying unit 103, the mixture ratio calculator 104 and the foreground/background separator 105 as the input image.

Figures 32, 33:
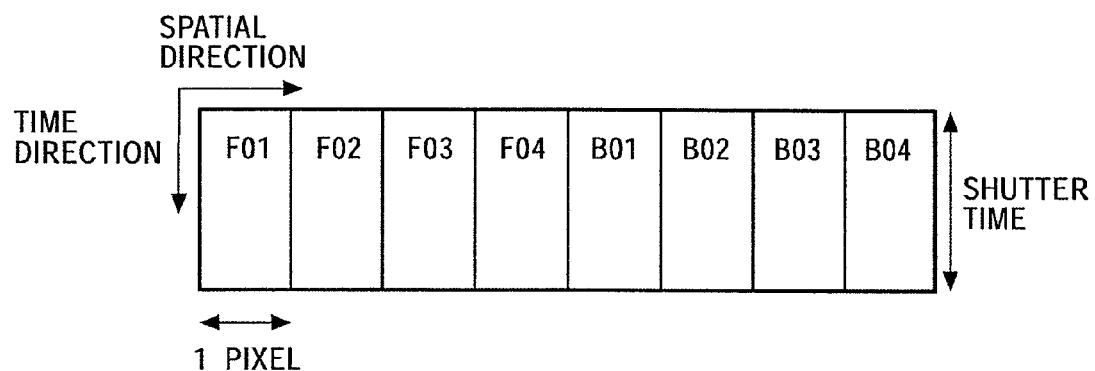
FIG. 32 is a diagram illustrating background area, foreground area, mixed area, covered background area and uncovered background area.
FIG. 33 is a modeling diagram in which pixel values of pixels adjacent to each other in a row are expanded in time direction in picking up an image of an object corresponding to a stationary foreground and an object corresponding to a stationary background.

FIG. 32 is a diagram illustrating the background area, the foreground area, the mixed area, the covered background area, and the uncovered background area like above. When an image corresponds to the image shown in FIGS. 31A and 31B, the background area is a stationary portion, the foreground area is a moving portion, the covered background area of the mixed area is a portion being changed from the background to the foreground and the uncovered background area of the mixed area is a potion being changed from the foreground to the background.

FIG. 33 is a model diagram in which the pixel values of pixels being adjacent in a row are expanded in the time direction in the image obtained by picking up an image of an object corresponding to the stationary foreground and an object corresponding to the stationary background. For example, as pixels being adjacent in a row, pixels being adjacent to a line of screen can be selected.

Pixel values of F01 to F04 shown in FIG. 33 are pixel values of pixels corresponding to a stationary foreground object. Pixel values of B01 to B04 shown in FIG. 33 are pixel values of pixels corresponding to a stationary background object.

The vertical direction in FIG. 33 corresponds to time and time elapses from the upper side to the lower side in the drawing. The Position at the upper side of the rectangle in FIG. 33 corresponds to a time when the sensor 76a starts to convert of the input light to charges and the position at the lower side of the rectangle in FIG. 33 corresponds to time when the sensor 76a finishes converting the input light into charges. That is, the distance from the upper side to the lower side of the rectangle in FIG. 33 corresponds to a shutter time.

Now, a case of when the shutter time equals to the frame interval will be explained as an example.

The horizontal direction in FIG. 33 corresponds to the spatial direction x shown in FIG. 31A. More specifically, in the example shown in FIG. 33, the distance from the left side of rectangle indicated by "F01" to the right side of rectangle indicated by "B04" in FIG. 33 corresponds to 8 times of a pixel pitch, that is, intervals of 8 pixels being continuous.

When the object of foreground and the object of background are stationary, light to be input to the sensor 76a is not varied for a time interval corresponding to a shutter time.

Here, the time interval corresponding to the shutter time is divided into two or more equivalent lengths. For example, if a virtual division number is 4, the model diagram shown in FIG. 33 can be shown as the model diagram shown in FIG. 9. The virtual division number is established according to the amount of movement v for the shutter time of the object corresponding to the foreground. For example, if the amount of movement v is defined as 4, the virtual division number is set at 4 and the time interval corresponding to the shutter time is divided into 4 intervals.

The uppermost row in the drawing corresponds to a first divided time interval after the shutter is opened. The second row from the uppermost in the drawing corresponds to a second divided time interval after the shutter is opened. The third row from the uppermost in the drawing corresponds to a third divided time interval after the shutter is opened. The fourth row from the uppermost in the drawing corresponds to a fourth divided time interval after the shutter is opened.

Now, the time interval by which the shutter time is divided according to the amount of movement v is referred to as shutter time/v.

When the object corresponding to the foreground is stationary, since light input to the sensor 76a is not varied, the foreground component $F01/v$ has the same value the pixel value F01 divided by the virtual division number. Similarly, when the object corresponding to the foreground is stationary, the foreground component $F02/v$ has the same value as the pixel value F02 divided by the virtual division number, the foreground component $F03/v$ has the same value as the pixel value F03 divided by the virtual division number and the foreground component F04/v has the same value as the pixel value F04 divided by the virtual division number.

When the object corresponding to the background is stationary, since light input to the sensor 76a is not varied, the background component B01/v has the same value as the pixel value B01 divided by the virtual division number. Similarly, when the object corresponding to the background is stationary, the background component B02/v has the same value as the pixel value B02 divided by the virtual division number, the background component B03/v has the same value as the pixel value B03 divided by the virtual division number and the background component B04/v has the same value as the pixel value B04 divided by the virtual division number.

That is, when an object corresponding to the foreground is stationary, since light input to the sensor 76a is not varied for the time interval corresponding to the shutter time, the foreground component F01/v corresponding to a first shutter time/v after the shutter is opened, the foreground component F01/v corresponding to a second shutter time/v after the shutter is opened, the foreground component F01/v corresponding to a third shutter time/v after the shutter is opened and the foreground component F01/v corresponding to a fourth shutter time/v after the shutter is opened all have the same value. F02/v to F04/v have also the same relation as F01/v.

When an object corresponding to the background is stationary, since light input to the sensor 76a is not varied for the time interval corresponding to the shutter time, the background component B01/v corresponding to a first shutter time/v after the shutter is opened, the background component B01/v corresponding to a second shutter time/v after the shutter is opened, the background component B01/v corresponding to a third shutter time/v after the shutter is opened and the background component B01/v corresponding to a fourth shutter time/v after the shutter is opened all have the same value. B02/v to B04/v have the same value as B01/v.

Next, a case of when an object corresponding to the foreground is moving and the object corresponding to the background is stationary will be explained.

FIG. 35 is a model diagram in which when an object corresponding to the foreground is moving toward the right side in the drawing, the pixel values of pixels in a line including the covered background area are developed in the time direction. In FIG. 35, the amount of movement v of the foreground is 4. Since one frame corresponds to a short time, it can be supposed that the object corresponding to the foreground is a rigid body and is moving at a uniform speed. In FIG. 35, an image of the object corresponding to the foreground is moving to be displayed at position displaced by 4 pixels in a frame following a reference frame.

In FIG. 35, the pixels from the leftmost to the fourth from the leftmost belong to the foreground. In FIG. 35, the pixels from the fifth from the leftmost to the seventh from the leftmost belong to the mixed area that is the covered background area. In FIG. 35, the rightmost pixel belongs to the background area.

Since the object corresponding to the foreground is moving to cover the object corresponding to the background with time elapsing, the components included in the pixel values of pixels belonging to the covered background area is changed from the background components to the foreground components at certain time point of the time interval corresponding to the shutter time.

For example, the pixel values M of which edge is a bold line in FIG. 35 is expressed as equation (1).

$$M = B02/v + B02/v + F07/v + F06/v \qquad (1)$$

For example, since the fifth pixel from the leftmost includes the background component corresponding to a first shutter time/v and the foreground component corresponding to a third shutter time/v, the mixture ratio α of the fifth pixel from the leftmost is ¼. Since the sixth pixel from the leftmost includes the background component corresponding to a second shutter time/v and the foreground component corresponding to the second shutter time/v, the mixture ratio α of the sixth pixel from the leftmost is ½. Since the seventh pixel from the leftmost includes the background component corresponding to the third shutter time/v and the foreground component corresponding to the first shutter time/v, the mixture ratio α of the seventh pixel from the leftmost is ¾.

Since it can be supposed that the object corresponding to the foreground is a rigid body and the foreground image is moving at an uniform speed to be displayed at a position displaced to the right by 4 pixels in a next frame, for example, the foreground component F07/v, of the fourth pixel from the leftmost in FIG. 35, corresponding to the first shutter time/v after the shutter is opened is the same as the foreground component of the fifth pixel from the leftmost in FIG. 35, corresponding to the second shutter time/v after the shutter is opened. Similarly, the foreground component F07/v is the same as the foreground component of the sixth pixel from the leftmost in FIG. 35 corresponding to the third shutter time/v after the shutter is opened and the foreground component of the seventh pixel from the leftmost in FIG. 35 corresponding to the fourth shutter time/v after the shutter is opened, respectively.

Since it can be supposed that the object corresponding to the foreground is a rigid body and the foreground image is moving at an uniform speed to be displayed at a position displaced to the right by 4 pixels in a next frame, for example, the foreground component F06/v of the third pixel from the leftmost in FIG. 35 corresponding to the first shutter time/v after the shutter is opened is the same as the foreground component of the fourth pixel from the leftmost in FIG. 35 corresponding to the second shutter time/v after the shutter is opened. Similarly, the foreground component F06/v is the same as the foreground component of the fifth pixel from the leftmost in FIG. 35 corresponding to the third shutter time/v after the shutter is opened and the foreground component of the sixth pixel from the leftmost in FIG. 35 corresponding to the fourth shutter time/v after the shutter is opened, respectively.

Since it can be supposed that the object corresponding to the foreground is a rigid body and the foreground image is moving at an uniform speed to be displayed at a position displaced to the right by 4 pixels in a next frame, for example, the foreground component F05/v of the second pixel from the leftmost in FIG. 35 corresponding to the first shutter time/v after the shutter is opened is the same as the foreground component of the third pixel from the leftmost in FIG. 35 corresponding to the second shutter time/v after the shutter is opened. Similarly, the foreground component F05/v is the same as the foreground component of the fourth pixel from the leftmost in FIG. 35 corresponding to the third shutter time/v after the shutter is opened and the foreground component of the fifth pixel from the leftmost in FIG. 35 corresponding to the fourth shutter time/v after the shutter is opened, respectively.

Since it can be supposed that the object corresponding to the foreground is a rigid body and the foreground image is moving at an uniform speed to be displayed at a position displaced to the right by 4 pixels in a next frame, for example, the foreground component F04/v of the leftmost pixel in FIG. 35 corresponding to the first shutter time/v after the shutter is opened is the same as the foreground component of the second pixel from the leftmost in FIG. 35 corresponding to the second shutter time/v after the shutter is opened. Similarly, the foreground component F04/v is the same as the foreground component of the third pixel from the leftmost in FIG. 35 corresponding to the third shutter time/v after the shutter is opened and the foreground component of the fourth pixel from the leftmost in FIG. 35 corresponding to the fourth shutter time/v after the shutter is opened, respectively.

The foreground area corresponding to a moving object may be mentioned as a distortion area because it includes the motion blur as described by the above.

Figure 36:
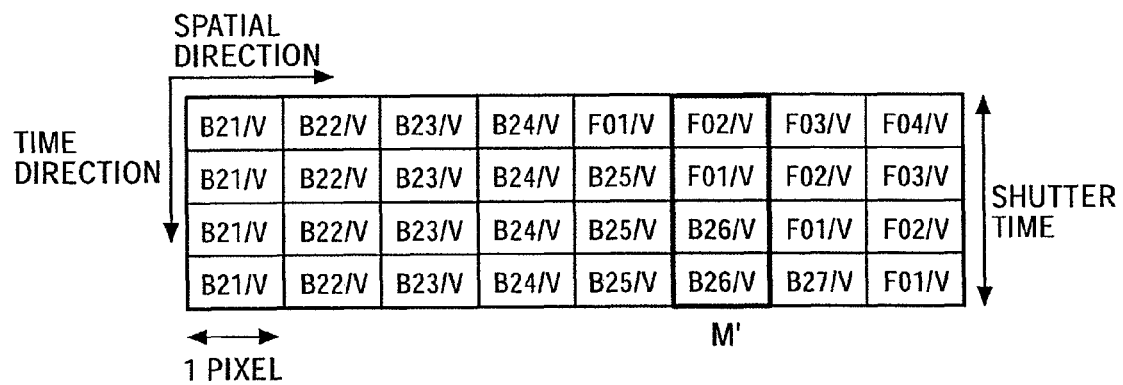
FIG. 36 is a modeling diagram in which pixel values are expanded in the time direction and shutter time which is divided into a time interval.

FIG. 36 is a model diagram in which when the foreground is moving toward the right side in the drawing, the pixel values of pixels in a line including the uncovered background area are expanded in the time direction. In FIG. 36, the amount of movement v of the foreground is 4. Since one frame corresponds to a short time, it can be supposed that an object corresponding to the foreground is a rigid body and is moving at a uniform speed. In FIG. 36, an image of the object corresponding to the foreground is moving toward the right side by 4 pixels in a next frame.

In FIG. 36, pixels from the leftmost to the fourth from the leftmost belong to the background area. In FIG. 36, pixels from the fifth from the leftmost to the seventh from the leftmost belong to the mixed area that is the uncovered background area. In FIG. 36, the rightmost pixel belongs to the background area.

Since the object corresponding to the foreground covering the object corresponding to the background is moving to be displaced from the object corresponding to the background with time elapsing, the components included in the pixel values of pixels belonging to the uncovered background area is changed from the foreground components to the background components at certain time point of the time interval corresponding to the shutter time.

For example, the pixel values M' of which edge is a bold line in FIG. 36 is expressed as equation (2).

$$M' = F02/v + F01/v + B26/v + B26/v \quad (2)$$

For example, since the fifth pixel from the leftmost includes the background component corresponding to a third shutter time/v and the foreground component corresponding to a first shutter time/v, the mixture ratio α of the fifth pixel from the leftmost is ¾. Since the sixth pixel from the leftmost includes the background component corresponding to a second shutter time/v and the foreground component corresponding to the second shutter time/v, the mixture ratio α of the sixth pixel from the leftmost is ½. Since the seventh pixel from the leftmost includes the background component corresponding to the first shutter time/v and the foreground component corresponding to the third shutter time/v, the mixture ratio α of the seventh pixel from the leftmost is ¼.

More generalizing combining equation (1) and equation (2), the pixel value M can also be expressed by equation (3).

$$M = \alpha \cdot B + \sum_i F_i / v \quad (3)$$

Here, α is a mixture ratio. B is a pixel value of the background and Fi/v is a foreground component.

Since it can be supposed that the object corresponding to the foreground is a rigid body and is moving at an uniform speed and the amount of movement v is 4, for example, the foreground component F01/v of the fifth pixel from the leftmost in FIG. 36 corresponding to the first shutter time/v after the shutter is opened is the same as the foreground component of the sixth pixel from the leftmost in FIG. 36 corresponding to the second shutter time/v after the shutter is opened. Similarly, the foreground component F01/v is the same as the foreground component of the seventh pixel from the leftmost in FIG. 36 corresponding to the third shutter time/v after the shutter is opened and the foreground component of the eighth pixel from the leftmost in FIG. 36 corresponding to the fourth shutter time/v after the shutter is opened, respectively.

Since it can be supposed that the object corresponding to the foreground is a rigid body and is moving at an uniform speed and the virtual division number is 4, for example, the foreground component F02/v of the sixth pixel from the leftmost in FIG. 36 corresponding to the first shutter time/v after the shutter is opened is the same as the foreground component of the seventh pixel from the leftmost in FIG. 36 corresponding to the second shutter time/v after the shutter is opened. Similarly, the foreground component F02/v is the same as the foreground component of the eighth pixel from the leftmost in FIG. 36 corresponding to the third shutter time/v after the shutter is opened.

Since it can be supposed that the object corresponding to the foreground is a rigid body and is moving at an uniform speed and the amount of movement v is 4, for example, the foreground component F03/v of the seventh pixel from the leftmost in FIG. 36 corresponding to the first shutter time/v after the shutter is opened is the same as the foreground component of the eighth pixel from the leftmost in FIG. 36 corresponding to the second shutter time/v after the shutter is opened.

In the explanations of FIGS. 34 to 36, it has been explained that the virtual division number is 4, however the virtual division number corresponds to the amount of movement v. The amount of movement v usually corresponds to the moving speed of an object corresponding to the foreground. For example, when an object corresponding to the foreground is moving to be displayed at position 4 pixels to the right in a frame following a reference frame, the amount of movement v is defined as 4. In accordance to the amount of movement v, the virtual division number is set at 4. Similarly, for example, when an object corresponding to the foreground is moving to be displayed at a position 6 pixels to the right in a frame following a reference frame, the amount of movement v is defined as 6 and the virtual division number is set at 6.

Figure 37:
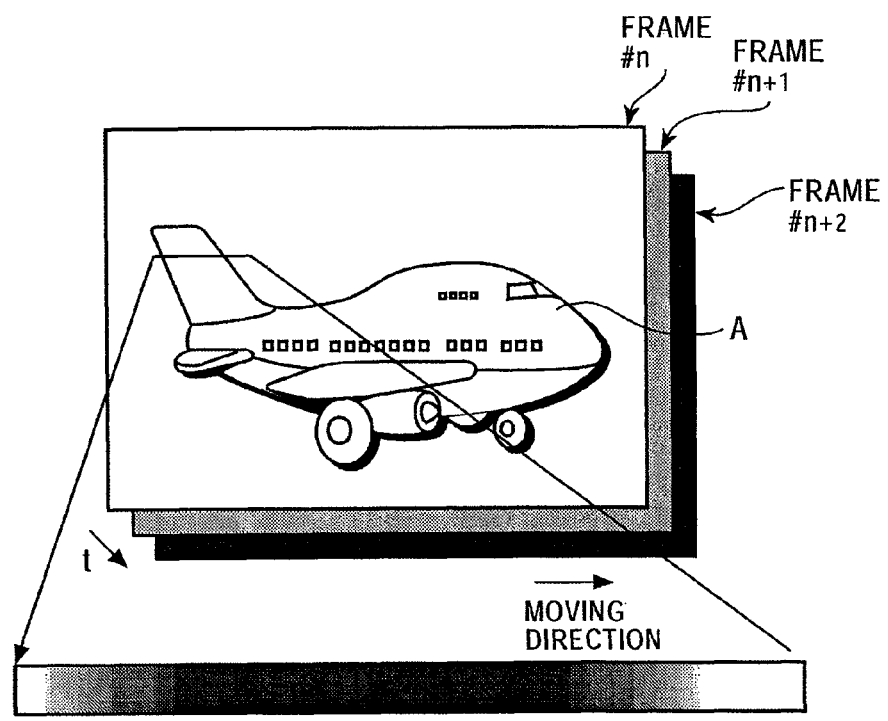
FIG. 37 is a diagram illustrating an example in which pixels of foreground area, background area and mixed area are extracted.
Figure 38:
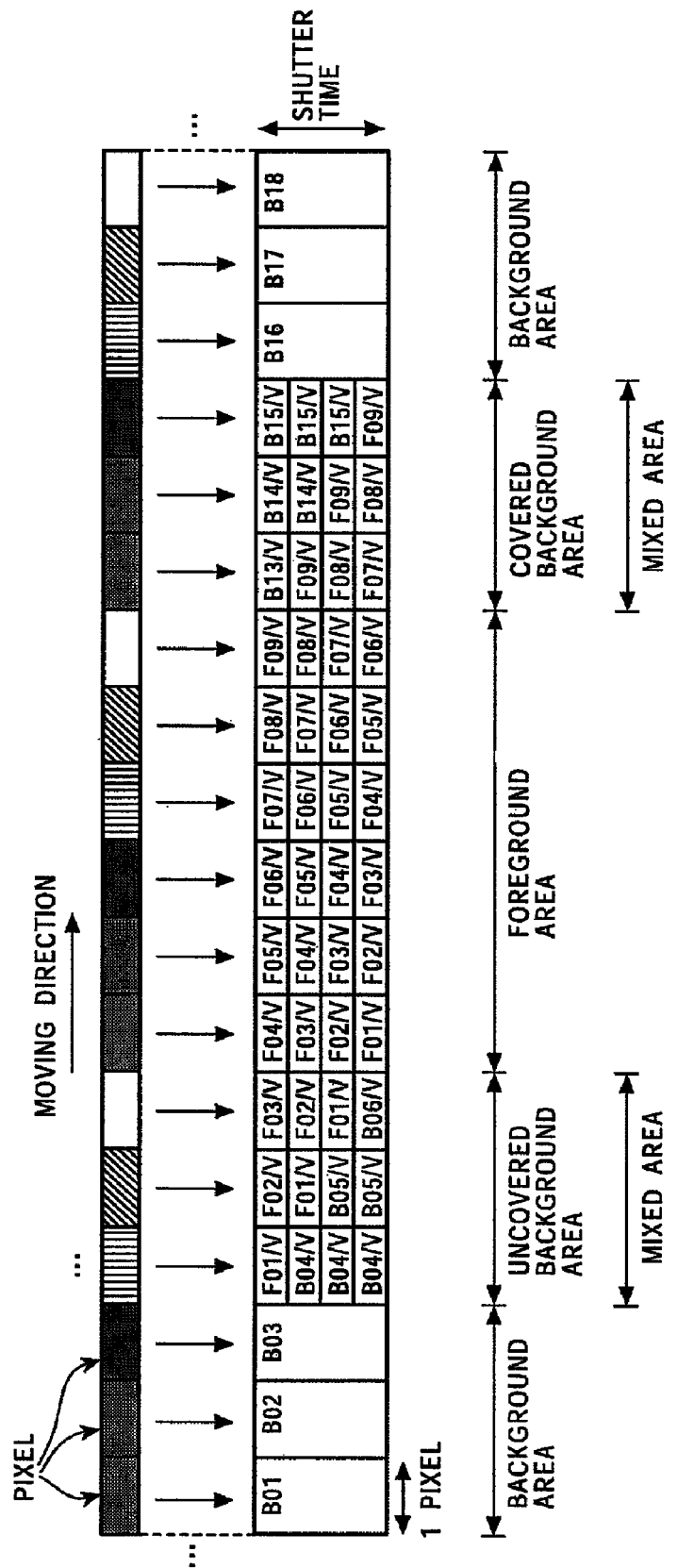
FIG. 38 is a diagram illustrating relationship of pixels and a model in which pixel values are expanded in the time direction.

FIGS. 37 and 38 show a relationship between the foreground area, the background area, the mixed area having the covered background area and the uncovered background area and the foreground component or the background component corresponding to the divided shutter time.

FIG. 37 shows an example in which the pixels of the foreground area, the background area and the mixed area are extracted from an image including the foreground corresponding to the object moving in front of the stationary background. In an example shown in FIG. 37, an object A corresponding to the foreground is moving horizontally with respect to the screen.

A frame #n+1 is a frame next to a frame #n and a frame #n+2 is a frame next to the frame #n+1.

A model in which the pixels of the foreground area, the background area and the mixed area extracted from one of the frame #n to the frame #n+2 and the pixel values of the extracted pixels are expanded in the time direction with the amount of movement v being 4 is shown in FIG. 38.

Since the object A corresponding to the foreground is moving, the pixel values of the foreground area comprise 4 different foreground components according to intervals of a shutter time/v. For example, the leftmost pixel in the foreground area shown in FIG. 38 comprises F01/v, F02/v, F03/v and F04/v. That is, the pixels of the foreground area include the motion blur.

Since an object corresponding to the background is stationary, the light corresponding to the background input to the sensor 76a for the time interval corresponding to the shutter time does not change. In this case, the pixel values of the background area do not include the motion blur.

The pixel values of pixels belonging to the mixed area containing the covered background area or the uncovered background area is comprised the foreground components and the background components.

Next, a model will be explained that when an image corresponding to an object is moving, the pixel values of pixels are adjacent in one row in a plurality of frames and are at the same positions in the frames are expanded in the time direction. For example, when the image corresponding to the object is moving horizontally with respect to the screen, the pixels being in one line on the screen can be selected as pixels being adjacent in one row.

Figure 39:
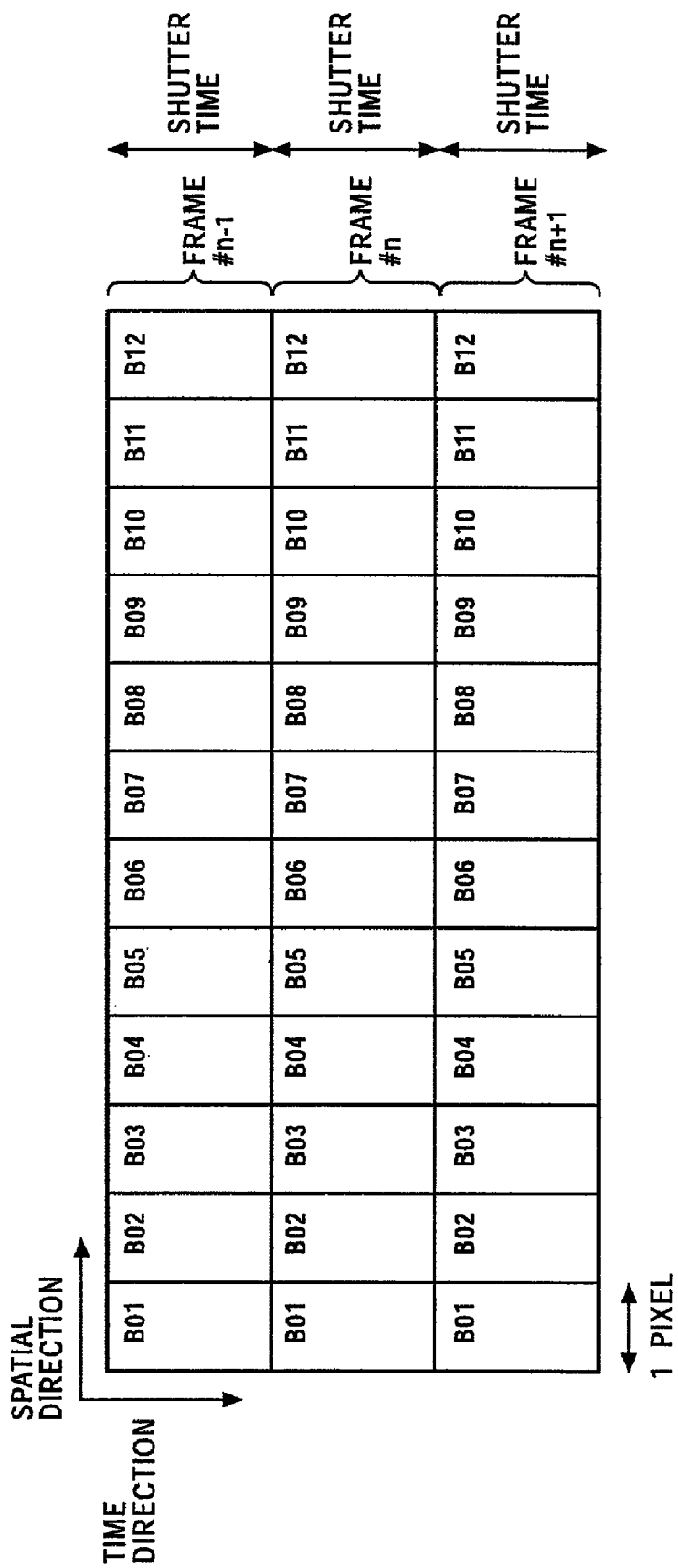
FIG. 39 is a modeling diagram in which pixel values are expanded in the time direction and shutter time which is divided into a time interval.

FIG. 39 is a model diagram in which the pixel values of pixels are expanded in the time direction, wherein the pixel values of pixels which are adjacent in one row in 3 frames of an image obtained by picking up an image of an object corresponding to the stationary background and are at the same positions in the frames. A frame #n is a frame following a frame #n−1 and a frame #n+1 is a frame following the frame #n. Other frames are referred in the same manner.

The pixel values of B01 to B12 shown in FIG. 39 are the pixel values corresponding to the object of the stationary background. Since the object corresponding to the background is stationary, the pixel values of the corresponding pixels do not changed in the frame #n−1 to the frame # n+1. For example, a pixel in the frame #n and a pixel in the frame #n+1 corresponding to the position of pixel having the pixel value of B05 in the frame #n−1 have the same pixel value of B05, respectively.

Figure 40:
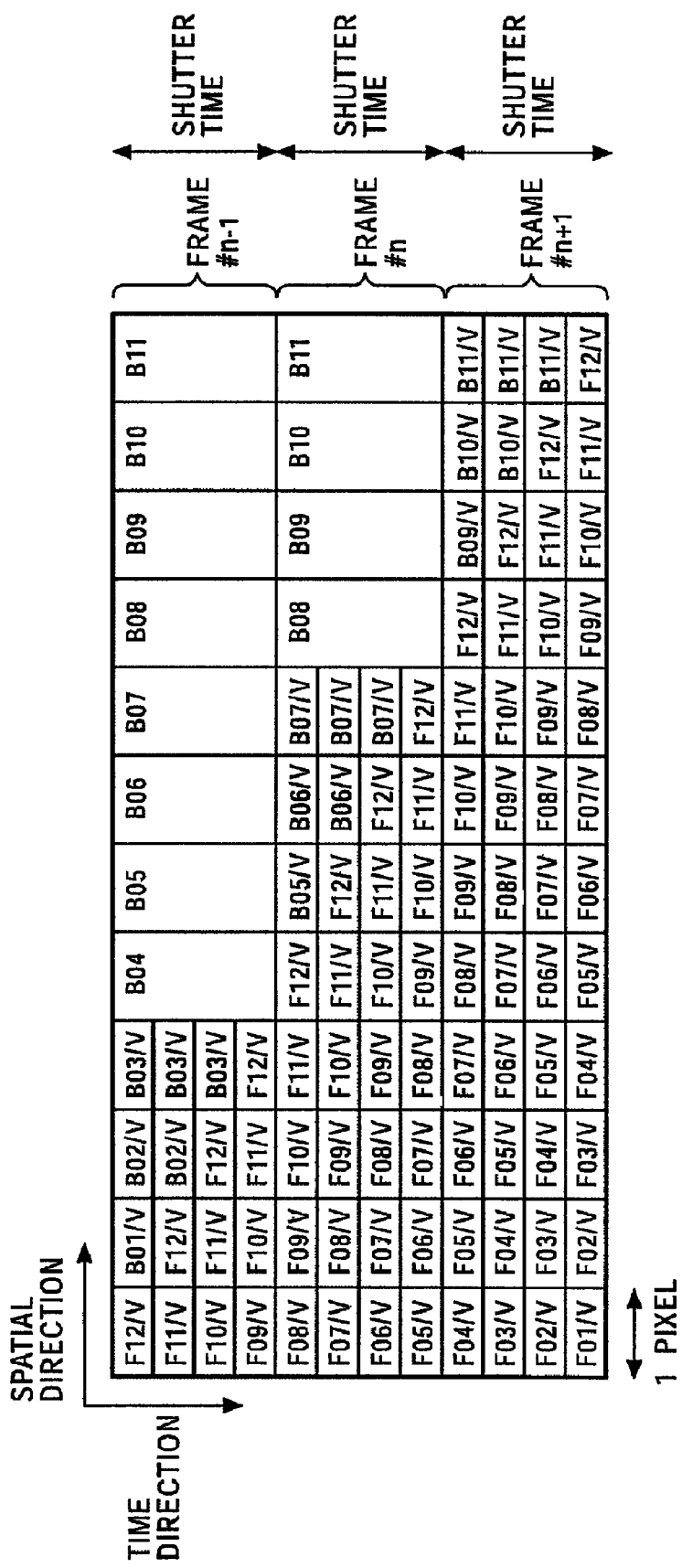
FIG. 40 is a modeling diagram in which pixel values are expanded in the time direction and shutter time which is divided into a time interval.

FIG. 40 is a model diagram in which the pixel values of pixels are expanded in the time direction, wherein the pixel values of pixels are adjacent in one row in 3 frames of an image obtained by picking up an image of an object corresponding to the foreground moving toward the right side in the drawing along with an object corresponding to the stationary background and are at the same positions in the frames. The model shown in FIG. 40 includes the covered background area.

In FIG. 40, since it can be supposed that the object corresponding to the foreground is a rigid body and is moving at an uniform speed and the foreground image is moving to be displayed displaced to the right by 4 pixels in a next frame, the amount of movement v of the foreground is defined as 4 and the virtual division number is set at 4.

For example, the foreground component of the leftmost pixel of a frame #n−1 in FIG. 40 corresponding to a first shutter time/v after the shutter is opened is F12/v, and the foreground component of the second pixel from the leftmost in FIG. 40 corresponding to a second shutter time/v after the shutter is opened is also F12/v. Similarly, the foreground component of the third pixel from the leftmost in FIG. 40 corresponding to a third shutter time/v after the shutter is opened and the foreground component of the fourth pixel from the leftmost in FIG. 40 corresponding to a fourth shutter time/v after the shutter is opened are F12/v.

The foreground component of the leftmost pixel of the frame #n−1 in FIG. 40 corresponding to the second shutter time/v after the shutter is opened is F11/v, and the foreground component of the second pixel from the leftmost in FIG. 40 corresponding to the third shutter time/v after the shutter is opened is also F11/v. The foreground component of the third pixel from the leftmost in FIG. 40 corresponding to the fourth shutter time/v after the shutter is opened is F11/v.

The foreground component of the leftmost pixel of the frame #n−1 in FIG. 40 corresponding to the third shutter time/v after the shutter is opened is F10/v, and the foreground component, of the second pixel from the leftmost in FIG. 40 corresponding to the fourth shutter time/v after the shutter is opened is also F10/v. The foreground component of the leftmost pixel of the frame #n−1 in FIG. 40 corresponding to the fourth shutter time/v after the shutter is opened is F09/v.

Since an object corresponding to the background is stationary, the background component of the second pixel from the leftmost of the frame #n−1 in FIG. 40 corresponding to the first shutter time/v after the shutter is opened is B01/v. The background components of the third pixel from the leftmost of the frame #n−1 in FIG. 40 corresponding to the first and the second shutter time/v after the shutter is opened are B02/v. The background components of the fourth pixel from the leftmost of the frame #n−1 in FIG. 40 corresponding to the first to third shutter time/v after the shutter is opened are B03/v.

In the frame #n−1 of FIG. 40, the leftmost pixel corresponds to the foreground area and the second to fourth pixels from the leftmost belong to the mixed area that is the covered background area.

The fifth to twelfth pixels from the leftmost of the frame #n−1 in FIG. 40 belong to the background area and the pixel values thereof are B04 to B11, respectively.

The first to fifth pixels from the leftmost of a frame #n in FIG. 40 belong to the foreground area. In the foreground area of the frame #n, the foreground component of the shutter time/v is one of F05/v to F12/v.

Since it can be supposed that the object corresponding to the foreground is a rigid body and is moving at an uniform speed and the foreground image is moving to be displayed displaced to the right by 4 pixels in a next frame, the foreground component of the fifth pixel from the leftmost of the frame #n in FIG. 40 corresponding to the first shutter time/v after the shutter is opened is F12/v, and the foreground component of the sixth pixel from the leftmost in FIG. 40 corresponding to the second shutter time/v after the shutter is opened is also F12/v. Similarly, the foreground component of the seventh pixel from the leftmost in FIG. 40 corresponding to the third shutter time/v after the shutter is opened and the foreground component of the eighth pixel from the leftmost in FIG. 40 corresponding to the fourth shutter time/v after the shutter is opened are F12/v.

The foreground component of the fifth pixel from the leftmost of the frame #n in FIG. 40 corresponding to the second shutter time/v after the shutter is opened is F11/v, and the foreground component of the sixth pixel from the leftmost in FIG. 40 corresponding to the third shutter time/v after the shutter is opened is also F11/v. The foreground component of the seventh pixel from the leftmost in FIG. 40 corresponding to the fourth shutter time/v after the shutter is opened is F11/v.

The foreground component of the fifth pixel from the leftmost of the frame #n in FIG. 40 corresponding to the third shutter time/v after the shutter is opened is F10/v, and the foreground component of the sixth pixel from the leftmost in FIG. 40 corresponding to the fourth shutter time/v after the shutter is opened is also F10/v. The foreground component of the fifth pixel from the leftmost of the frame #n in FIG. 40 corresponding to the fourth shutter time/v after the shutter is opened is F09/v.

Since the object corresponding to the background is stationary, the background component of the sixth pixel from the leftmost of the frame #n in FIG. 40 corresponding to the first shutter time/v after the shutter is opened is B05/v. The background components of the seventh pixel from the leftmost of the frame #n in FIG. 40 corresponding to the first and the second shutter time/v after the shutter is opened are B06/v. The background components of the eighth pixel from the leftmost of the frame #n in FIG. 40 corresponding to the first to third shutter time/v after the shutter is opened are B07/v.

In the frame #n in FIG. 40, the sixth to eighth pixels from the leftmost belong to the mixed area that is the covered background area.

The ninth to twelfth pixels from the leftmost of the frame #n in FIG. 40 belong to the background area and the pixel values thereof are B08 to B11, respectively.

The first to ninth pixels from the leftmost of a frame #n+1 in FIG. 40 belong to the foreground area. In the foreground area of the frame #n+1, the foreground component corresponding to the shutter time/v is one of F01/v to F12/v.

Since it can be supposed that the object corresponding to the foreground is a rigid body and is moving at an uniform speed and the foreground image is moving to be displayed displaced to the right by 4 pixels in a next frame, the foreground component of the ninth pixel from the leftmost of the frame #n+1 in FIG. 40 corresponding to the first shutter time/v after the shutter is opened is F12/v, and the foreground component of the tenth pixel from the leftmost in FIG. 40 corresponding to the second shutter time/v after the shutter is opened is also F12/v. The foreground component of the eleventh pixel from the leftmost in FIG. 40 corresponding to the third shutter time/v after the shutter is opened and the foreground component of the twelfth pixel from the leftmost in FIG. 40 corresponding to the fourth shutter time/v after the shutter is opened are F12/v.

The foreground component of the ninth pixel from the leftmost of the frame #n+1 in FIG. 40 corresponding to the second shutter time/v after the shutter is opened is F11/v, and the foreground component of the tenth pixel from the leftmost in FIG. 40 corresponding to the third shutter time/v after the shutter is opened is also F11/v. The foreground component, of the eleventh pixel from the leftmost in FIG. 40, corresponding to the fourth shutter time/v after the shutter is opened is F11/v.

The foreground component of the ninth pixel from the leftmost of the frame #n+1 in FIG. 40 corresponding to the third shutter time/v after the shutter is opened is F10/v, and the foreground component of the tenth pixel from the leftmost in FIG. 40 corresponding to the fourth shutter time/v after the shutter is opened is also F10/v. The foreground component of the ninth pixel from the leftmost of the frame #n+1 in FIG. 40 corresponding to the fourth shutter time/v after the shutter is opened is F09/v.

Since the object corresponding to the background is stationary, the background component of the tenth pixel from the leftmost of the frame #n+1 in FIG. 40 corresponding to the first shutter time/v after the shutter is opened is B09/v. The background components of the eleventh pixel from the leftmost of the frame #n+1 in FIG. 40 corresponding to the first and the second shutter time/v after the shutter is opened are B10/v. The background components of the twelfth pixel from the leftmost of the frame #n+1 in FIG. 40 corresponding to the first to third shutter time/v after the shutter is opened are B11/v.

In the frame #n+1 of FIG. 40, the tenth to twelfth pixels from the leftmost belong to the mixed area that is the covered background area.

Figure 41:
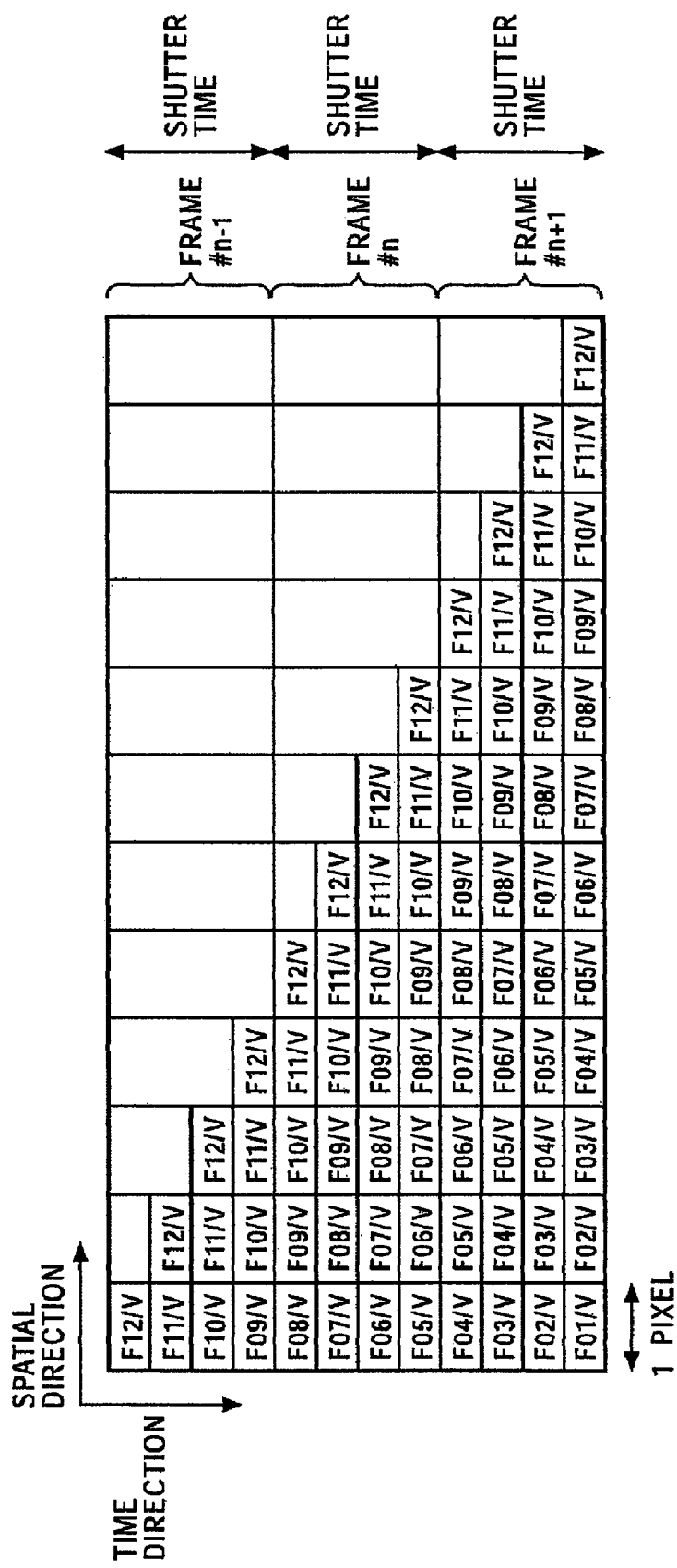
FIG. 41 is a modeling diagram in which pixel values are expanded in the time direction and shutter time which is divided into a time interval.

FIG. 41 is a model diagram of an image obtained by extracting the foreground components from the pixel values shown in FIG. 40.

Figure 42:
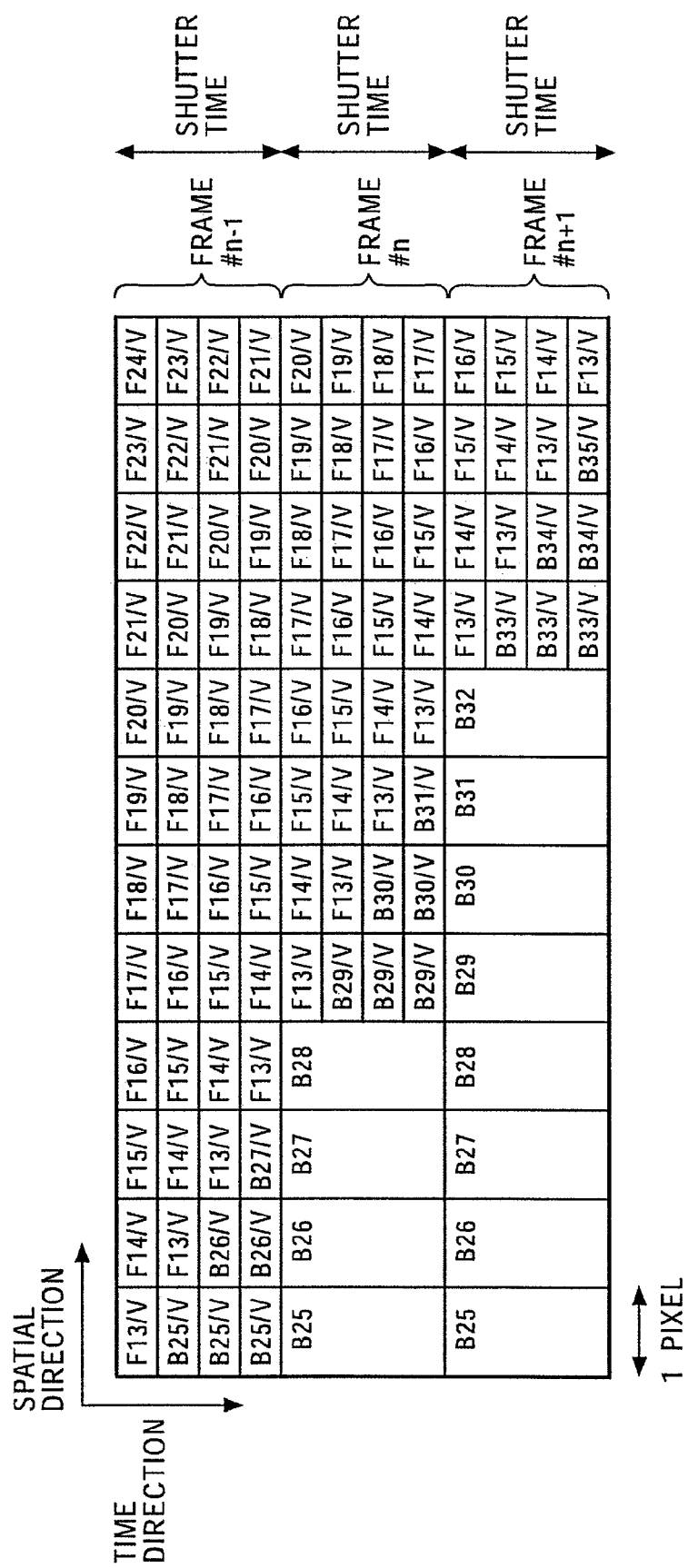
FIG. 42 is a modeling diagram in which pixel values are expanded in the time direction and shutter time which is divided into a time interval.

FIG. 42 is a model diagram in which the pixel values of pixels are expanded in the time direction, wherein the pixel values of pixels are adjacent in one row in 3 frames of an image obtained by picking up an image of an object corresponding to the foreground moving toward the right side in the drawing along with the stationary background and are at the same positions in the frames. In FIG. 42, the uncovered background area is included.

In FIG. 42, it can be supposed that the object corresponding to the foreground is a rigid body and is moving at a uniform speed. Since the object corresponding to the foreground is moving to be displayed displaced to the right by 4 pixels in a next frame, the amount of movement v of the foreground is defined as 4.

For example, the foreground component of the leftmost pixel of a frame #n−1 in FIG. 42 corresponding to a first shutter time/v after the shutter is opened is F13/v, and the foreground component of the second pixel from the leftmost in FIG. 42 corresponding to a second shutter time/v after the shutter is opened is also F13/v. The foreground component of the third pixel from the leftmost in FIG. 42 corresponding to a third shutter time/v after the shutter is opened and the foreground component of the fourth pixel from the leftmost in FIG. 42 corresponding to a fourth shutter time/v after the shutter is opened are F13/v.

The foreground component of the second pixel from the leftmost of the frame #n−1 in FIG. 42 corresponding to the first shutter time/v after the shutter is opened is F14/v, and the foreground component of the third pixel from the leftmost in FIG. 42 corresponding to the second shutter time/v after the shutter is opened is also F14/v. The foreground component of the third pixel from the leftmost in FIG. 42 corresponding to the first shutter time/v after the shutter is opened is F15/v.

Since an object corresponding to the background is stationary, the background components of the leftmost pixel of the frame #n−1 in FIG. 42 corresponding to the second to fourth shutter time/v after the shutter is opened are B25/v. The background components of the second pixel from the leftmost of the frame #n−1 in FIG. 42 corresponding to the third and fourth shutter time/v after the shutter is opened are B26/v. The background component of the third pixel from the leftmost of the frame #n−1 in FIG. 42 corresponding to the fourth shutter time/v after the shutter is opened is B27/v.

In the frame #n−1 of FIG. 42, the first, second and third pixels from the leftmost belong to the mixed area that is the uncovered background area.

The fourth to twelfth pixels from the leftmost in the frame #n−1 in FIG. 42 belong to the foreground. The foreground components of the frame are one of F13/v to F24/v.

The first, second, third and fourth pixels from the leftmost in the frame #n in FIG. 42 belong to the background area and the pixel values thereof are B25 to B28, respectively.

Since it can be supposed that the object corresponding to the foreground is a rigid body and is moving at an uniform speed and the foreground image is moving to be displayed displaced to the right by 4 pixels in a next frame, the foreground component of the fifth pixel from the leftmost of the frame #n in FIG. 42 corresponding to the first shutter time/v after the shutter is opened is F13/v, and the foreground component of the sixth pixel from the leftmost in FIG. 42 corresponding to the second shutter time/v after the shutter is opened is also F13/v. The foreground component of the seventh pixel from the leftmost in FIG. 42 corresponding to the third shutter time/v after the shutter is opened and the foreground component of the eighth pixel from the leftmost in FIG. 42 corresponding to the fourth shutter time/v after the shutter is opened are F13/v.

The foreground component of the sixth pixel from the leftmost of the frame #n in FIG. 42 corresponding to the first shutter time/v after the shutter is opened is F14/v, and the foreground component of the seventh pixel from the leftmost in FIG. 42 corresponding to the second shutter time/v after the shutter is opened is also F14/v. The foreground component of the eighth pixel from the leftmost in FIG. 42 corresponding to the first shutter time/v after the shutter is opened is F15/v.

Since the object corresponding to the background is stationary, the background components of the fifth pixel from the leftmost of the frame #n in FIG. 42 corresponding to the second to the fourth shutter time/v after the shutter is opened are B29/v. The background components of the sixth pixel from the leftmost of the frame #n in FIG. 42 corresponding to the third and the fourth shutter time/v after the shutter is opened are B30/v. The background components of the seventh pixel from the leftmost of the frame #n in FIG. 42 corresponding to the fourth shutter time/v after the shutter is opened are B31/v.

In the frame #n of FIG. 42, the fifth to seventh pixels from the leftmost belong to the mixed area that is the uncovered background area.

The eighth to twelfth pixels from the leftmost of the frame #n in FIG. 42 belong to the foreground area. In the foreground area of the frame #n, the values corresponding to the shutter time/v are one of F13/v to F20/v.

The leftmost to eighth pixels from the leftmost of a frame #n+1 in FIG. 42 belong to the background area, and the pixel values thereof are B25 to B32, respectively.

Since it can be supposed that the object corresponding to the foreground is a rigid body and is moving at an uniform speed and the foreground image is moving to be displayed displaced to the right by 4 pixels in a next frame, the foreground component of the ninth pixel from the leftmost of the frame #n+1 in FIG. 42 corresponding to the first shutter time/v after the shutter is opened is F13/v, and the foreground component of the tenth pixel from the leftmost in FIG. 42 corresponding to a second shutter time/v after the shutter is opened is also F13/v. The foreground component of the eleventh pixel from the leftmost in FIG. 42 corresponding to the third shutter time/v after the shutter is opened and the foreground component of the twelfth pixel from the leftmost in FIG. 42 corresponding to the fourth shutter time/v after the shutter is opened are F13/v.

The foreground component of the tenth pixel from the leftmost of the frame #n+1 in FIG. 42 corresponding to the first shutter time/v after the shutter is opened is F14/v, and the foreground component of the eleventh pixel from the leftmost in FIG. 42 corresponding to the second shutter time/v after the shutter is opened is also F14/v. The foreground component of the twelfth pixel from the leftmost in FIG. 42, corresponding to the first shutter time/v after the shutter is opened is F15/v.

Since the object corresponding to the background is stationary, the background components of the ninth pixel from the leftmost of the frame #n+1 in FIG. 42 corresponding to the second to the fourth shutter time/v after the shutter is opened are B33/v. The background components of the tenth pixel from the leftmost of the frame #n+1 in FIG. 42 corresponding to the third and the fourth shutter time/v after the shutter is opened are B34/v. The background component of the eleventh pixel from the leftmost of the frame #n+1 in FIG. 42 corresponding to the fourth shutter time/v after the shutter is opened is B35/v.

In the frame #n+1 of FIG. 42, the ninth to eleventh pixels from the leftmost belong to the mixed area that is the uncovered background area.

The twelfth pixel from the leftmost of the frame #n+1 in FIG. 42 belongs to the foreground. In the foreground area of the frame #n+1, the foreground components corresponding to the shutter time/v are one of F13/v to F16/v.

Figure 43:
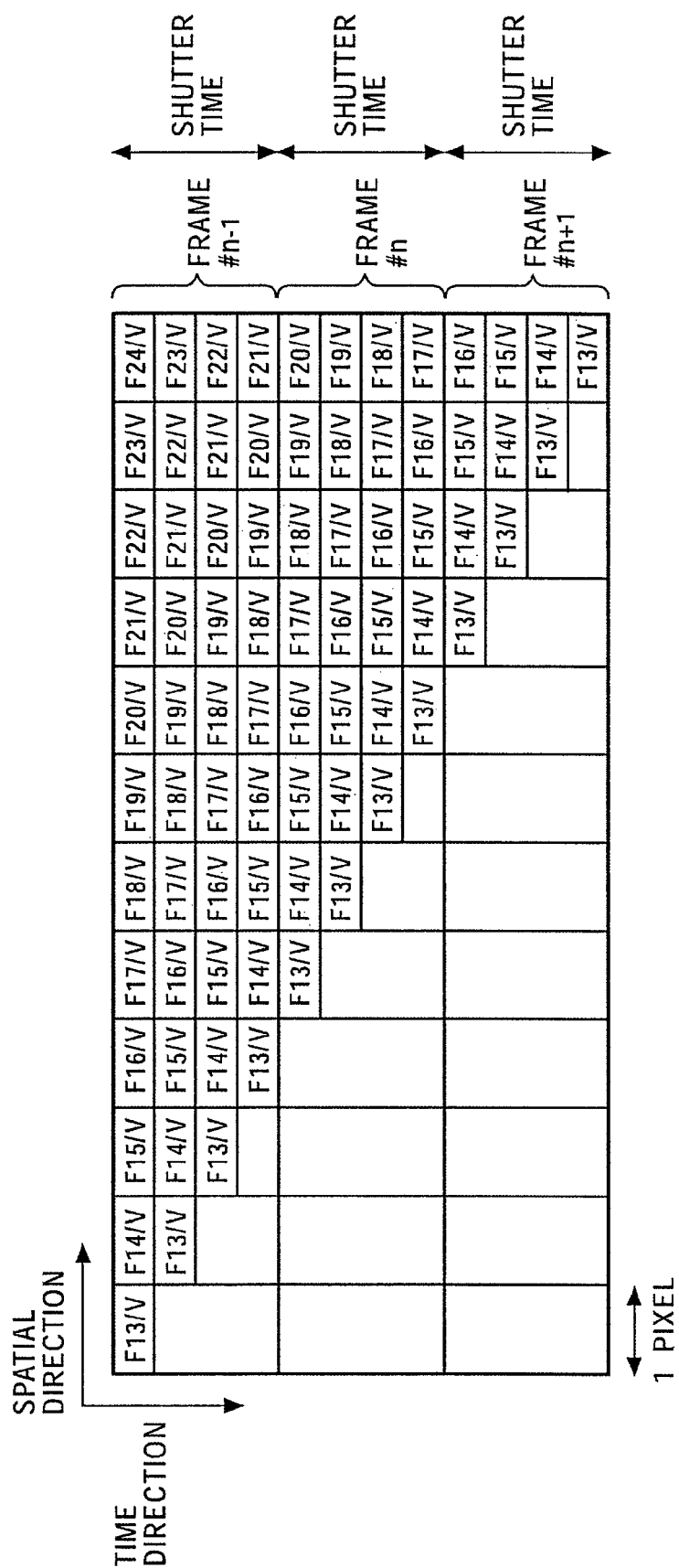
FIG. 43 is a modeling diagram in which pixel values are expanded in the time direction and shutter time which is divided into a time interval.

FIG. 43 is a model diagram of an image obtained by extracting the foreground components from the pixel values shown in FIG. 42.

Returning to FIG. 27, the area specifying unit 103 generates flags indicating which of the foreground area, the background area, the covered background area or the uncovered background area correspond to the respective pixels, using a plurality of pixel values, and then, supplies them to the mixture ratio calculator 104 and the motion blur adjusting unit 106 as the area information.

The mixture ratio calculator 104 calculates the mixture ratios α for each pixel included in the mixed area on the basis of the pixel values from a plurality of frames and the area information, and supplies the calculated mixture ratio α to the foreground/background separator 105.

The foreground/background separator 105 extracts the foreground component image having only the foreground components on the basis of the pixel values from a plurality of frames, the area information and the mixture ratio α and supplies it to the motion blur adjusting unit 106.

The motion blur adjusting unit 106 adjusts the amount of motion blur included in the foreground component image on the basis of the foreground component image supplied from the foreground/background separator 105, the motion vector supplied from the motion detector 102 and the area information supplied from the area specifying unit 103 and then outputs the foreground component image in which the motion blur is adjusted.

Figure 44:
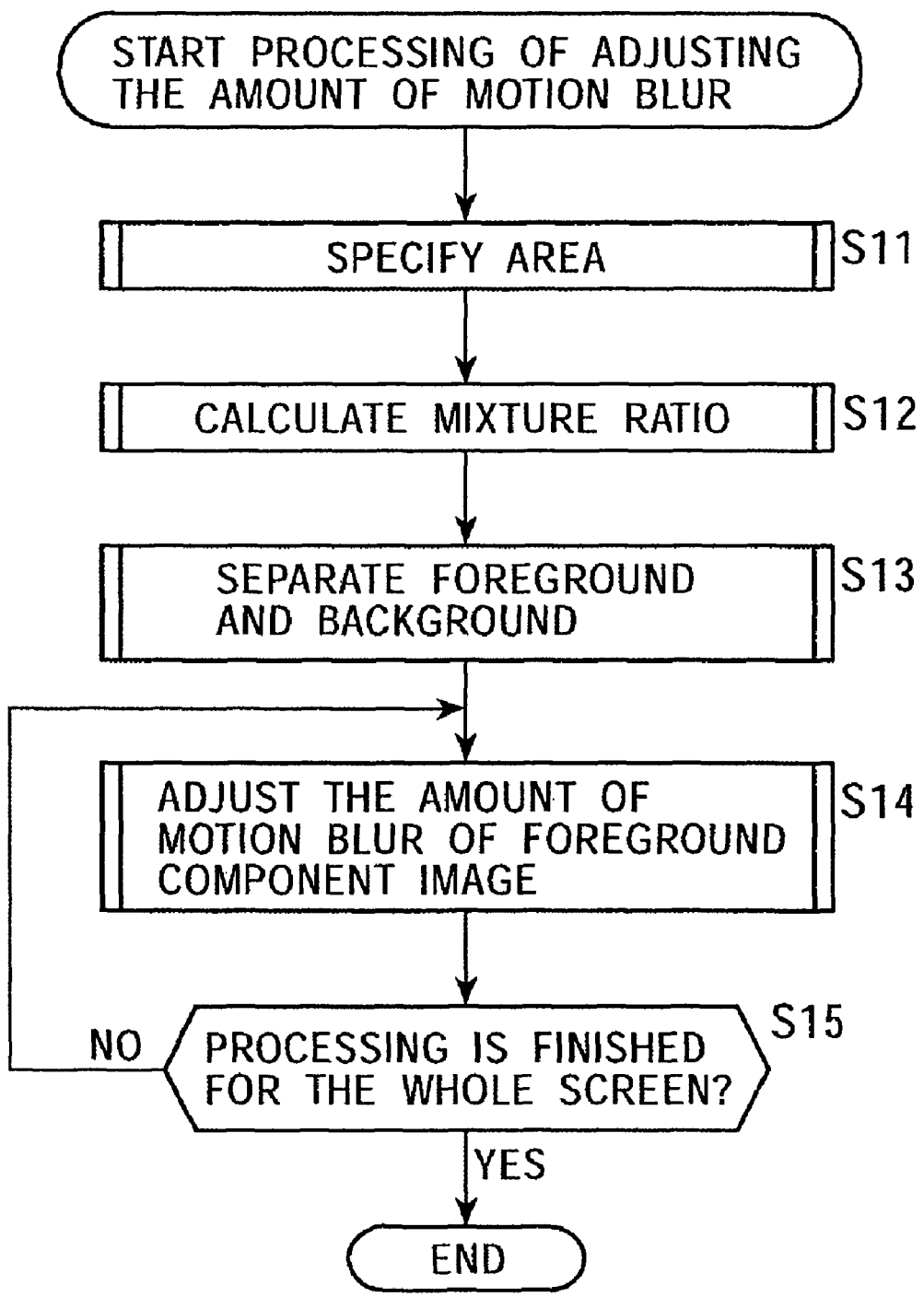
FIG. 44 is a flowchart illustrating a process of adjusting the amount of motion blur.

Referring to the flowchart of FIG. 44, the processing of adjusting the amount of motion blur by means of the separation server 11 will be explained. In the step S11, the area specifying unit 103 performs the area specifying processing for generating the area information indicating to which of the foreground area, the background area, the covered background area and the uncovered background area that each pixel of the input image belongs on the basis of the input image. Details of the area specifying processing will be explained later. The area specifying unit 103 supplies the generated area information to the mixture ratio calculator 104.

Further, in step S11, the area specifying unit 103 may generate the area information indicating to which of the foreground area, the background area and the mixed area (the covered background area and the uncovered background area are not distinguished) that each pixel of the input image belongs on the basis of the input image. In this case, the foreground/background separator 105 and the motion blur adjusting unit 106 determine whether the mixed area is the covered background area or the uncovered background area on the basis of the direction of the motion vector. For example, when the order of the foreground area, the background area and the mixed area are sequentially arranged for the direction of the motion vector, it is determined that the mixed area is the covered background area. when the order of the background area, the mixed area and the foreground area are sequentially arranged in the direction of the motion vector, it is determined that the mixed area is the uncovered background area.

In step S12, the mixture ratio calculator 104 calculates the mixture ratio α for each pixel included in the mixed area on the basis of the input image and the area information. Details of the mixture ratio calculating processing will be given later. The mixture ratio calculator 104 supplies the calculated mixture ratio α to the foreground/background separator 105.

In step S13, the foreground/background separator 105 extracts the foreground components from the input image on the basis of the area information and the mixture ratio α to supply them to the motion blur adjusting unit 106 as the foreground component image.

In step S14, the motion blur adjusting unit 106 generates units of processing which specify the positions of the image in pixels which are continuously arranged in the moving direction and which correspond to any of the uncovered background area, the foreground area and the covered background area on the basis of the motion vector and the area information, and adjusts the amount of motion blur included in the foreground components corresponding to the units of processing. The processing details of adjusting the amount of motion blur will be explained later.

In step S15, the separation server 11 determines whether the processing is finished for the whole screen or not, and if it is determined that the processing is not finished for the whole screen, the procedure returns to step S14, and the process of adjusting the amount of motion blur for the foreground components corresponding to the unit of processing is repeated.

In step S15, if it is determined that the processing is finished for the whole screen, the process ends.

Like this, separation server 11 can separate the foreground and the background to adjust the amount of motion blur included the foreground. That is, the separation server 11 can adjust the amount of motion blur included in the sample data that are the pixel values of pixels of the foreground.

Now, the respective configurations of the area specifying unit 103, the mixture ratio calculator 104, the foreground/background separator 105 and the motion blur adjusting unit 106 will be explained.

Figure 45:
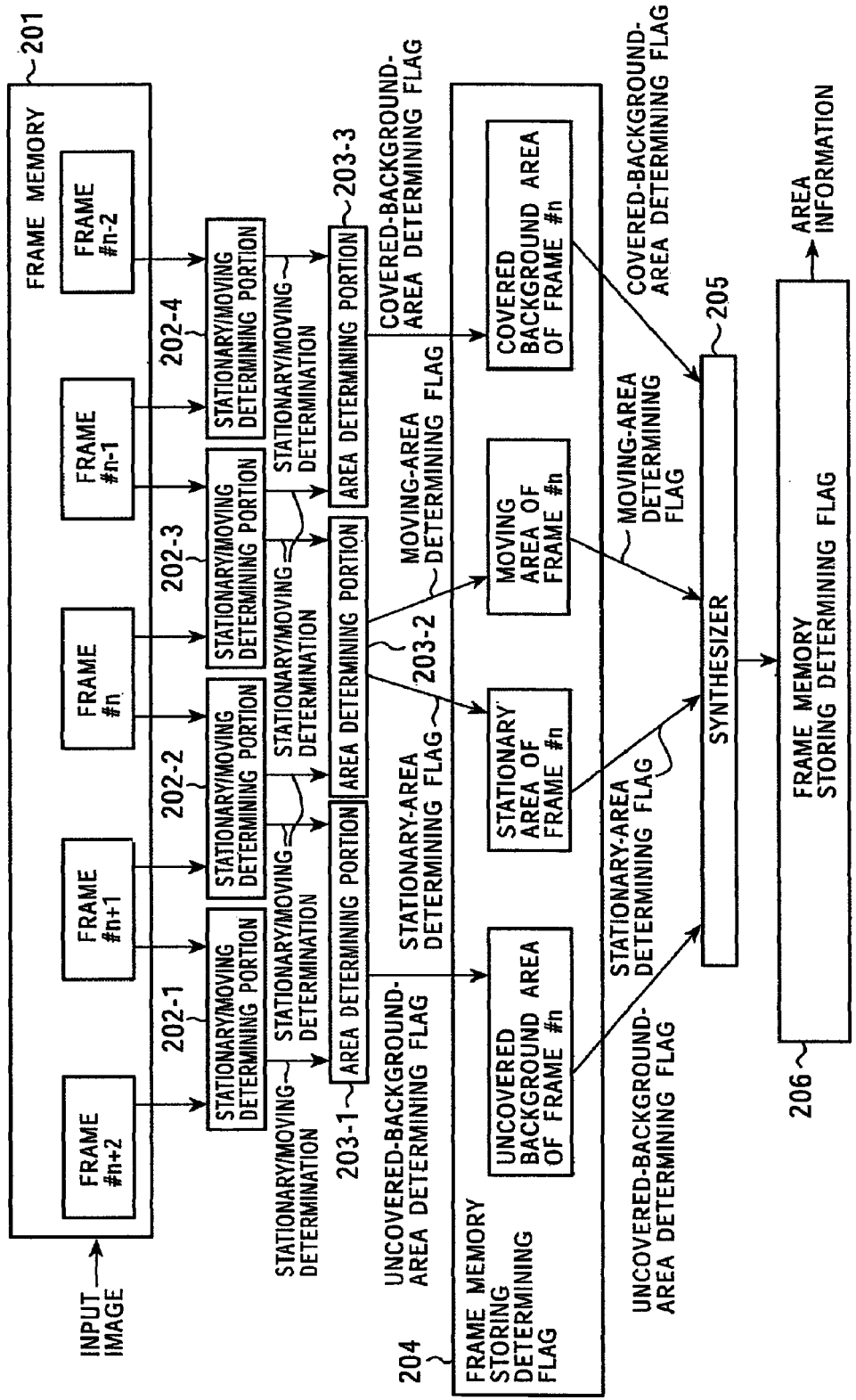
FIG. 45 is a block diagram illustrating a configuration example of an area specifying unit 103.

FIG. 45 is a block diagram showing an example of configuration of the area specifying unit 103. The area specifying unit 103 of which configuration is shown in FIG. 45 does not use the motion vector. A frame memory 201 stores the input image in a frame unit. When the target of processing is a frame #n, the frame memory 201 stores a frame #n−2 two frames ahead of the frame #n, a frame #n−1 one frame ahead of the frame #n, a frame #n+1 one frame behind the frame #n and the frame #n+2 two frames behind the frame #n.

A stationary/moving determining portion 202-1 reads out from the frame memory 201 the pixel value of the pixel in the frame #n+2 located at the same position as the position of the image in the pixel that is a target of the area specification in the frame #n and the pixel value of the pixel in the frame #n+1 located at the same position as the position of the image in the pixel that is also a target of the area specification in the frame #n, to calculate the absolute value of the difference between the read-out pixel values. The stationary/moving determining portion 202-1 determines whether the absolute value of the difference between the pixel value in the frame #n+2 and the pixel value in the frame #n+1 is greater than the pre-set threshold value Th or not and supplies the stationary/moving determination indicating motion status to the area determining portion 203-1 if it is determined that the absolute value of the difference is greater than the threshold value Th. If it is determined that the absolute value of the difference between the pixel value in the frame #n+2 and the pixel value in the frame #n+1 is not greater than the threshold value Th, the stationary/moving determining portion 202-1 supplies the stationary/moving determination indicating stationary status to the area determining portion 203-1.

A stationary/moving determining portion 202-2 reads out from the frame memory 201 the pixel value of pixel in the frame #n+1 located at the same position as the position of the image in the pixel that is a target of the area specification in the frame #n and the pixel value of pixel that is a target of the area specification in the frame #n, to calculate the absolute value of the difference between the pixel values. The stationary/moving determining portion 202-2 determines whether the absolute value of the difference between the pixel value in the frame #n+1 and the pixel value in the frame #n is greater than the pre-set threshold value Th or not and supplies the stationary/moving determination indicating motion status to the area determining portion 203-1 and the area determining portion 203-2 if it is determined that the absolute value of the difference between the pixel values is greater than the threshold value Th. If it is determined that the absolute value of the difference between the pixel value of the pixel in the frame #n+1 and the pixel value of pixel in the frame #n is not greater than the threshold value Th, the stationary/moving determining portion 202-1 supplies the stationary/moving determination indicating stationary status to the area determining portion 203-1 and the area determining portion 203-2.

The stationary/moving determining portion 202-3 reads out from the frame memory 201 the pixel value of pixel that is a target of the area specification in the frame #n and the pixel value of pixel in the frame #n−1 located at the same position as the position in the image of the pixel that is a target of the area specification in the frame to calculate the absolute value of the difference between the pixel values. The stationary/moving determining portion 202-3 determines whether the absolute value of the difference between the pixel value in the frame #n and the pixel value in the frame #n−1 is greater than the pre-set threshold value Th or not and supplies the stationary/moving determination indicating motion status to the area determining portion 203-2 and the area determining portion 203-3 if it is determined that the absolute value of the difference between the pixel values is greater than the threshold value Th. If it is determined that the absolute value of the difference between the pixel value of pixel in the frame #n and the pixel value of pixel in the frame #n−1 is not greater than the threshold value Th, the stationary/moving determining portion 202-3 supplies the stationary/moving determination indicating stationary status to the area determining portion 203-2 and the area determining portion 203-3.

The stationary/moving determining portion 202-4 reads out from the frame memory 201 the pixel value of pixel in the frame #n−1 located at the same position as the position in the image of the pixel that is a target of the area specification in the frame #n and the pixel value of pixel in the frame #n−2 located at the same position as the position in the image of the pixel that is a target of the area specification in the frame #n, to calculate the absolute value of the difference between the read-out pixel values. The stationary/moving determining portion 202-4 determines whether the absolute value of the difference between the pixel value in the frame #n−1 and the pixel value in the frame #n−1 is greater than the pre-set threshold value Th or not and supplies the stationary/moving determination indicating motion status to the area determining portion 203-3 if it is determined that the absolute value of the difference is greater than the threshold value Th. If it is determined that the absolute value of the difference between the pixel value of pixel in the frame #n−1 and the pixel value of pixel in the frame #n−2 is not greater than the threshold value Th, the stationary/moving determining portion 202-4 supplies the stationary/moving determination indicating stationary status to the area determining portion 203-3.

When the stationary/moving determination supplied from the stationary/moving determining portion 202-1 indicates stationary status and the stationary/moving determination supplied from the stationary/moving determining portion 202-2 indicates motion status, the area determining portion 203-1 determines that the pixel being a target of the area specification in the frame #n belongs to the uncovered background area and sets "1" indicating that the pixel belongs to the uncovered background area to the uncovered background area determining flag corresponding to the pixel of which area is determined.

When the stationary/moving determination supplied from the stationary/moving determining portion 202-1 indicates motion status or the stationary/moving determination supplied from the stationary/moving determining portion 202-2 indicates stationary status, the area determining portion 203-1 determines that the pixel being a target of the area specification in the frame #n does not belong to the uncovered background area and sets "0" indicating that the pixel does not belong to the uncovered background area to the uncovered background area determining flag corresponding to the pixel of which area is determined.

The area determining portion 203-1 supplies the uncovered background area determining flag to which "1" or "0" is set as described by the above to the frame memory storing determining flag 204.

When the stationary/moving determination supplied from the stationary/moving determining portion 202-2 indicates stationary status and the stationary/moving determination supplied from the stationary/moving determining portion 202-3 indicates stationary status, the area determining portion 203-2 determines that the pixel being a target of the area specification in the frame #n belongs to the stationary area and sets "1" indicating that the pixel belongs to the stationary area to the stationary area determining flag corresponding to the pixel of which area is determined.

When the stationary/moving determination supplied from the stationary/moving determining portion 202-2 indicates motion status or the stationary/moving determination supplied from the stationary/moving determining portion 202-3 indicates motion status, the area determining portion 203-2 determines that the pixel being a target of the area specification in the frame #n does not belong to the stationary area and sets "0" indicating that the pixel does not belong to the stationary area to the stationary area determining flag corresponding to the pixel of which area is determined.

The area determining portion 203-2 supplies the stationary area determining flag to which "1" or "0" is set as described by the above to the frame memory storing determining flag 204.

When the stationary/moving determination supplied from the stationary/moving determining portion 202-2 indicates motion status and the stationary/moving determination supplied from the stationary/moving determining portion 202-3 indicates motion status, the area determining portion 203-2 determines that the pixel being a target of the area specification in the frame #n belongs to the moving area and sets "1" indicating that the pixel belongs to the moving area to the moving area determining flag corresponding to the pixel of which area is determined.

When the stationary/moving determination supplied from the stationary/moving determining portion 202-2 indicates stationary status or the stationary/moving determination supplied from the stationary/moving determining portion 202-3 indicates stationary status, the area determining portion 203-2 determines that the pixel being a target of the area specification in the frame #n does not belong to the moving area and sets "0" indicating that the pixel does not belong to the moving area to the moving area determining flag corresponding to the pixel of which area is determined.

The area determining portion 203-2 supplies the moving area determining flag to which "1" or "0" is set as described by the above to the frame memory storing determining flag 204.

When the stationary/moving determination supplied from the stationary/moving determining portion 202-3 indicates motion status and the stationary/moving determination supplied from the stationary/moving determining portion 202-4 indicates stationary status, the area determining portion 203-3 determines that the pixel being a target of the area specification in the frame #n belongs to the covered background area and sets "1" indicating that the pixel belongs to the covered background area to the covered background area determining flag corresponding to the pixel of which area is determined.

When the stationary/moving determination supplied from the stationary/moving determining portion 202-3 indicates stationary status or the stationary/moving determination supplied from the stationary/moving determining portion 202-4 indicates motion status, the area determining portion 203-2 determines that the pixel being a target of the area specification in the frame #n does not belong to the covered background area and sets "0" indicating that the pixel does not belong to the covered background area to the covered background area determining flag corresponding to the pixel of which area is determined.

The area determining portion 203-3 supplies the covered background area determining flag to which "1" or "0" is set as described by the above to the frame memory storing determining flag 204.

The frame memory storing determining flag 204 stores the uncovered background area determining flag supplied from the area determining portion 203-1, the stationary area determining flag supplied from the are determining portion 203-2, the moving area determining flag supplied from the area determining portion 203-2 and the covered background area determining flag supplied from the area determining portion 203-3, respectively.

The frame memory storing determining flag 204 supplies the uncovered background area determining flag, the stationary area determining flag, the moving area determining flag and the covered background area determining flag stored therein to a synthesizer 205. The synthesizer 205 generates the area information indicating that each pixel belongs to any of the uncovered background area, the stationary area, the moving area and the covered background area on the basis of the uncovered background area determining flag, the stationary area determining flag, the moving area determining flag and the covered background area determining flag supplied from the frame memory storing determining flag 204 and then supplies it to the frame memory storing determining flag 206.

The frame memory storing determining flag 206 stores the area information supplied from the synthesizer 205 and outputs the stored area information.

Next, referring to FIGS. 46 to 50, an example of processing by the area specifying unit 103 will be explained.

Figure 46:
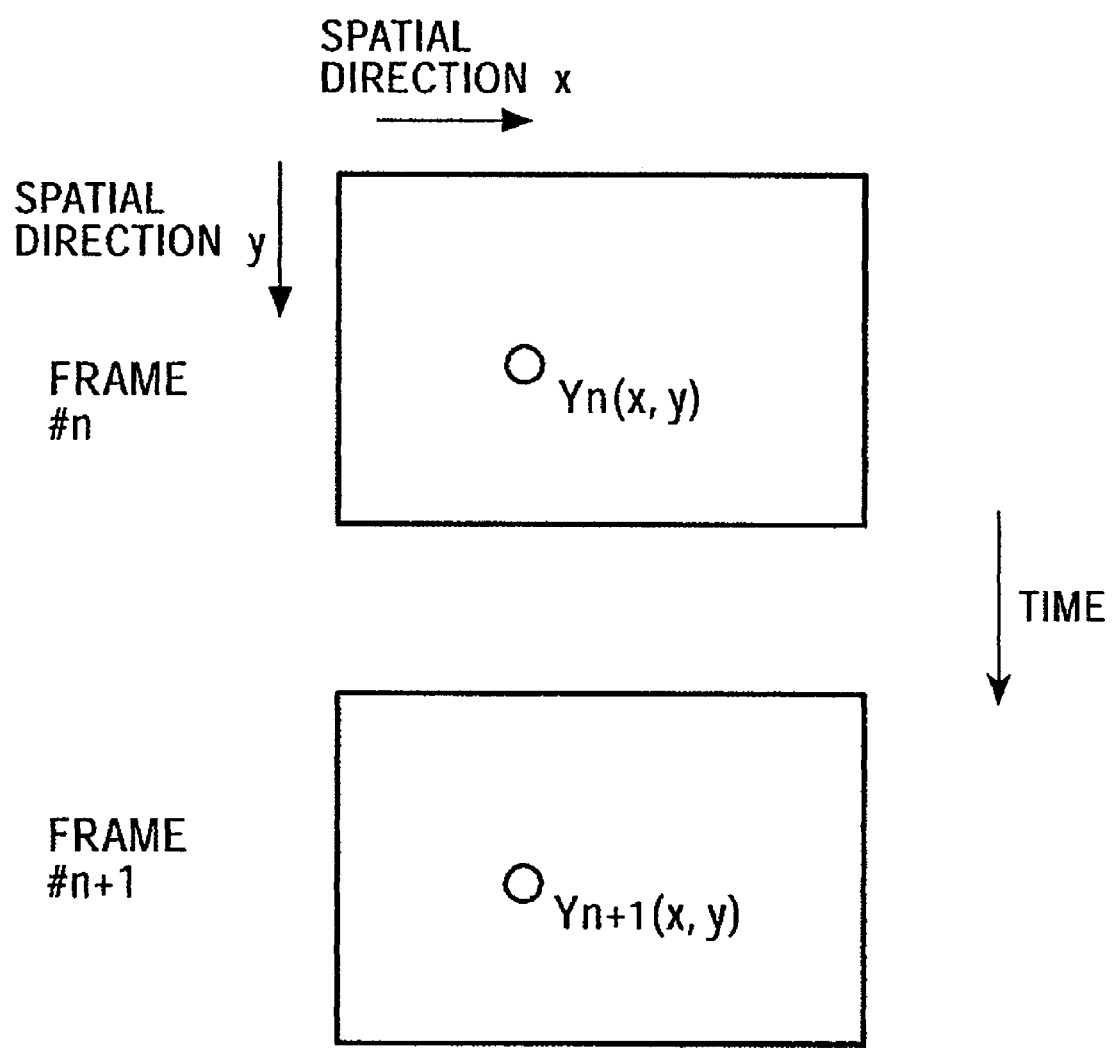
FIG. 46 is a diagram illustrating an image when an object corresponding to foreground is being moved.

When the object corresponding to the foreground is moving, the position on the screen of the image corresponding to the object varies every frame. As shown in FIG. 46, the image corresponding to the object located at a position indicated by Yn(x, y) in the frame #n is located at Yn+1(x, y) in the frame #n+1.

FIG. 22 is a model diagram in which the pixel values of pixels being adjacent in a row in the moving direction of the image corresponding to the foreground object are expanded in the time direction. For example, when the moving direction of the image corresponding to the foreground object is horizontal on the screen, the model diagram in FIG. 47 shows a model in which the pixel values of pixels being adjacent in one line are developed in the time direction.

Figure 47:
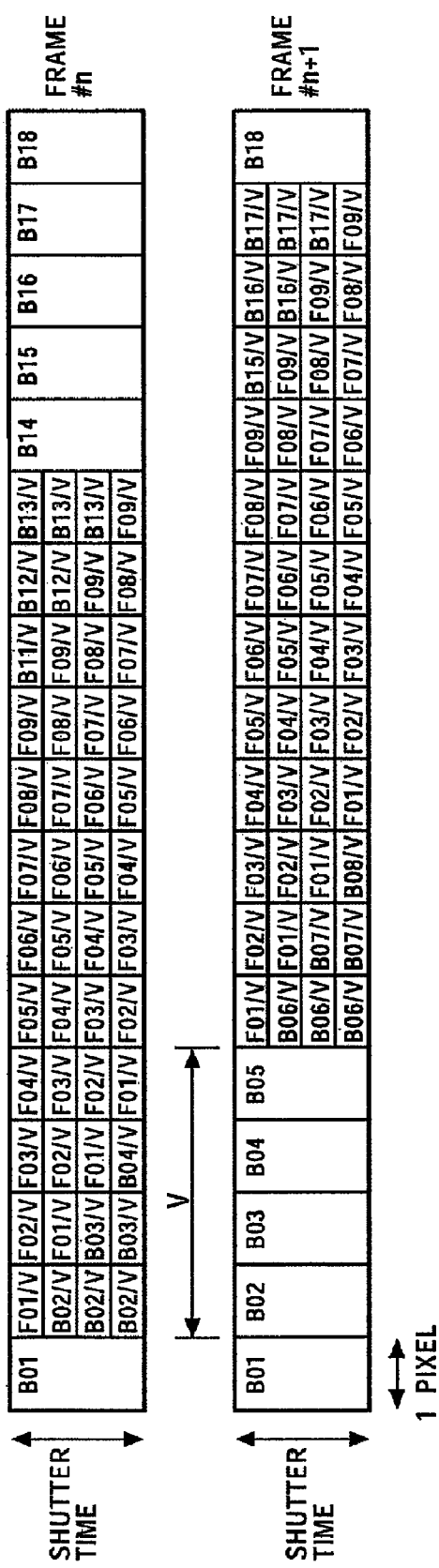
FIG. 47 is a modeling diagram in which pixel values are expanded in the time direction and shutter time which is divided into a time interval.

In FIG. 47, the lines in the frame #n are the same as those in the frame #n+1.

The foreground components corresponding to the object included in the second to the thirteenth pixels from the leftmost in the frame #n are included in the sixth to the seventeenth pixels from the leftmost in the frame #n+1.

In the frame #n, pixels belonging to the covered background area are the eleventh to thirteenth pixels from the leftmost and pixels belonging to the uncovered background area are the second to fourth pixels from the leftmost. In the frame #n+1, pixels belonging to the covered background area are the fifteenth to seventeenth pixels from the leftmost and pixels belonging to the uncovered background area are the sixth to eighth pixels from the leftmost.

In the example shown in FIG. 47, since the foreground components included in the frame #n is moved by 4 pixels in the frame #n+1, the amount of movement v is defined as 4. The virtual division number is set at 4 corresponding to the amount of movement v.

Next, variation of the pixel values of pixels belonging to the mixed area in front or back of the indicated frame will be explained.

Figure 48:
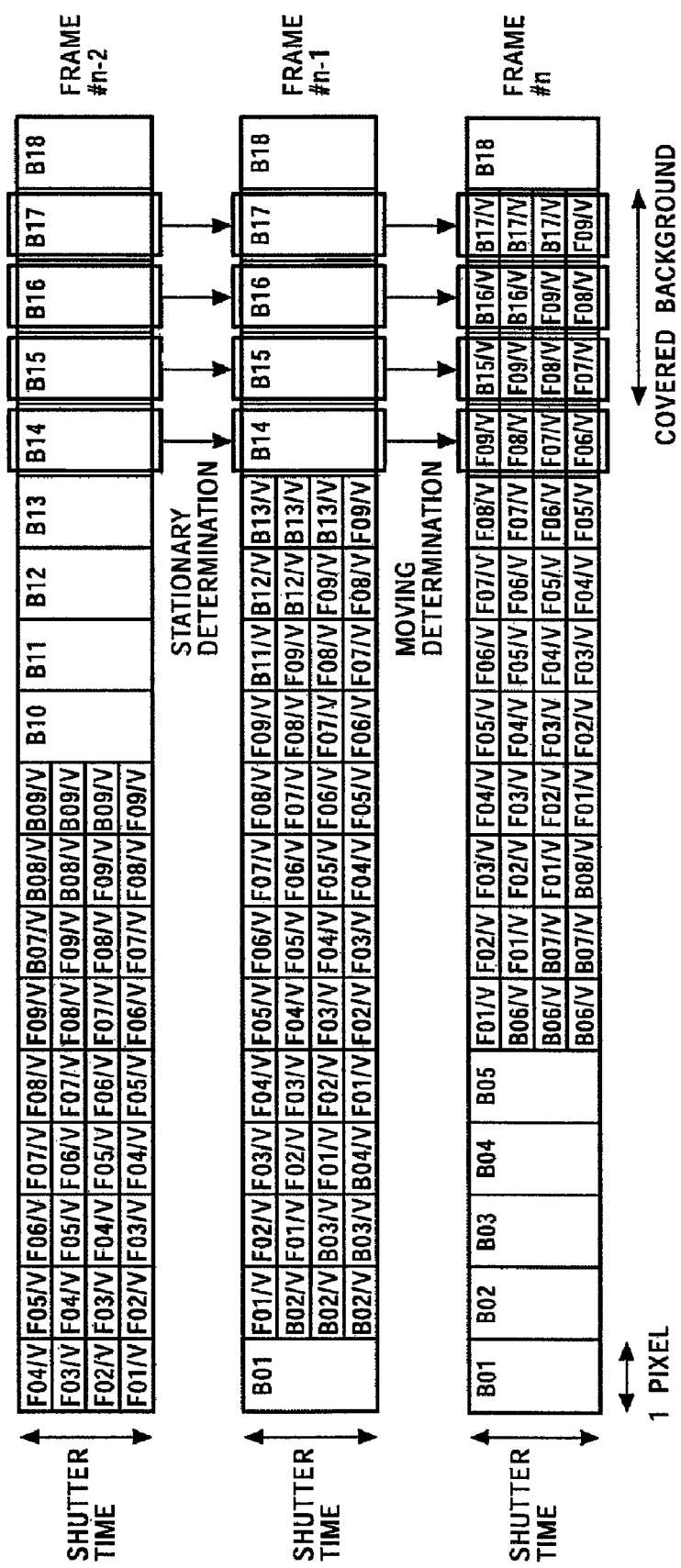
FIG. 48 is a modeling diagram in which pixel values are expanded in the time direction and shutter time which is divided into a time interval.

In the frame #n that is shown in FIG. 48 and in which the background is stationary and the amount of movement v of the foreground is 4, pixels belonging to the covered background area are the fifteenth to seventeenth pixels from the leftmost. Since the amount of movement v is 4, the fifteenth to seventeenth pixels in the frame #n−1 one frame ahead include only the background components and belong to the background area. Further, the fifteenth to seventeenth pixels in the frame #n−2 further one frame ahead include only the background components and belong to the background area.

Here, since the object corresponding to the background is stationary, the pixel value of the fifteenth pixel from the leftmost in the frame #n−1 is not changed from the pixel value of the fifteenth pixel from the leftmost in the frame #n−2. Similarly, the pixel value of the sixteenth pixel from the leftmost in the frame #n−1 is not changed from the pixel value of the sixteenth pixel from the leftmost in the frame #n−2 and the pixel value of the seventeenth pixel from the leftmost in the frame #n−1 is not changed from the pixel value of the seventeenth pixel from the leftmost in the frame #n−2.

That is, since pixels in the frame #n−1 and the frame #n−2 corresponding to the pixels belonging to the covered background area in the frame #n comprised only the background components and the pixel values thereof are not changed, the absolute value of the difference thereof is almost 0. Therefore, the stationary/moving determination on the pixels in the frame #n−1 and the frame #n−2 corresponding to pixels belonging to the mixed area in the frame #n is determined to be stationary by the stationary/moving determining portion 202-4.

Since pixels belonging to the covered background area in the frame #n include the foreground components, the pixel values thereof are different from those in the case of including only the background components in the frame #n−1. Therefore, the stationary/moving determination on the pixels belonging to the mixed area in the frame #n and pixels in the corresponding frame #n−1 is determined to be moving by the stationary/moving determining portion 202-3.

Like the above, when the stationary/moving determination result indicating motion status is supplied from the stationary/moving determining portion 202-3 and the stationary/moving determination result indicating stationary status is supplied from the stationary/moving determining portion 202-4, the area determining portion 203-3 determines that the corresponding pixel belongs to the covered background area.

Figure 49:
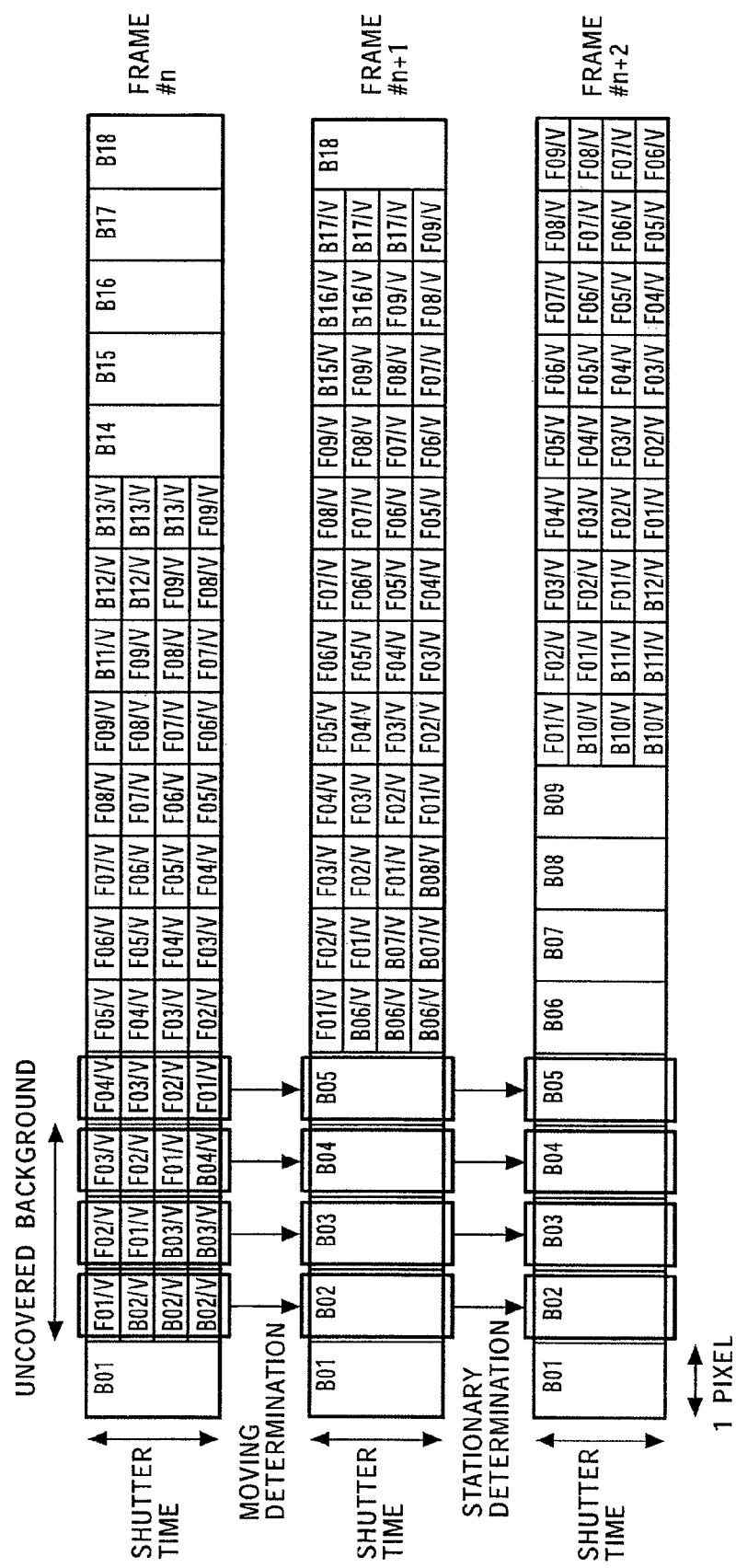
FIG. 49 is a modeling diagram in which pixel values are expanded in the time direction and shutter time which is divided into a time interval.

In the frame #n that is shown in FIG. 49 and in which the background is stationary and the amount of movement v of the foreground is 4, the pixels belonging to the uncovered background area are the second to fourth pixels from the leftmost. Since the amount of movement v is 4, the second to fourth pixels in the frame #n+1 one frame behind include only the background components and belong to the background area. Further, the second to fourth pixels in the frame #n+2 further one frame behind include only the background components and belong to the background area.

Here, since the object corresponding to the background is stationary, the pixel value of the second pixel from the leftmost in the frame #n+2 is not changed from the pixel value of the second pixel from the leftmost in the frame #n+1. Similarly, the pixel value of the third pixel from the leftmost in the frame #n+2 is not changed from the pixel value of the third pixel from the leftmost in the frame #n+1 and the pixel value of the fourth pixel from the leftmost in the frame #n+2 is not changed from the pixel value of the fourth pixel from the leftmost in the frame #n+1.

That is, since pixels in the frame #n+1 and the frame #n+2 corresponding to the pixels belonging to the uncovered background area in the frame #n comprised only the background components and the pixel values thereof are not changed, the absolute value of the difference thereof is almost 0. Therefore, the stationary/moving determination on the pixels in the frame #n+1 and the frame #n+2 corresponding to pixels belonging to the mixed area in the frame #n is determined to be stationary by the stationary/moving determining portion 202-1.

Since pixels belonging to the uncovered background area in the frame #n include the foreground components, the pixel values thereof are different from those in the case of including only the background components in the frame #n+1. Therefore, the stationary/moving determination on the pixels belonging to the mixed area in the frame #n and pixels in the corresponding frame #n+1 is determined to be moving by the stationary/moving determining portion 202-2.

Like the above, when the stationary/moving determination result indicating motion status is supplied from the stationary/moving determining portion 202-2 and the stationary/moving determination result indicating stationary status is supplied from the stationary/moving determining portion 202-1, the area determining portion 203-1 determines that the corresponding pixel belongs to the uncovered background area.

FIG. 50 shows determination conditions of the area specifying unit 103 in the frame #n. When it is determined that a pixel in the frame #n−2 located at the same position as the position in the image of a pixel that is a target of determination in the frame #n and a pixel in the frame #n−1 located at the same position as the position in the image of the pixel that is a target of determination in the frame #n, are stationary and when it is determined that a pixel in the frame #n−1 located at the same position as the position in the image of the pixel that is a target of determination in the frame #n and the pixel in the frame #n are moving, the area specifying unit 103 determines that the pixel that is a target of determination in the frame #n belongs to the covered background area.

When it is determined that a pixel in the frame #n−1 located at the same position as the position in the image of the pixel that is a target of determination in the frame #n and the pixel in the frame #n, are stationary and when it is determined that the pixel in the frame #n and the pixel in the frame #n+1 located at the same position as the position in the image of the pixel that is a target of determination in the frame #n are stationary, the area specifying unit 103 determines that the pixel that is a target of determination in the frame #n belongs to the stationary area.

When it is determined that the pixel in the frame #n-1 located at the same position as the position in the image of the pixel that is a target of determination in the frame #n and the pixel in the frame #n, are moving and when it is determined that the pixel in the frame #n and the pixel in the frame #n+1 located at the same position as the position in the image of the pixel that is a target of determination in the frame #n are moving, the area specifying unit 103 determines that the pixel that is a target of determination in the frame #n belongs to the moving area.

When it is determined that the pixel in the frame #n and the pixel in the frame #n+1 located at the same position as the position in the image of the pixel that is a target of determination in the frame #n, are moving and when it is determined that the pixel in the frame #n+1 located at the same position as the position in the image of the pixel that is a target of determination in the frame #n and the pixel in the frame #n+2 located at the same position as the position in the image of the pixel that is a target of determination in the frame #n are stationary, the area specifying unit 103 determines that the pixel that is a target of determination in the frame #n belongs to the uncovered background area.

Figure 51C:
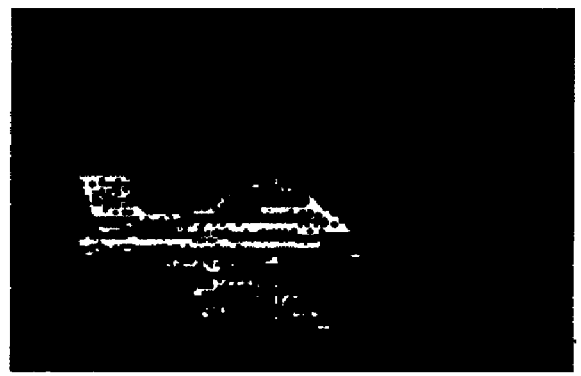
FIG. 51C is a diagram illustrating an example of an area specification result in the area specifying unit 103.

FIGS. 51A to 51D show examples of area specification result of the area specifying unit 103. In FIG. 51A, pixel determined to belong in the covered background area is displayed in white color. In FIG. 51B, a pixel determined to belong in the uncovered background area is displayed in white color.

Figure 51D:
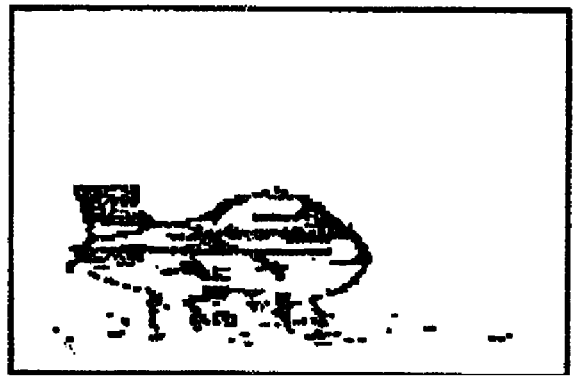
FIG. 51D is a diagram illustrating an example of an area specification result in the area specifying unit 103.

In FIG. 51C, a pixel determined to belong in the moving area is displayed in white color. In FIG. 51D, a pixel determined to belong in the stationary area is displayed in white color.

Figure 52:
FIG. 52 is a diagram illustrating an example of an area specification result in the area specifying unit 103.

FIG. 52 shows as an image of the area information indicating the mixed area from the area information output from the frame memory storing determinating flag 206. In FIG. 52, the pixel determined to belong in the covered background area or the uncovered background area, that is, the pixel determined to belong to the mixed area is displayed in white color. The area information indicating the mixed area output from the frame memory storing determinating flag 206 means a portion having texture surrounded by a portion not having texture in the mixed area and the foreground area.

Figure 53:
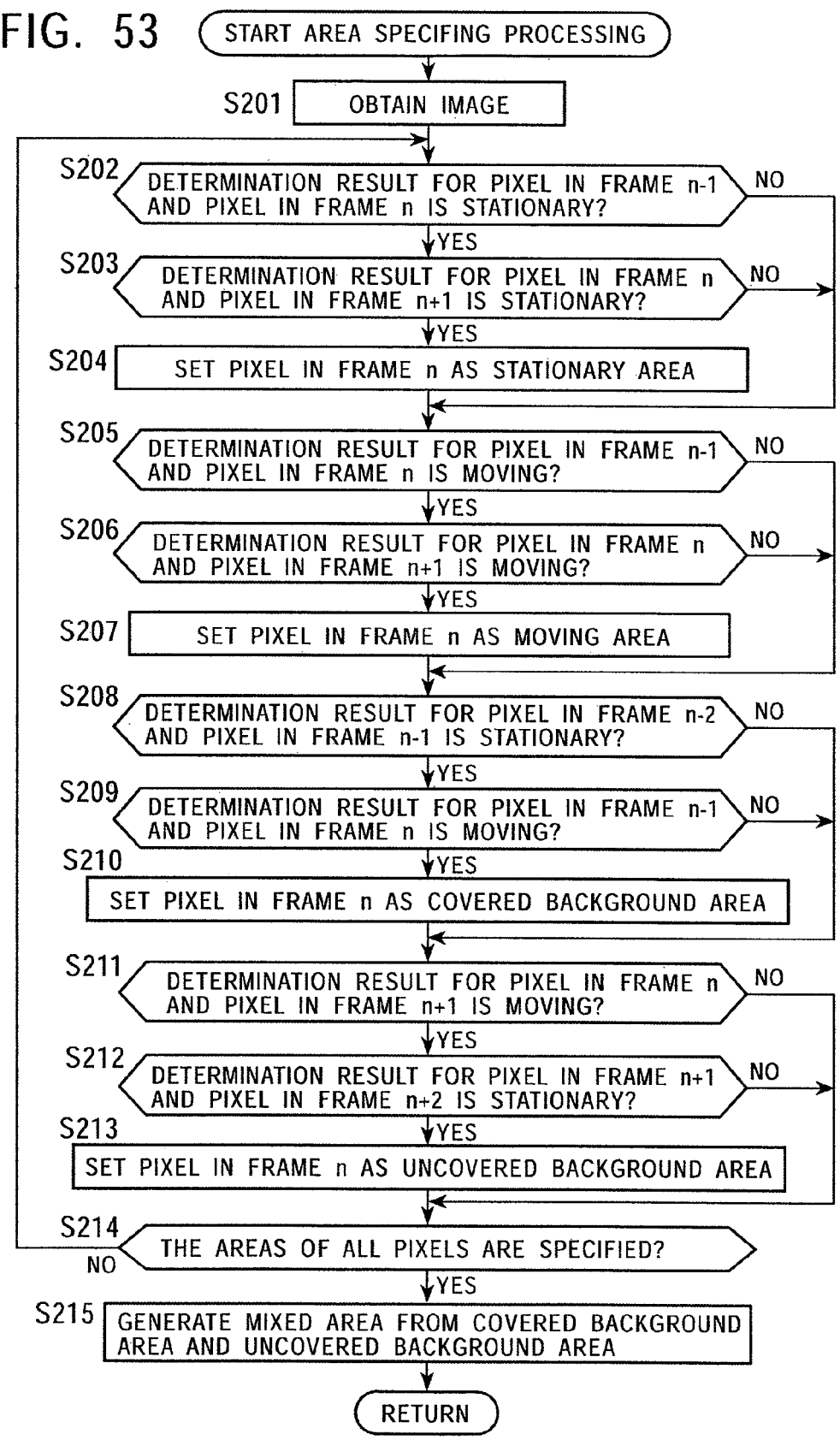
FIG. 53 is a flowchart illustrating an area specification processing.

Next, referring to the flowchart of FIG. 53, the area specifying processing of the area specifying unit 103 will be explained. In step S201, the frame memory 201 obtains images of the frame #n-2 to the frame #n+2 including the frame #n that is a target of determination.

In step S202, the stationary/moving determining portion 202-3 determines whether it is stationary or not for the pixel in the frame #n-1 and the pixel in the frame #n located at the same position and if it is determined to be stationary, the procedure proceeds to step S203. The stationary/moving determining portion 202-2 determines whether it is stationary or not for the pixel in the frame #n and the pixel in the frame #n+1 located at the same position.

In step S203, when it is determined to be stationary for the pixel in the frame #n and the pixel in the frame #n+1 located at the same position, the procedure proceeds to step S204 and the area determining portion 203-2 sets "1" indicating the pixel belongs to the stationary area to the stationary area determinating flag corresponding to the pixel of which area is determined. The area determining portion 203-2 supplies the stationary area determinating flag to the frame memory storing determinating flag 204 and the procedure proceeds to step S205.

When it is determined to be moving for the pixel in the frame #n-1 and the pixel in the frame #n position located at the same position in step S202 or when it is determined to be moving for the pixel in the frame #n and the pixel in the frame #n+1 position located at the same position in step S203, since the pixel in the frame #n does not belong to the stationary area, the processing in step S204 is skipped and the procedure proceeds to step S205.

In step S205, the stationary/moving determining portion 202-3 determines whether it is moving or not for the pixel in the frame #n-1 and the pixel in the frame #n located at the same position and if it is determined to be moving, the procedure proceeds to step S206. The stationary/moving determining portion 202-2 determines whether it is moving or not for the pixel in the frame #n and the pixel in the frame #n+1 located at the same position.

In step S206, when it is determined to be moving for the pixel in the frame #n and the pixel in the frame #n+1 located at the same position, the procedure proceeds to step S207 and the area determining portion 203-2 sets "1" indicating the pixel belongs to the moving area to the moving area determinating flag corresponding to the pixel of which area is determined. The area determining portion 203-2 supplies the moving area determinating flag to the frame memory storing determinating flag 204 and the procedure proceeds to step S208.

When it is determined to be stationary for the pixel in the frame #n-1 and the pixel in the frame #n position located at the same position in step S205 or when it is determined to be stationary for the pixel in the frame #n and the pixel in the frame #n+1 position located at the same position in step S206, since the pixel in the frame #n does not belong to the moving area, the processing in step S207 is skipped and the procedure proceeds to step S208.

In step S208, the stationary/moving determining portion 202-4 determines whether it is stationary or not for the pixel in the frame #n-2 and the pixel in the frame #n-1 located at the same position and if it is determined to be stationary, the procedure proceeds to step S209. The stationary/moving determining portion 202-3 determines whether it is moving or not for the pixel in the frame #n-1 and the pixel in the frame #n located at the same position.

In step S209, when it is determined to be moving for the pixel in the frame #n-1 and the pixel in the frame #n located at the same position, the procedure proceeds to step S210 and the area determining portion 203-3 sets "1" indicating the pixel belongs to the covered background area to the covered background area determinating flag corresponding to the pixel of which area is determined. The area determining portion 203-3 supplies the covered background area determinating flag to the frame memory storing determinating flag 204 and the procedure proceeds to step S211.

When it is determined to be moving for the pixel in the frame #n-2 and the pixel in the frame #n-1 position located at the same position in step S208 or when it is determined to be stationary for the pixel in the frame #n-1 and the pixel in the frame #n position located at the same position in step S209, since the pixel in the frame #n does not belong to the covered background area, the processing in step S210 is skipped and the procedure proceeds to step S211.

In step S211, the stationary/moving determining portion 202-2 determines whether it is moving or not for the pixel in the frame #n and the pixel in the frame #n+1 located at the same position and if it is determined to be moving, the procedure proceeds to step S212. The stationary/moving determining portion 202-1 determines whether it is stationary or not for the pixel in the frame #n+1 and the pixel in the frame #n+2 located at the same position.

In step S212, when it is determined to be stationary for the pixel in the frame #n+1 and the pixel in the frame #n+2 located at the same position, the procedure proceeds to step S213 and the area determining portion 203-1 sets "1" indicating the pixel belongs to the uncovered background area to the uncovered background area determinating flag corresponding to the pixel of which area is determined. The area determining portion 203-1 supplies the uncovered background area determinating flag to the frame memory storing determinating flag 204 and the procedure proceeds to step S214.

When it is determined to be stationary for the pixel in the frame #n and the pixel in the frame #n+1 position located at the same position in step S211 or when it is determined to be moving for the pixel in the frame #n+1 and the pixel in the frame #n+2 position located at the same position in step S212, since the pixel in the frame #n does not belong to the uncovered background area, the processing in step S213 is skipped and the procedure proceeds to step S214.

In step S214, the area specifying unit 103 determines whether area specification has been performed for all the pixels in the frame #n or not and if it is determined that the area specification has not been performed for all the pixels in the frame #n, the procedure returns to step S202 and the area specifying processing is repeated for other pixels.

In step S214, if it is determined that the area specification has been performed for all the pixels in the frame #n, the procedure proceeds to step S215 and the synthesizer 205 generates the area information indicating the mixed area on the basis of the uncovered background area determinating flag and the covered background area determinating flag stored in the frame memory storing determinating flag 204, generates the area information indicating that each pixel belongs to which of the uncovered background area, the stationary area, the moving area and the covered background area and sets the generated area information in the frame memory storing determinating flag 206. Then, the processing ends.

Like the above, the area specifying unit 103 can generate the area information indicating that the each pixel included in the frame belongs to the moving area, the stationary area, the uncovered background area or the covered background area.

Further, the area specifying unit 103 may generate the area information corresponding to the mixed area by applying logical sum to the area information corresponding to the uncovered background area and covered background area and may generate the area information comprised of flags indicating that the each pixel included in the frame belongs to the moving area, the stationary area or the mixed area.

When the object corresponding to the foreground has texture, the area specifying unit 103 can specify the moving area more accurately.

The area specifying unit 103 can output the area information indicating the moving area as the area information indicating the foreground area and the area information indicating the stationary area as the area information indicating the background area.

Further, although it has been explained that the object corresponding to the background is stationary, even when the image corresponding to the background area includes motion, the area specifying processing described above can be applied. For example, when an image corresponding to the background area is moving constantly, the area specifying unit 103 shifts the whole image corresponding to this movement and processes it similarly to the case that the object corresponding to the background is stationary. Further, when an image corresponding to the background area includes other movements locally, the area specifying unit 103 selects pixels corresponding to the movements and performs the aforementioned processing.

Figure 54:
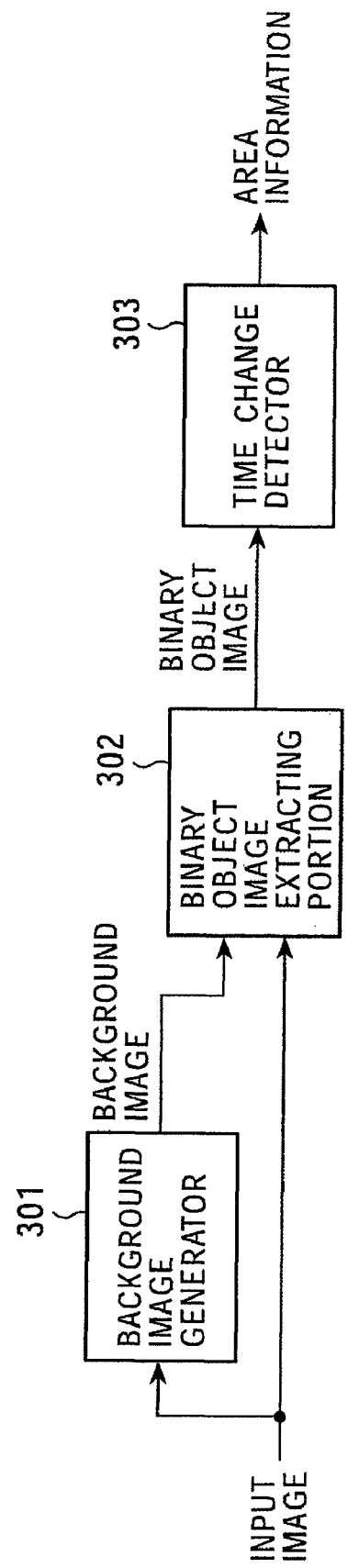
FIG. 54 is a block diagram of another example of a configuration of the area specifying unit 103.

FIG. 54 is a block diagram illustrating another example of configuration of the area specifying unit 103. The area specifying unit 103 shown in FIG. 54 does not use the motion vector. A background image generator 301 generates the background image corresponding to the input image and supplies the generated background image to a binary object image extracting portion 302. The background image generator 301 extracts, for example, an image object corresponding to the object of the background included in the input image to generate the background image.

Figure 55:
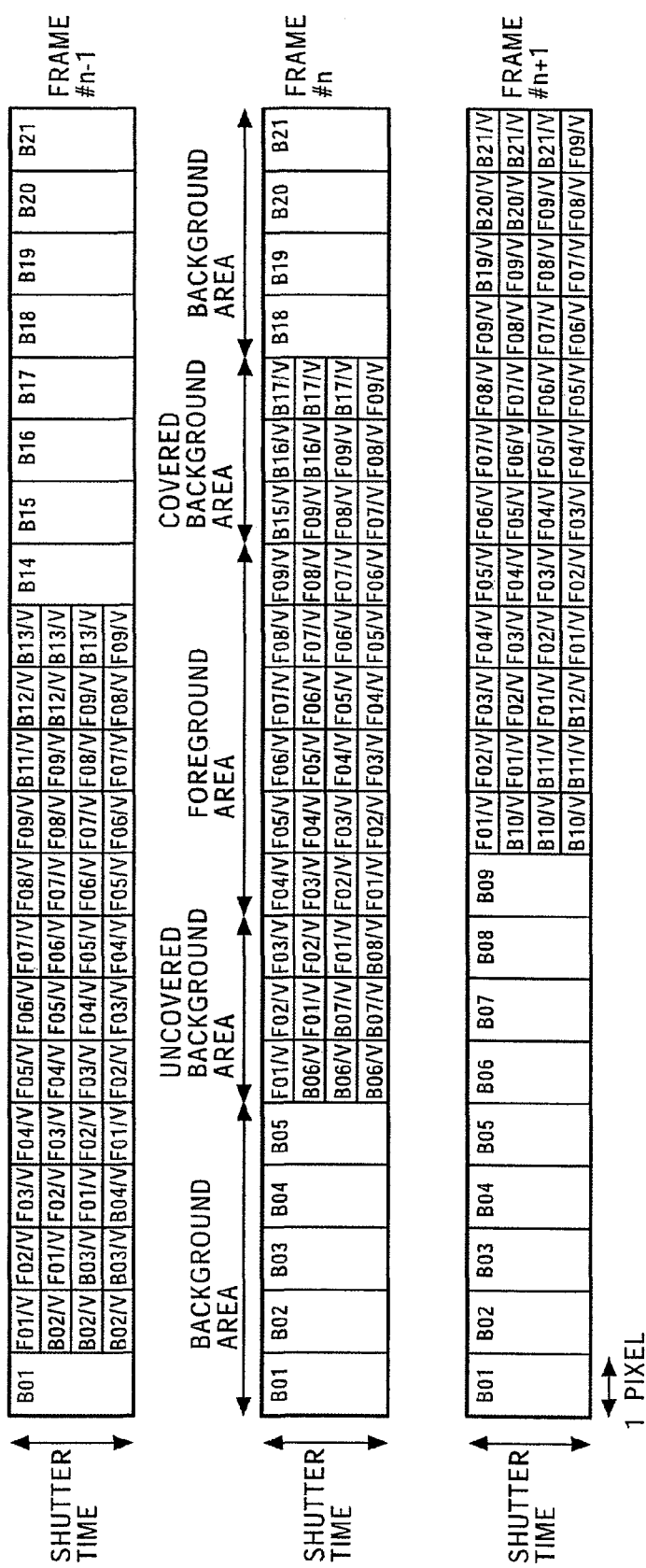
FIG. 55 is a modeling diagram in which pixel values are expanded in the time direction and shutter time which is divided into a time interval.

An example of a model in which the pixel values of pixels being adjacent in a row in the moving direction of an image corresponding to the foreground object are expanded in the time direction is shown in FIG. 55. For example, when the moving direction of the image corresponding to the foreground object is horizontal on the screen, the model diagram shown in FIG. 55 shows a model in which the pixel values of pixels being adjacent in one line are expanded in the time direction.

In FIG. 55, a line in a frame #n is the same as that in a frame #n−1 and a frame #n+1.

In the frame #n, the foreground components corresponding to the object included in the sixth to seventeenth pixels from the leftmost are included in the second to thirteenth pixels from the leftmost in the frame #n−1 and in the tenth to twenty first pixels from the leftmost in the frame #n+1.

In the frame #n−1, the pixels belonging to the covered background area are the eleventh to thirteenth pixels from the leftmost and the pixels belonging to the uncovered background area are the second to fourth pixels from the leftmost. In the frame #n, the pixels belonging to the covered background area are the fifteenth to seventeenth pixels from the leftmost pixels belonging to the uncovered background area are the sixth pixels to eighth pixels. In the frame #n+1, the pixels belonging to the covered background area are the nineteenth to twenty first pixels from the leftmost and the pixels belonging to the uncovered background area are the tenth to twelfth pixels from the leftmost.

In the frame #n−1, the pixels belonging to the background area are the first pixel and the fourteenth to twenty first pixels from the leftmost. In the frame #n, the pixels belonging to the background area are the first to fifth pixels and the eighteenth to twenty first pixels from the leftmost. In frame #n+1, the pixels belonging to the background area are the first to ninth pixels from the leftmost.

Figure 56:
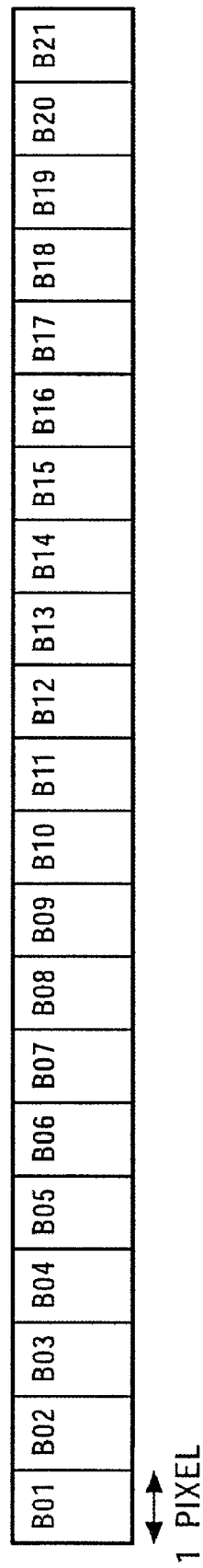
FIG. 56 is a diagram illustrating an example of a background image.

An example of the background image corresponding to the example of FIG. 55 which is generated from background generator 301 is shown in FIG. 56. The background image is comprised of pixels corresponding to the background object and does not include the image components corresponding to the foreground object.

The binary object image extracting portion 302 generates the binary object image on the basis of the correlation between the background image and the input image and supplies the generated binary object image to a time change detector 303.

Figure 57:
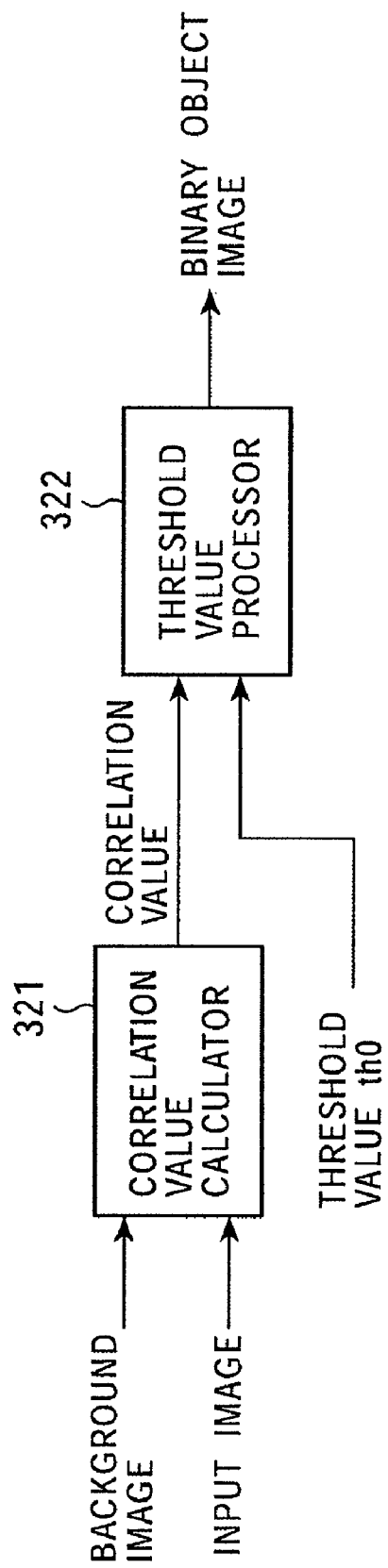
FIG. 57 is a block diagram illustrating a configuration of a binary object image extracting portion 302.

FIG. 57 is a block diagram showing configuration of the binary object image extracting portion 302. A correlation value calculator 321 calculates the correlation between the input image and the background image supplied from the background image generator 301 and generates and supply the correlation value to a threshold value processor 322.

The correlation value calculator 321 applies equation (4) to, for example, 3×3 blocks in the background image where X4 is centered as shown in FIG. 58A and 3×3 blocks in the input image, corresponding to the blocks in the background image, where Y4 is centered as shown in FIG. 58B to calculate the correlation value corresponding to Y4.

$$\text{CORRELATION VALUE} = \frac{\sum_{i=0}^{8}(X_i - \overline{X}) \sum_{i=0}^{8}(Y_i - \overline{Y})}{\sqrt{\sum_{i=0}^{8}(X_i - \overline{X})^2 \cdot \sum_{i=0}^{8}(Y_i - \overline{Y})^2}} \quad (4)$$

$$\overline{X} = \frac{\sum_{i=0}^{8} X_i}{9} \quad (5)$$

$$\overline{Y} = \frac{\sum_{i=0}^{8} Y_i}{9} \quad (6)$$

The correlation value calculator 321 supplies the correlation value calculated for the respective pixels as described by the above to the threshold vale processor 322. Further, the correlation value calculator 321 may apply equation (7) to, for example, 3×3 blocks in the background image where X4 is centered as shown in FIG. 59A and 3×3 blocks in the input image, corresponding to the blocks in the background image, where Y4 is centered as shown in FIG. 59B to calculate the absolute value of difference corresponding to Y4.

$$\text{SUM OF ABSOLUTE VALUE OF DIFFERENCE} = \sum_{i=0}^{8}|(X_i - Y_i)| \quad (7)$$

The correlation value calculator 321 supplies the absolute value of the difference calculated by the process described above as the correlation value to the threshold value processor 322.

The threshold value processor 322 compares the pixel value of the correlating image to the threshold value th0, sets 1 to the pixel value of the binary object image when the correlation value is not greater than the threshold value th0, sets 0 to the pixel value of the binary object image when the correlation value is greater than the threshold value th0 and outputs the binary object image to which pixel value 0 or 1 is set. The threshold value processor 322 may previously store the threshold value th0 or may use the externally input threshold value th0.

Figure 60:
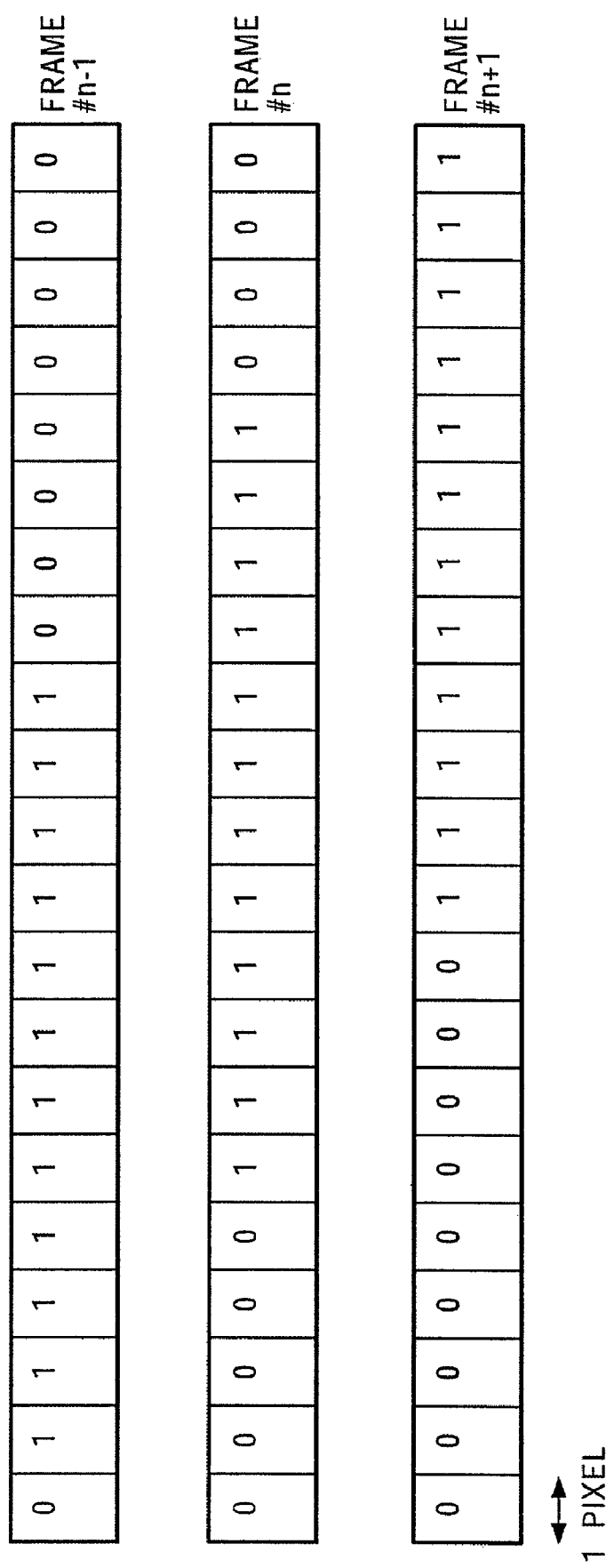
FIG. 60 is a diagram illustrating an example of a binary object image.

FIG. 60 shows an example of a binary object image corresponding to the model of the input image shown in FIG. 55. In the binary object image, 0 is set to the pixel value of pixel that has a high correlation to the background image.

Figure 61:
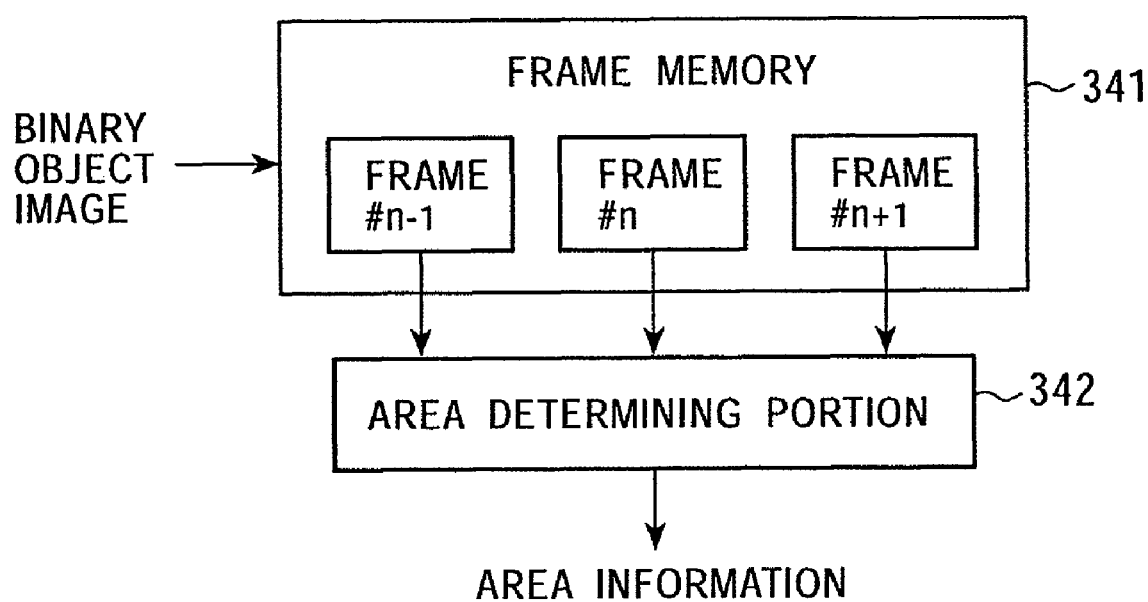
FIG. 61 is a block diagram illustrating a configuration of a time change detector 303.

FIG. 61 is a block diagram showing a configuration of the time change detector 303. When performing the area determination for the pixels in the frame #n, the frame memory 341 stores the binary object image of the frame #n−1, the frame #n and the frame #n+1 supplied from the binary object image extracting portion 302.

The area determining portion 342 determines area for each pixel in the frame #n on the basis of the binary object image of the frame #n−1, the frame #n and the frame #n+1 stored in the frame memory 341 to generate and output the area information.

FIG. 62 is a diagram illustrating a determination process of the area determining portion 342. When the indicated pixel of the binary object image in the frame #n is 0, the area determining portion 342 determines that the indicated pixel in the frame #n belongs to the background area.

When the indicated pixel of the binary object image in the frame #n is 1, the indicated pixel of the binary object image in the frame #n−1 is 1 and the indicated pixel of the binary object image in the frame #n+1 is 1, the area determining portion 342 determines that the indicated pixel in the frame #n belongs to the foreground area.

When the indicated pixel of the binary object image in the frame #n is 1 and the indicated pixel of the binary object image in the frame #n−1 is 0, the area determining portion 342 determines that the indicated pixel in the frame #n belongs to the covered background area.

When the indicated pixel of the binary object image in the frame #n is 1 and the indicated pixel of the binary object image in the frame #n+1 is 0, the area determining portion 342 determines that the indicated pixel in the frame #n belongs to the uncovered background area.

Figure 63:
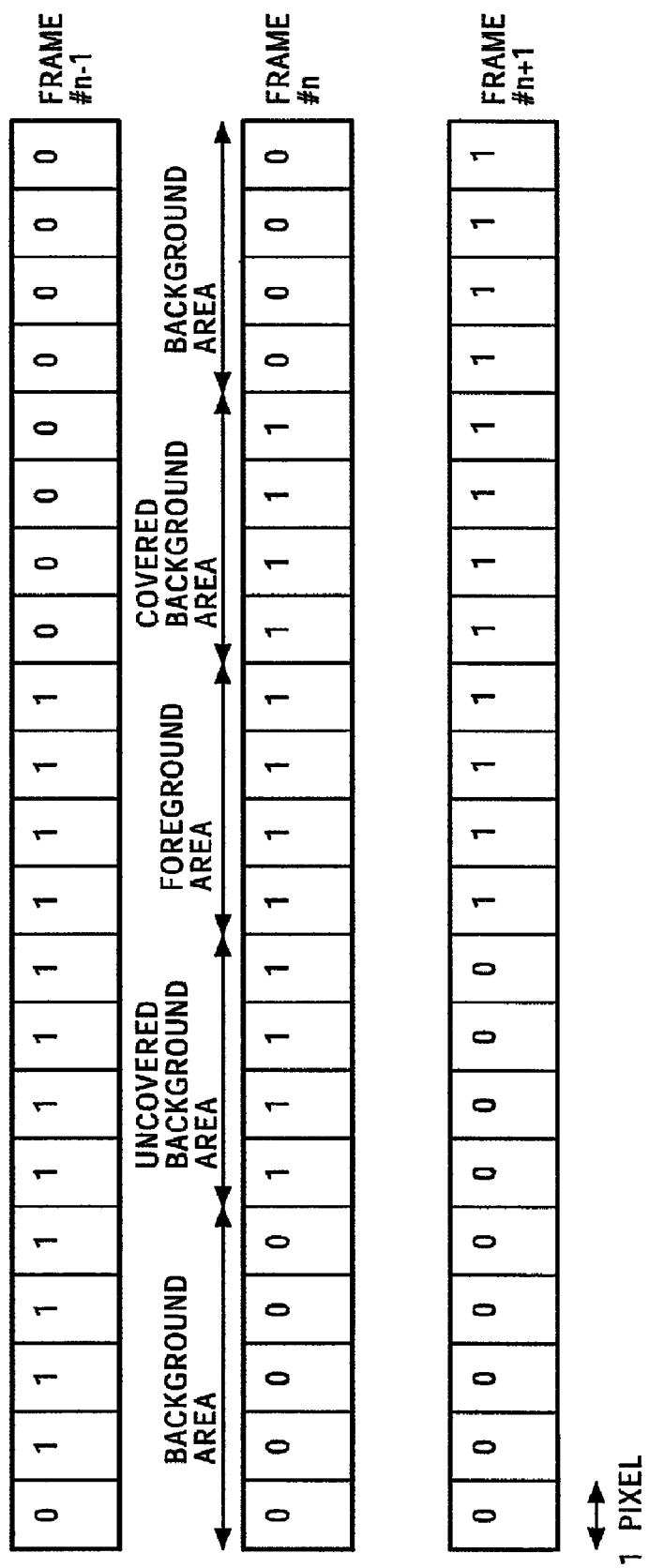
FIG. 63 is a diagram illustrating an example of a determination in the time change detector 303.

FIG. 63 shows an example of the time change detector 303 performing determination process with respect to the binary object image corresponding to the model of the input image shown in FIG. 55. Since the pixel in the frame #n corresponding to the binary object image is 0, the time change detector 303 determines that the first to fifth pixels from the leftmost in the frame #n belong to the background area.

Since the pixel in the frame #n of the binary object image is 1 and the corresponding pixel in the frame #n+1 is 0, the time change detector 303 determines that the sixth to ninth pixels from the leftmost belong to the uncovered background area.

Since the pixel in the frame #n of the binary object image is 1, the corresponding pixel in the frame #n−1 is 1 and the corresponding pixel in the frame #n+1 is 1, the time change detector 303 determines that the tenth to thirteenth pixels from the leftmost belong to the foreground area.

Since the pixel in the frame #n of the binary object image is 1 and the corresponding pixel in the frame #n−1 is 0, the time change detector 303 determines that the fourteenth to seventeenth pixels from the leftmost belong to the covered background area.

Since the corresponding pixel in the frame #n of the binary object image is 0, the time change detector 303 determines that the eighteenth to twenty first pixels from the leftmost belong to the background area.

Figure 64:
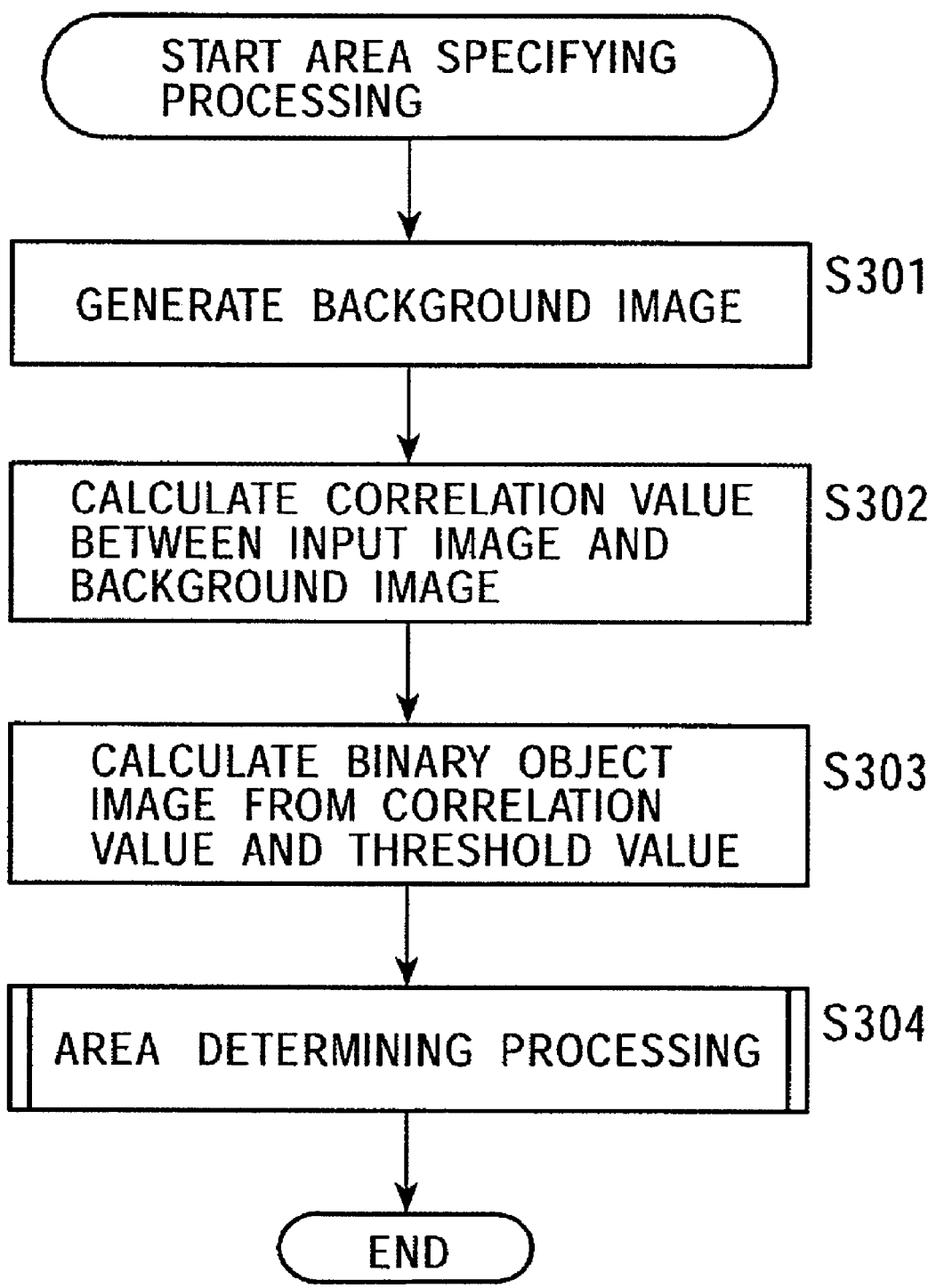
FIG. 64 is a flowchart illustrating an area specification processing in the area determining unit 103.

Next, referring to a flowchart of FIG. 64, the area specifying processing of the area determining unit 103 will be explained. In step S301, the background image generator 301 of the area determining unit 103 extracts, for example, the image object corresponding to the background object included in the input image on the basis of the input image to generate the background image and supplies the generated background image to the binary object image extracting portion 302.

In step S302, the binary object image extracting portion 302 calculates the correlation value between the input image and the background image supplied from the background image generator 301, for example, by using calculations which were explained by referring to FIG. 58A and FIG. 58B. In step S303, the binary object image extracting portion 302 calculates the binary object image from the correlation value and the threshold value th0, for example, by comparing the correlation value with the threshold value th0.

In step S304, the time change detector 303 performs the area determining processing to complete the processing.

Figure 65:
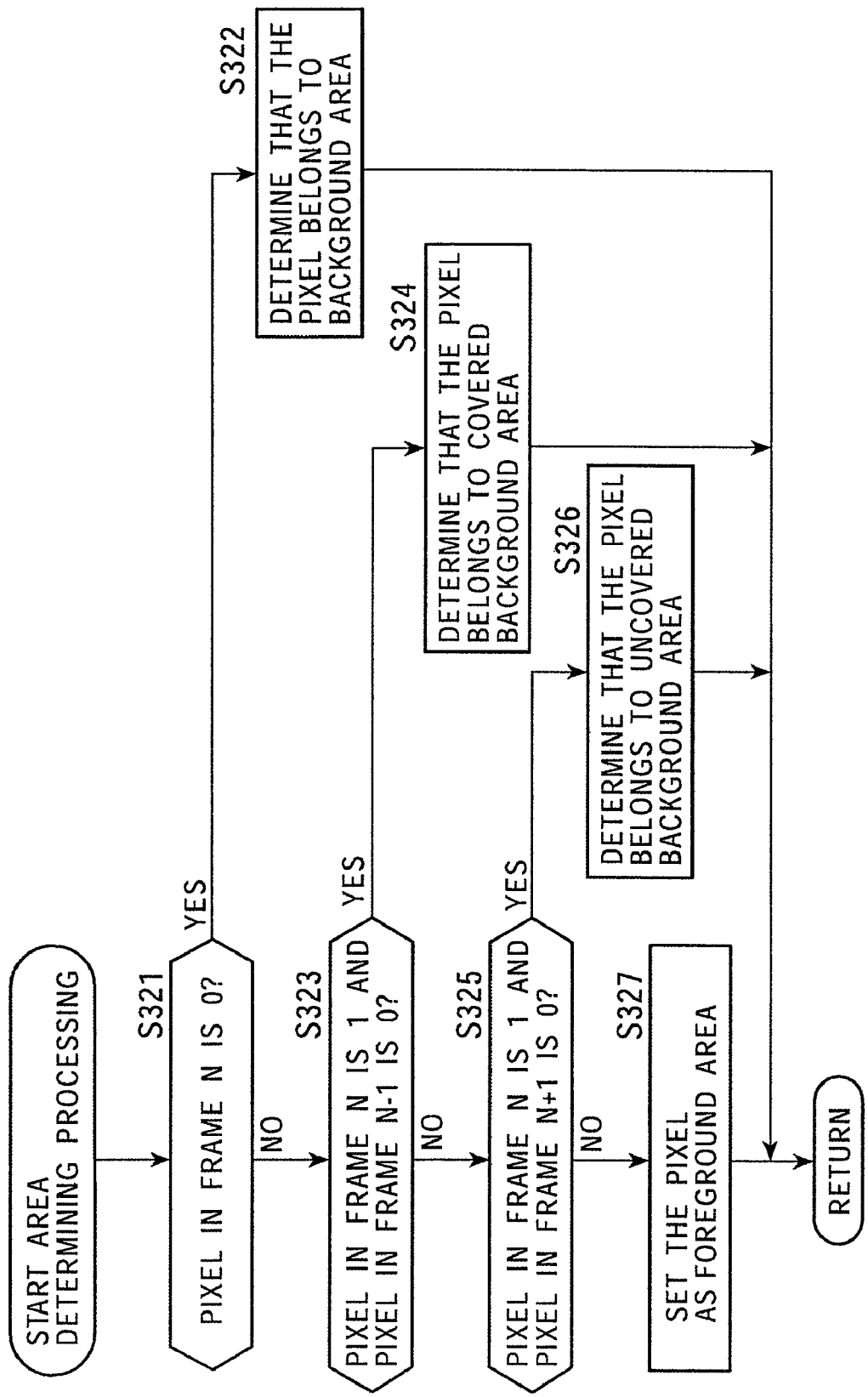
FIG. 65 is a flowchart illustrating details of the area specification processing.

Referring to a flowchart of FIG. 65, the details of the area determining processing corresponding to step S304 will be explained. In step S321, the area determining portion 342 of the time change detector 303 determines whether the indicated pixel in the frame #n stored in the frame memory 341 is 0 or not and if it is determined that the indicated pixel in the frame #n is 0, the procedure proceeds to step S322. Then, the area determining portion 342 determines that the noticed pixel in the frame #n belongs to the background area to complete the processing.

In step S321, if it is determined that the indicated pixel in the frame #n is 1, the procedure proceeds to step S323. The area determining portion 342 of the time change detector 303 determines whether the indicated pixel in the frame #n stored in the frame memory 341 is 1 and the corresponding pixel in the frame #n−1 is 0 or not, and if it is determined that the indicated pixel in the frame #n is 1 and the corresponding pixel in the frame #n−1 is 0, the procedure proceeds to step S324. Then, the area determining portion 342 determines that the indicated pixel in the frame #n belongs to the covered background area to finish the processing.

In step S323, if it is determined that the indicated pixel in the frame #n is 0 or the corresponding pixel in the frame #n−1 is 1, the procedure proceeds to step S325. The area determining portion 342 of the time change detector 303 determines whether the indicated pixel in the frame #n stored in the frame memory 341 is 1 and the corresponding pixel in the frame #n+1 is 0 or not, and if it is determined that the noticed pixel in the frame #n is 1 and the corresponding pixel in the frame #n+1 is 0, the procedure proceeds to step S326. Then, the area determining portion 342 determines that the indicated pixel in the frame #n belongs to the uncovered background area and finishes the processing.

In step S325, if it is determined that the indicated pixel in the frame #n is 0 or the corresponding pixel in the frame #n+1 is 1, the procedure proceeds to step S327. The area determining portion 342 of the time change detector 303 determines that the noticed pixel in the frame #n belongs to the foreground area and finishes the processing.

Like the above, the area specifying unit 103 can specify which of the foreground area, the background area, the covered background area and the uncovered background area that the pixels of the input image belong on the basis of the correlation value between the input image and the corresponding background image, and generates the area information corresponding to the specification result.

Figure 66:
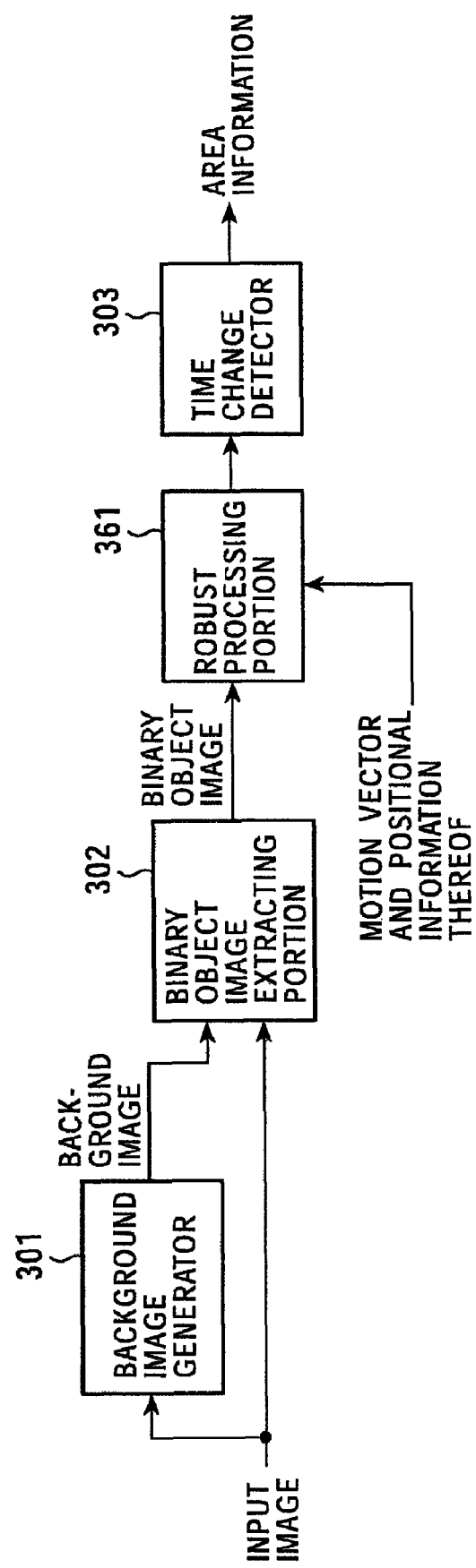
FIG. 66 is a block diagram of another configuration of the area specifying unit 103.

FIG. 66 is a block diagram showing other configuration of the area specifying unit 103. The area specifying unit 103 shown in FIG. 66 uses the motion vector supplied from the motion detector 102 and the positional information thereof. Portions equal to those in FIG. 54 are indicated by the same reference numerals and explanation thereof will be omitted.

A robust processing portion 361 generates a binary object image of which robust processing is performed on the basis of the binary object image of N frames supplied from the binary object image extracting portion 302 and outputs it to the time change detector 303.

Figure 67:
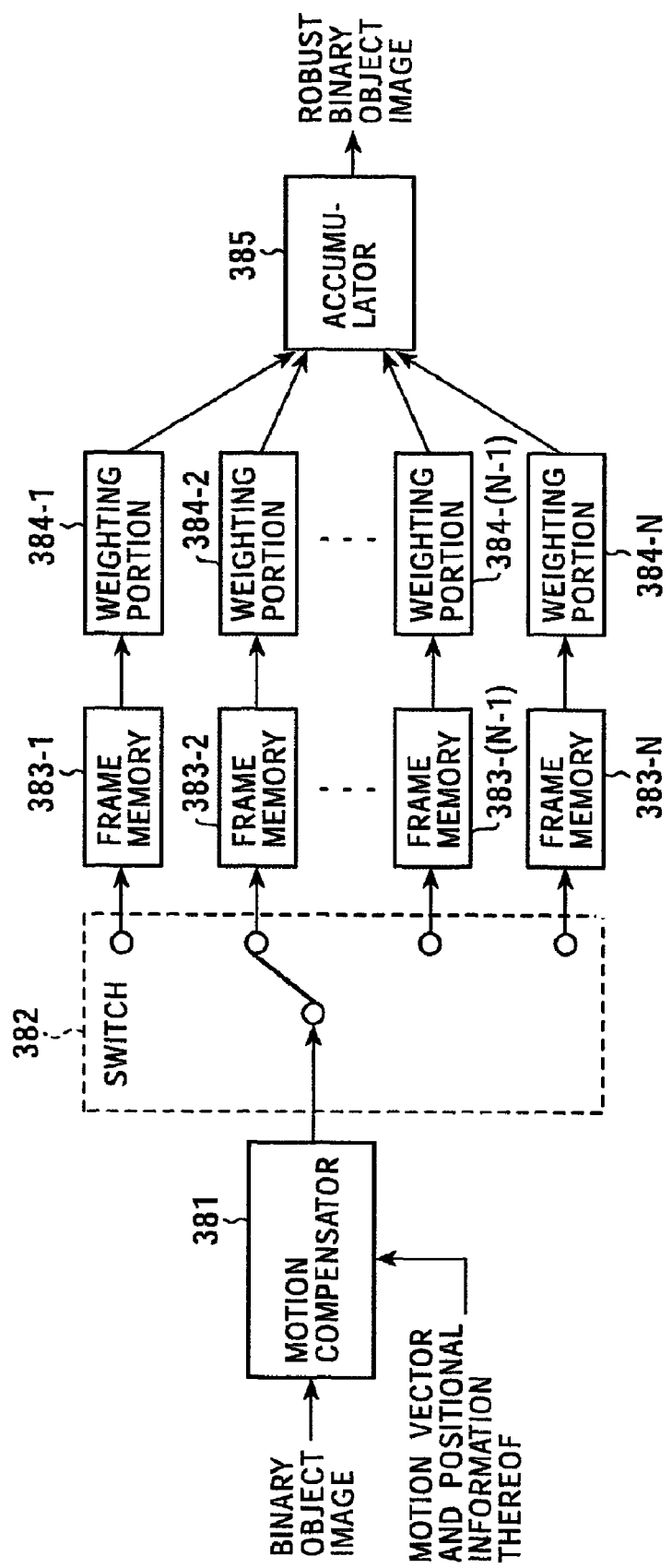
FIG. 67 is a block diagram illustrating a configuration of a robust processing portion 361.

FIG. 67 is a block diagram illustrating a configuration of the robust processing portion 361. A motion compensator 381 compensates for motion of the binary object image of N frames on the basis of the motion vector supplied from the motion detector 102 and the positional information thereof, and outputs the binary object image of which motion is compensated to a switch 382.

Figure 68:
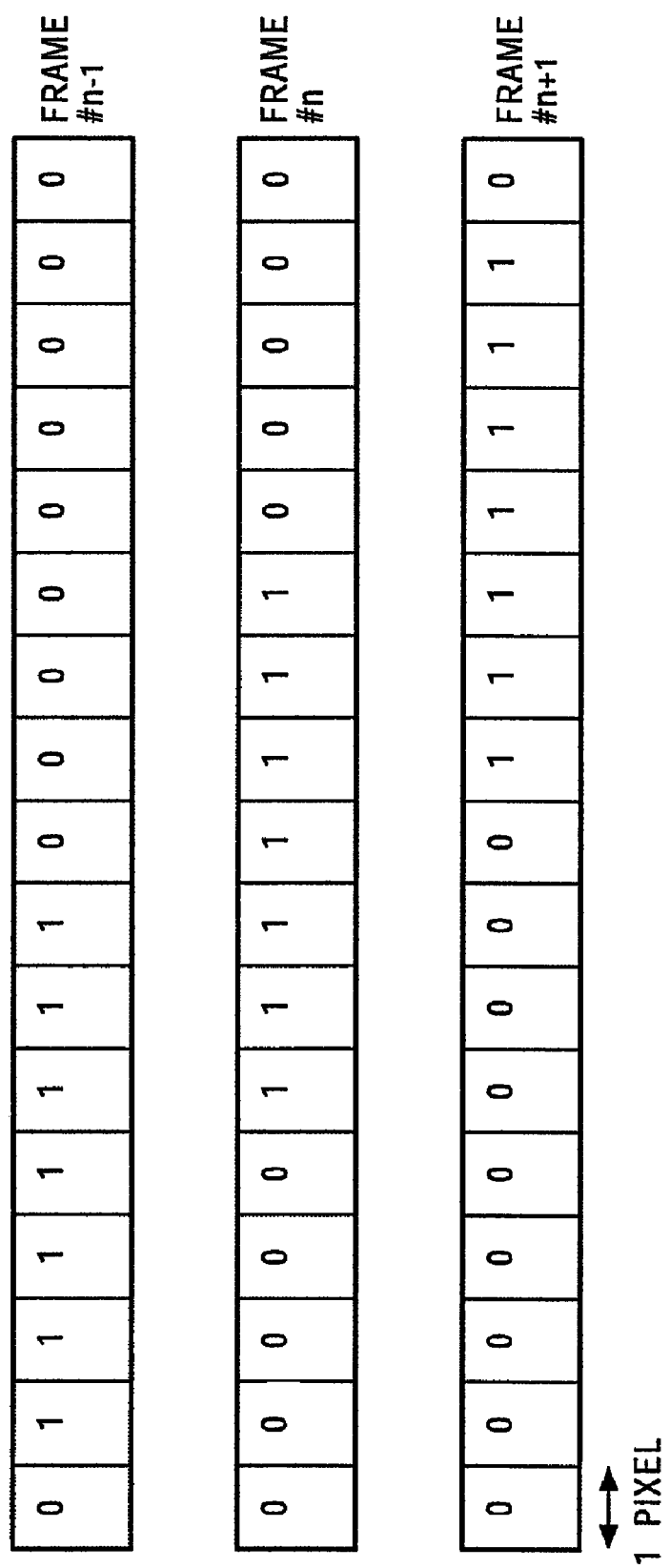
FIG. 68 is a diagram illustrating motion compensation in a motion compensator 381.
Figure 69:
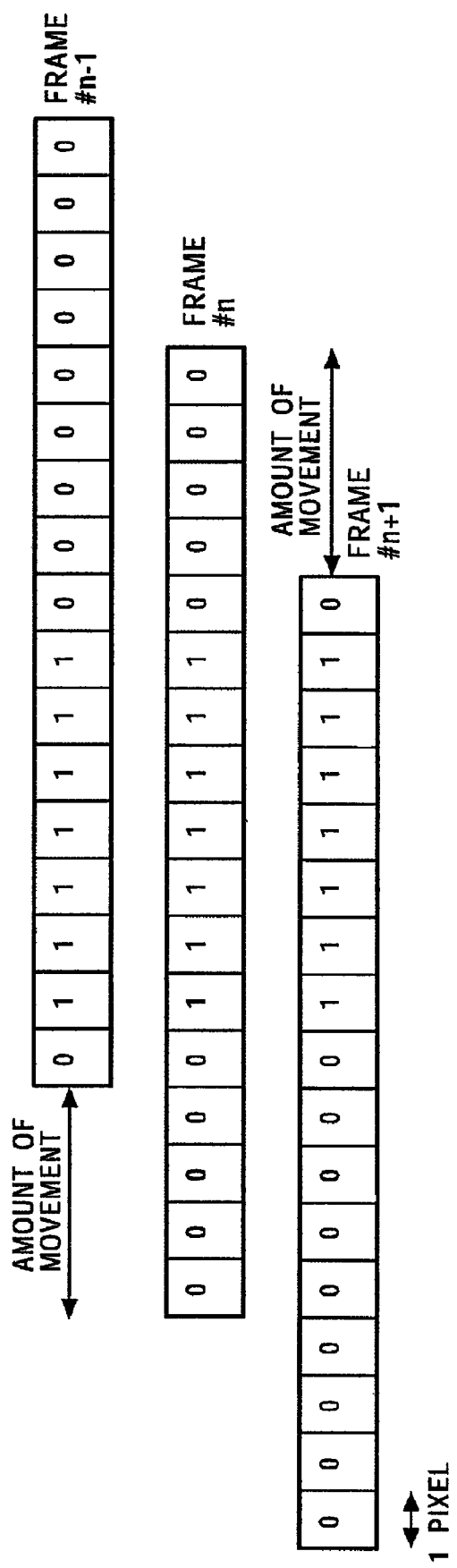
FIG. 69 is a diagram illustrating motion compensation in the motion compensator 381.

Referring to examples of FIG. 68 and FIG. 69, a motion compensation process of the motion compensator 381 will be explained. For example, when an area in a frame #n is determined, if the binary object image of a frame #n−1, a frame #n and a frame #n+1 exemplified in FIG. 68 is input, the motion compensator 381 compensates the binary object image of the frame #n−1 and the binary object image of the frame #n+1, as exemplified in FIG. 69, on the basis of the motion vector supplied from the motion detector 102 and supplies the binary object image of which motion is compensated to the switch 382.

The switch 382 outputs the binary object image of the first frame in which motion is compensated to the frame memory 383-1 and outputs the binary object image, of the second frame in which motion is compensated to the frame memory 383-2. Similarly, the switch 382 outputs each of the binary object images of the third to N−1-th frames in which motion is compensated to one of the frame memory 383-3 to 383-(N−1) and outputs the binary object image of the Nth frame in which motion is compensated to the frame memory 383-N.

The frame memory 383-1 stores the binary object image of the first frame in which motion is compensated and outputs the stored binary object image to the weighting portion 384-1. The frame memory 383-2 stores the binary object image of the second frame in which motion is compensated and outputs the stored binary object image to the weighting portion 384-2.

Similarly, each of the frame memory 383-3 to 383-(N−1) stores one of the binary object images of the third to (N−1)th frames of which motion is compensated and outputs the stored binary object image to one of weighting portions 384-3 to 384-(N−1). The frame memory 383-N stores the binary object image of Nth frame of which motion is compensated and outputs the stored binary object image to the weighting portion 384-N.

The weighting portion 384-1 multiplies the binary object image of the first frame supplied from the frame memory 383-1 of which motion is compensated, by predetermined weight w1 to supply it to the accumulator 385. The weighting portion 384-2 multiplies the pixel value of the binary object image of the second frame supplied from the frame memory 383-2 of which motion is compensated by a predetermined weight w2 to supply it to the accumulator 385.

Similarly, each of the weighting portion 384-3 to the weighting portion 384-(N−1) multiplies the pixel value of the binary object image of one of the third to (N−1)th frames supplied from one of the frame memories 383-3 to 383-(N−1) of which motion is compensated, by one of weight w3 to weight w(N−1) to supply it to the accumulator 385. The weighting portion 384-N multiplies the pixel value of the binary object image of the Nth frame supplied from the frame memory 383-N of which motion is compensated, by a predetermined weight wN to supply it to the accumulator 385.

The accumulator 385 accumulates the pixel values corresponding to the binary object images of the first to Nth frames respectively multiplied by one of the weights w1 to wN of which motions are compensated and generates the binary object image by comparing the accumulated pixel values with the predetermined threshold value th0.

Like the above, since the robust processing portion 361 generates the binary object images of which robust processing is performed from N binary object images and supplies it to the time change detector 303, even when noises are included in the input image, the area specifying unit 103 of which the configuration is shown in FIG. 66 can perform the area specification more accurately than the case shown in FIG. 54.

Figure 70:
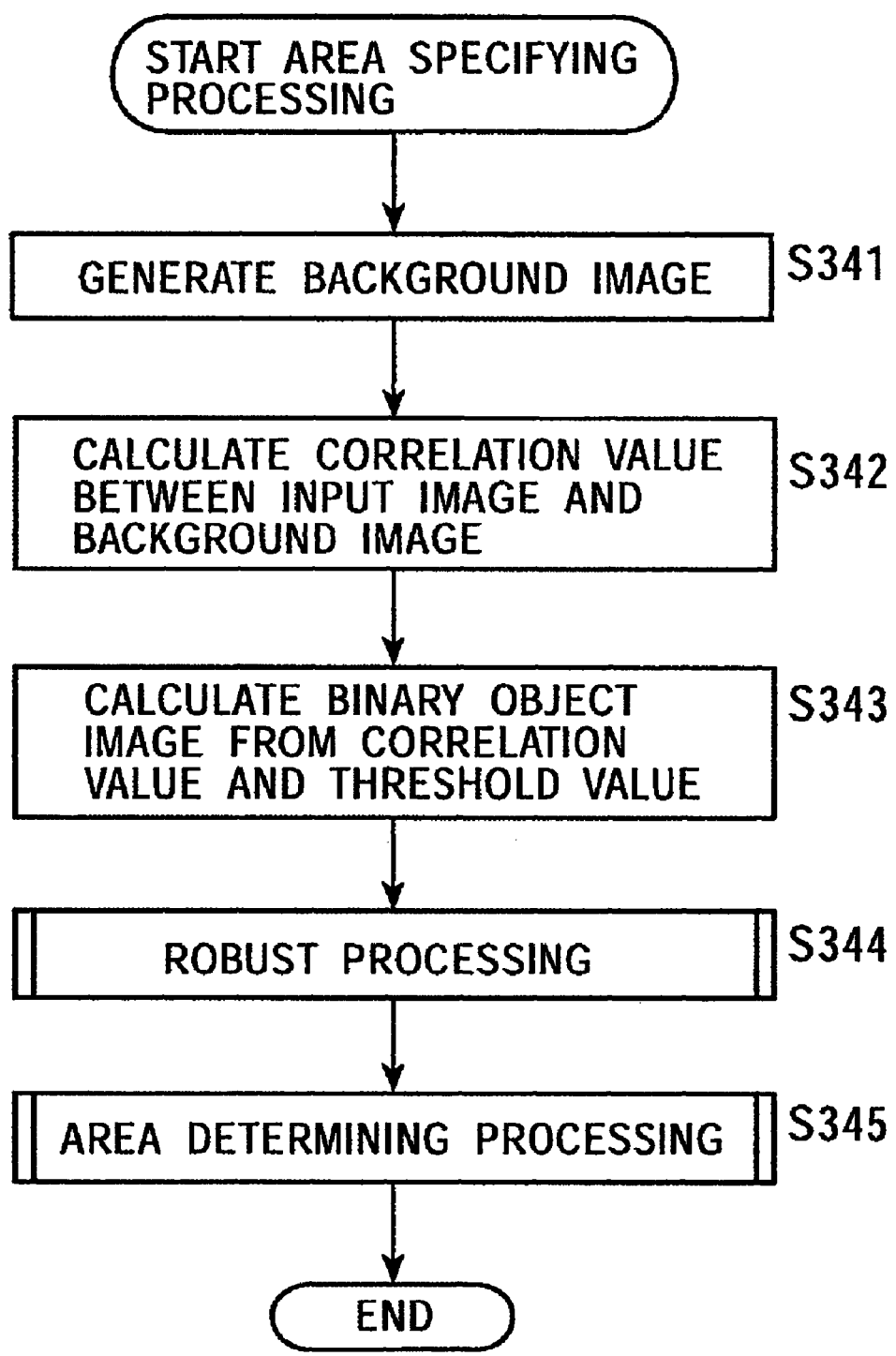
FIG. 70 is a flowchart illustrating the area specification processing.

Next, referring to a flowchart of FIG. 70, the area specifying process of the area specifying unit 103 of which the configuration is shown in FIG. 66 will be explained. The steps of step S341 to step S343 are equal to those of step S301 to step S303 and thus, explanation thereof will be omitted.

In step S344, the robust processing portion 361 performs the robust processing.

In step S345, the time change detector 303 performs the area specifying process and finishes the procedure. Since the detailed process in step S345 is similar to the process explained by referring to the flowchart of FIG. 65, explanation thereof will be omitted.

Figure 71:
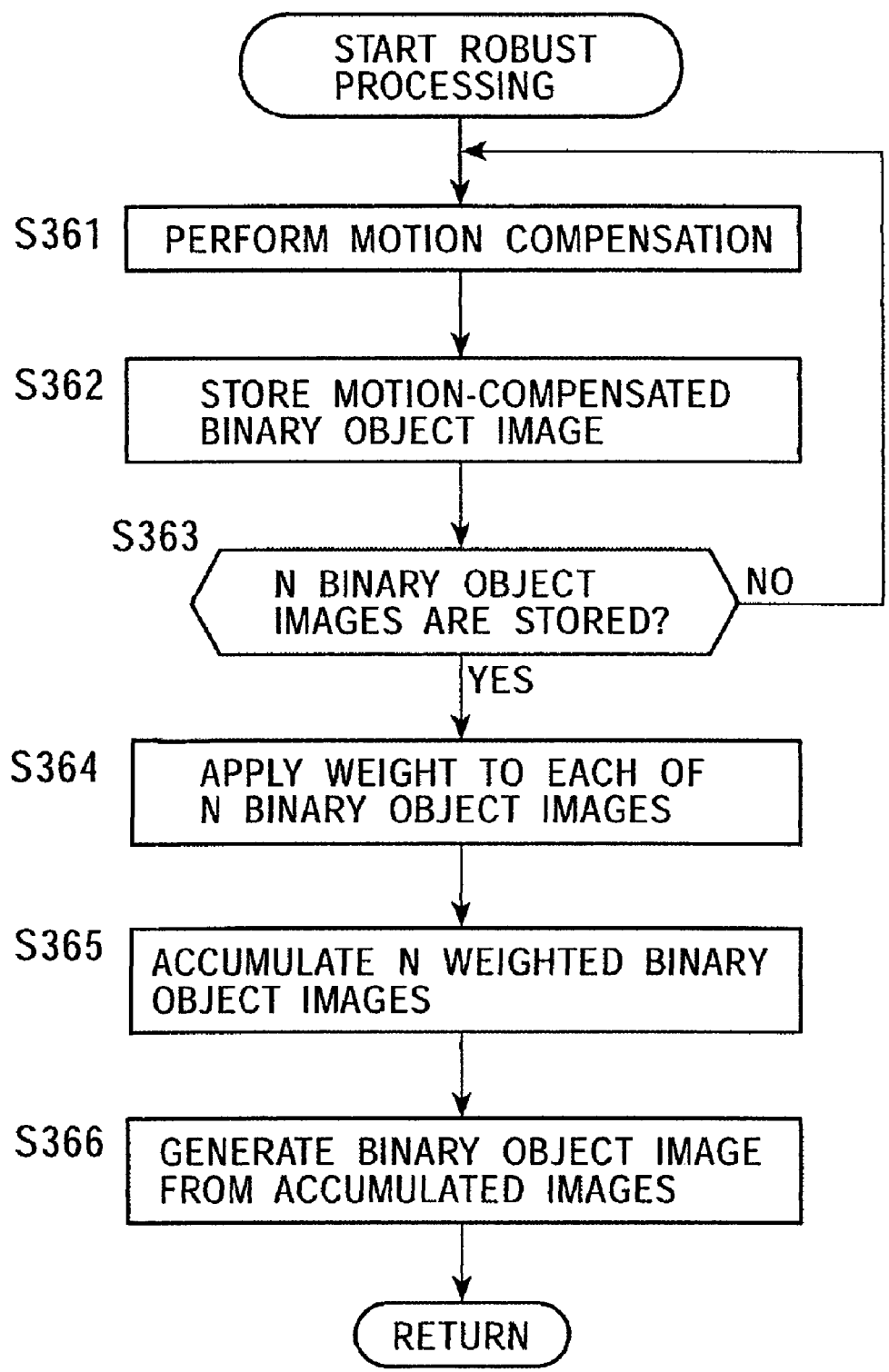
FIG. 71 is a flowchart illustrating details of a robust processing.

Next, referring to a flowchart of FIG. 71, the details of the robust processing corresponding to the processing of step S344 in FIG. 70 will be explained. In step S361, a motion compensator 381 performs the motion compensating process for the input binary object image on the basis of the motion vector supplied from the motion detector 102 and the positional information thereof. In step S362, one of the frame memories 383-1 to 383-N stores the motion compensated binary object image supplied through the switch 382.

In step S363, the robust processing portion 361 determines whether N binary object images are stored or not and if it is determined that N binary object images are not stored, the procedure returns to step S361 and the motion compensating process for the binary object image and the storing process for the binary object image are repeated. In step S363, if it is determined that N binary object images are stored, the procedure proceeds to step S364. Each of the weighting portions 384-1 to 384-N multiplies each of the N binary object images by one of the weights w1 to wN for weighting.

In step S365, an accumulator 385 accumulates the weighted N binary object images.

In step S366, the accumulator 385 generates a binary object image from the accumulated image, for example, by comparing to the predetermined threshold value th1 and finishes the procedure.

Like the above, the area specifying unit 103 of which the configuration is shown in FIG. 66 can generate the area information on the basis of the binary object image that is robust processed.

As described above, the area specifying unit 103 can generate the area information indicating that each pixel included in the frame belongs to the moving area, the stationary area, the uncovered background area or the covered background area.

Figure 72:
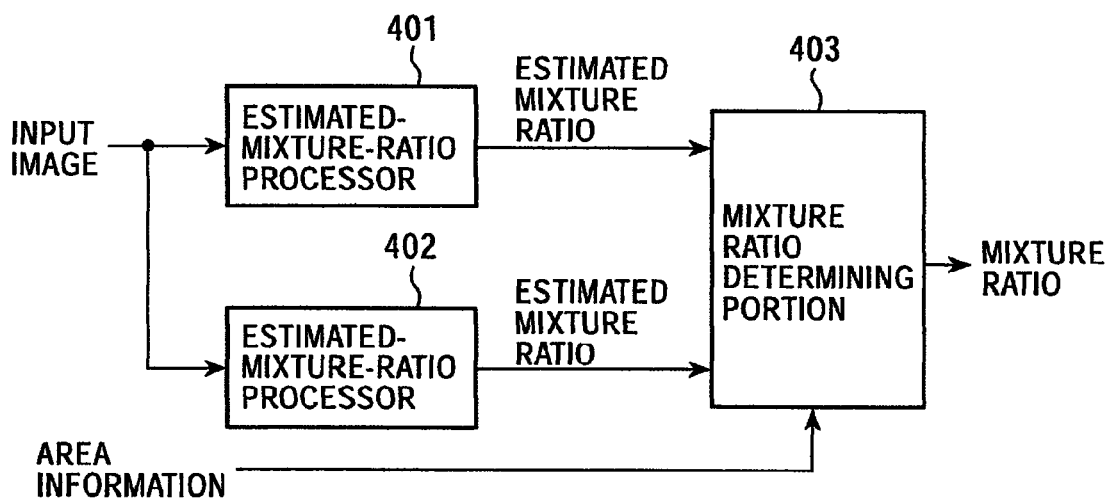
FIG. 72 is a block diagram illustrating an example of a configuration of a mixture ratio calculating unit 104.

FIG. 72 is a block diagram illustrating an example of a configuration of the mixture ratio calculator 104. An estimated mixture ratio processor 401 calculates the mixture ratio of each pixel by using the calculation corresponding to a model of the covered background area on the basis of the input image and supplies the calculated estimated mixture ratio to the mixture ratio determining portion 403.

An estimated mixture ratio processor 402 calculates the mixture ratio of each pixel by using the calculation corresponding to the model of the uncovered background area on the basis of the input image and supplies the calculated estimated mixture ratio to the mixture ratio determining portion 403.

Since it is supposed that the object corresponding to the foreground is moving at a uniform speed for the shutter time, the mixture ratio α of pixel belonging to the mixed area has the following feature. That is, the mixture ratio α is linearly varied corresponding to the positional variation of a pixel. If the positional variation of a pixel is one-dimensional, the variation in mixture ratio α can be expressed by a linear line and if the positional variation of pixel is two-dimensional, the variation in mixture ratio α can be expressed by a plane.

Further, since time interval for one frame is short, it can be supposed that the object corresponding to the foreground is a rigid body and is moving at a uniform speed.

In this case, the slope of mixture ratio α is reciprocal ratio to the amount of movement v in the shutter time of the foreground.

Figure 73:
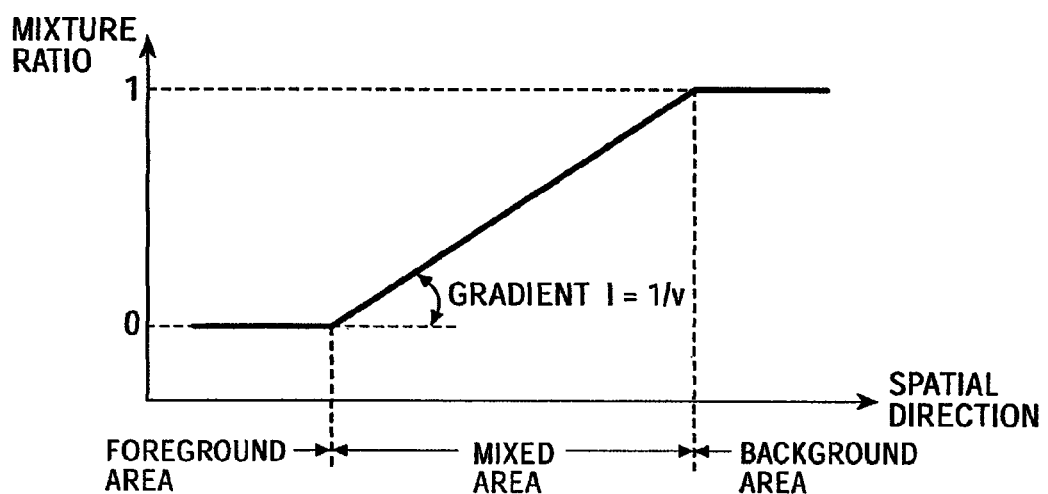
FIG. 73 is a diagram illustrating an example of an ideal mixture ratio α.

An example of an ideal mixture ratio α is shown in FIG. 73. The slope I of the ideal mixture ratio α in the mixed area can be expressed as a reciprocal number of the amount of movement v.

As shown in FIG. 73, the ideal mixture ratio α is 1 in the background area, is 0 in the foreground area and is greater than 0 and less than 1 in the mixed area.

Figure 74:
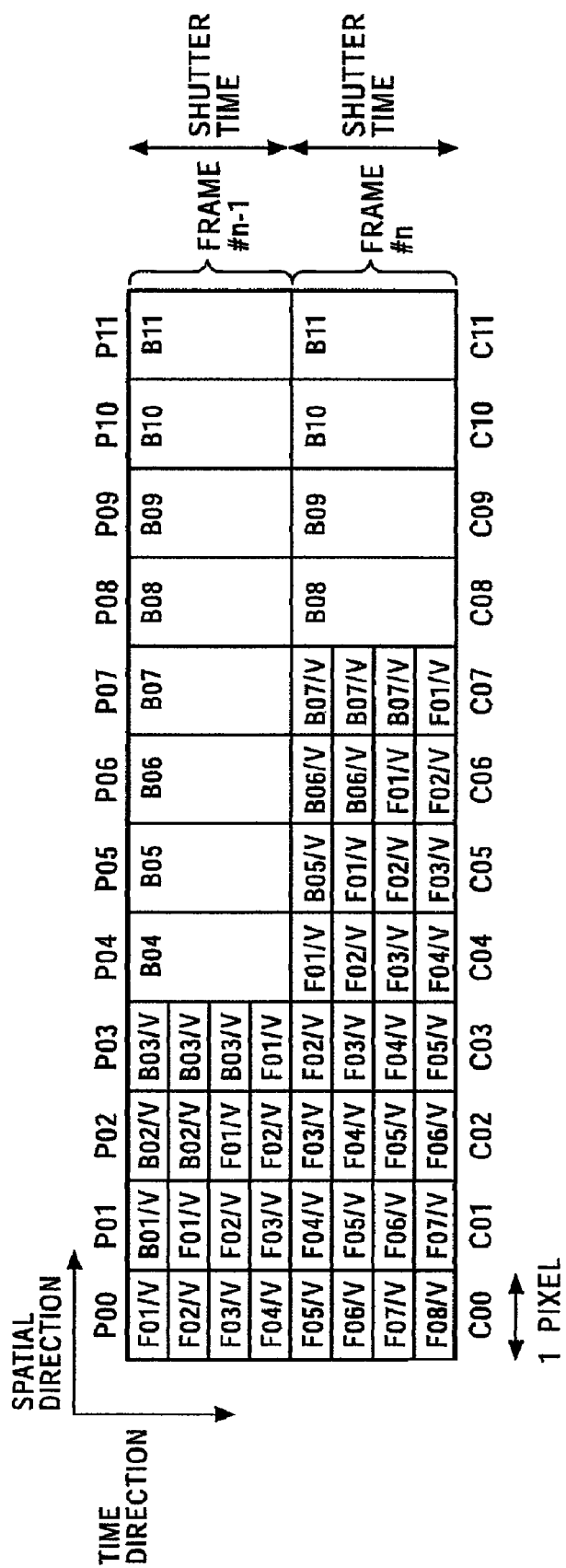
FIG. 74 is a modeling diagram in which pixel values are expanded in the time direction and shutter time which is divided into a time interval.

In the example of FIG. 74, the pixel value C06 of the seventh pixel from the leftmost in the frame #n can be expressed as equation (8) by using the pixel value P06 of the seventh pixel in the frame #n−1.

$$C06 = B06/v + B06/v + F01/v + F02/v \qquad (8)$$
$$= P06/v + P06/v + F01/v + F02/v$$
$$= 2/v \cdot P06 + \sum_{i=1}^{2} F_i/v$$

In equation (8), the pixel value C06 is expressed as the pixel value M of pixel in the mixed area and the pixel value P06 is expressed as the pixel value B of pixel in the background area. That is, the pixel value M of pixel in the mixed area and the pixel value B of pixel in the background area can be expressed by equation (9) and equation (10), respectively.

$$M = C06 \qquad (9)$$

$$B = P06 \qquad (10)$$

2/v in equation (8) corresponds to the mixture ratio α. Since the amount of movement v is defined as 4, the mixture ratio α of the seventh pixel from the leftmost in the frame #n is 0.5.

As described above, by considering the pixel value C in the indicated frame #n as the pixel value in the mixed area and the pixel value P in the frame #n−1 ahead of the frame #n as the pixel value in the background area, the equation (3) expressing the mixture ratio α can be expressed by equation (11).

$$C = \alpha \cdot P + f \qquad (11)$$

f in equation (11) is sum $\Sigma_i F_i/v$ of the foreground components included in the indicated pixel. Variables included in equation (11) are two of the mixture ratio α and the sum f of the foreground components.

Figure 75:
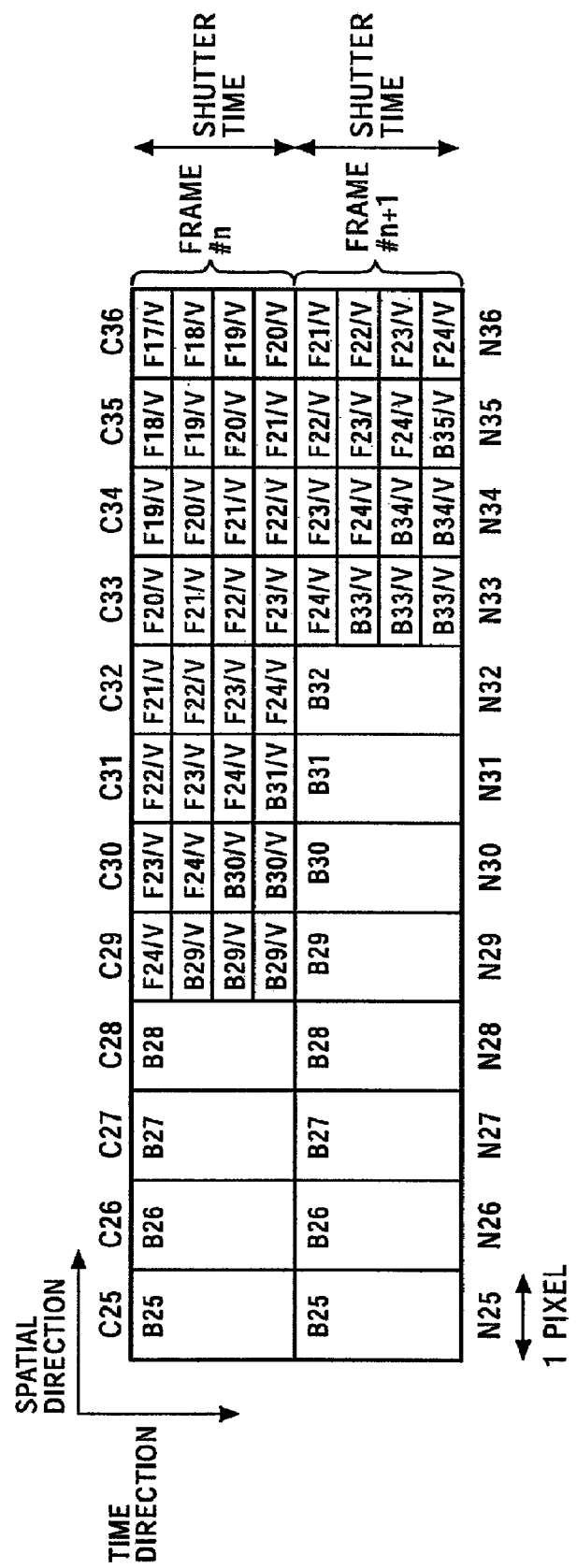
FIG. 75 is a modeling diagram in which pixel values are expanded in the time direction and shutter time which is divided into a time interval.

Similarly, in the uncovered background area, the amount of movement v is 4 and the virtual division number in the time direction is 4. A model in which the pixel values are expanded in the time direction is shown in FIG. 75.

In the uncovered background area, similar to the expressions of the aforementioned covered background area, by considering the pixel value C of pixel in the indicated frame n as the pixel value in the mixed area and the pixel value N in the frame #n+1 behind the frame #n as the pixel value in the background area, the equation (3) expressing the mixture ratio α can be expressed by equation (12).

$$C = \alpha \cdot N + f \quad (12)$$

Further, although it has been explained by considering that the background object is stationary, even when the background object is moving, equation (8) to equation (12) can be applied by using the pixel value of pixel at a position corresponding to the amount of movement v of the background. For example, in FIG. 74, when the amount of movement v of the object corresponding to the background is 2, the virtual division number is 2 and when the object corresponding to the background is moving toward the right side in the drawing, the pixel value B of pixel in the background area in equation (10) becomes the pixel value P04.

Since each of equation (11) and equation (12) includes two variables, the mixture ratio α cannot be obtained by these equations. Here, since the image has a strong correlation in space, the adjacent pixels are almost equal.

Therefore, because the foreground components have a strong correlation in space, by changing the equations to derive the sum f of the foreground components from the front or next frame, the mixture ratio α is obtained.

Figure 76:
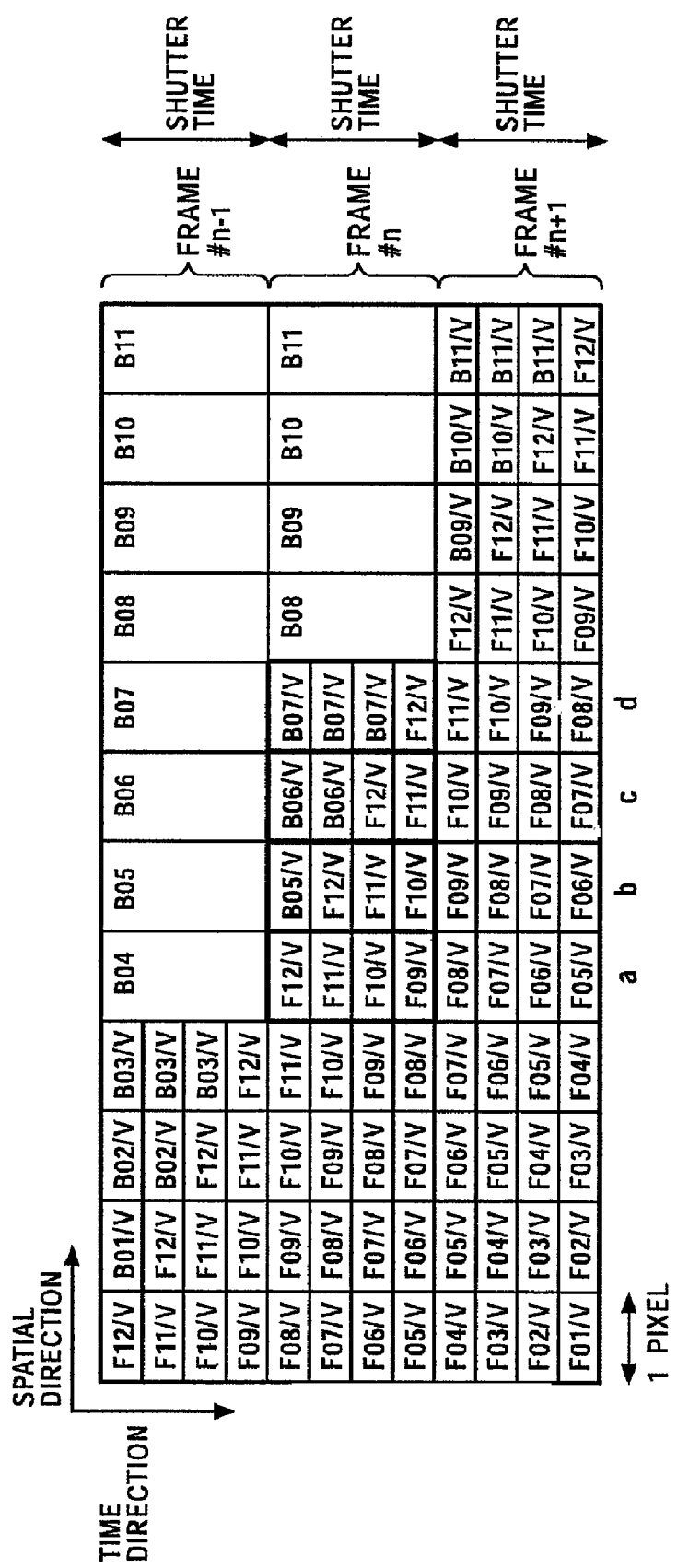
FIG. 76 is a diagram illustrating an approximation using correlation of foreground components.

The pixel value Mc of the seventh pixel from the leftmost in the frame #n in FIG. 76 can be expressed by equation (13).

$$M_c = \frac{2}{v} \cdot B06 + \sum_{i=11}^{12} F_i / v \quad (13)$$

2/v of the first term of right side of equation (13) corresponds to the mixture ratio α. The second term of right side of equation (13) can be expressed by equation (14) using the pixel value in the next frame #n+1.

$$\sum_{i=11}^{12} F_i / v = \beta \cdot \sum_{i=7}^{10} F_i / v \quad (14)$$

Here, using the spatial correlation of the foreground components, equation (15) can be obtained.

$$F = F05 = F06 = F07 = F08 = F09 = F10 = F11 = F12 \quad (15)$$

Equation (14) can be replaced with equation (16) by using equation (15).

$$\sum_{i=11}^{12} F_i / v = \frac{2}{v} \cdot F \quad (16)$$
$$= \beta \cdot \frac{4}{v} \cdot F$$

Consequently, β can be expressed by equation (17).

$$\beta = 2/4 \quad (17)$$

In general, if it is supposed that the foreground components corresponding to the mixed area as shown in equation (15) are equal, equation (18) can be established for all the pixels in the mixed area, in view of relation of the interior division ratio.

$$\beta = 1 - \alpha \quad (18)$$

If the equation (18) is established, equation (11) can be obtained as shown in equation (19).

$$C = \alpha \cdot P + f \quad (19)$$
$$= \alpha \cdot P + (1 - \alpha) \cdot \sum_{i=\gamma}^{\gamma+V-1} F_i / v$$
$$= \alpha \cdot P + (1 - \alpha) \cdot N$$

Similarly, if the equation (18) is established, equation (12) can be obtained as shown in equation (20).

$$C = \alpha \cdot N + f \quad (20)$$
$$= \alpha \cdot N + (1 - \alpha) \cdot \sum_{i=\gamma}^{\gamma+V-1} F_i / v$$
$$= \alpha \cdot N + (1 - \alpha) \cdot P$$

Figure 77:
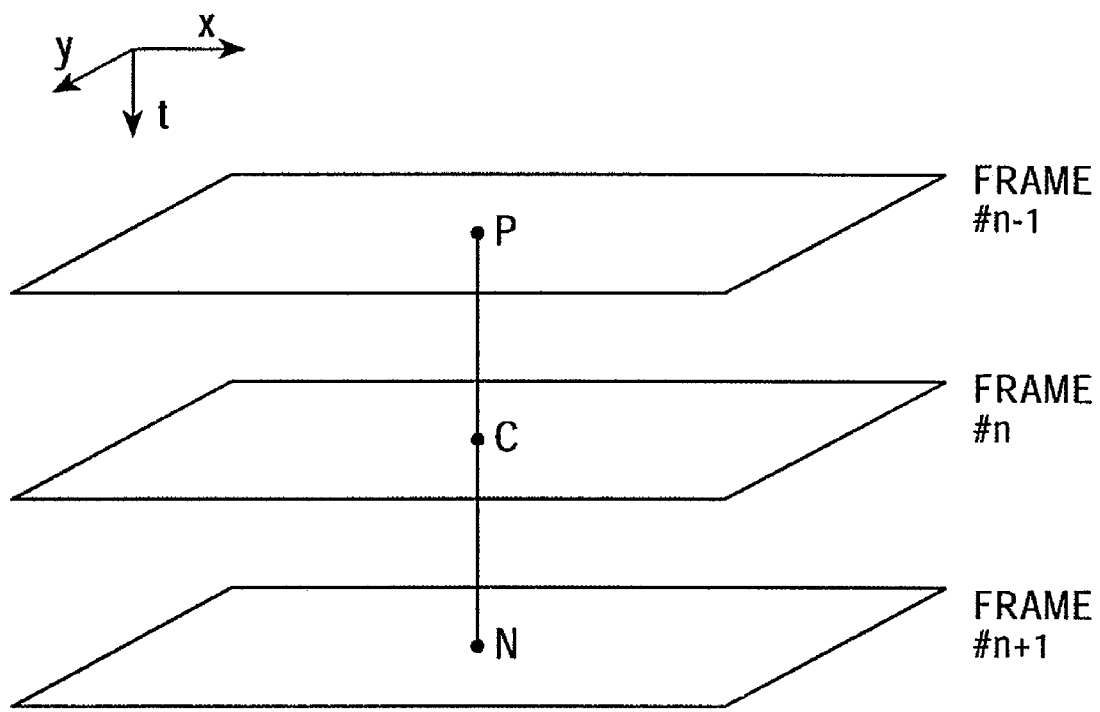
FIG. 77 is a diagram illustrating the relationship of C, N and P.

In equation (19) and equation (20), since C, N and P are the known pixel values, the only variable in equation (19) and equation (20) is the mixture ratio α. The relationship of C, N and P in equation (19) and equation (20) is shown in FIG. 77. C is the pixel value of the indicated pixel in the frame #n which calculates the mixed ratio α. N is the pixel value of pixel in the frame #n+1 of which the spatial position corresponds to that of the indicated pixel. P is the pixel value of pixel in the frame #n−1 of which the spatial position corresponds to that of the indicated pixel.

Therefore, since one variable is included respectively in equation (19) and equation (20), the mixture ratio α can be calculated using the pixel values of pixels in three frames. Conditions for calculating appropriate mixture ratio by solving equation (19) and equation (20) is that the pixel values of pixels are constant, the foreground components corresponding to the mixed area are equal, that is, the pixels being located on the interface of the image object corresponding to the moving direction of the foreground object in the foreground image object picked up when the foreground object is stationary, a twice number of pixels for the amount of movement v are adjacent in a row.

As described above, the mixture ratio α of pixels belonging to the covered background area is calculated by equation (21) and the mixture ratio α of pixels belonging to the uncovered background area is calculated by equation (22).

$$\alpha = (C-N)/(P-N) \quad (21)$$

$$\alpha = (C-P)/(N-P) \quad (22)$$

Figure 78:
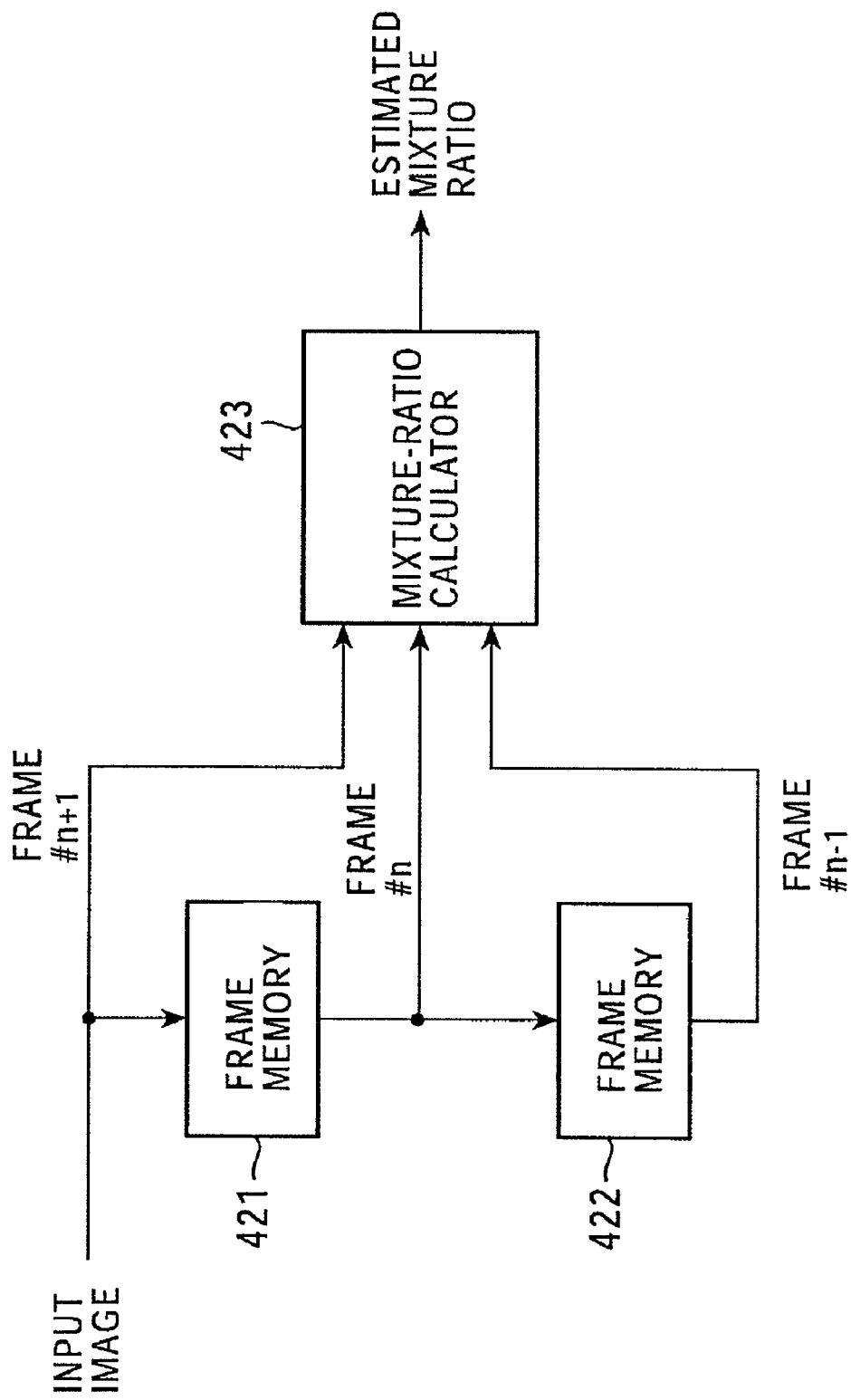
FIG. 78 is a block diagram illustrating a configuration of an estimated mixture ratio processor 401.

FIG. 78 is a block diagram showing a configuration of the estimated mixture ratio processor 401. The frame memory 421 stores the input image in frame unit and supplies a frame one behind the frame input as the input image, to the frame memory 422 and the mixture ratio calculator 423.

The frame memory 422 stores the input image in frame unit and supplies the frame one behind the frame supplied from the frame memory 421, to the mixture ratio calculator 423.

Therefore, when the frame #n+1 as the input image is input to the mixture ratio calculator 423, the frame memory 421 supplies the frame #n to the mixture ratio calculator 423 and the frame memory 422 supplies the frame #n−1 to the mixture ratio calculator 423.

The mixture ratio calculator 423 calculates the estimated mixture ratio of the noticed pixels by using calculation shown in equation (21) on the basis of the pixel value C of the indicated pixel in the frame #n, the pixel value N of pixel in the frame #n+1 of which the spatial position corresponds to that of the indicated pixel, and on the basis of the pixel value P of pixel in the frame #n−1 of which the spatial position corresponds to that of the indicated pixel, and outputs the calculated estimated mixture ratio. For example, when the background is stationary, the mixture ratio calculator 423 calculates the estimated mixture ratio of the indicated pixel on the basis of the pixel value C of the indicated pixel in the frame #n, the pixel value N of pixel in the frame #n+1 of which the position is equal to that of the indicated pixel, and the pixel value P of pixel in the frame #n−1 of which the position is equal to that of the indicated pixel, and outputs the calculated estimated mixture ratio.

Like the above, the estimated mixture ratio processor 401 can calculate the estimated mixture ratio on the basis of the input image and supply it to the mixture ratio determining portion 403.

Further, since the estimated mixture ratio processor 402 has the same function as the estimated mixture ratio processor 401, except that the estimated mixture ratio processor 402 calculates the estimated mixture ratio of the indicated pixel by using calculation expressed by equation (22), on the contrary to the estimated mixture ratio processor 401 which calculates the estimated mixture ratio of the indicated pixel by using calculation expressed by equation (21), explanation thereof will be omitted.

Figure 79:
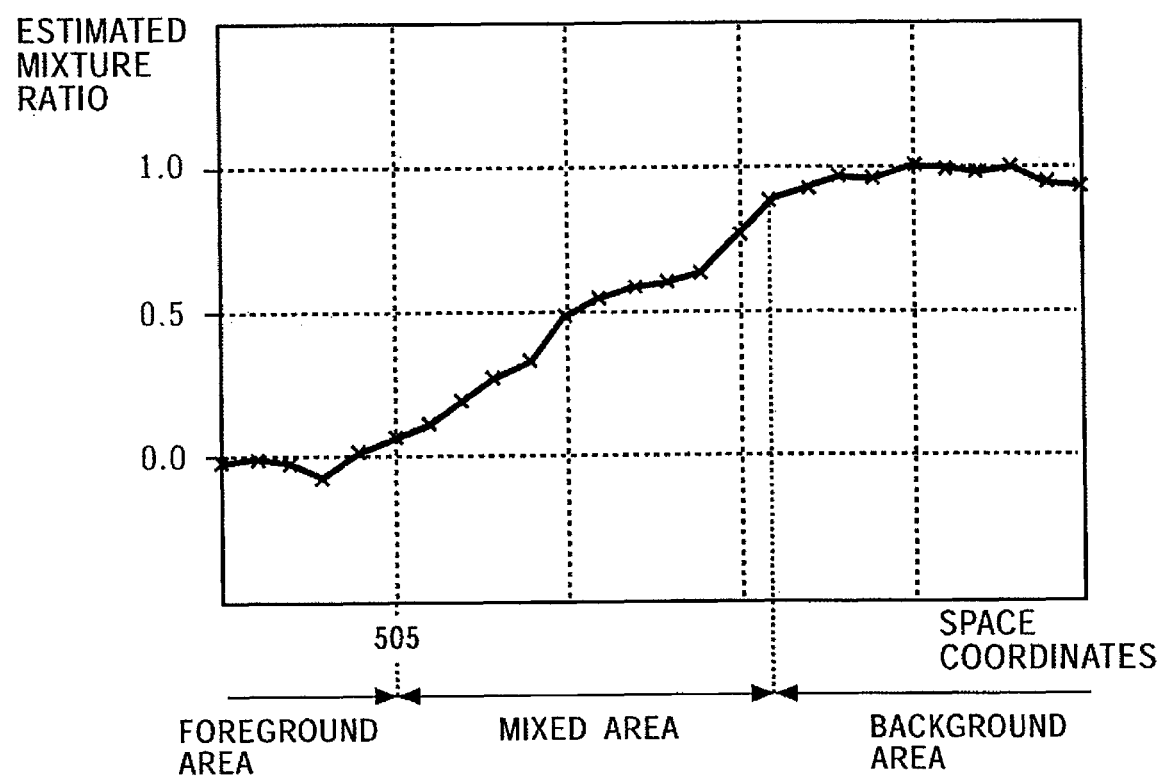
FIG. 79 is a diagram illustrating an example of an estimated mixture ratio.

FIG. 79 is a diagram illustrating an example of an estimated mixture ratio calculated by the estimated mixture ratio processor 401. The estimated mixture ratio shown in FIG. 79 indicates the result when the amount of movement v of the foreground corresponding to the object moving at uniform speed is 11, with respect to a line.

It can be known that the estimated mixture ratio is almost linearly varied, as shown in the mixed area of FIG. 73.

Returning to FIG. 72, the mixture ratio determining portion 403 sets the mixture ratio $\alpha$ on the basis of the area information supplied from the area specifying unit 103, indicating which of the foreground area, the background area, the covered background area and the uncovered background area, the pixel that is a target of calculation of the mixture ratio $\alpha$ belongs to. The mixture ratio determining portion 403 sets 0 to the mixture ratio $\alpha$ when the target pixel belongs to the foreground area, sets 1 to the mixture ratio $\alpha$ when the target pixel belongs to the background area, sets the estimated mixture ratio supplied from the estimated mixture ratio processor 401 to the mixture ratio $\alpha$ when the target pixel belongs to the covered background area, and sets the estimated mixture ratio supplied from the estimated mixture ratio processor 402, to the mixture ratio $\alpha$ when the target pixel belongs to the uncovered background area. The mixture ratio determining portion 403 outputs the mixture ratio $\alpha$ set on the basis of the area information.

Figure 80:
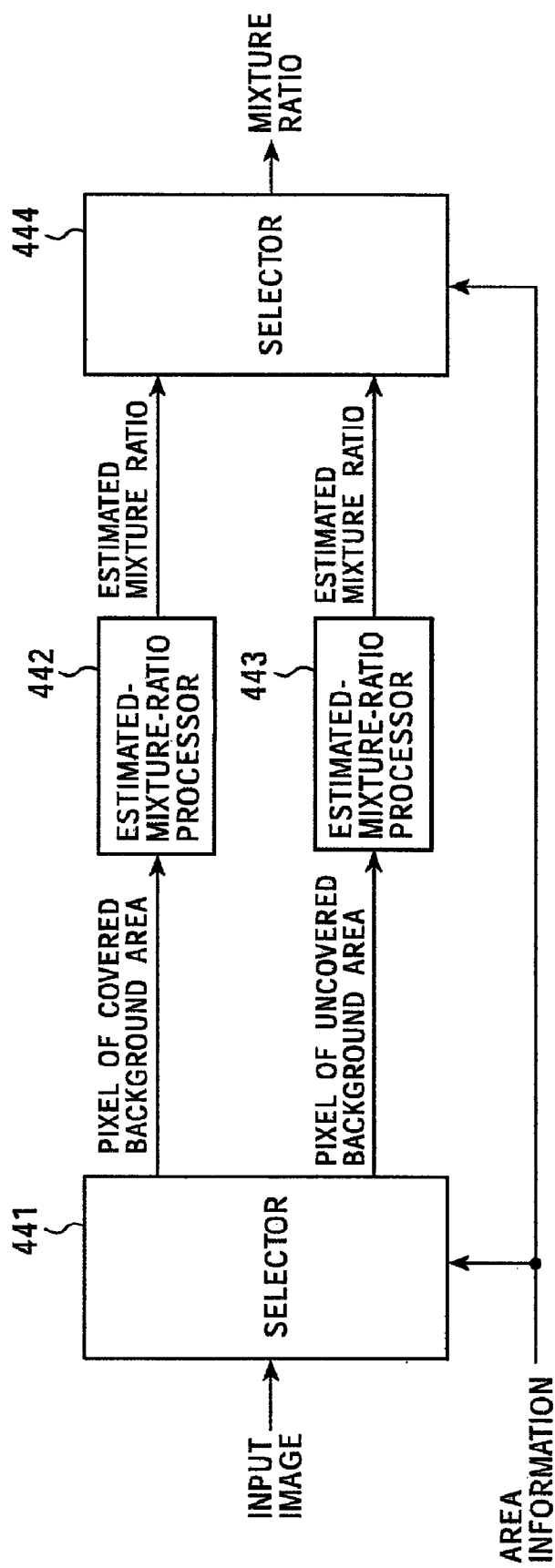
FIG. 80 is a block diagram illustrating another configuration of the mixture ratio calculator 104.

FIG. 80 is a block diagram illustrating another configuration of the mixture ratio calculator 104. The selector 441 supplies the pixels belonging to the covered background area and the pixels in the front and next frames corresponding to the pixels to the estimated mixture ratio processing portion 442 on the basis of the area information supplied from the area specifying unit 103. The selector 441 supplies the pixels belonging to the uncovered background area and the pixels in the front and next frames corresponding to the pixels to the estimated mixture ratio processor 443 on the basis of the area information supplied from the area specifying unit 103.

The estimated mixture ratio processor 442 calculates the estimated mixture ratio of the indicated pixel belonging to the covered background area by using calculation by equation (21) on the basis of the pixel value input from the selector 441, and supplies the calculated estimated mixture ratio to a selector 444.

The estimated mixture ratio processing portion 443 calculates the estimated mixture ratio of the indicated pixel belonging to the uncovered background area by using calculation by equation (22) on the basis of the pixel value input from the selector 441, and supplies the calculated estimated mixture ratio to a selector 444.

When the target pixel belongs to the foreground area, the selector 444 selects the estimated mixture ratio of 0 on the basis of the area information supplied from the area specifying unit 103, and sets it to the mixture ratio $\alpha$ and when the target pixel belongs to the background area, the selector 444 selects the estimated mixture ratio of 1 and sets it to the mixture ratio $\alpha$. When the target pixel belongs to the covered background area, the selector 444 selects the estimated mixture ratio supplied from the estimated mixture ratio processor 442 to set it to the mixture ratio $\alpha$. When the target pixel belongs to the uncovered background area, the selector 444 selects the estimated mixture ratio supplied from the estimated mixture ratio processor 443 to set it to the mixture ratio $\alpha$. The selector 444 outputs the mixture ratio $\alpha$ selected and set on the basis of the area information.

Like the above, the mixture ratio calculator 104 having another configuration shown in FIG. 80 can calculate the mixture ratio $\alpha$ for each pixel having an image and output the calculated mixture ratio $\alpha$.

Referring to a flowchart of FIG. 81, the mixture ratio $\alpha$ calculating process of the mixture ratio calculator 104 of which configuration is shown in FIG. 72 will be explained. In step S401, the mixture ratio calculator 104 obtains the area information supplied from the area specifying unit 103. In step S402, the estimated mixture ratio processor 401 performs the estimated mixture ratio calculating process by using a model corresponding to the covered background area and supplies the calculated estimated mixture ratio to the mixture ratio determining portion 403. Details of the estimated mixture ratio calculating process will be explained later referring to a flowchart of FIG. 82.

In step S403, the estimated mixture ratio processor 402 performs the estimated mixture ratio calculating process by using a model corresponding to the uncovered background area and supplies the calculated estimated mixture ratio to the mixture ratio determining portion 403.

In step S404, the mixture ratio calculator 104 determines whether the mixture ratios $\alpha$ are estimated for the whole frame or not, and if it is determined that the mixture ratios $\alpha$ are not estimated for the whole frames, the procedure returns to step S402 and performs processing of estimating the mixture ratio $\alpha$ for next pixel.

In step S404, if it is determined that the mixture ratio $\alpha$ is estimated for the whole frame, the procedure proceeds to step S405 and the mixture ratio determining portion 403 sets the mixture ratio $\alpha$ on the basis of the area information supplied from the area specifying unit 103, indicating which of the foreground area, the background area, the covered background area and the uncovered background area the pixel belongs to. The mixture ratio determining portion 403 sets 0 to the mixture ratio $\alpha$ when the target pixel belongs to the foreground area, sets 1 to the mixture ratio $\alpha$ when the target pixel belongs to the background area, sets the estimated mixture ratio supplied from the estimated mixture ratio processor 401 to the mixture ratio $\alpha$ when the target pixel belongs to the covered background area and sets the estimated mixture ratio supplied from the estimated mixture ratio processor 402 to the mixture ratio α when the target pixel belongs to the uncovered background area. Then, the process ends.

Like the above, the mixture ratio calculator 104 can calculate the mixture ratio α that is a feature amount corresponding to each pixel, on the basis of the area information supplied from the area specifying unit 103 and the input image.

Figure 81:
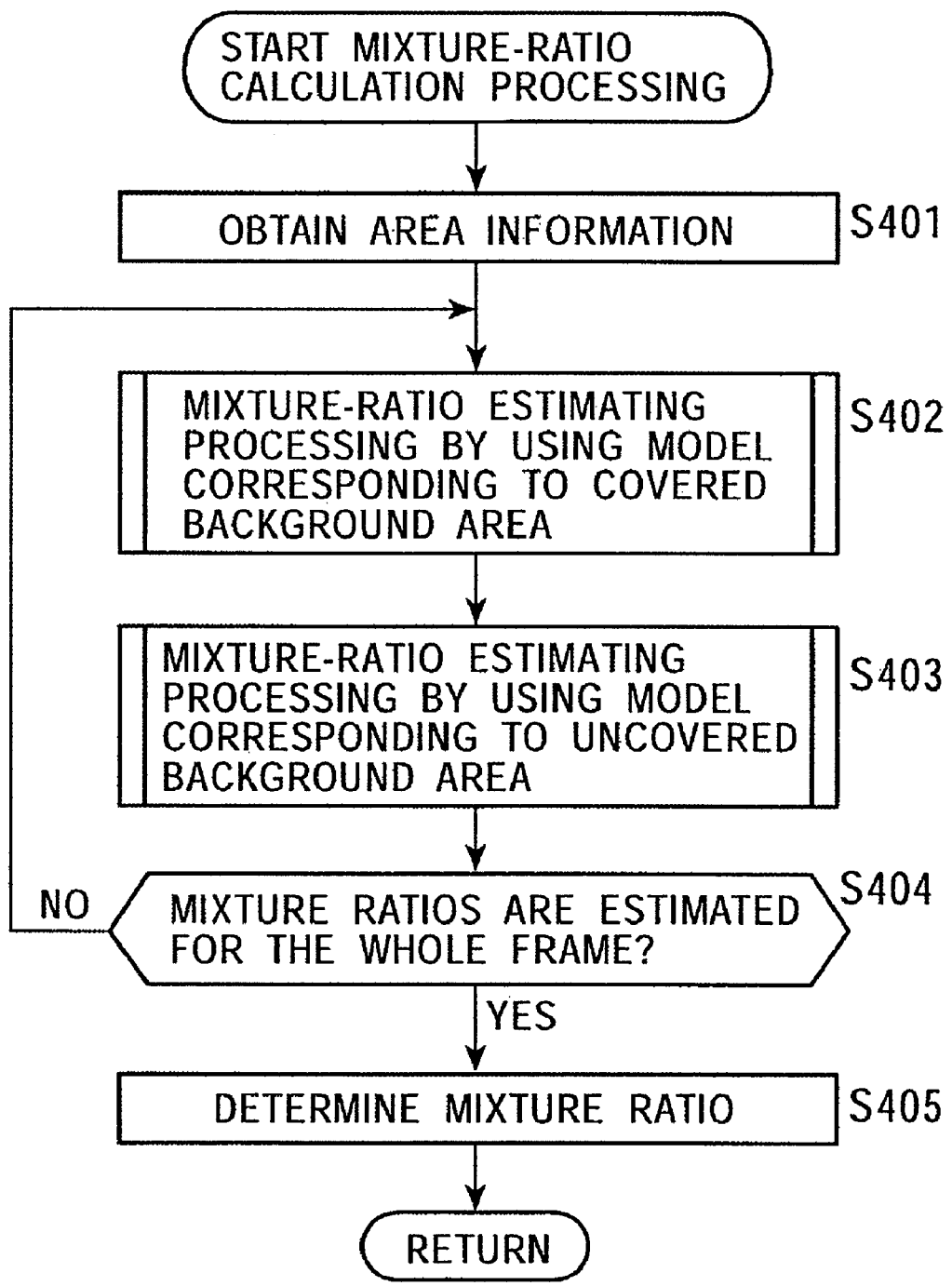
FIG. 81 is a flowchart illustrating a mixture ratio calculation processing.

The mixture ratio α calculation processing of the mixture ratio calculator 104 of which configuration is shown in FIG. 80 is similar to that explained in the flowchart of FIG. 81 and thus, the explanation thereof will be omitted.

Next, a process of estimating a mixture ratio by using a model corresponding to the covered background area, corresponding to step S402 in FIG. 81, will be explained referring to the flowchart of FIG. 82.

In step S421, the mixture ratio calculator 423 obtains the pixel value C of the indicated pixel in the frame #n from the frame memory 421.

In step S422, the mixture ratio calculator 423 obtains the pixel value P of pixel in the frame #n−1 corresponding to the indicated pixel from the frame memory 422.

In step S423, the mixture ratio calculator 423 obtains the pixel value N of pixel in the frame #n+1 corresponding to the indicated pixel included in the input image.

In step S424, the mixture ratio calculator 423 calculates the estimated mixture ratio on the basis of the pixel value C of the indicated pixel in the frame #n, the pixel value P of pixel in the frame #n−1 and the pixel value N of pixel in the frame #n+1.

In step S425, the mixture ratio calculator 423 determines whether the estimated mixture ratio calculation processing is finished for the whole frame or not and if it is determined that the estimated mixture ratio calculation processing is not finished for the whole frame, the procedure returns to step S421 and repeats the estimated mixture ratio calculation processing for next pixel.

In step S425, if it is determined that the estimated mixture ratio calculating processing is finished for the whole frame, the process ends.

Like this, the estimated mixture ratio processor 401 can calculate the estimated mixture ratio on the basis of the input image.

Figure 82:
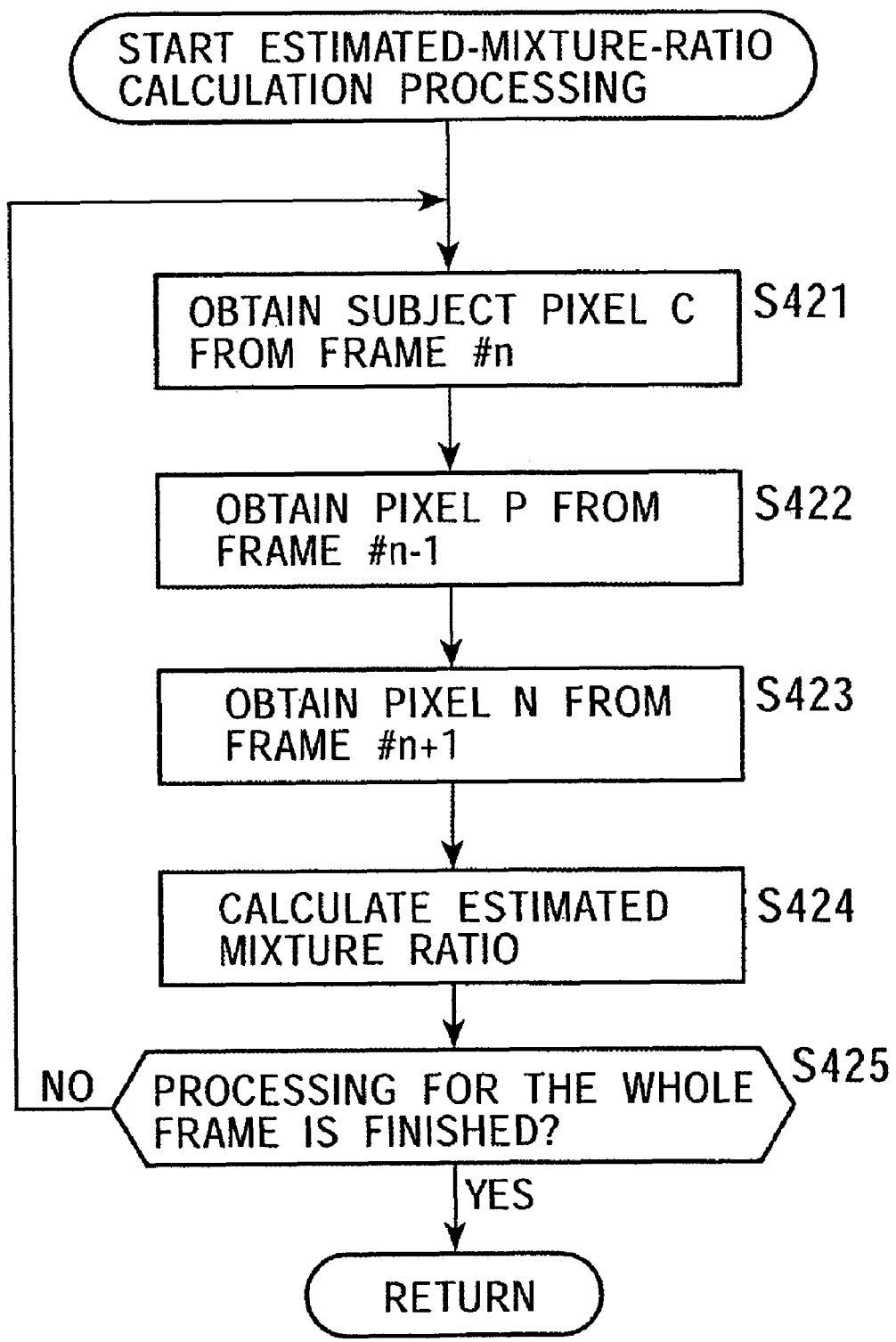
FIG. 82 is a flowchart illustrating an estimated mixture ratio calculation processing.

The mixture ratio estimating process by using a model corresponding to the uncovered background area in step S403 in FIG. 81 is similar to the process shown in the flowchart of FIG. 82, in which the both process use equation corresponding to the model of the uncovered background area and thus, explanation thereof will be omitted.

Further, since the estimated mixture ratio processor 442 and the estimated mixture ratio processor 443 shown in FIG. 80 perform the same processing as that in the flowchart of FIG. 82 to calculate the estimated mixture ratio, explanation thereof will be omitted.

Further, although it has been explained that the object corresponding to the background is stationary, even when the image corresponding to the background area includes motion, the mixture ratio α calculating process mentioned above can be applied. For example, when the image corresponding to the background area is constantly moving, the estimated mixture ratio processor 401 shifts the whole image according to motion of the background, and performs the same processing as in the case where the object corresponding to the background is stationary. Further, when the image corresponding to the background area includes local motion of other background, the estimated mixture ratio processor 401 selects the pixels corresponding to the motion of the background as the pixels corresponding to the pixels belonging to the mixed area, and performs the aforementioned process.

Further, the mixture ratio calculator 104 may perform the mixture ratio estimating processing for all the pixels by only using a model corresponding to the covered background area, and may output the calculated estimated mixture ratio as the mixture ratio α. In this case, the mixture ratio α means the ratio of the background components for the pixels belonging to the covered background area and the ratio of the foreground components for the pixels belonging to the uncovered background area. If the absolute value of the difference between the mixture ratio α is calculated like the above method and 1 for the pixels belonging to the uncovered background area and the calculated absolute value is set to the mixture ratio α, the separation server 11 can obtain the mixture ratio α indicating the ratio of the background components for the pixels belonging to the uncovered background area.

Further, similarly, the mixture ratio calculator 104 may perform only the mixture ratio estimating processing for all the pixels by using a model corresponding to the uncovered background area, and may output the calculated estimated mixture ratio as the mixture ratio α.

Next, the mixture ratio calculator 104 for calculating the mixture ratio α by using characteristics that the mixture ratio α is varied linearly will be explained.

As described above, since each of equation (11) and equation (12) includes two variables, the mixture ratio α cannot be obtained from these equations.

Therefore, equation approximating the mixture ratio α and sum f of the foreground components in the spatial direction is established by using characteristics that the mixture ratio α is varied linearly corresponding to the positional variation of pixels according to movement of the foreground object at a uniform speed for the shutter time. The equation approximating the mixture ratio α and sum f of the foreground components is solved by using the pixel value of pixel belonging to the mixed area and the pixel value of pixel belonging to the background area.

If variation of the mixture ratio α is linearly approximated, the mixture ratio α is expressed by equation (23).

$$\alpha = il + p \tag{23}$$

In this equation (23), i is an index in the spatial direction when the position of the indicated pixel is 0. l is slope of a linear line of the mixture ratio α. p is an intercept of the linear line of the mixture ratio α and is the mixture ratio α of the indicated pixel. In equation (23), the index i is known but the slope l and the intercept p are not known.

Figure 83:
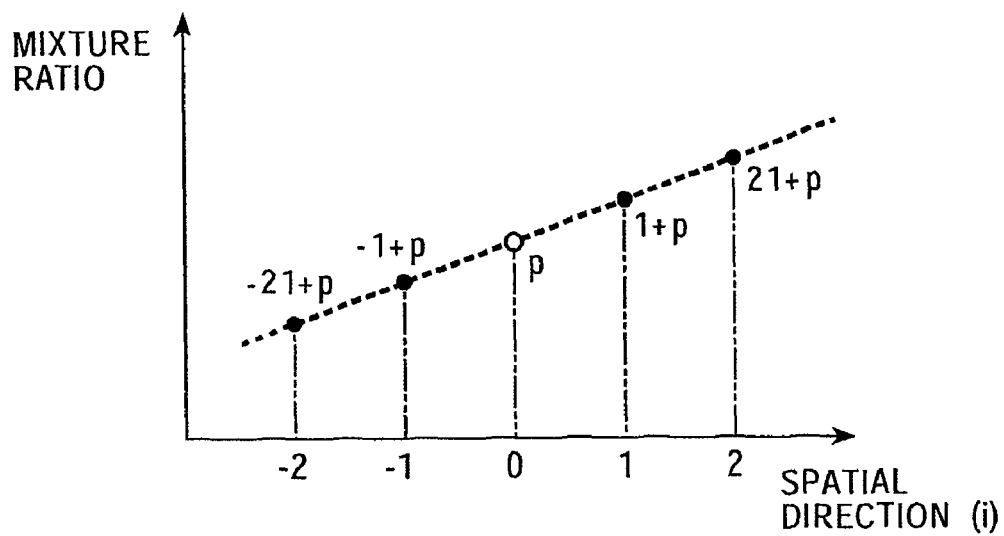
FIG. 83 is a diagram illustrating a linear line approximation of the mixture ratio α.

The relationship between index i, the slope l and the intercept p is shown in FIG. 83.

By approximating the mixture ratio α by equation (23), a plurality of different mixture ratios α for a plurality of pixels are expressed with two variables. In the example shown in FIG. 83, 5 mixture ratios for the five pixels are expressed with two variables of the slope i and the intercept p. Further, in FIG. 83, the indicated pixel is indicated by a white circle and the peripheral pixels are indicated by black circle.

Figure 84:
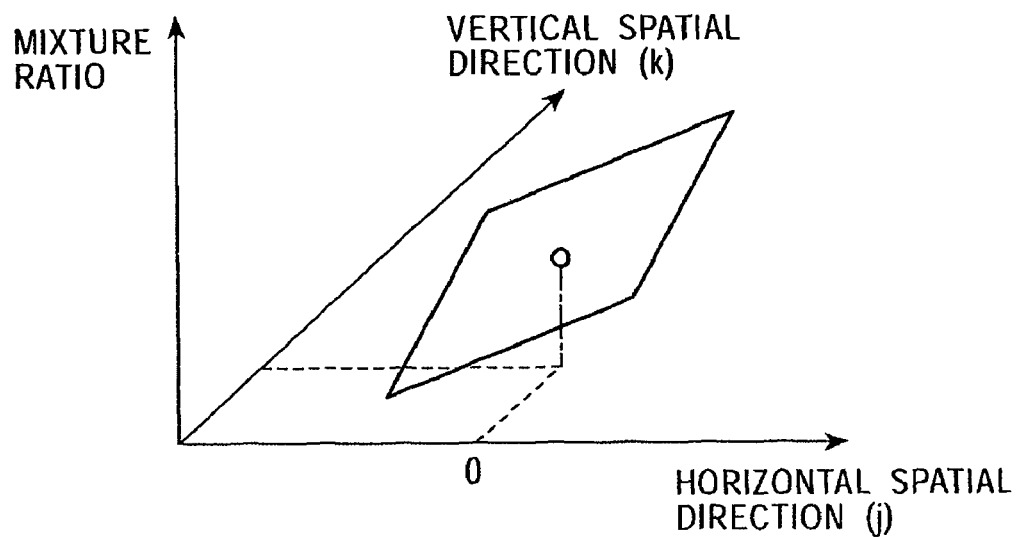
FIG. 84 is a diagram illustrating a plane approximation of the mixture ratio α.

If the mixture ratio α is approximated in a plane shown in FIG. 84, considering movement v corresponding to two directions, the horizontal direction and the vertical direction of the image, the equation (23) is extended into the plane and the mixture ratio α is expressed by equation (24). Further, in FIG. 84, the white circle indicates the indicated pixel.

$$\alpha = jm + kq + p \tag{24}$$

In equation (24), j is an index in the horizontal direction when the position of the indicated pixel is 0 and k is an index in the vertical direction. m is a slope of the mixture ratio α plane in the horizontal direction and q is a slope of the mixture ratio α plane in the vertical direction. p is an intercept of the mixture ratio α plane.

For example, in the frame #n shown in FIG. 74, equations (25) to (27) are established with respect to C05 to C07, respectively.

$$C05 = \alpha 05 \cdot B05/v + f05 \quad (25)$$

$$C06 = \alpha 06 \cdot B06/v + f06 \quad (26)$$

$$C07 = \alpha 07 \cdot B07/v + f07 \quad (27)$$

If the foreground components are equal in the neighborhood, that is, F01 to F03 are equal and F01 to F03 is replaced with Fc, equation (28) can be established.

$$f(x) = (1 - \alpha(x)) \cdot Fc \quad (28)$$

In equation (28), x expresses a position of the spatial direction.

If α (x) is replaced with equation (24), and equation (28) can be expressed by equation (29).

$$f(x) = (1 - (jm + kq + p)) \cdot Fc \quad (29)$$
$$= j \cdot (-m \cdot Fc) + k \cdot (-q \cdot Fc) + ((1 - p) \cdot Fc)$$
$$= js + kt + u$$

In equation (29), (−m·Fc), (−q·Fc) and (1−p)·Fc are replaced as shown in equations (30) to (32).

$$s = -m \cdot Fc \quad (30)$$

$$t = -q \cdot Fc \quad (31)$$

$$u = (1 - p) \cdot Fc \quad (32)$$

In equation (29), j is an index in the horizontal direction when position of the indicated pixel is 0 and k is an index in the vertical direction.

Like the above, since it is supposed that the object corresponding to the foreground is moving at a uniform speed for the shutter time and the components corresponding to the foreground are constant in the neighborhood, the sum of the foreground components is approximated by equation (29).

Further, when the mixture ratio α is approximated by a linear line, the sum of the foreground components can be expressed by equation (33).

$$f(x) = is + u \quad (33)$$

If substituting the mixture ratio α in equation (13) and the sum of the foreground components in equation (24) and equation (29), the pixel value M is expressed by equation (34).

$$M = (jm + kq + p) \cdot B + js + kt + u \quad (34)$$
$$= jB \cdot m + kB \cdot q + B \cdot p + j \cdot s + k \cdot t + u$$

In equation (34), the six unknown variables are the slope m of the mixture ratio α plane in the horizontal direction, the slope q of the mixture ratio α plane in the vertical direction and the intercepts p, s, t and u of the mixture ratio α plane.

The pixel value M or the pixel value B is substituted in a normal equation shown in equation (34) corresponding to pixels in the neighborhood of the indicated pixel and a plurality of normal equations in which the pixel value M or the pixel value B is substituted are solved by the least square method to calculate the mixture ratio α.

For example, if the index j of the indicated pixel in the horizontal direction is 0, the index k in the vertical direction is 0 and the pixel value M or the pixel value B is substituted in the normal equation shown in equation (34) for 3×3 pixels adjacent to the indicated pixel, equations (35) to (43) are obtained.

$$M_{-1,-1} = (-1) \cdot B_{-1,-1} \cdot m + (-1) \cdot B_{-1,-1} \cdot q + B_{-1,-1} \cdot p + (-1) \cdot s + (-1) \cdot t + u \quad (35)$$

$$M_{0,-1} = (0) \cdot B_{0,-1} \cdot m + (-1) \cdot B_{0,-1} \cdot q + B_{0,-1} \cdot p + (-1) \cdot t + u \quad (36)$$

$$M_{+1,-1} = (-1) \cdot B_{+1,-1} \cdot m + (-1) \cdot B_{+1,-1} \cdot q + B_{-1,-1} \cdot p + (+1) \cdot s + (-1) \cdot t + u \quad (37)$$

$$M_{-1,0} = (-1) \cdot B_{-1,0} \cdot m + (0) \cdot B_{-1,0} \cdot q + B_{-1,0} \cdot p + (-1) \cdot s + (0) \cdot t + u \quad (38)$$

$$M_{0,0} = (0) \cdot B_{0,0} \cdot m + (0) \cdot B_{0,0} \cdot q + B_{0,0} \cdot p + (0) \cdot s + (0) \cdot t + u \quad (39)$$

$$M_{+1,0} = (+1) \cdot B_{-1,0} \cdot m + (0) \cdot B_{+1,0} \cdot q + B_{+1,0} \cdot p + (+1) \cdot s + (0) \cdot t + u \quad (40)$$

$$M_{-1,+1} = (-1) \cdot B_{-1,+1} \cdot m + (+1) \cdot B_{-1,+1} \cdot p + (-1) \cdot s + (+1) \cdot +u \quad (41)$$

$$M_{0,+1} = (0) \cdot B_{0,+1} \cdot m + (+1) \cdot B_{0,+1} \cdot q + B_{0,+1} \cdot p + (0) \cdot s + (+1) \cdot t + u \quad (42)$$

$$M_{+1,+1} = (+1) \cdot B_{+1,+1} \cdot m + (+1) \cdot B_{+1,+1} \cdot q + B_{+1,+1} \cdot p + (+1) \cdot s + (+1) \cdot t + u \quad (43)$$

Since the index j of the indicated pixel in the horizontal direction is 0 and the index k in the vertical direction is 0, the mixture ratio α of the indicated pixel is equal to the value when j=0 and k=0 in equation (24), that is, the intercept p.

Therefore, each value of the slope m in the horizontal direction, the slope q in the vertical direction and the intercepts p, s, t and u is calculated by using the least square method on the basis the nine equations (35) to (43) and then, the intercept p is output as the mixture ratio α.

Next, a more specific procedure for calculating the mixture ratio α by using the least square method will be explained.

If the index i and the index k are expressed by one index x, the relationship of the index i, the index k and the index x is expressed by equation (44).

$$x = (j+1) \cdot 3 + (k+1) \quad (44)$$

The slope m in the horizontal direction, the slope q in the vertical direction and the intercepts p, s, t, and u are expressed as variables w0, w1, w2, w3, w4 and w5, respectively and jB, kB, B, j, k and l are expressed as a0, a1, a2, a3, a4 and a5, respectively. Considering error ex, equations (35) to (43) can be rewritten as equation (45).

$$M_x = \sum_{y=0}^{5} a_y \cdot w_y + e_x \quad (45)$$

In equation (45), x is a value from integers 0 to 8.
Equation (46) can be derived from the equation (45).

$$e_x = M_x - \sum_{y=0}^{5} a_y \cdot w_y \quad (46)$$

Here, in order to use the least square method, the sum of squares of errors E is defined as shown by equation (47).

$$E = \sum_{x=0}^{8} e_x^2 \quad (47)$$

In order to minimize error, the partial differential of variable Wv and the sum of squares of errors E should be 0. Here, v is one of integers 0 to 5. Therefore, wy is obtained to satisfy equation (48).

$$\frac{\partial E}{\partial w_v} = 2 \cdot \sum_{x=0}^{8} e_x \cdot \frac{\partial e_x}{\partial w_v} \quad (48)$$

$$= 2 \cdot \sum_{x=0}^{8} e_x \cdot a_v = 0$$

If equation (46) is substituted in equation (48), equation (49) is obtained.

$$\sum_{x=0}^{8} \left( a_v \cdot \sum_{y=0}^{5} a_y \cdot w_y \right) = \sum_{x=0}^{8} a_v \cdot M_x \quad (49)$$

By applying, for example, sweeping-out method such as Gauss-Jordan elimination method, to six equations obtained by substituting one of integers 0 to 5 in v of equation (49), wy is calculated. As described above, w0 is the slope m in the horizontal direction, w1 is the slope in the vertical direction, w2 is the intercept p, w3 is s, w4 is t and w5 is u.

As described above, by applying the least square method to equations in which the pixel value M and the pixel value B are substituted, the slope m in the horizontal direction, the slope q in the vertical direction and the intercepts p, s, t and u can be obtained.

In explanation of equations (35) to (43), the pixel value of pixel included in the mixed area is explained as M and the pixel value of pixel included in the background area is explained as B. However, it is necessary that normal equations be established for each case that the indicated pixel is included in the covered background area or in the uncovered background area.

For example, when the mixture ratios α of pixels included in the covered background area in the frame #n as shown in FIG. 74 are obtained, the pixel values C04 to C08 of pixels in the frame #n and the pixel values P04 to P08 of pixels in the frame #n−1 are substituted in the normal equations.

When the mixture ratios α of pixels included in the uncovered background area in the frame #n as shown in FIG. 75 are obtained, the pixel values C28 to C32 of pixels in the frame #n and the pixel values N28 to N32 of pixels in the frame #n+1 are substituted in the normal equations.

Figure 85:
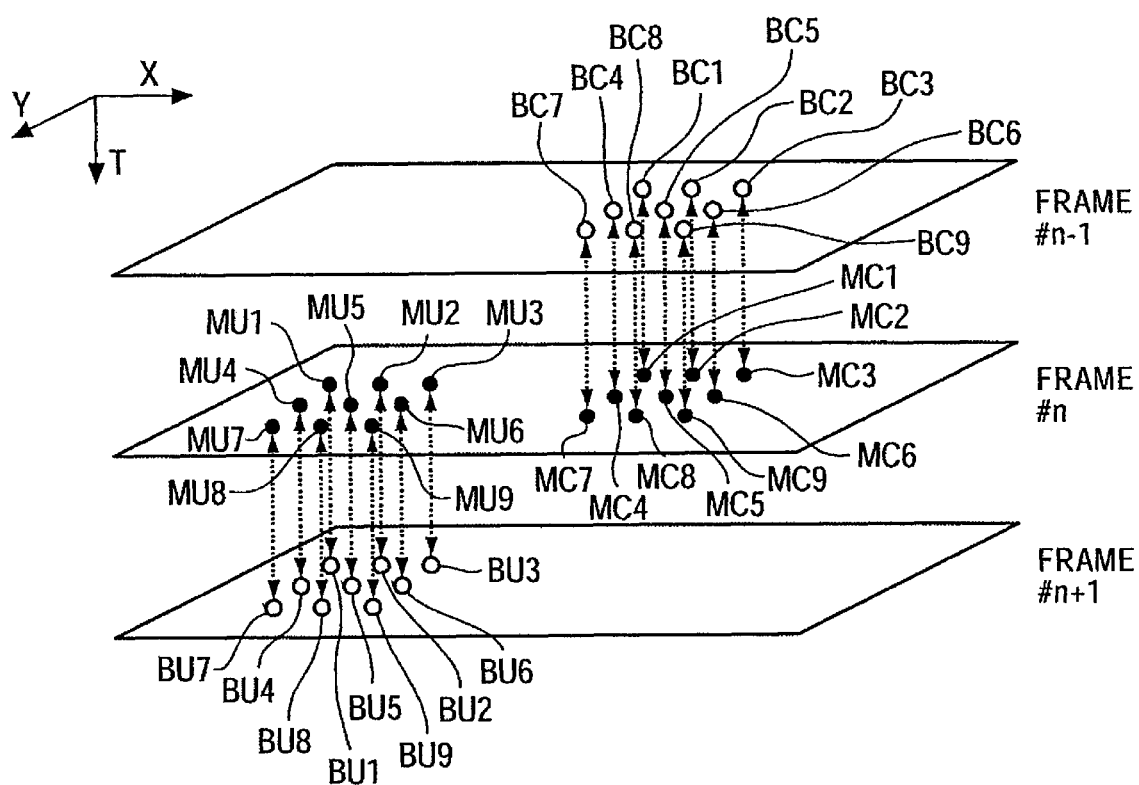
FIG. 85 is a diagram illustrating correspondence of pixels in a plurality frames when the mixture ratio α is calculated.

Further, for example, when the mixture ratios α of pixels included in the covered background area in the frame #n as shown in FIG. 85 are calculated, equations (50) to (58) can be established. The pixel value of pixel of which the mixture ratio α is calculated is Mc5. Further, in FIG. 85, white circles indicate the pixels in the background and black circles indicate the pixels in the mixed area, respectively.

$$Mc1 = (-1) \cdot Bc1 \cdot m + (-1) \cdot Bc1 \cdot q + Bc1 \cdot p + (-1) \cdot s + (-1) \cdot t + u \quad (50)$$

$$Mc2 = (0) \cdot Bc2 \cdot m + (-1) \cdot Bc2 \cdot q + Bc2 \cdot p + (0) \cdot s + (-1) \cdot t + u \quad (51)$$

$$Mc3 = (+1) \cdot Bc3 \cdot m + (-1) \cdot Bc3 \cdot q + Bc3 \cdot p + (+1) \cdot s + (-1) \cdot t + u \quad (52)$$

$$Mc4 = (-1) \cdot Bc4 \cdot m + (0) \cdot Bc4 \cdot q + Bc4 \cdot p + (-1) \cdot s + (0) \cdot t + u \quad (53)$$

$$Mc5 = (0) \cdot Bc5 \cdot m + (0) \cdot Bc5 \cdot q + Bc5 \cdot p + (0) \cdot s + (0) \cdot t + u \quad (54)$$

$$Mc6 = (+1) \cdot Bc6 \cdot m + (0) \cdot Bc6 \cdot q + Bc6 \cdot p + (+1) \cdot s + (0) \cdot t + u \quad (55)$$

$$Mc7 = (-1) \cdot Bc7 \cdot m + (+1) \cdot Bc7 \cdot q + Bc7 \cdot p + (-1) \cdot s + (+1) \cdot t + u \quad (56)$$

$$Mc8 = (0) \cdot Bc8 \cdot m + (+1) \cdot Bc8 \cdot q + Bc8 \cdot p + (0) \cdot s + (+1) \cdot t + u \quad (57)$$

$$Mc9 = (+1) \cdot Bc9 \cdot m + (+1) \cdot Bc9 \cdot q + Bc9 \cdot p + (+1) \cdot s + (+1) \cdot t + u \quad (58)$$

When the mixture ratios α of pixels included in the covered background area in the frame #n are calculated, the pixel values Bc1 to Bc9 of pixels of the background area in the frame #n−1 corresponding to the pixels in the frame #n are used in equations (50) to (58).

When the mixture ratios α of pixels included in the uncovered background shown in FIG. 85 are calculated, equations (59) to (67) can be established. The pixel value of pixel of which the mixture ratio α is calculated is Mu5.

$$Mu1 = (-1) \cdot Bu1 \cdot m + (-1) \cdot Bu1 \cdot q + Bu1 \cdot p + (-1) \cdot s + (-1) \cdot t + u \quad (59)$$

$$Mu2 = (0) \cdot Bu2 \cdot m + (-1) \cdot Bu2 \cdot q + Bu2 \cdot p + (0) \cdot s + (-1) \cdot t + u \quad (60)$$

$$Mu3 = (+1) \cdot Bu3 \cdot m + (-1) \cdot Bu3 \cdot q + Bu3 \cdot p + (+1) \cdot s + (-1) \cdot t + u \quad (61)$$

$$Mu4 = (-1) \cdot Bu4 \cdot m + (0) \cdot Bu4 \cdot q + Bu4 \cdot p + (-1) \cdot s + (0) \cdot t + u \quad (62)$$

$$Mu5 = (0) \cdot Bu5 \cdot m + (0) \cdot Bu5 \cdot q + Bu5 \cdot p + (0) \cdot s + (0) \cdot t + u \quad (63)$$

$$Mu6 = (+1) \cdot Bu6 \cdot m + (0) \cdot Bu6 \cdot q + Bu6 \cdot p + (+1) \cdot s + (0) \cdot t + u \quad (64)$$

$$Mu7 = (-1) \cdot Bu7 \cdot m + (+1) \cdot Bu7 \cdot q + Bu7 \cdot p + (-1) \cdot s + (+1) \cdot t + u \quad (65)$$

$$Mu8 = (0) \cdot Bu8 \cdot m + (+1) \cdot Bu8 \cdot q + Bu8 \cdot p + (0) \cdot s + (+1) \cdot t + u \quad (66)$$

$$Mu9 = (+1) \cdot Bu9 \cdot m + (+1) \cdot Bu9 \cdot q + Bu9 \cdot p + (+1) \cdot s + (+1) \cdot t + u \quad (67)$$

When the mixture ratios α of pixels included in the uncovered background area in the frame #n are calculated, the pixel values Bu1 to Bu9 of pixels of the background area in the frame #n+1 corresponding to the pixels in the frame #n are used in equations (59) to (67).

Figure 86:
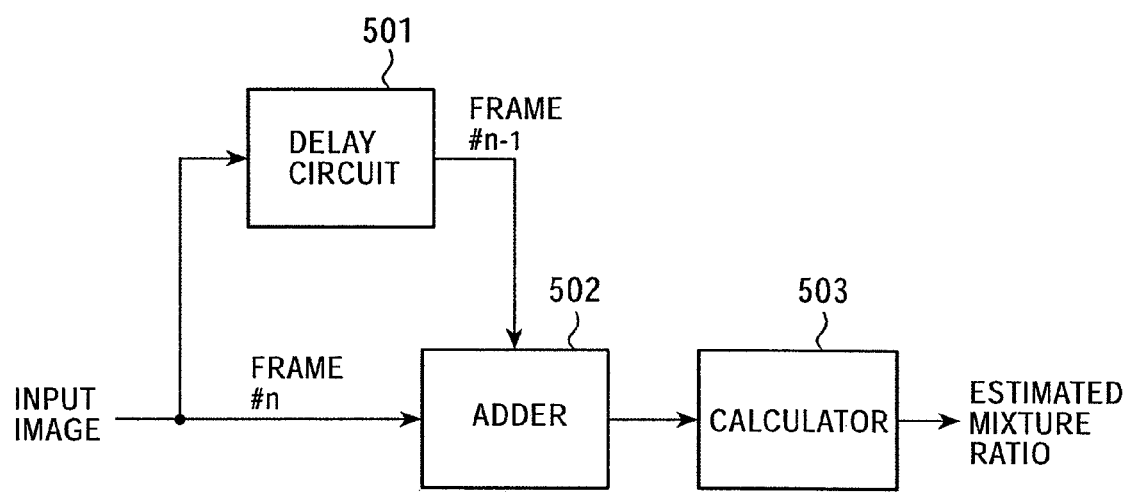
FIG. 86 is a block diagram illustrating another configuration of the mixture ratio estimating processor 401.

FIG. 86 is a block diagram illustrating configuration of the estimated mixture ratio processor 401. The image input to the estimated mixture ratio processor 401 is supplied to a delay circuit 501 and an adder 502.

The delay circuit 501 delays the input image by one, frame and supplies it to the adder 502. When the frame #n is input to the adder 502 as the input image, the delay circuit 501 supplies the frame #n−1 to the adder 502.

The adder 502 sets the pixel values of pixels adjacent to pixel of which the mixture ratio α is calculated and the pixel values in the frame #n−1 in the normal equations. For example, the adder 502 sets the pixel values Mc1 to Mc9 and the pixel values Bc1 to Bc9 in the normal equations on the basis of equations (50) to (58). The adder 502 supplies the normal equations in which the pixel values are set to the calculator 503.

The calculator 503 solves the normal equations supplied from the adder 502 by using the elimination method, etc. to obtain the estimated mixture ratio and outputs the obtained estimated mixture ratio.

Like the above, the estimated mixture ratio processor 401 can calculate the estimated mixture ratio on the basis of the input image and supply it to the mixture ratio determining portion 403.

Further, since the estimated mixture ratio processor 402 has the configuration similar to that of the estimated mixture ratio processor 401, explanation thereof will be omitted.

Figure 87:
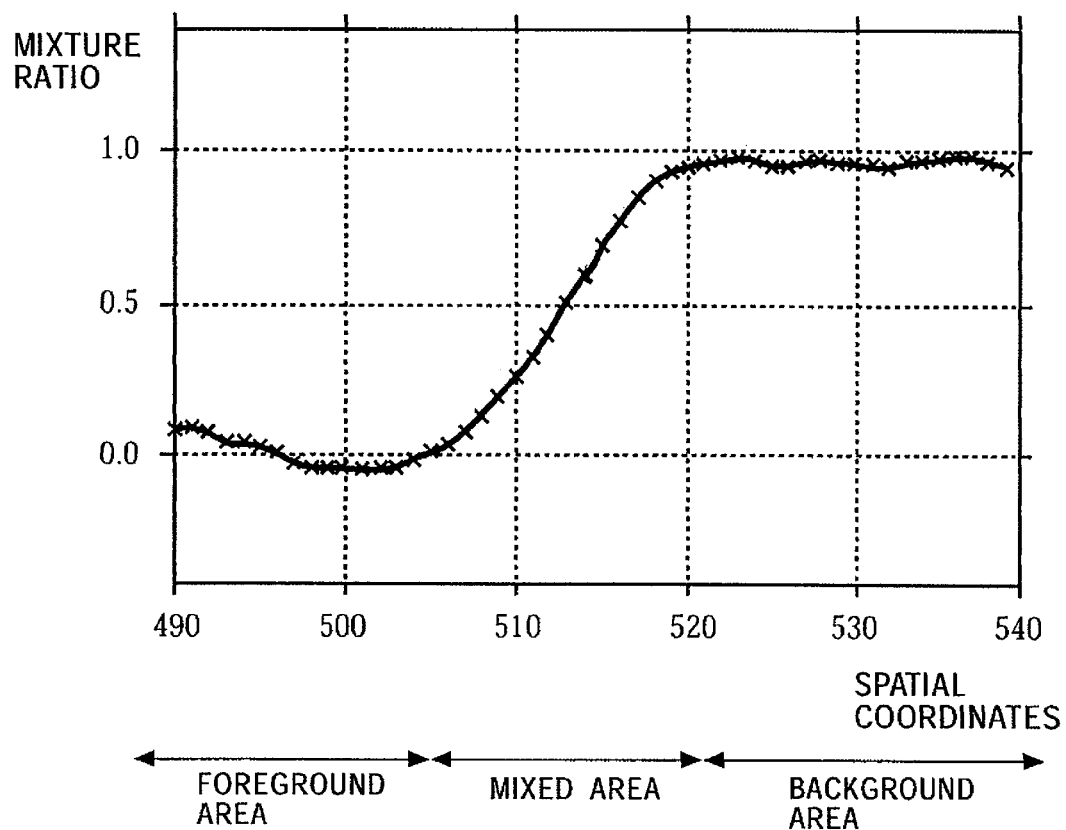
FIG. 87 is a diagram illustrating an example of an estimated mixture ratio.

FIG. 87 shows an example of the estimated mixture ratio calculated by the estimated mixture ratio processor 401. The estimated mixture ratio shown in FIG. 87 expresses the result calculated from equations generated in a unit of 7×7 pixels with respect to one line when the amount of movement v of the foreground corresponding to the object moving at a uniform speed is 11.

It can be known that the estimated mixture ratio is varied almost linearly in the mixed area as shown in FIG. 86.

Next, the mixture ratio estimating processing of the estimated mixture ratio processor 401 of which configuration is shown in FIG. 86 by using a model corresponding to the covered background area will be explained referring to FIG. 88.

In step S521, the adder 502 sets the pixel values included in the input image and the pixel values included in the image supplied from the delay circuit 501 in the normal equations corresponding to the model of the covered background area.

In step S522, the estimated mixture ratio processor 401 determines whether setting for the target pixels is finished or not and if it is determined that the setting for the target pixels is not finished, the procedure returns to step S521 and repeats the setting processing of the pixel values in the normal equations.

In step S522, if it is determined that the setting the pixel value for the target pixels is finished, the procedure proceeds to step S523 and the calculator 173 calculates the estimated mixture ratio on the basis of the normal equations in which the pixel values are set and outputs the obtained estimated mixture ratio.

Like the above, the estimated mixture ratio processor 401 of which configuration is shown in FIG. 86 can calculate the estimated mixture ratio on the basis of the input image.

Figure 88:
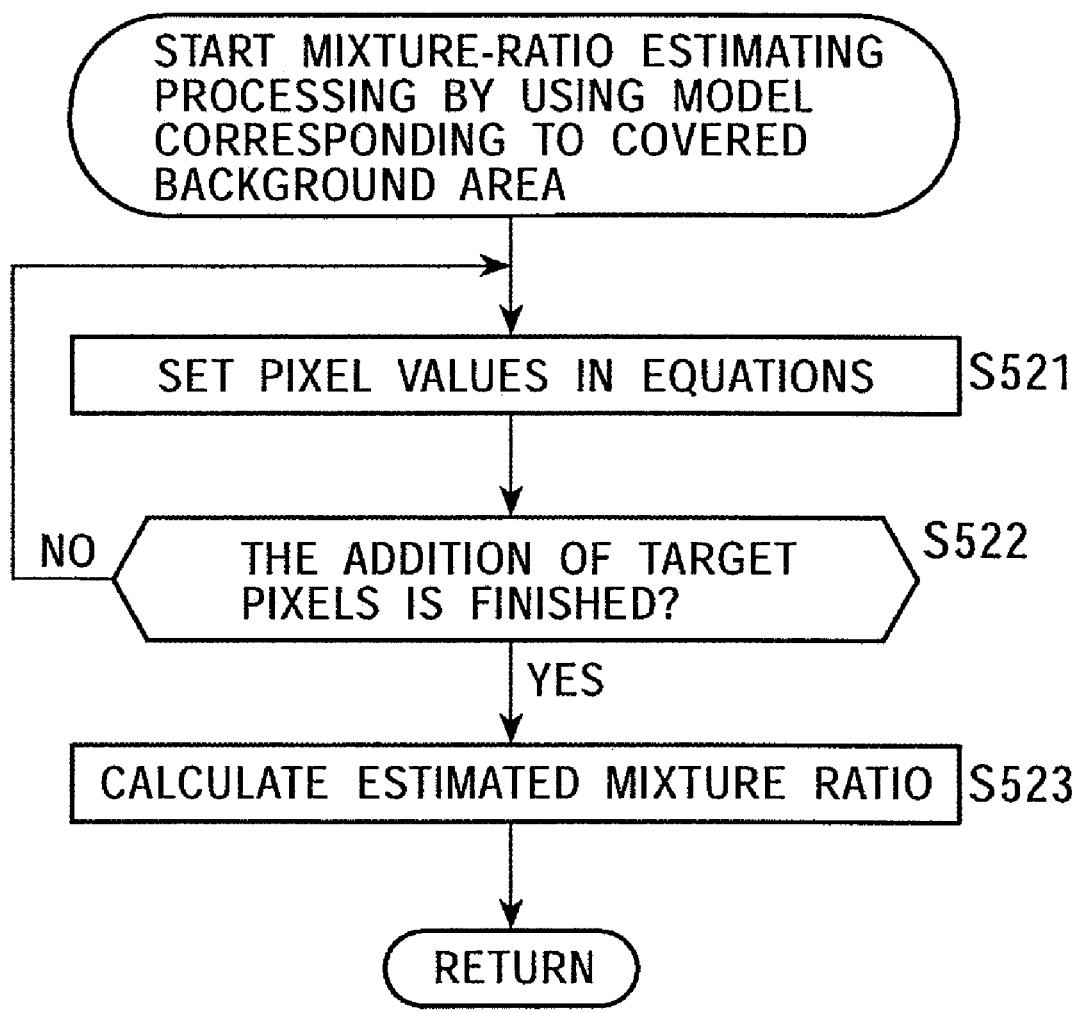
FIG. 88 is a flowchart illustrating the mixture ratio estimation processing by using a model corresponding to a covered background area.

The mixture ratio estimating process using the model corresponding to the uncovered background area is similar to the process using the normal equations corresponding to the model of the uncovered background area shown in a flowchart of FIG. 88 and thus, explanation thereof will be omitted.

Further, although it has been explained that the object corresponding to the background is stationary, even when the image corresponding to the background area includes movement, the aforementioned mixture ratio obtaining processing can be applied. For example, when the image corresponding to the background is moving constantly, the estimated mixture ratio processor 401 shifts the whole image according to the movements and then, processes similarly to the case that the object corresponding to the background is stationary. Further, when the image corresponding to the background area includes other local movements, the estimated mixture ratio processing portion 401 selects the pixels corresponding to the movements as the pixels corresponding to pixels belonging to the mixed area and then, performs the aforementioned processing.

Like the above, the mixture ratio calculator 102 can calculate the mixture ratio α that is a feature amount corresponding to each pixel on the basis of the area information supplied from the area specifying unit 101 and the input image.

By using the mixture ratio α, while the information of motion blur included in the image corresponding to the moving object is left, it is possible to separate the foreground components and the background components included in the pixel values.

Further, if an image is synthesized on the basis of the mixture ratio α, it is possible to generate image including the corrected motion blur adapted to the speed of the object moving to correspond to the images in the real world.

Figure 89:
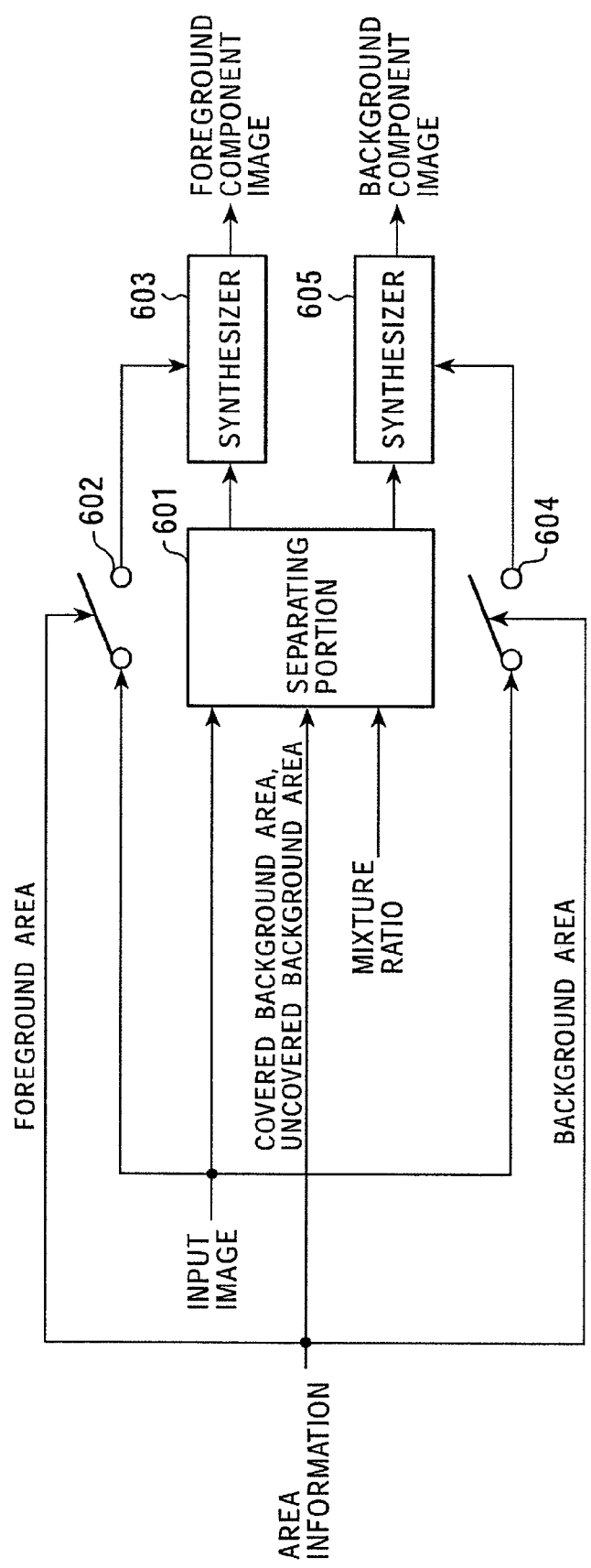
FIG. 89 is a block diagram illustrating an example of a configuration of a foreground/background separator 105.

Next, the foreground/background separator 105 will be explained. FIG. 89 is a block diagram illustrating an example of a configuration of the foreground/background separator 105. The input image supplied to the foreground/background separator 105 is supplied to a separating portion 601, the switch 602 and the switch 604. The area information indicating the covered background area and the area information indicating the uncovered background area supplied from the area specifying unit 103, are supplied to the separating portion 601. The area information indicating the foreground area is supplied to the switch 602. The area information indicating the background area is supplied to the switch 604.

The mixture ratio α supplied from the mixture ratio calculator 104 is supplied to the separating portion 601.

The separating portion 601 separates the foreground components from the input image to supply the separated foreground components to the synthesizer 603 and separates the background components from the input image to supply the separated background components to the synthesizer 605, on the basis of the area information indicating the covered background area, the area information indicating the uncovered background area and the mixture ratio α.

When the pixels corresponding to the foreground are input, the switch 602 is closed and supplies only the pixels corresponding to the foreground included in the input image to the synthesizer 603, on the basis of the area information indicating the foreground area.

When the pixels corresponding to the background are input, the switch 604 is closed and supplies only the pixels corresponding to the background included in the input image to the synthesizer 605, on the basis of the area information indicating the background area.

The synthesizer 603 synthesizes the foreground component image on the basis of the foreground components supplied from the separating portion 601 and the pixels corresponding to the foreground supplied from the switch 602, and outputs the synthesized foreground component image. Since the foreground area and the background area are not overlapped, the synthesizer 603 applies, for example, logical sum operation to the foreground components and the pixels corresponding to the foreground to synthesize the foreground component image.

In initial process to be first performed in the process of synthesizing the foreground component image, the synthesizer 603 stores the image of which all the pixels in the built-in frame memory are 0, and in the process of synthesizing the foreground component image, the synthesizer 603 stores (overwrites) the foreground component image. Therefore, 0 is stored as the pixel values in the pixels corresponding to the background area and in the foreground component images supplied from the synthesizer 603.

The synthesizer 605 synthesizes the background component image on the basis of the background components supplied from the separating portion 601 and the pixels corresponding to the background supplied from, the switch 604, and outputs the synthesized background component image. Since the background area and the mixed area are not overlapped, the synthesizer 605 applies, for example, logical sum operation to the background components and the pixels corresponding to the background to synthesize the background component image.

In initial process to be first performed in the process of synthesizing the background component image, the synthesizer 605 stores the image of which all the pixels in the built-in frame memory are 0, and in the process of synthesizing the background component image, the synthesizer 605 stores (overwrites) the background component image. Therefore, 0 is stored as the pixel values in the pixels corresponding to the foreground area and in the background component images supplied from the synthesizer 605.

Figure 90B:
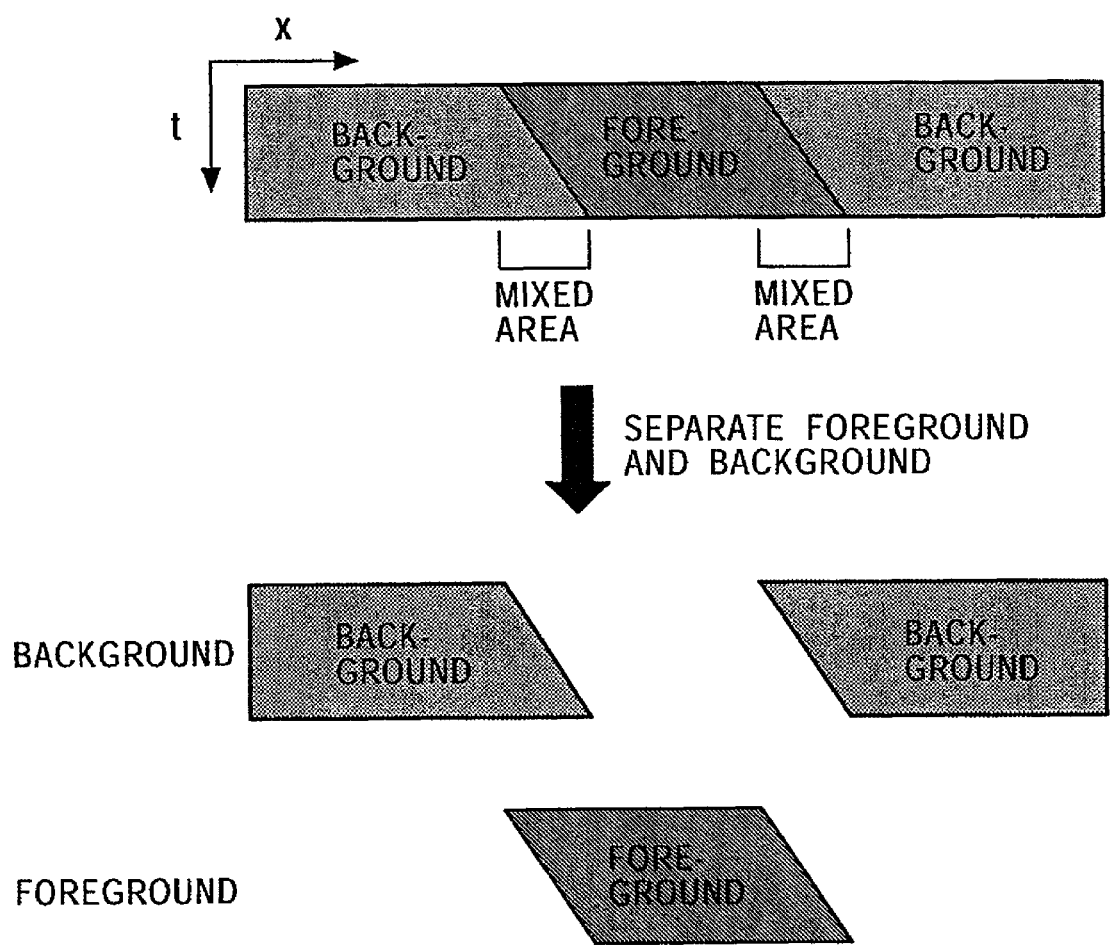
FIG. 90B is a diagram showing an input image, a foreground component image and a background component image.

FIGS. 90A and 90B show the input image input to the foreground/background separator 105 and the foreground component image and background component image output from the foreground/background separator 105.

FIG. 90A shows a typical diagram of an image to be displayed, and FIG. 90B shows a model diagram in which the pixels in one line including pixels belonging to the foreground area, pixels belonging to the background area and pixels belonging to the mixed area corresponding to FIG. 90A are expanded in the time direction.

As shown in FIGS. 90A and 90B, the background component image output from the foreground/background separator 105 comprise the pixels belonging to the background area and the background components included in the pixels in the mixed area.

As shown in FIGS. 90A and 90B, the foreground component image output from the foreground/background separator 105 comprise the pixels belonging to the foreground area and the foreground components included in the pixels in the mixed area.

The pixel values of pixels in the mixed area are separated into the background components and the foreground components by the foreground/background separator 105. The separated background components constitute the background component image along with the pixels belonging to the background area. The separated foreground components constitute the foreground component image along with the pixels belonging to the foreground area.

Like the above, in the foreground component image, the pixel values of pixels corresponding to the background area are 0, and significant pixel values are set to the pixels corresponding to the foreground area and the pixels corresponding to the mixed area. Similarly, in the background component image, the pixel values of pixels corresponding to the foreground area are 0, and significant pixel values are set to the pixels corresponding to the background area and the pixels corresponding to the mixed area.

Next, a process of separating the foreground components and the background components from the pixels belonging to the mixed area, to be performed by the separating portion 601 will be explained.

Figure 91:
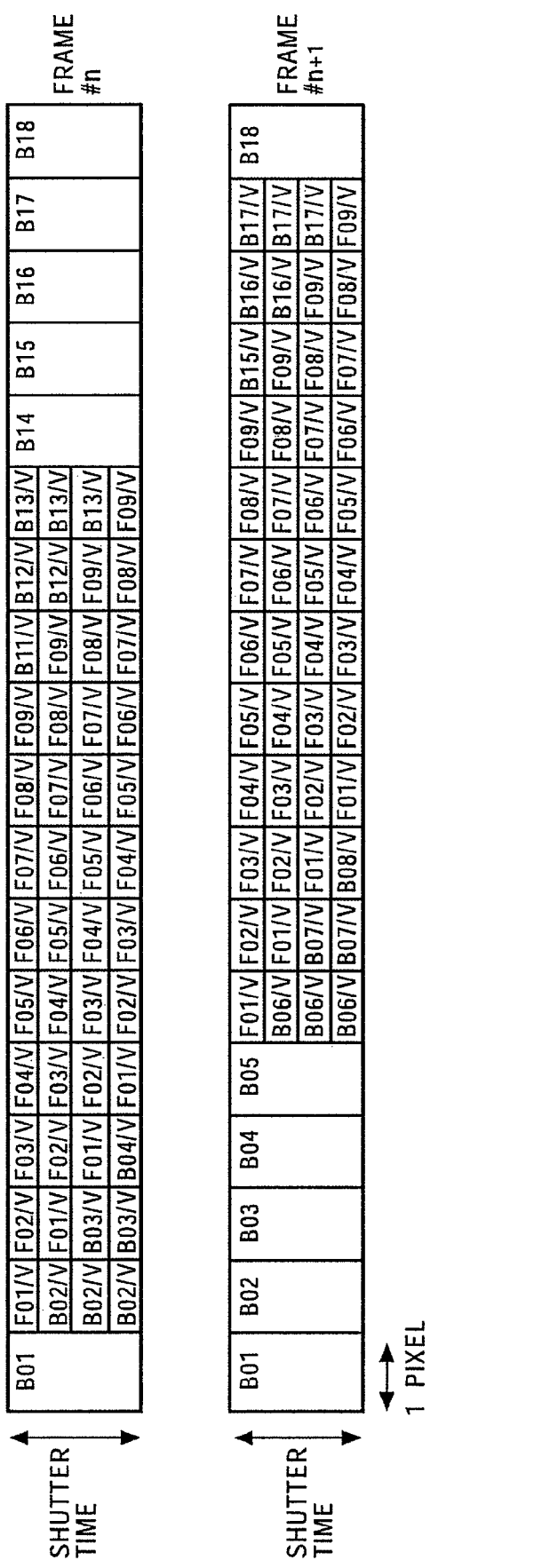
FIG. 91 is a modeling diagram in which pixel values are expanded in the time direction and shutter time which is divided into a time interval.

FIG. 91 is a model diagram of an image including the foreground corresponding to an object moving from the left to right in the drawing and indicating the foreground components and the background components in two frames. In the model of image shown in FIG. 91, the amount of movement v of the foreground is defined as 4 and the virtual division number is set at 4.

In a frame #n, the leftmost pixel and the fourteenth to eighteenth pixels from the leftmost include only the background components and belong to the background area. In the frame #n, the second to fourth pixels from the leftmost include the background components and the foreground components and belong to the uncovered background area. In the frame #n, the eleventh to thirteenth pixels from the leftmost include the background components and the foreground components and belong to the covered background area. In the frame #n, the fifth to tenth pixels from the leftmost include only the foreground components and belong to the foreground area.

In a frame #n+1, the first to fifth pixels from the leftmost and the eighteenth pixel from the leftmost include only the background components and belong to the background area. In the frame #n+1, the sixth to eighth pixels from the leftmost include the background components and the foreground components and belong to the uncovered background area. In the frame #n+1, the fifteenth to seventeenth pixels from the leftmost include the background components and the foreground components and belong to the covered background area. In the frame #n+1, the ninth to fourteenth pixels from the leftmost include only the foreground components and belong to the foreground area.

Figure 92:
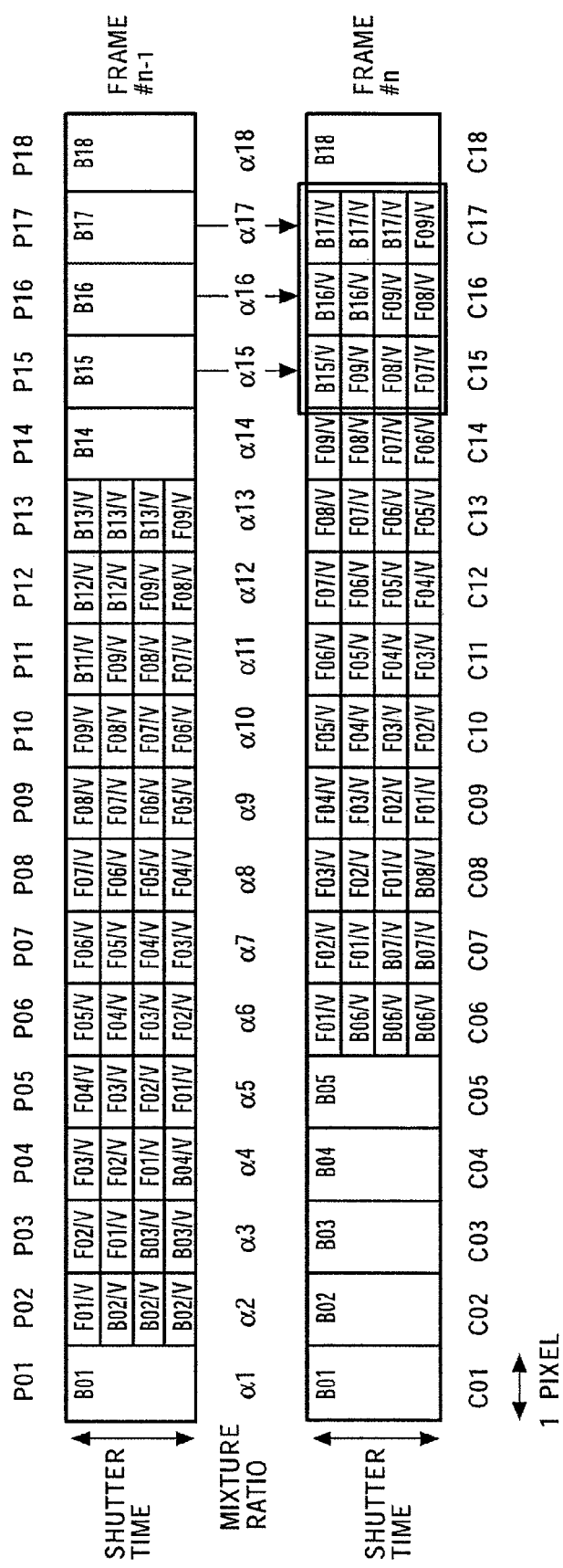
FIG. 92 is a modeling diagram in which pixel values are expanded in the time direction and shutter time which is divided into a time interval.

FIG. 92 is a diagram illustrating a process of separating the foreground components from the pixels belonging to the covered background area. In FIGS. 92, $\alpha 1$ to $\alpha 18$ are the mixture ratios corresponding to the respective pixels in the frame #n. In FIG. 92, the fifteenth to seventeenth pixels from the leftmost belong to the covered background area.

The pixel value C15 of the fifteenth pixel from the leftmost in the frame #n is expressed by equation (68).

$$C15 = B15/v + F09/v + F08/v + F07/v \qquad (68)$$
$$= \alpha 15 \cdot B15 + F09/v + F08/v + F07/v$$
$$= \alpha 15 \cdot P15 + F09/v + F08/v + F07/v$$

Here, $\alpha 15$ is a mixture ratio of the fifteenth pixel from the leftmost in the frame #n. P15 is a pixel value of the fifteenth pixel from the leftmost in the frame #n−1.

On the basis of equation (68), sum f15 of the foreground components of the fifteenth pixel from the leftmost in the frame #n is expressed by equation (69).

$$f15 = F09/v + F08/v + F07/v \qquad (69)$$
$$= C15 - \alpha 15 \cdot P15$$

Similarly, sum f16 of the foreground components of the sixteenth pixel from the leftmost in the frame #n is expressed by equation (70), and sum f17 of the foreground components of the seventeenth pixel from the leftmost in the frame #n is expressed by equation (71).

$$f16 = C16 - \alpha 16 \cdot P16 \qquad (70)$$

$$f17 = C17 - \alpha 17 \cdot P17 \qquad (71)$$

Like the above, the foreground component fc included in the pixel value C of pixels belonging to the covered background area is calculated by equation (72).

$$fc = C - \alpha \cdot P \qquad (72)$$

P is the pixel value of the corresponding pixel in the frame one ahead.

Figure 93:
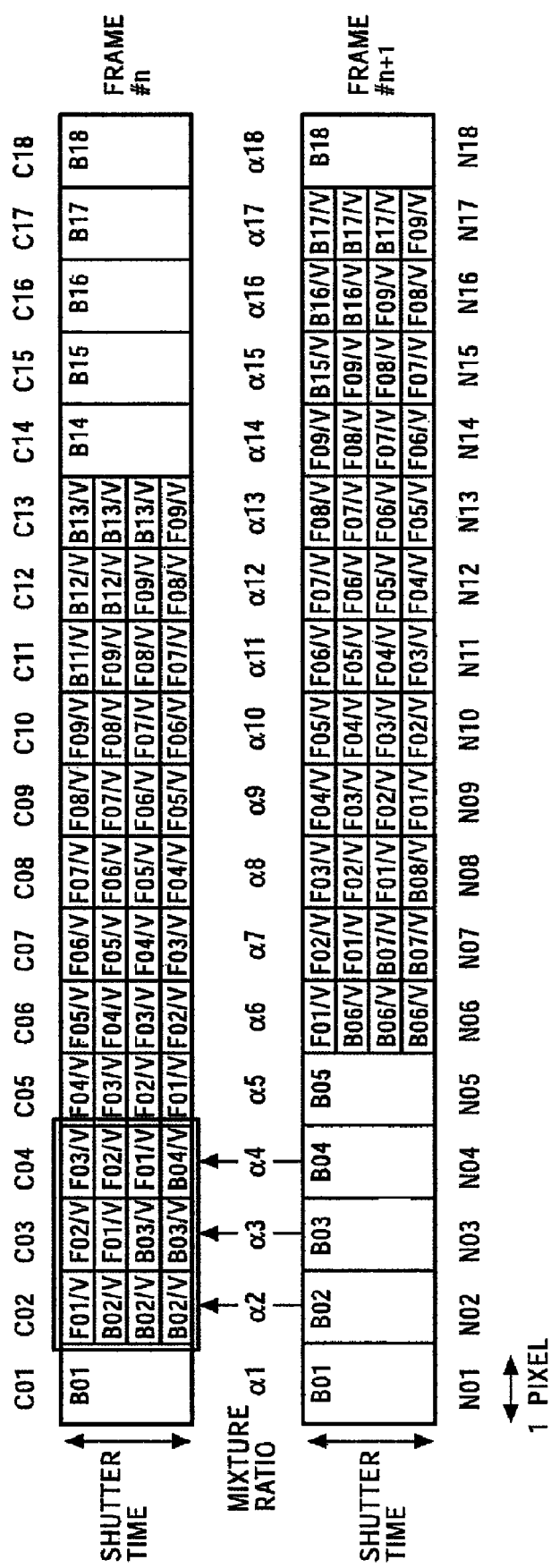
FIG. 93 is a modeling diagram in which pixel values are expanded in the time direction and shutter time which is divided into a time interval.

FIG. 93 is a diagram illustrating a process of separating the foreground components from the pixels belonging to the uncovered background area. In FIGS. 93, $\alpha 1$ to $\alpha 18$ are the mixture ratios corresponding to the respective pixels in the frame #n. In FIG. 93, the second to fourth pixels from the leftmost belong to the uncovered background area.

The pixel value C02 of the second pixel from the leftmost in the frame #n is expressed by equation (73).

$$C02 = B02/v + B02/v + B02/v + F01/v \qquad (73)$$
$$= \alpha 2 \cdot B02 + F01/v$$
$$= \alpha 2 \cdot N02 + F01/v$$

Here, α2 is the mixture ratio of the second pixel from the leftmost in the frame #n. N02 is the pixel value of the second pixel from the leftmost in the frame #n+1.

On the basis of equation (73), sum f02 of the foreground components of the second pixel from the leftmost in the frame #n is expressed by equation (74).

$$f02 = F01/v \qquad (74)$$
$$= C02 - \alpha 2 \cdot N02$$

Similarly, sum f03 of the foreground components of the third pixel from the leftmost in the frame #n is expressed by equation (75) and sum f04 of the foreground components of the fourth pixel from the leftmost in the frame #n is expressed by equation (76)

$$f03 = C03 - \alpha 3 \cdot N03 \qquad (75)$$

$$f04 = C04 - \alpha 4 \cdot N04 \qquad (76)$$

Like this, the foreground component fu included in the pixel value C of pixel belonging to the uncovered background area is calculated by equation (77).

$$fu = C - \alpha \qquad (77)$$

N is the pixel value of the corresponding pixel in the frame one behind.

Like the above, the separating portion 601 can separate the foreground components and the background components from the pixel belonging to the mixed area on the basis of the information indicating the covered background area, the information indicating the uncovered background area which are included in the area information and the mixture ratio α for each pixel.

Figure 94:
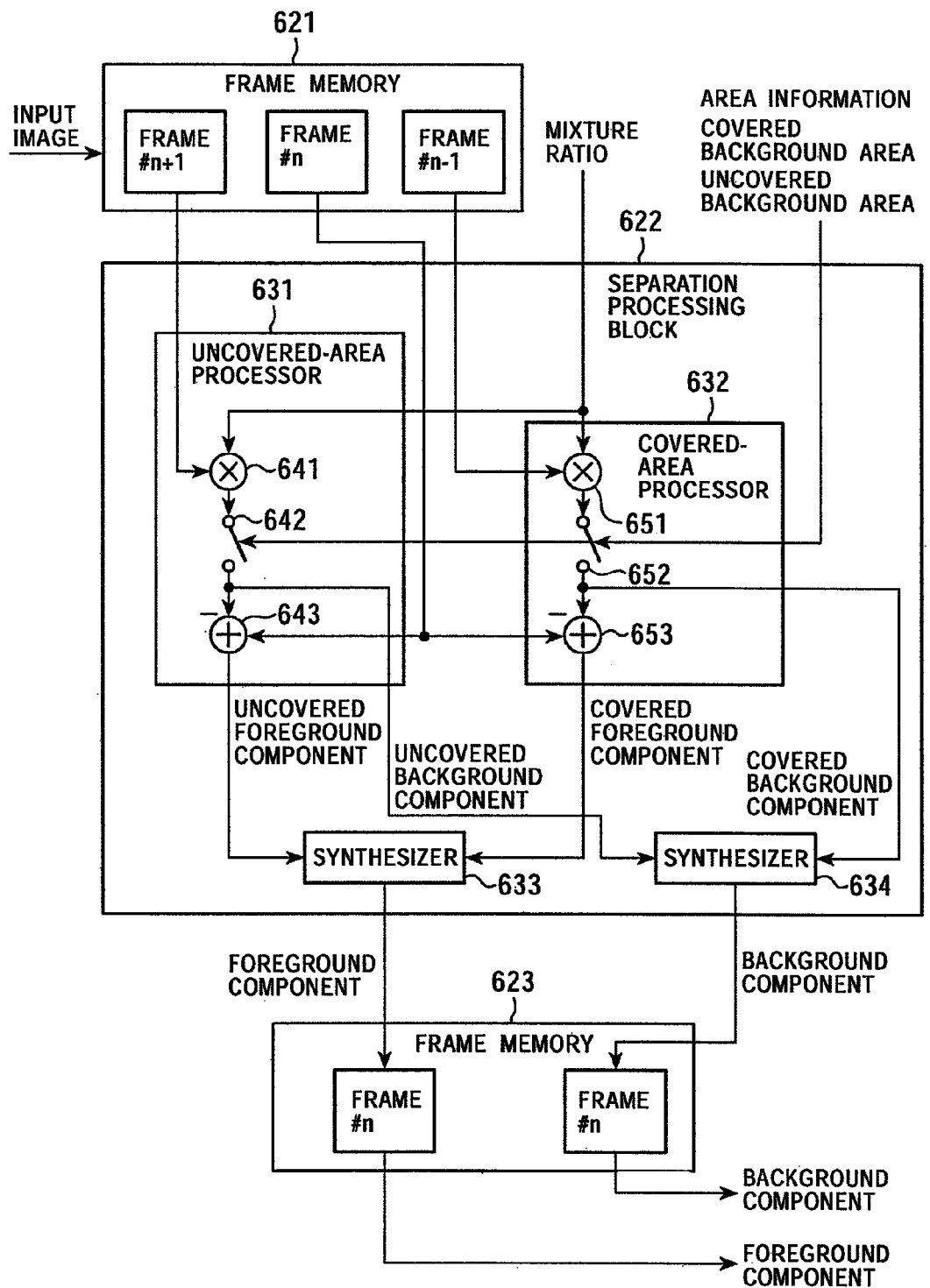
FIG. 94 is a block diagram illustrating an example of a configuration of a separating portion 601.

FIG. 94 is a block diagram illustrating an example of configuration of the separating portion 601 to perform the aforementioned processing. The image input to the separating portion 601 is supplied to the frame memory 621 and the area information indicating the covered background area and the uncovered background area supplied from the mixture ratio calculator 104 and the mixture ratio α are input to the separation processing block 622.

The frame memory 621 stores the input image in frame unit. When the target of processing is the frame #n, the frame memory 621 stores the frame #n−1 one ahead of the frame #n the frame #n and the frame #n+1 one behind the frame #n.

The frame memory 621 supplies pixels corresponding to the frame #n−1, the frame #n and the frame #n+1 to the separation processing block 622.

The separation processing block 622 separates the foreground component and background component from the pixel belonging to the mixed area of the frame #n on the basis of the area information indicating the covered background area and the uncovered background area and the mixture ratio α by applying the pixel values of the pixels corresponding to the frame #n−1, the frame #n and the frame #n+1, supplied from the frame memory 621 by the calculation explained in FIGS. 92 and 93 and supplies them to the frame memory 623.

The separation processing block 622 comprises an uncovered-area processor 631, a covered-area processor 632, a synthesizer 633 and synthesizer 634.

A multiplier 641 of the uncovered-area processor 631 multiplies the pixel value of the pixel in the frame #n+1 supplied from the frame memory 621 by the mixture ratio α and outputs the result to the switch 642. The switch 642 is closed when the pixel in the frame #n supplied from the frame memory 621 (corresponding to the pixel of the frame #n+1) belongs to the uncovered background area, and supplies the value obtained by multiplying the pixel value by the mixture ratio α supplied from the multiplier 641 to the calculator 643 and the synthesizer 634. The value obtained by multiplying the pixel value of the pixel in the frame #n+1 output from the switch 642 by the mixture ratio α equals to the background component of the pixel value of the pixel corresponding to the frame #n.

The calculator 643 obtains the foreground component by subtracting the background component which is supplied from the switch 642 from the pixel value of the pixel of the frame #n which is supplied from the frame memory 621, and supplies the foreground component of the pixel of the frame #n belonging to the uncovered background area to the synthesizer 633.

The multiplier 651 of the covered-area processor 632 multiplies the pixel value of the pixel of the frame #n−1 supplied from the frame memory 621 by the mixture α, and outputs the result to the switch 652. The switch 652 is closed when the pixel of frame #n which is supplied from the frame memory 621 (corresponding to the pixel of the frame #n−1) belongs to the covered background area, and supplies the value obtained by multiplying the pixel value by the mixture ratio α which is supplied from the multiplier 651 to the calculator 653 and the synthesizer 634. The value obtained by multiplying the pixel value of the pixel of the frame #n−1 output from the switch 652 by the mixture ratio α equals to the background component of the pixel value of the pixel corresponding to the frame #n.

The calculator 653 obtains the foreground component by subtracting the background component which is supplied from switch 652 from the pixel value of the pixel of the frame #n which is supplied from the frame memory 621, and supplies the foreground component of the pixel of the frame #n belonging to the covered background area to the synthesizer 633.

The synthesizer 633 synthesizes the foreground component of the pixel of the frame #n, belonging to the uncovered background area and supplied from the calculator 643 and the foreground component of the pixel of the frame #n, belonging to the covered background area and supplied from the calculator 653, and then supplies the result to the frame memory 623.

The synthesizer 634 synthesizes the background component of the pixel of the frame #n, belonging to the uncovered background area and supplied from the switch 642 and the background component of the pixel of the frame #n, belonging to the covered background area and supplied from the calculator 652, and then supplies the result to the frame memory 623.

The frame memory 623 stores respectively the foreground component and the background component of the pixels of the mixed area of the frame #n which are supplied from the separation processing block 622.

The frame memory 623 outputs the stored foreground component and background component of the pixels of the mixed area of the frame #n.

It is possible to perfectly separate the foreground component from the background component which are included in the pixel value by using the mixture ratio α which is a feature amount.

The synthesizer 603 synthesizes the foreground component of the pixel of the mixed area of frame #n output from the separating portion 601 and the pixel belongs to the foreground area to generate the foreground component image. The synthesizer 605 synthesizes the background component of the pixel of the mixed area of frame #n output from the separating portion 601 and the pixel belongs to the background area to generate the background component image.

FIGS. 95A and 95B are drawings showing an example of the foreground component image and an example of the background component image corresponding to the frame #n of FIG. 91.

FIG. 95A shows an example of the foreground component image corresponding to the frame #n of FIG. 91. Because the leftmost pixel and the fourteenth pixel from the leftmost comprise only the background component before they are separated into the foreground and background, their respective pixel values become 0.

The second to fourth pixels from the leftmost belong to the uncovered background area before they are separated into the foreground and background. Therefore, their respective background components become 0 and their respective foreground components remain unchanged. The eleventh to thirteenth pixels from the leftmost belong to the covered background area before they are separated into the foreground and background. Therefore, their respective background components become 0 and their respective foreground components remain unchanged. Because the fifth to tenth pixel from the leftmost comprise only the foreground component, their respective pixel values remain unchanged.

FIG. 95B shows an example of the background component image corresponding to the frame #n of FIG. 91. Because the leftmost pixel and the fourteenth pixel from the leftmost comprise only the background component before they are separated into the foreground and background, their respective pixel values remain unchanged.

The second to fourth pixels from the leftmost belong to the uncovered background area before they are separated into the foreground and background. Therefore, their respective foreground components become 0 and their respective background components remain unchanged. The eleventh to thirteenth pixels from the leftmost belong to the covered background area before they are separated into the foreground and background. Therefore, their respective foreground components become 0 and their respective background components remain unchanged. Because the fifth to tenth pixel from the leftmost comprise only the foreground component, their respective pixel values become 0.

Figure 96:
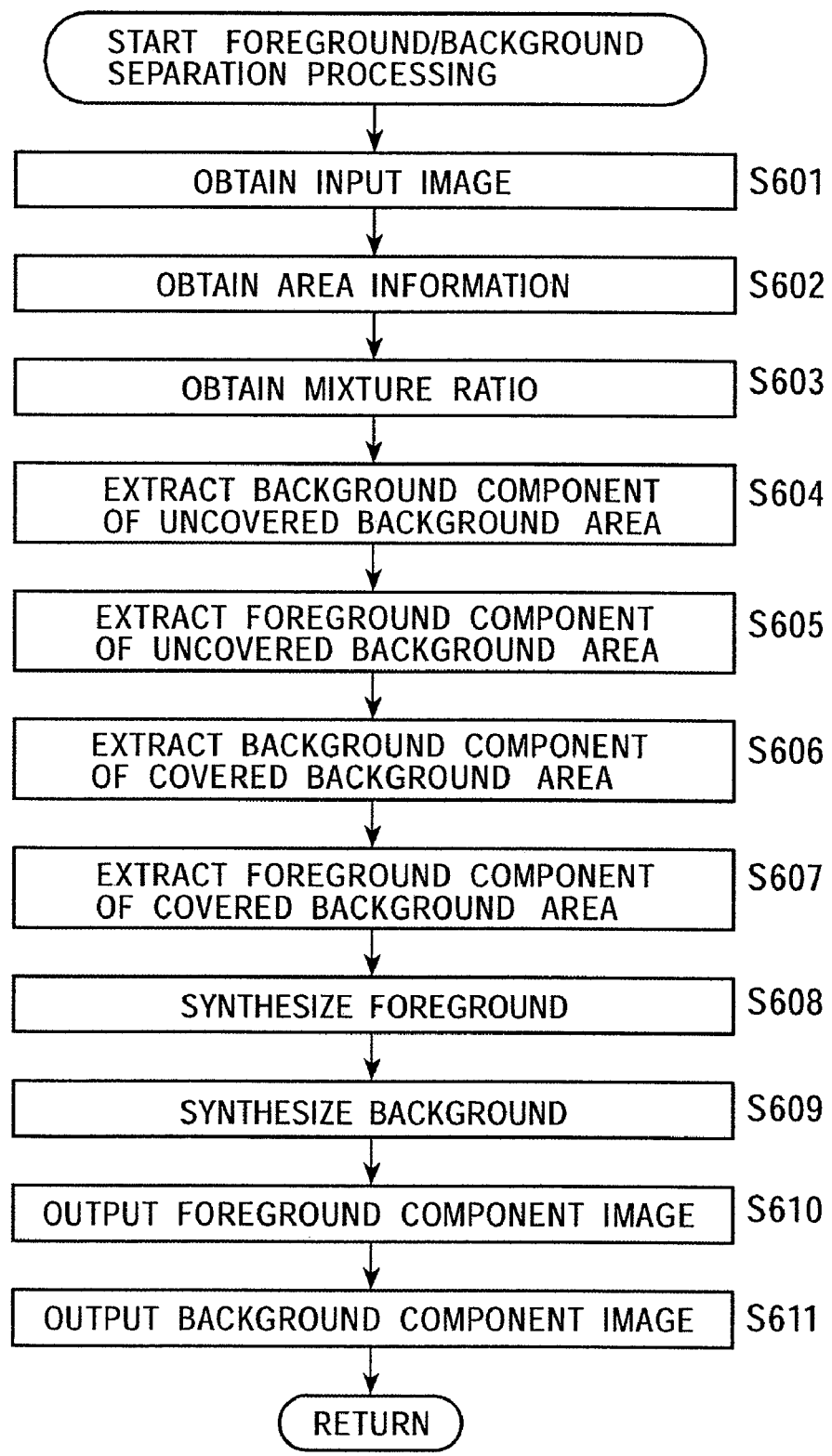
FIG. 96 is a flowchart illustrating a foreground/background separation processing.

Next, referring to a flowchart in FIG. 96, a process of separating the foreground and the background by the foreground/background separator 105 will be explained. In step S601, the frame memory 621 of the separating portion 601 obtains the input image, and stores the indicated frame #n targeted to be separated into the foreground and background with the leading frame #n−1 and the following frame #n+1.

In step S602, the separation processing block 622 of the separating portion 601 obtains the area information supplied from the mixture ratio calculator 104. In step S603, the separation processing block 622 of the separating portion 601 obtains the mixture ratio α supplied from the mixture ratio calculator 104.

In step S604, the uncovered-area processor 631 extracts the background component from the pixel value of the pixel belonging to the uncovered background area supplied from the frame memory 621 on the basis of the area information and the mixture ratio α.

In step S605, the uncovered area processor 631 extracts the foreground component from the pixel value of the pixel belonging to the uncovered background area supplied from the frame memory 621 on the basis of the area information and the mixture ratio α.

In step S606, the covered area processor 632 extracts the background component from the pixel value of the pixel belonging to the covered background area supplied from the frame memory 621 on the basis of the area information and the mixture ratio α.

In step S607, the uncovered area processor 632 extracts the foreground component from the pixel value of the pixel belonging to the covered background area supplied from the frame memory 621 on the basis of the area information and the mixture ratio α.

In step S608, the synthesizer 633 synthesizes the foreground component of the pixel belonging to the uncovered background area and extracted from the processing in step S605 and the foreground component of the pixel belonging to the covered background area and extracted from the processing in step S607. The synthesized foreground component is supplied to the synthesizer 603. Further, the synthesizer 603 synthesizes the pixel belonging to the foreground area and supplied through the switch 602 and the foreground component supplied from the separating portion 601, and then generates the foreground component image.

In step S609, the synthesizer 634 synthesizes the background component of the pixel belonging to the uncovered background area and extracted from the processing in step S604 and the background component of the pixel belonging to the covered background area and extracted from the processing in step S606. The synthesized background component is supplied to the synthesizer 605. Further, the synthesizer 605 synthesizes the pixel belonging to the background area and supplied through the switch 604 and the background component supplied from the separating portion 601, and then generates the foreground component image.

In step S610, the synthesizer 603 outputs the foreground component image. In step S611, the synthesizer 605 outputs the background component image and then the process ends.

Like the above, the foreground/background separator 105 can separate the foreground component and the background component from the input image based on the area information and the mixture ratio α and output the foreground component image comprised of only the foreground component and the background component image comprised of only the background component.

Next, an adjustment process of adjusting the amount of motion blur of the foreground component image is explained.

Figure 97:
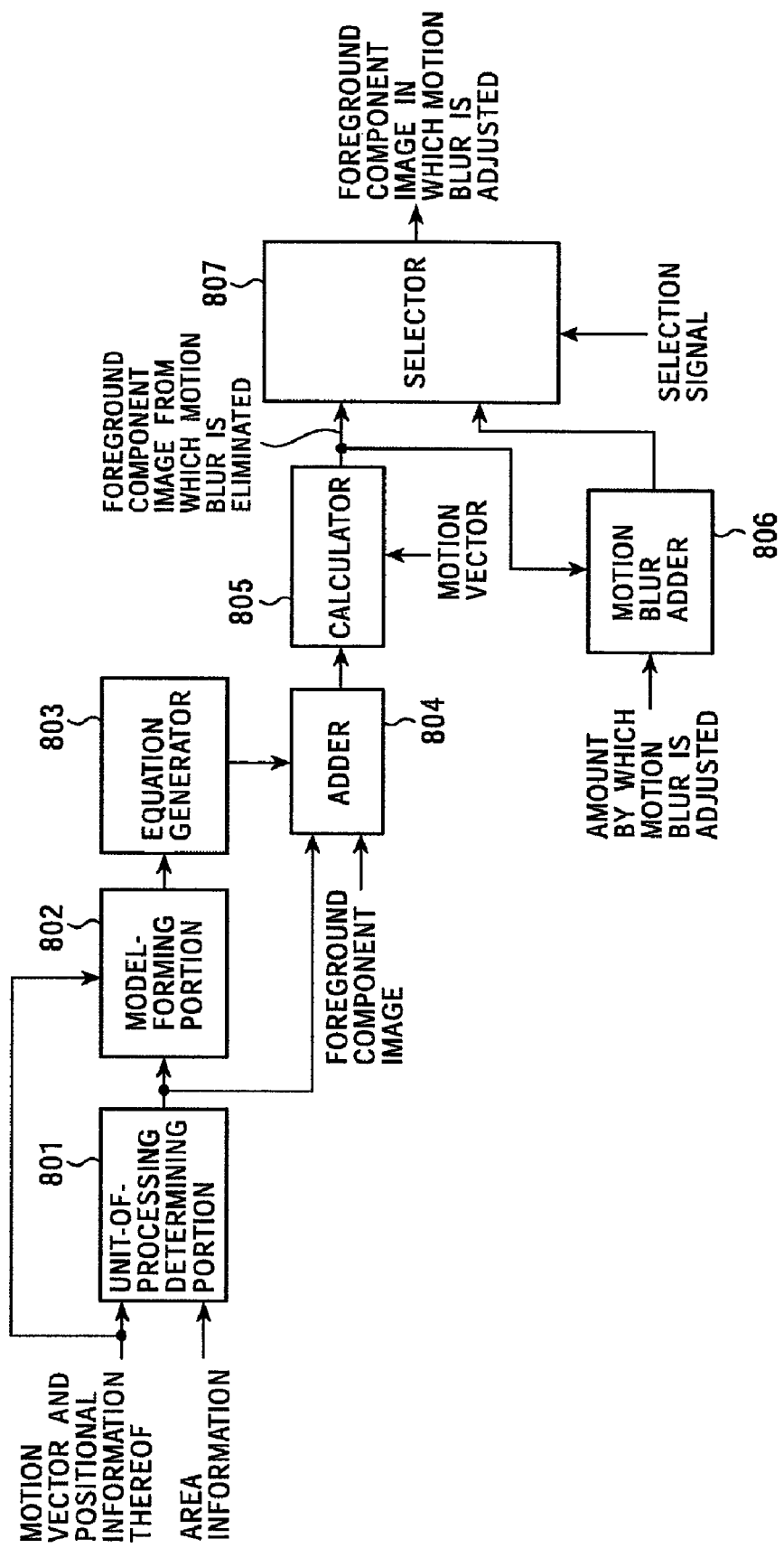
FIG. 97 is a block diagram showing an example of a configuration of a motion blur adjusting unit 106.

FIG. 97 is a block diagram showing an example of a structure of the motion blur adjusting unit 106. The motion vector supplied from the motion detector 102 and the positional information thereof are supplied to a unit of processing determining portion 801, a model forming portion 802 and a calculator 805. The area information supplied from the area specifying unit 103 is supplied to the unit of processing determining portion 801. The foreground component image supplied from the foreground/background separator 105 is supplied to an adder 804.

The unit of processing determining portion 801 generates the unit of processing based on the motion vector, the positional information thereof and the area information, and then supplies the generated unit of processing to the model forming portion 802 and the adder 804.

Figure 98:
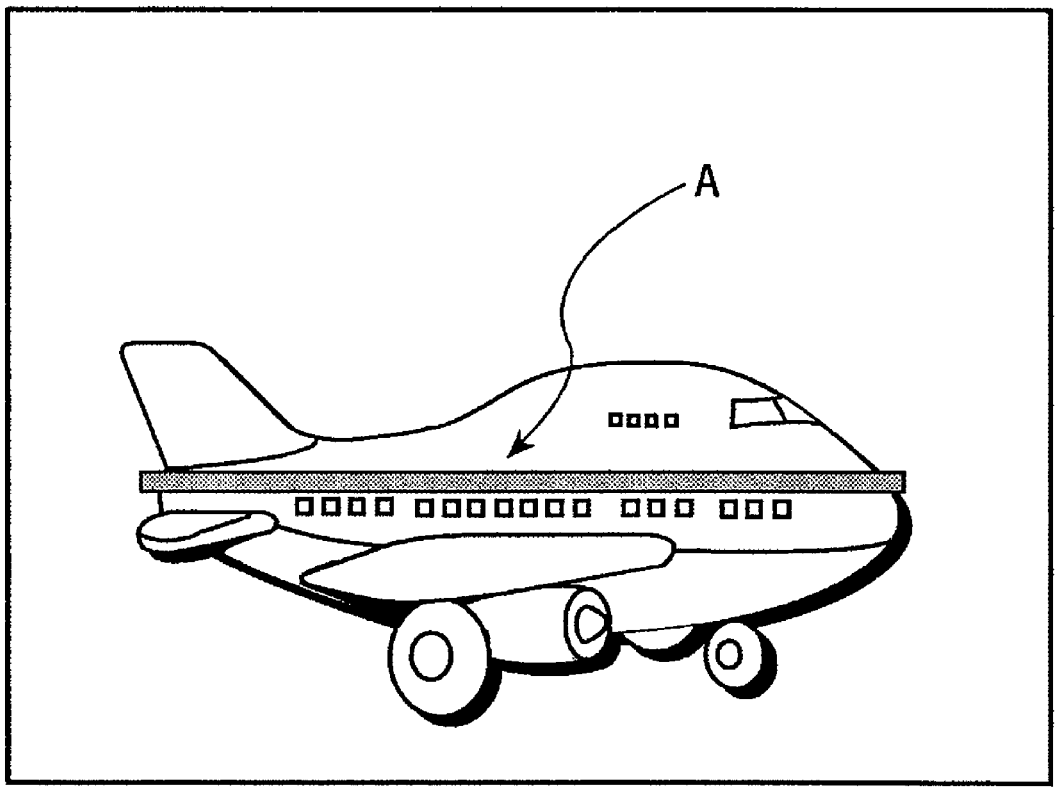
FIG. 98 is a diagram illustrating a unit of processing.

The unit of processing A generated by the unit of processing determining portion 801, as shown in FIG. 98, indicates the successive pixels which are in a row in the moving direction from the pixel corresponding to the covered background area of the foreground component image to the pixel corresponding to the uncovered background area, or the successive pixels which are in a row in the moving direction from the pixel corresponding to the uncovered background area to the pixel corresponding to the covered background area. The unit of processing A, for example, comprises data of left-upper point (position of the pixel which is designated as one of the unit of processing and is located at the leftmost or the most upper on the image) and data of right-lower point.

Figure 99:
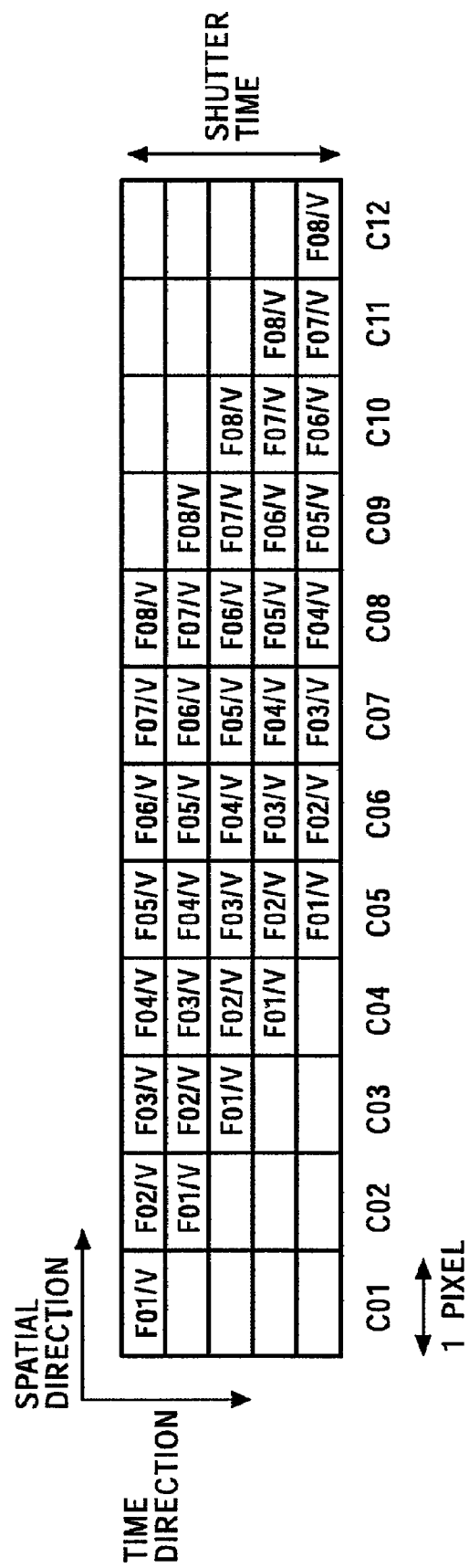
FIG. 99 is a modeling diagram in which pixel values of a foreground component image are expanded in the time direction and shutter time which is divided into a time interval.

The model forming portion 802 performs the model forming based on the motion vector and the input unit of processing A. More specifically, the model forming portion 802 stores, for example, a plurality of models corresponding to the number of pixels included in the unit of processing A, the virtual division number of pixel value in time direction and the number of the foreground components for each pixel in advance, and then selects a designated model corresponding to the pixel value and the foreground component shown in FIG. 99 on the basis of the unit of processing A and the virtual division number of the pixel value in time direction.

For example, if the number of pixels of the unit of processing A is 12 and the amount of movement v in shutter time is 5, the model forming portion 802 selects a model totally comprised of 8 foreground components and where the virtual division number is 5, the leftmost pixel includes 1 foreground component, the second pixel from the leftmost includes 2 foreground components, the third pixel from the leftmost includes 3 foreground components, the fourth pixel from the leftmost includes 4 foreground components, the fifth pixel from the leftmost includes 5 foreground components, the sixth pixel from the leftmost includes 5 foreground components, the seventh pixel from the left includes 5 foreground components, the eighth pixel from the leftmost includes 5 foreground components, the ninth pixel from the leftmost includes 4 foreground components, the tenth pixel from the leftmost includes 3 foreground components, the eleventh pixel from the leftmost includes 2 foreground components, the twelfth pixel from the leftmost includes 1 foreground component.

Further, the model forming portion 802 may not select one of the models stored in advance, but may generate a model based on motion vector and the unit of processing when the motion vector and the unit of processing A are supplied.

The model forming portion 802 supplies the selected model to the equation generator 803.

The equation generator 803 generates equations based on the models supplied from the model forming portion 802. Referring to the models of the foreground component image in FIG. 99, when the number of the foreground components is 8, the number of the pixels corresponding to the unit of processing A is 12, the amount of movement v is 5 and the virtual division number is 5, subsequent equations generated by the equation generator 803 are explained.

When the foreground component included in the foreground component image corresponding to the shutter time/v lies between F01/v and F08/v, the relations between F01/v to F08/v and the pixel values C01 to C12 are expressed in equations (78) to (89).

$$C01 = F01/v \tag{78}$$

$$C02 = F02/v + F01/v \tag{79}$$

$$C03 = F03/v + F02/v + F01/v \tag{80}$$

$$C04 = F04/v + F03/v + F02/v + F01/v \tag{81}$$

$$C05 = F05/v + F04/v + F03/v + F02/v + F01/v \tag{82}$$

$$C06 = F06/v + F05/v + F04/v + F03/v + F02/v \tag{83}$$

$$C07 = F07/v + F06/v + F05/v + F04/v + F03/v \tag{84}$$

$$C08 = F08/v + F07/v + F06/v + F05/v + F04/v \tag{85}$$

$$C09 = F08/v + F07/v + F06/v + F05/v \tag{86}$$

$$C10 = F08/v + F07/v + F06/v \tag{87}$$

$$C11 = F08/v + F07/v \tag{88}$$

$$C12 = F08/v \tag{89}$$

The equation generator 803 generates equations by modifying the generated equations. Equations generated by the equation generator 803 are expressed in equations (90) to (101).

$$C01 = 1 \cdot F01/v + 0 \cdot F02/v + 0 \cdot F03/v + \\ 0 \cdot F04/v + 0 \cdot F05/v + 0 \cdot F06/v + 0 \cdot F07/v + 0 \cdot F08/v \tag{90}$$

$$C02 = 1 \cdot F01/v + 1 \cdot F02/v + 0 \cdot F03/v + \\ 0 \cdot F04/v + 0 \cdot F05/v + 0 \cdot F06/v + 0 \cdot F07/v + 0 \cdot F08/v \tag{91}$$

$$C03 = 1 \cdot F01/v + 1 \cdot F02/v + 1 \cdot F03/v + \\ 0 \cdot F04/v + 0 \cdot F05/v + 0 \cdot F06/v + 0 \cdot F07/v + 0 \cdot F08/v \tag{92}$$

$$C04 = 1 \cdot F01/v + 1 \cdot F02/v + 1 \cdot F03/v + \\ 1 \cdot F04/v + 0 \cdot F05/v + 0 \cdot F06/v + 0 \cdot F07/v + 0 \cdot F08/v \tag{93}$$

$$C05 = 1 \cdot F01/v + 1 \cdot F02/v + 1 \cdot F03/v + \\ 1 \cdot F04/v + 1 \cdot F05/v + 0 \cdot F06/v + 0 \cdot F07/v + 0 \cdot F08/v \tag{94}$$

$$C06 = 0 \cdot F01/v + 1 \cdot F02/v + 1 \cdot F03/v + \\ 1 \cdot F04/v + 1 \cdot F05/v + 1 \cdot F06/v + 0 \cdot F07/v + 0 \cdot F08/v \tag{95}$$

$$C07 = 0 \cdot F01/v + 0 \cdot F02/v + 1 \cdot F03/v + \\ 1 \cdot F04/v + 1 \cdot F05/v + 1 \cdot F06/v + 1 \cdot F07/v + 0 \cdot F08/v \tag{96}$$

$$C08 = 0 \cdot F01/v + 0 \cdot F02/v + 0 \cdot F03/v + \\ 1 \cdot F04/v + 1 \cdot F05/v + 1 \cdot F06/v + 1 \cdot F07/v + 1 \cdot F08/v \tag{97}$$

$$C09 = 0 \cdot F01/v + 0 \cdot F02/v + 0 \cdot F03/v + \\ 0 \cdot F04/v + 1 \cdot F05/v + 1 \cdot F06/v + 1 \cdot F07/v + 1 \cdot F08/v \tag{98}$$

$$C10 = 0 \cdot F01/v + 0 \cdot F02/v + 0 \cdot F03/v + \\ 0 \cdot F04/v + 0 \cdot F05/v + 1 \cdot F06/v + 1 \cdot F07/v + 1 \cdot F08/v \tag{99}$$

$$C11 = 0 \cdot F01/v + 0 \cdot F02/v + 0 \cdot F03/v + \\ 0 \cdot F04/v + 0 \cdot F05/v + 0 \cdot F06/v + 1 \cdot F07/v + 1 \cdot F08/v \tag{100}$$

$$C12 = 0 \cdot F01/v + 0 \cdot F02/v + 0 \cdot F03/v + \\ 0 \cdot F04/v + 0 \cdot F05/v + 0 \cdot F06/v + 0 \cdot F07/v + 1 \cdot F08/v \tag{101}$$

Equations (90) to (102) may be expressed as an equation (102).

$$C_j = \sum_{i=01}^{08} aij \cdot F_i / v \tag{102}$$

In equation (102), j means the position of pixel. In this example, j is one of 1 to 12. Further, i means the position of foreground value. In this example, i is one of 1 to 8. aij is 0 or 1 according to the values of i and j.

Considering an error, equation (102) is expressed as equation (103).

$$Cj = \sum_{i=01}^{08} aij \cdot F_i/v + ej \quad (103)$$

In equation (103), ej is an error included in indicated pixel Cj.

Equation 103 can be expressed as equation 104 again.

$$ej = Cj - \sum_{i=01}^{08} aij \cdot F_i/v \quad (104)$$

Here, sum of the square of errors E is defined as shown in equation (105) to apply the least square method.

$$E = \sum_{j=01}^{12} ej^2 \quad (105)$$

In order to minimize the error, the value of the partial differential by the variable Fk to the sum of the square of errors E should equal zero. Fk satisfying equation (106) is obtained.

$$\frac{\partial E}{\partial F_k} = 2 \cdot \sum_{j=01}^{12} ej \cdot \frac{\partial ej}{\partial F_k} \quad (106)$$

$$= 2 \cdot \sum_{j=01}^{12} \left\{ \left( Cj - \sum_{i=01}^{08} aij \cdot F_i/v \right) \cdot (-a_{kj}/v) \right\} = 0$$

In equation (106), because the amount of movement v is fixed, equation (107) can be derived.

$$\sum_{j=01}^{12} a_{kj} \cdot \left( Cj - \sum_{i=01}^{08} aij \cdot F_i/v \right) = 0 \quad (107)$$

Equation (108) is obtained by expanding and transposing equation (107).

$$\sum_{j=01}^{12} \left( a_{kj} \cdot \sum_{i=01}^{08} aij \cdot F_i \right) = v \cdot \sum_{j=01}^{12} a_{kj} \cdot Cj \quad (108)$$

Equation (108) is expanded in 8 equations obtained by substituting one of integers between 1 and 8 for k in equation (108). The obtained 8 equations can be expressed as a matrix equation, and this matrix equation is called a normal equation.

An example of a normal equation generated by the equation generator 803 based on the least square method is shown in equation (109).

$$\begin{bmatrix} 5 & 4 & 3 & 2 & 1 & 0 & 0 & 0 \\ 4 & 5 & 4 & 3 & 2 & 1 & 0 & 0 \\ 3 & 4 & 5 & 4 & 3 & 2 & 1 & 0 \\ 2 & 3 & 4 & 5 & 4 & 3 & 2 & 1 \\ 1 & 2 & 3 & 4 & 5 & 4 & 3 & 2 \\ 0 & 1 & 2 & 3 & 4 & 5 & 4 & 3 \\ 0 & 0 & 1 & 2 & 3 & 4 & 5 & 4 \\ 0 & 0 & 0 & 1 & 2 & 3 & 4 & 5 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} C_i \\ \sum_{i=07}^{11} C_i \\ \sum_{i=06}^{10} C_i \\ \sum_{i=05}^{09} C_i \\ \sum_{i=04}^{08} C_i \\ \sum_{i=03}^{07} C_i \\ \sum_{i=02}^{06} C_i \\ \sum_{i=01}^{05} C_i \end{bmatrix} \quad (109)$$

If equation (109) is expressed as A·F=v·C, C, A and v are known and F is unknown. A and v are known at the time of model forming and C is already known by inputting the pixel values in adding operation.

Errors included in pixel C can be dispersed by calculating the foreground component by using the normal equation based on the least square method.

The equation generator 803 supplies the normal equation generated by the above to the adder 804.

The adder 804 sets the pixel values C included in foreground component image in the matrix equation supplied from the equation generator 803 on the basis of the unit of processing supplied from the unit of processing determining portion 801. The adder 804 supplies the matrix where the pixel values C are set to the calculator 805.

The calculator 805 calculates the foreground component Fi/v from which motion blur is eliminated through the processing based on the sweeping-out methods such as Gauss-Jordan elimination method, calculates Fi corresponding to the pixel value i of the foreground from which motion blur is eliminated, wherein i is one of integers between 0 and 8, and then outputs the foreground component image from which motion blur is eliminated, along with the calculated pixel value Fi to the motion blur adder 806 and the selector 807.

Figure 100:
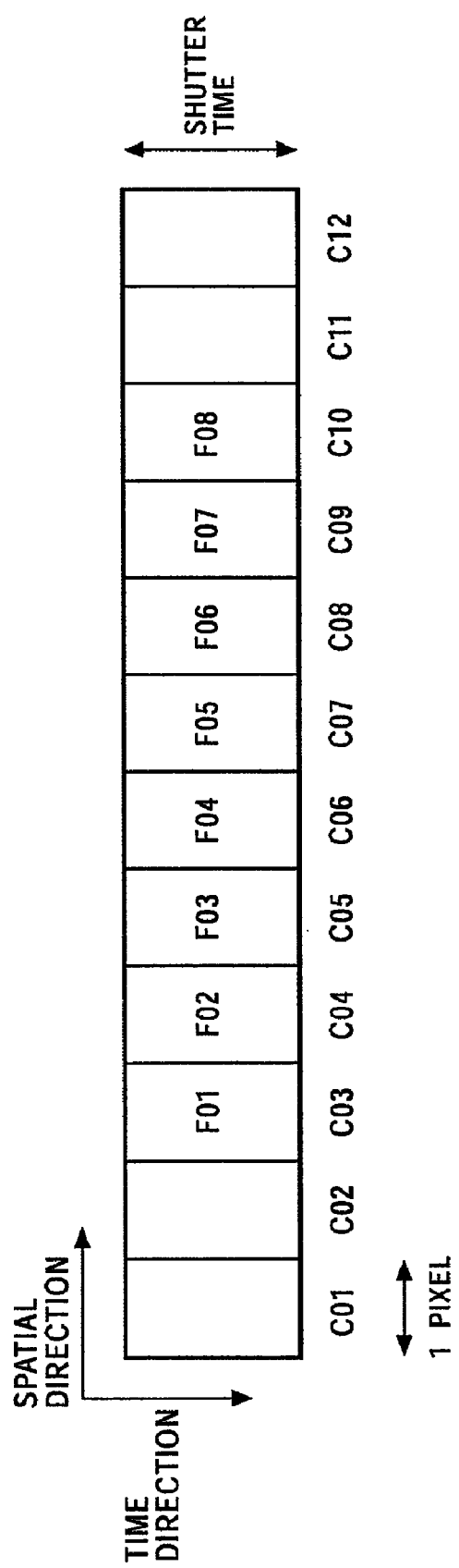
FIG. 100 is a modeling diagram in which pixel values of foreground component image are expanded in the time direction and shutter time which is divided into a time interval.

Further, as shown in FIG. 100, for making the position of the foreground component image unchanged with respect to the screen, each of F01 to F08 is set to each of C03 to C10 in the foreground component image from which motion blur is eliminated. However, it may correspond to arbitrary positions.

Figure 101:
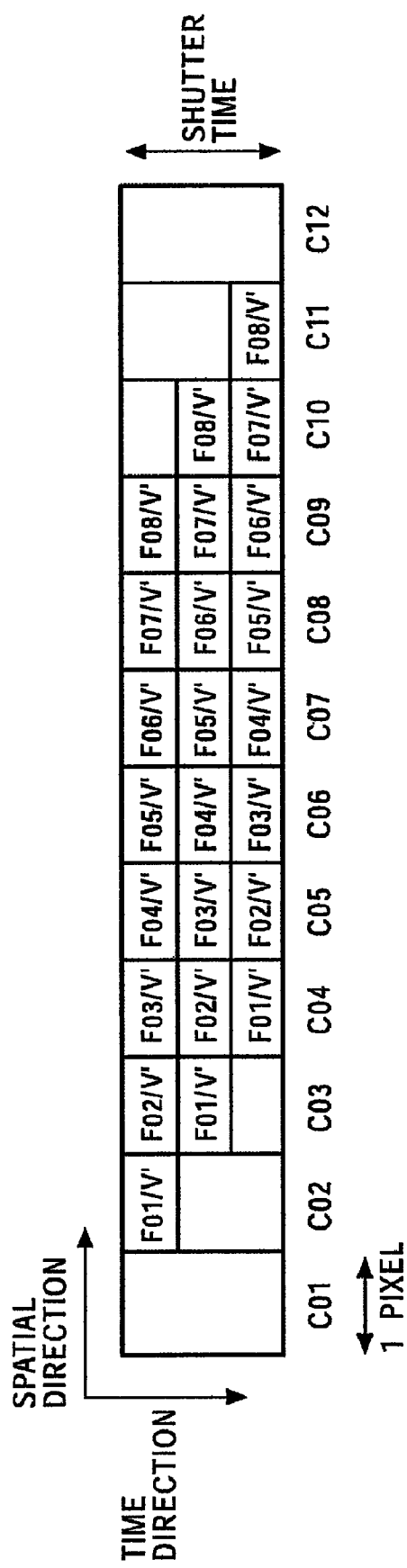
FIG. 101 is a modeling diagram in which pixel values of a foreground component image are expanded in the time direction and shutter time which is divided into a time interval.

The motion blur adder 806 may adjust the amount of motion blur by adding the amount by which motion blur is adjusted v' which is different from the amount of movement v, for example, the amount by which motion blur is adjusted v' is half of the amount of movement v, or has no relation with the amount of movement v. For example, as shown in FIG. 101, the motion blur adder 806 calculates the foreground component Fi/v' by dividing the foreground pixel value from which motion blur is eliminated Fi with the amount by which motion blur is adjusted v', calculates the sum of the foreground components Fi/v', and then generates the pixel value where the amount of motion blur is adjusted. For example, when the amount by which motion blur is adjusted is 3, the pixel value C02 becomes (F01)/v', the pixel value C03 becomes (F01+F02)/v', the pixel value C04 becomes (F01+F02+F03)/v' and the pixel value C05 becomes (F02+F03+F04)/v'.

The motion blur adder 806 supplies the foreground component image of which the amount of motion blur is adjusted to the selector 807.

The selector 807 selects one of the foreground component image from which motion blur is eliminated and which is supplied from the calculator 805 and the foreground component image of which the amount of motion blur is adjusted and which is supplied from the motion blur adder 806 on the basis of the selection signal selected by an user, and then outputs the selected foreground component image.

Like the above, the motion blur adjusting unit 106 is able to adjust the amount of motion blur based on the selection signal and the amount v' by which motion blur is adjusted.

Figure 102:
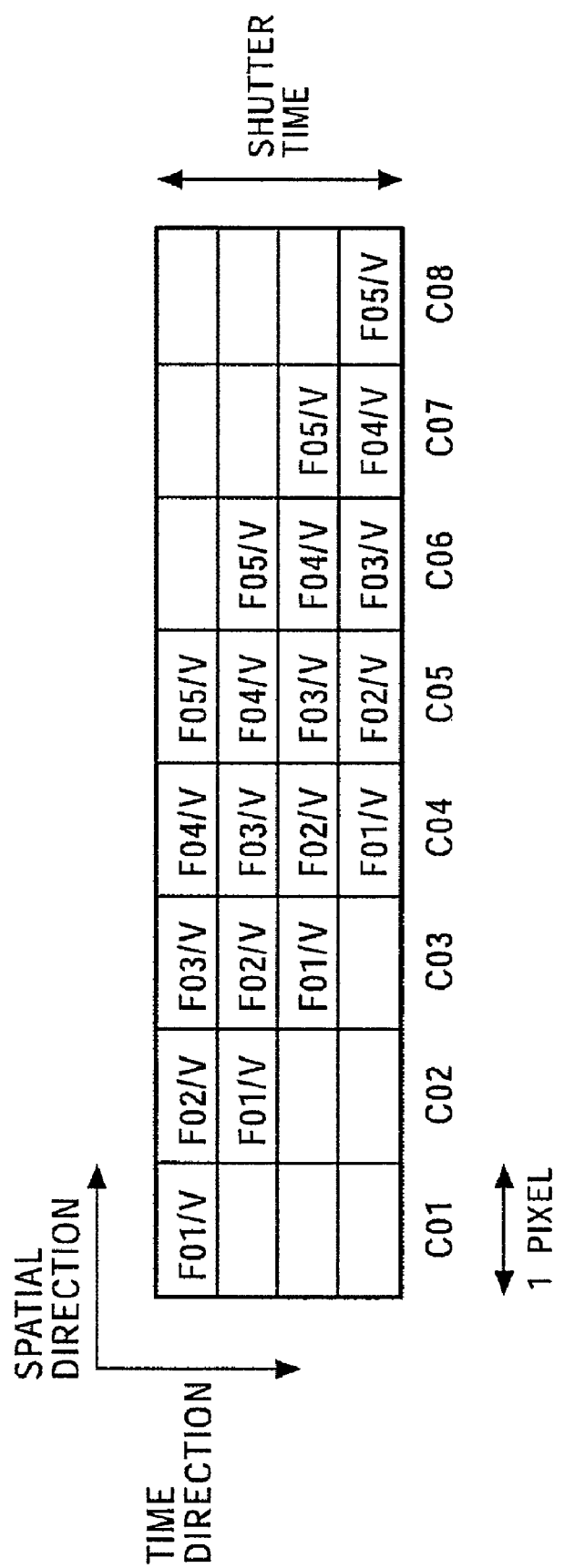
FIG. 102 is a modeling diagram in which pixel values of a foreground component image are expanded in the time direction and shutter time which is divided into a time interval.

Further, for example, as shown in FIG. 102, when the number of pixels corresponding to the unit of processing is 8 and the amount of movement v is 4, the motion blur adjusting unit 106 generates the matrix equation shown in equation (110).

$$\begin{bmatrix} 4 & 3 & 2 & 1 & 0 \\ 3 & 4 & 3 & 2 & 1 \\ 2 & 3 & 4 & 3 & 2 \\ 1 & 2 & 3 & 4 & 3 \\ 0 & 1 & 2 & 3 & 4 \end{bmatrix} \begin{bmatrix} F01 \\ F02 \\ F03 \\ F04 \\ F05 \end{bmatrix} = v \cdot \begin{bmatrix} \sum_{i=05}^{08} C_i \\ \sum_{i=04}^{07} C_i \\ \sum_{i=03}^{06} C_i \\ \sum_{i=02}^{05} C_i \\ \sum_{i=01}^{04} C_i \end{bmatrix} \quad (110)$$

The motion blur adjusting unit 106 generates as many equations needed to correspond to the length of the unit of processing and calculates the pixel value Fi from which the amount of motion blur is adjusted. In the same manner, when the number of pixels included in the unit of processing is, for example, 100, the motion blur adjusting unit 106 generates as many equations to accommodate the unit of processing comprising one hundred pixels, and then calculates Fi.

Figure 103:
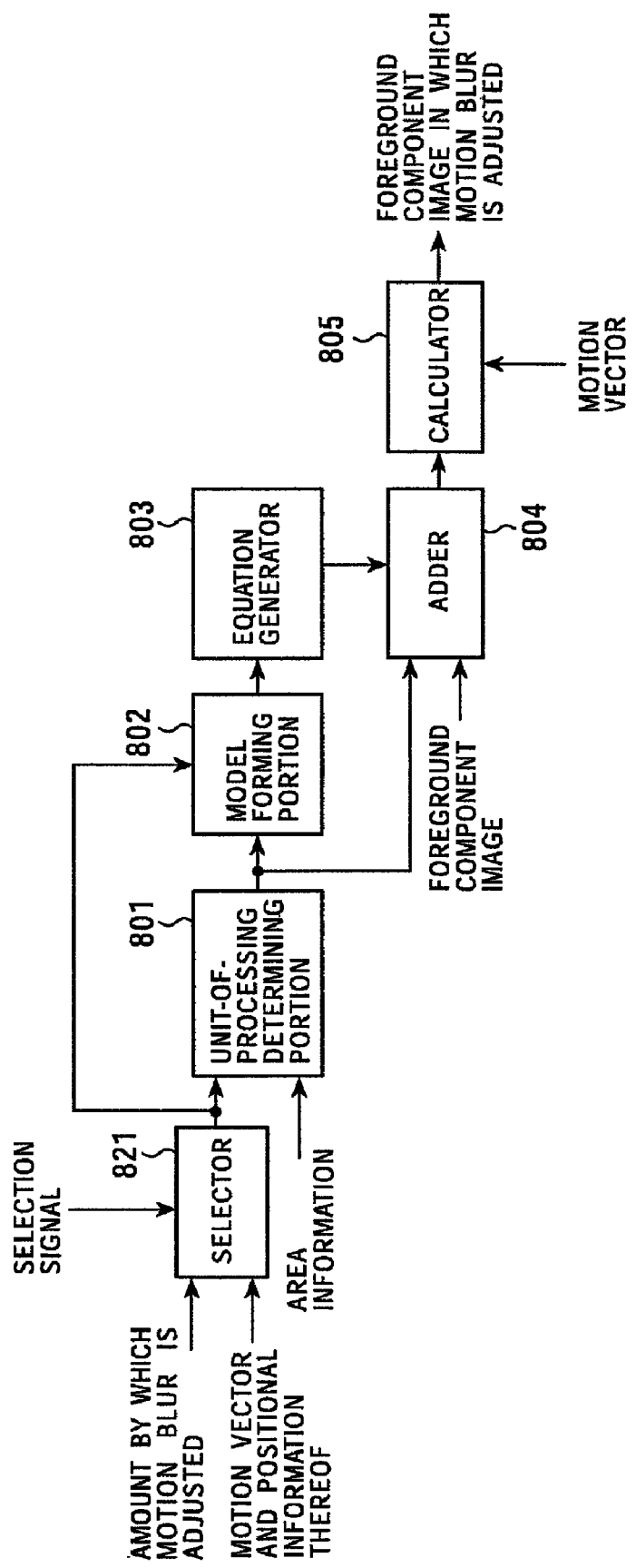
FIG. 103 is a diagram showing another configuration of the motion blur adjusting unit 106.

FIG. 103 is a drawing showing another structure of the motion blur adjusting unit 106. The same portions as those in FIG. 97 are given with the same reference numerals and the description thereof will be omitted.

The selector 821 supplies the input motion vector and the positional information thereof, as it is, to the unit of processing determining portion 801 and the model forming portion 802, on the basis of the selection signal or replaces the magnitude of motion vector with the amount v' by which motion blur is adjusted and then supplies the replaced amount v' and the positional information thereof to the unit of processing determining portion 801 and the model forming portion 802.

By doing like this, the unit of processing determining portion 801 to the calculator 805 of the motion blur adjusting unit 106 in FIG. 103 can adjust the amount of motion blur according to the amount of movement v and the amount v' by which motion blur is adjusted. For example, when the amount of movement v is 5 and the amount by which motion blur is adjusted is 3, the unit of processing determining portion 801 to the calculator 805 of the motion blur adjusting unit 106 in FIG. 103 performs calculations for the foreground component image whose amount of movement v is 5 according to the model of FIG. 101 corresponding to the amount v' by which the motion blur is adjusted 3, and then calculated the image including the motion blur according to the (amount of movement v)/(amount v' by which motion blur is adjusted)=5/3, almost equaling 1.7. Further, in this case, because the calculated image does not include the motion blur corresponding to amount of movement v of 3, it is important to keep in mind that the result of the motion blur adder 806 is different from the relation between the amount of movement v and the amount of adjusting motion blur v'.

As mentioned above, the motion blur adjusting unit 106 generates equations, according to the amount of movement v and the unit of processing, sets the pixel values of foreground component image in the generated equations, and then calculates the foreground component image whose amount of motion blur is adjusted.

Figure 104:
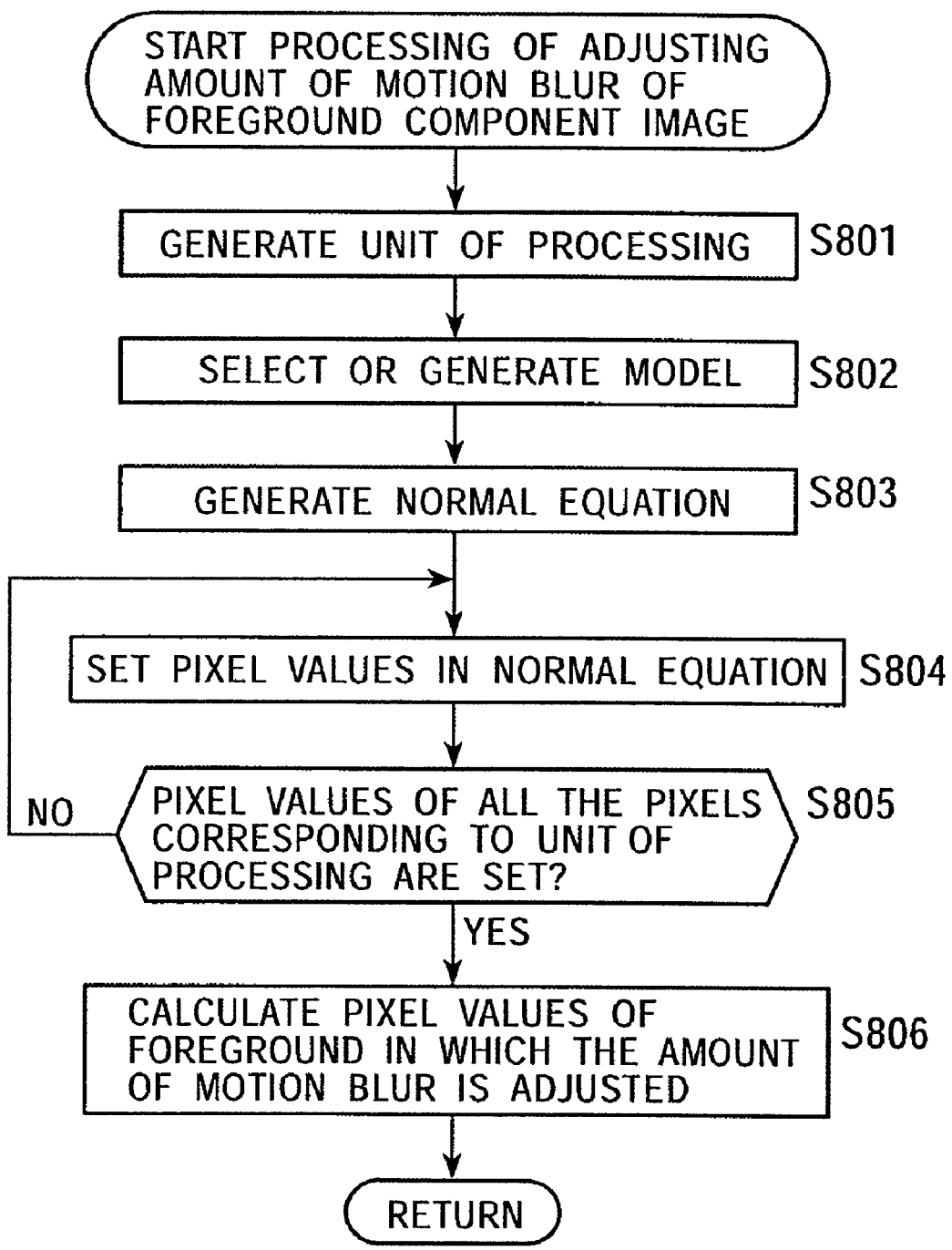
FIG. 104 is a flowchart illustrating a process of adjusting the amount of motion blur contained in a foreground component image in the motion blur adjusting unit (106)

Next, referring a flow chart in FIG. 104, a process of adjusting of amount of motion blur included in foreground component image by the motion blur adjusting portion 106 is explained.

In step S801, the unit of processing determining portion 801 of the motion blur adjusting unit 106 generates the unit of processing based on the motion vector and the positional information thereof, and the supplies the generated unit of processing to the model forming portion 802.

In step S802, the model forming portion 802 of the motion blur adjusting unit 106 selects or generates a model according to the amount of movement v and the unit of processing. In step S803, the equation generator 803 generates a normal equation based on the selected model.

In step S804, the adder 804 sets the pixel values of the foreground component image in the generated normal equation. In step S805, the adder 804 determines whether the pixel values of all the pixels corresponding to the unit of processing are set or not and if it is determined that the pixel value of all the pixels corresponding to the unit of processing are not set, the procedure returns to step S804 and repeats the processing for setting the pixel values in the generated normal equation.

In step S805, if the adder 804 determines that the pixel values of all the pixels corresponding to the unit of processing are set, the procedure proceeds to set S806, the calculator 805 calculates the pixel values of foreground whose amount of motion blur is adjusted on the basis of the normal equation where the pixel values supplied by the adder 804 is set, and the process ends.

Like this, the motion blur adjusting unit 106 can adjust the amount of motion blur from foreground image which includes the motion blur based on the motion vector and the positional information thereof.

That is, it is possible to adjust the amount of motion blur included in the pixel values which are sample data.

Figure 105:
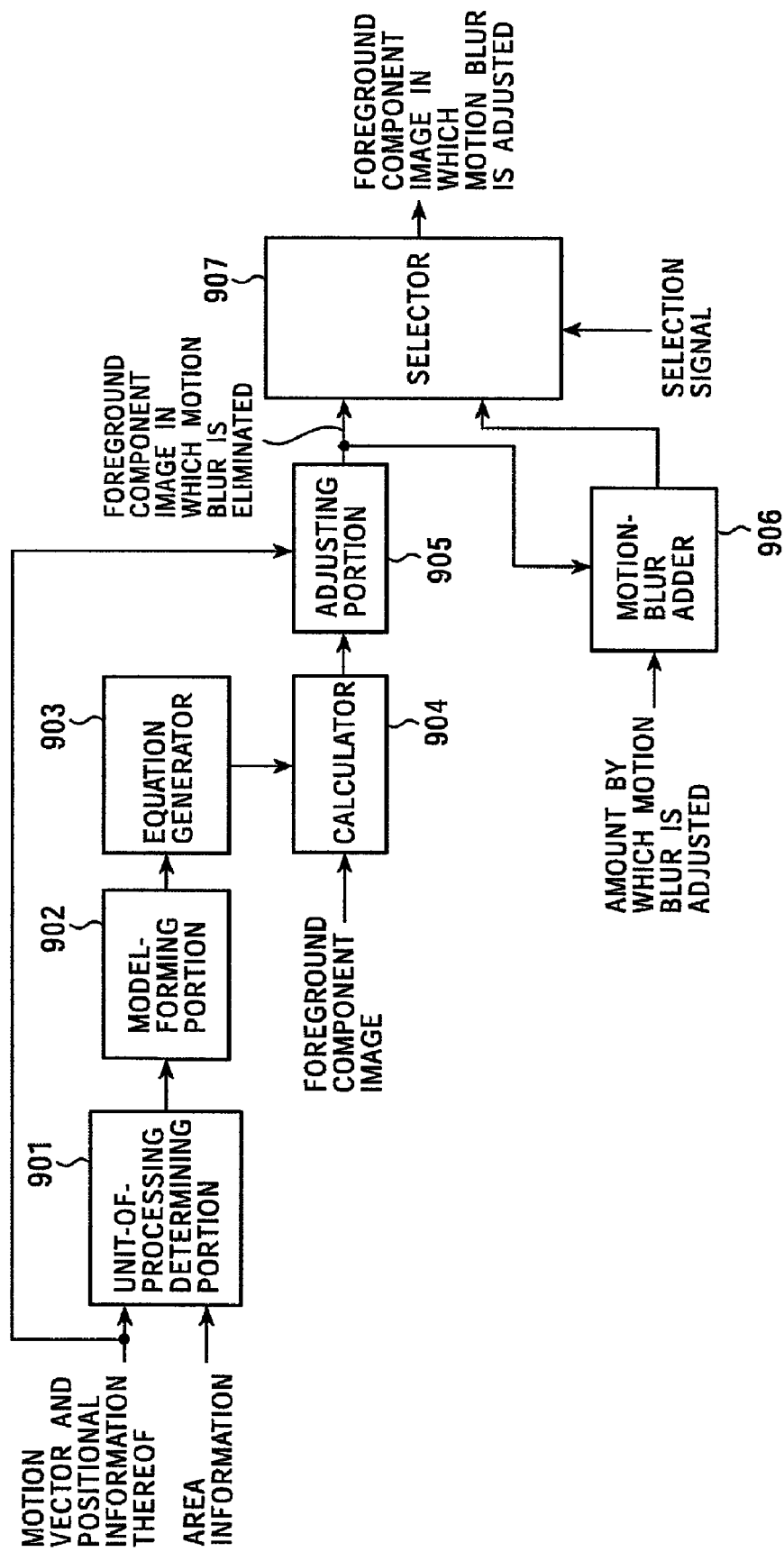
FIG. 105 is a block diagram showing another example of the configuration of the motion blur adjusting unit 106.

FIG. 105 is a block diagram showing another example of a configuration of the motion blur adjusting unit 106. The motion vector and the positional information thereof supplied from the motion detector 102 are supplied to a unit of processing determining portion 901 and a adjusting portion 905, and the area information supplied from the area specifying unit 103 is supplied to the unit of processing determining portion 901. The foreground component image supplied from the foreground/background separator 105 is supplied to calculator 904.

The unit of processing determining portion 901 generates a unit of processing based on the motion vector and positional information thereof, and the area information, and then supplies the generated unit of processing to the model forming portion 902 along with the motion vector.

The model forming portion 902 performs the model forming based on the motion vector and the input unit of processing. More specifically, the model forming portion 902 stores, for example, a plurality of models corresponding to the number of pixels included in the unit of processing, the virtual division number of the pixel value in time direction and the number of the foreground components for each pixel in advance, selects a specifying model corresponding to the pixel value and the foreground component shown in FIG. 106 on the basis of the unit of processing and the virtual division number of the pixel value in time direction.

For example, if the number of pixels corresponding to the unit of processing is 12 and the amount of movement v is 5, the model forming portion 902 selects the model, totally comprised 8 foreground components and where the number of division is 5, the leftmost pixel includes one foreground component, the second pixel from the leftmost includes two foreground components, the third pixel from the leftmost includes three foreground components, the fourth pixel from the leftmost includes four foreground components, the fifth pixel from the leftmost includes five foreground components, the sixth pixel from the leftmost includes five foreground components, the seventh pixel from the leftmost includes five foreground components, the eighth pixel from the leftmost includes five foreground components, the ninth pixel from the leftmost includes four foreground components, the tenth pixel from the leftmost includes three foreground components, the eleventh pixel from the leftmost includes two foreground components, the twelfth pixel from the leftmost includes one foreground component.

Further, the model forming portion 902 may not select one of the models stored in advance, but generates a model based on the motion vector and the unit of processing when the motion vector and the unit of processing are supplied.

The equation generator 903 generates equations based on the model supplied from the model forming portion 902.

Figure 106:
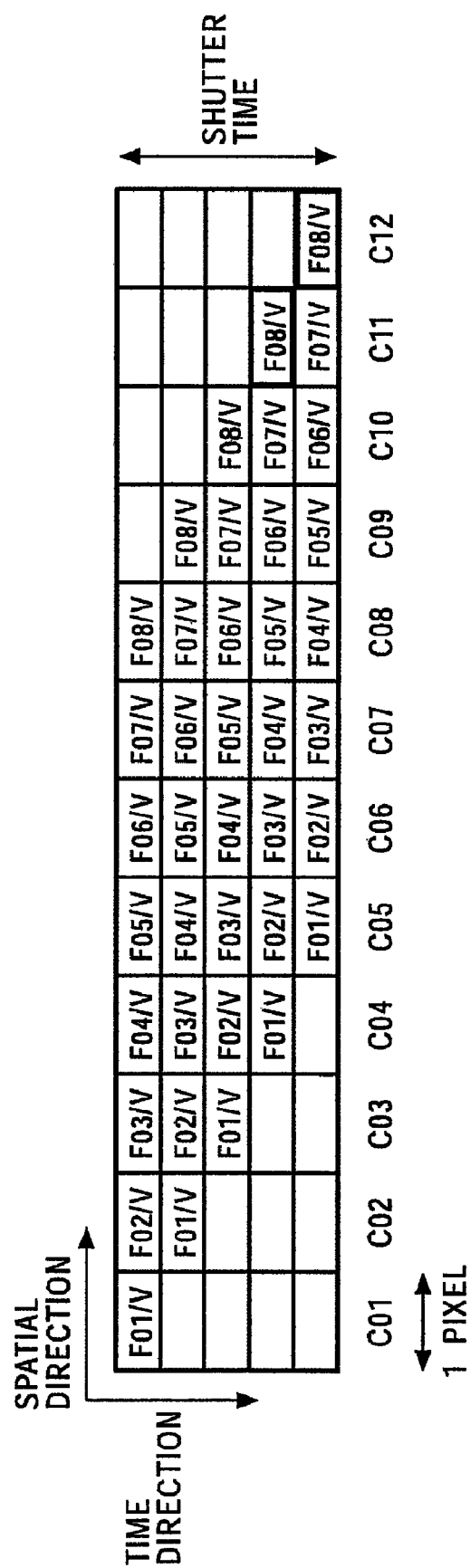
FIG. 106 is a diagram showing an example of a model in which the relationship of pixel values and foreground components is specified.
Figure 107:
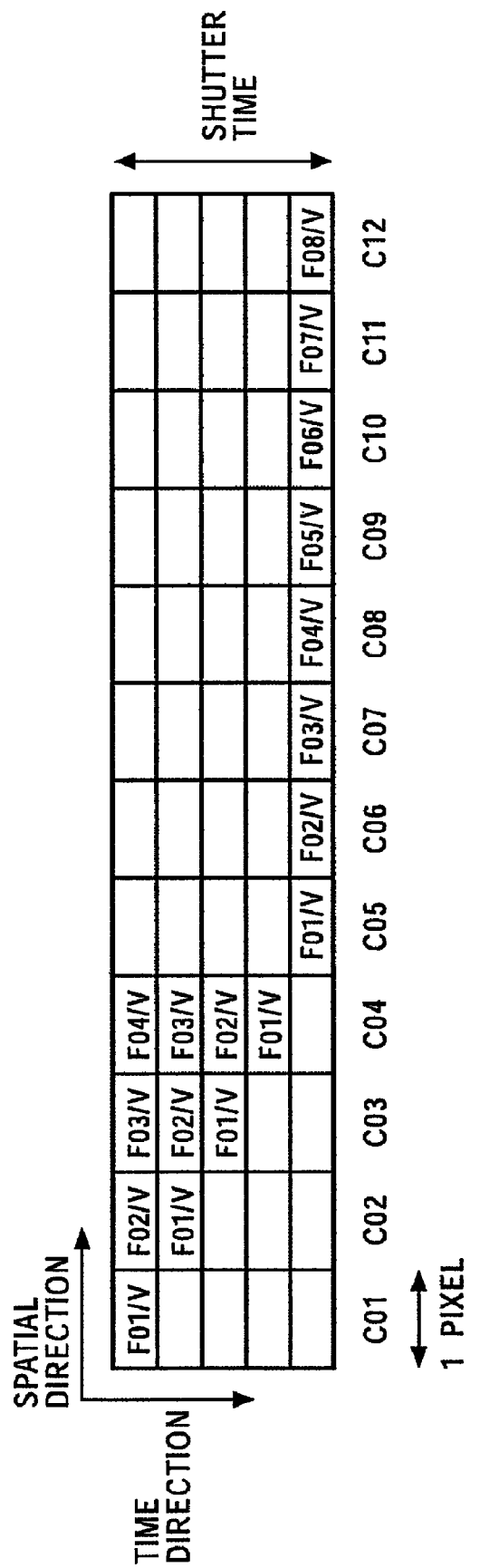
FIG. 107 is a diagram illustrating a calculation of a foreground component.
Figure 108:
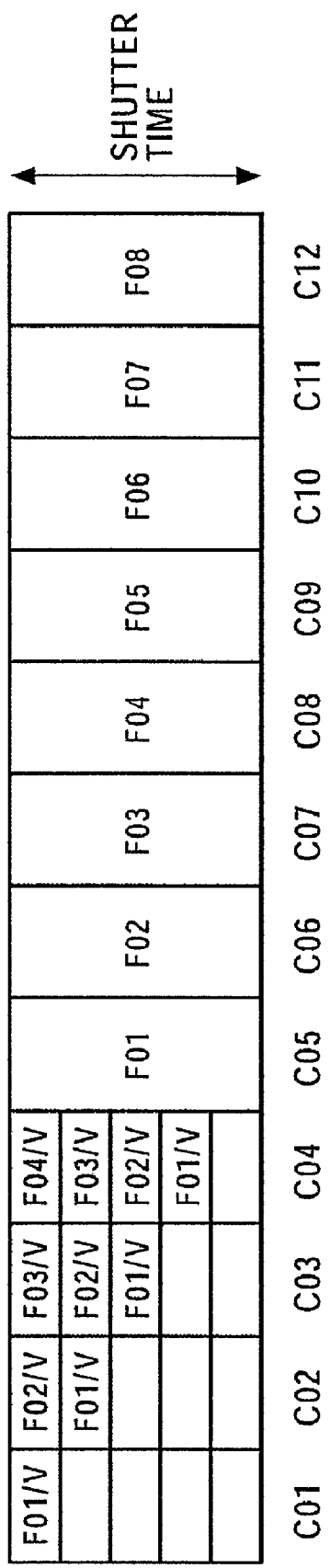
FIG. 108 is a diagram illustrating a calculation of a foreground component.

Referring to models of the foreground component image shown in FIGS. 106 to 108, examples of the equations generated by the equation generator 903 is explained when the number of the foreground components is 8, the number of the pixels corresponding to the unit of processing is 12 and the amount of movement v is 5.

When the foreground component corresponding to (shutter time)/v included in the foreground component image is between F01/v and F08/v, the relationship between F01/v to F08/v and the pixel values C01 to C12 are expressed in equations (78) to (89) as mentioned earlier.

Paying attention to the pixel values C12 and C11, the pixel value C12 comprise only the foreground component F08/v as shown in equation (111) and the pixel value C11 comprise the sum of the foreground components F08/v and F07/v. Therefore, the foreground component F07/v can be obtained from equation (112).

$$F08/v = C12 \quad (111)$$

$$F07/v = C11 - C12 \quad (112)$$

In the same manner, referring to the foreground components included in the pixel values C10 to C01, the foreground components F06/v to F01/v can be obtained by the equations (113) to (118).

$$F06/v = C10 - C11 \quad (113)$$

$$F05/v = C09 - C10 \quad (114)$$

$$F04/v = C08 - C09 \quad (115)$$

$$F03/v = C07 - C08 + C12 \quad (116)$$

$$F02/v = C06 - C07 + C11 - C12 \quad (117)$$

$$F01/v = C05 - C06 + C10 - C11 \quad (118)$$

The equation generator 903 generates equations for calculating the foreground components by using the differences between the pixel values shown in equations (111) to (118). The equation generator 903 supplies the generated equations to the calculator 904.

The calculator 904 calculates the foreground components based on the equations supplied from the equation generator 903 where the pixel values of the foreground component image are set. For example, when the equations (111) to (118) are supplied from the equation generator 903, the pixel values C05 to C12 are substituted in the equations (111) to (118).

The calculator 904 calculates the foreground components based on the equations where the pixel values are set. For example, the calculator 904 calculates the foreground components F01/v to F08/v from the calculations based on the equations (111) to (118) where the pixel values C05 to C12 are set as shown in FIG. 107. The calculator 904 supplies the foreground components F01/v to F08/v to the adjusting portion 905.

The adjusting portion 905 calculates the pixel value of the foreground where motion blur is eliminated by multiplying the foreground component supplied from the calculator 904 by the amount of movement v included in motion vector supplied from the unit of processing determining portion 901. For example, the adjusting portion 905 calculates the pixel values F01 to F08 of the foregrounds where motion blur is eliminated by multiplying each of the foreground components F01/v to F08/v by 5 of the amount of movement v when the foreground components F01/v to F08/v supplied from the calculator 904 are supplied as shown in FIG. 108.

The adjusting portion 905 supplies the calculated foreground component image comprising the pixel values of the foreground where motion blur is eliminated to the motion blur adder 906 and the selector 907.

The motion blur adder 906 may adjust the amount of motion blur by, for example, the amount v' by which motion blur is adjusted which is different from the amount of movement v and which is half of the amount of movement v, or the amount v' by which motion blur is adjusted having no relation with the amount of movement v. For example, as shown in FIG. 101, the motion blur adder 906 calculates the foreground component Fi/v' by eliminating the pixel value of foreground from which motion blur is eliminated Fi from the amount v' by which motion blur is adjusted, calculates the sum of the foreground components Fi/v', and then generates the pixel value where the amount of motion blur is adjusted. For example, when the amount by which motion blur is adjusted is 3, the pixel value C02 becomes (F01)/v', the pixel value C03 becomes (F01+F02)/v', the pixel value C04 becomes (F01+F02+F03)/v' and the pixel value C05 becomes (F02+F03+F04)/v'.

The motion blur adder 906 supplies the foreground component image where motion blur is adjusted to the selector 907.

The selector 907 selects one of the foreground component image from which motion blur is eliminated and which is supplied from the adjusting portion 905, and the foreground component image of which motion blur is adjusted and which is supplied from the motion blur adder 906, for example, on the basis of selection signal corresponding to the selection of an user, and then outputs the selected foreground component image.

Like the above, the motion blur adjusting unit 106 can adjust the amount of motion blur based on the selection signal and the amount v' by which motion blur is adjusted.

Figure 109:
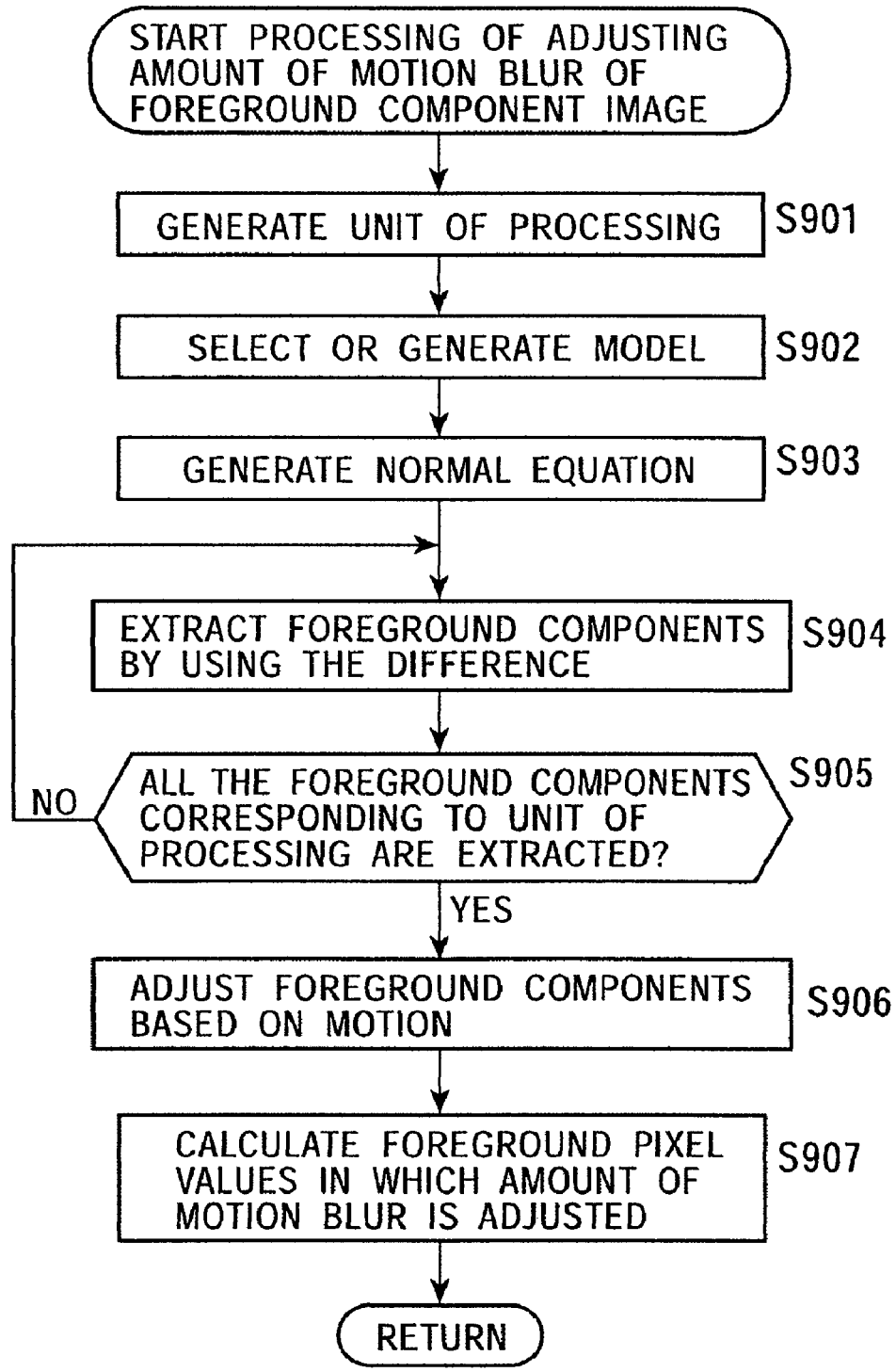
FIG. 109 is a flowchart illustrating the motion blur elimination processing of a foreground.

Next, referring the flow chart in FIG. 109, a process of adjusting the amount of motion blur of foreground in the motion blur adjusting unit 106 having a configuration shown in FIG. 105, will be explained.

In step S901, the unit of processing determining portion 901 of the motion blur adjusting unit 106 generates a unit of processing based on the motion vector and the area information, and then supplies the generated unit of processing to the model forming portion 902 and the adjusting portion 905.

In step S902, the model forming portion 902 of the motion blur adjusting unit 106 selects or generates a model according to the amount of movement v and the unit of processing. In step S903, the equation generator 903 generates an equation for calculating the foreground component from the differences between the pixel values of the foreground components based on the selected or generated model.

In step S904, the calculator 904 sets the pixel values of the foreground component image in the generated equation and extracts the foreground component from the differences between the pixel values on the basis of the equation which sets the pixels. In step S905, the calculator 904 determines whether all the foreground components corresponding to the unit of processing are extracted, and if it is determined that all the foreground components corresponding to the unit of processing are not extracted, the procedure returns to step S904 and the processing for extracting the foreground components is repeated.

In step S905, if it is determined that all the foreground components corresponding to unit of processing are extracted, the procedure proceeds to step S906, and the adjusting portion 905 corrects each of the foreground components F01/v to F08/v supplied from the calculator 904 based on the amount v of movement and then calculates the pixel values F01 to F08 from which the motion blur is eliminated.

In step S907, the motion blur adder 906 calculates the pixel values of the foreground where amount of motion blur is adjusted, the selector 907 selects either the image in which amount of movement is eliminated or the image in which amount of movement is adjusted and outputs the selected image, and then the procedure is finished.

Like the above, the motion blur adjusting unit 106 having the configuration shown in FIG. 105 can adjust motion blur by foreground image in which motion blur is included more rapidly by more simple operations.

Conventional methods for eliminating motion blur such as wiener•filter, etc., are effective in ideal conditions, but are not effective for the quantized real images having noises. However, this method using the motion blur adjusting unit 106 having the structure shown in FIG. 105 is sufficiently effective for the quantized real images having noises and it is possible to eliminate the motion blur precisely.

As mentioned above, the separation server 11 having the structure shown in FIG. 27 can adjust the amount of motion blur belonging to the input image.

Figure 110:
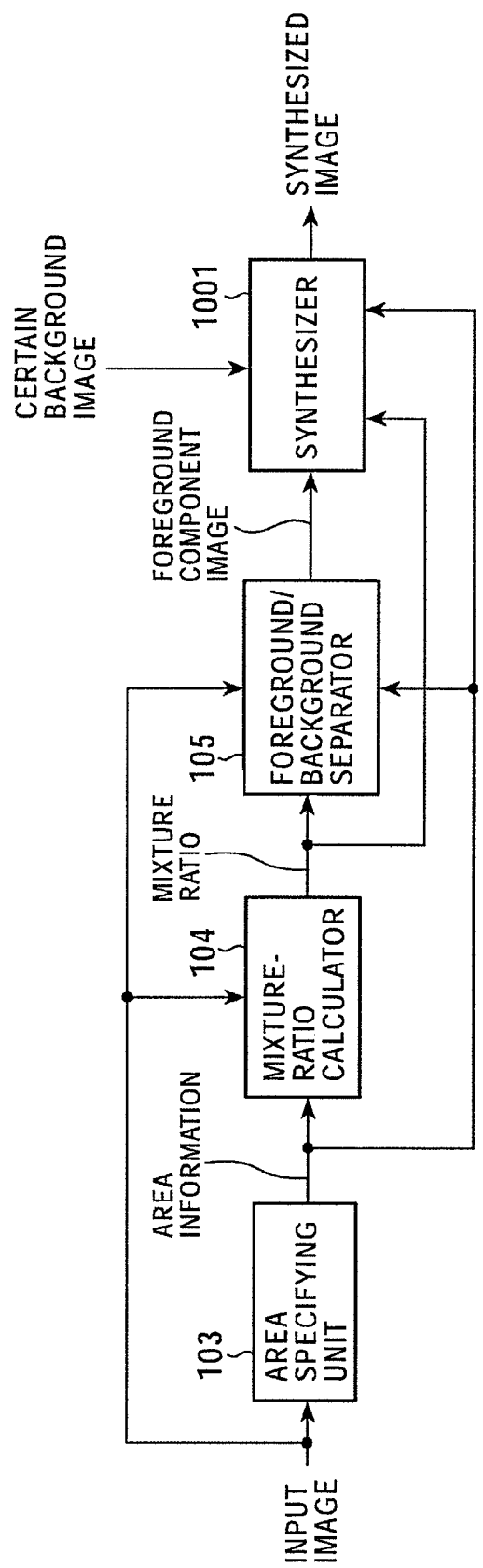
FIG. 110 is a block diagram showing another configuration of a function of the separation server.

FIG. 110 is a block diagram showing another configuration of the separation server 11.

The same portions as those in FIG. 27 are given with the same reference numerals and the description thereof will be omitted adequately.

The area specifying unit 103 supplies the area information to the mixture ratio calculator 104 and the synthesizer 1001.

The mixture ratio calculator 104 supplies the mixture ratio $\alpha$ to the foreground/background separator 105 and the synthesizer 1001.

The foreground/background separator 105 the foreground component image to the synthesizer 1001.

The synthesizer 1001 synthesizes any background image and the foreground component image supplied from the foreground/background separator 105 based on the mixture ratio $\alpha$ supplied from the mixture ratio calculator 104 and the area information supplied from the area specifying unit 103, and then output the synthesized image corresponding to the background image or the foreground component image.

Figure 111:
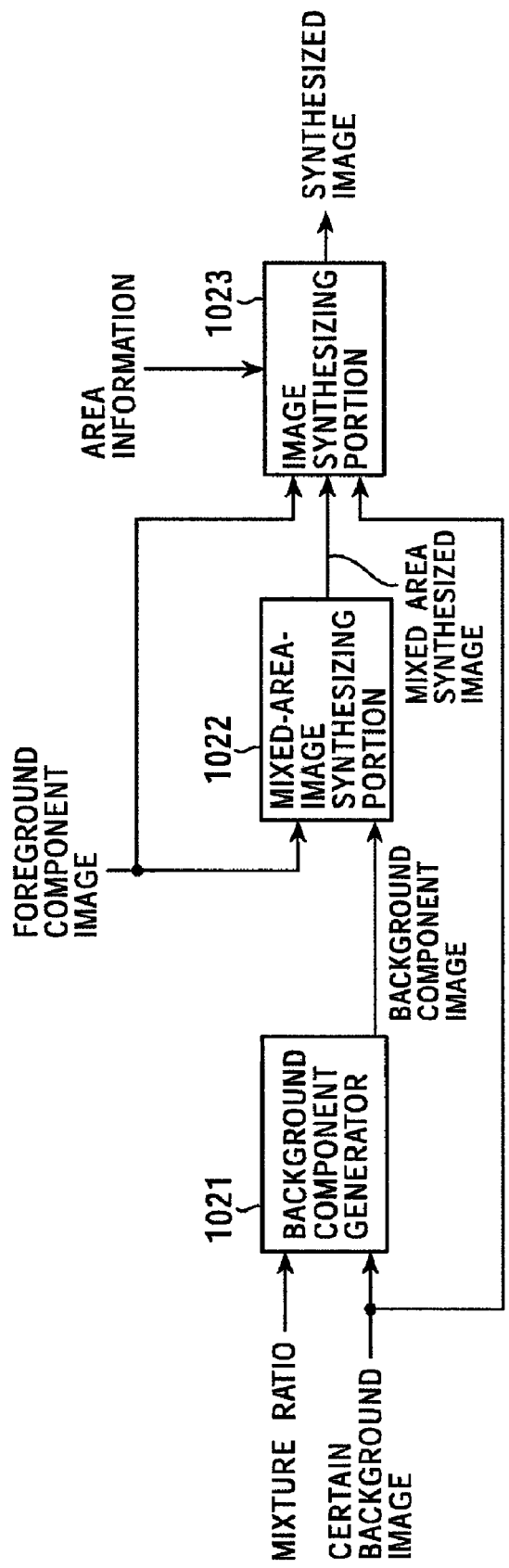
FIG. 111 is a diagram showing a configuration of a synthesizer 1001.

FIG. 111 is a drawing showing a configuration of the synthesizer 1001. The background component generator 1021 generates the background component image based on the mixture ratio $\alpha$ and any background image, and then supplies the generated background component image to the mixed area image synthesizing portion 1022.

The mixed area image synthesizing portion 1022 generates the mixed area synthesized image by synthesizing the background component image supplied from the background component generator 1021 and the foreground component and then supplies the generated mixed area synthesized image to the image synthesizing portion 1023.

The image synthesizing portion 1023 synthesizes the foreground component image, the mixed area synthesized image supplied from the mixed area image synthesizing portion 1022 and any background image based on the area information to generate and output the synthesized image.

Like the above, the synthesizer 1001 can synthesize the foreground component image and any background image.

The image obtained by synthesizing the foreground component image and any background image based on the feature amount of the mixture ratio $\alpha$ is more natural when compared to the image obtained by synthesizing only the pixels.

Figure 112:
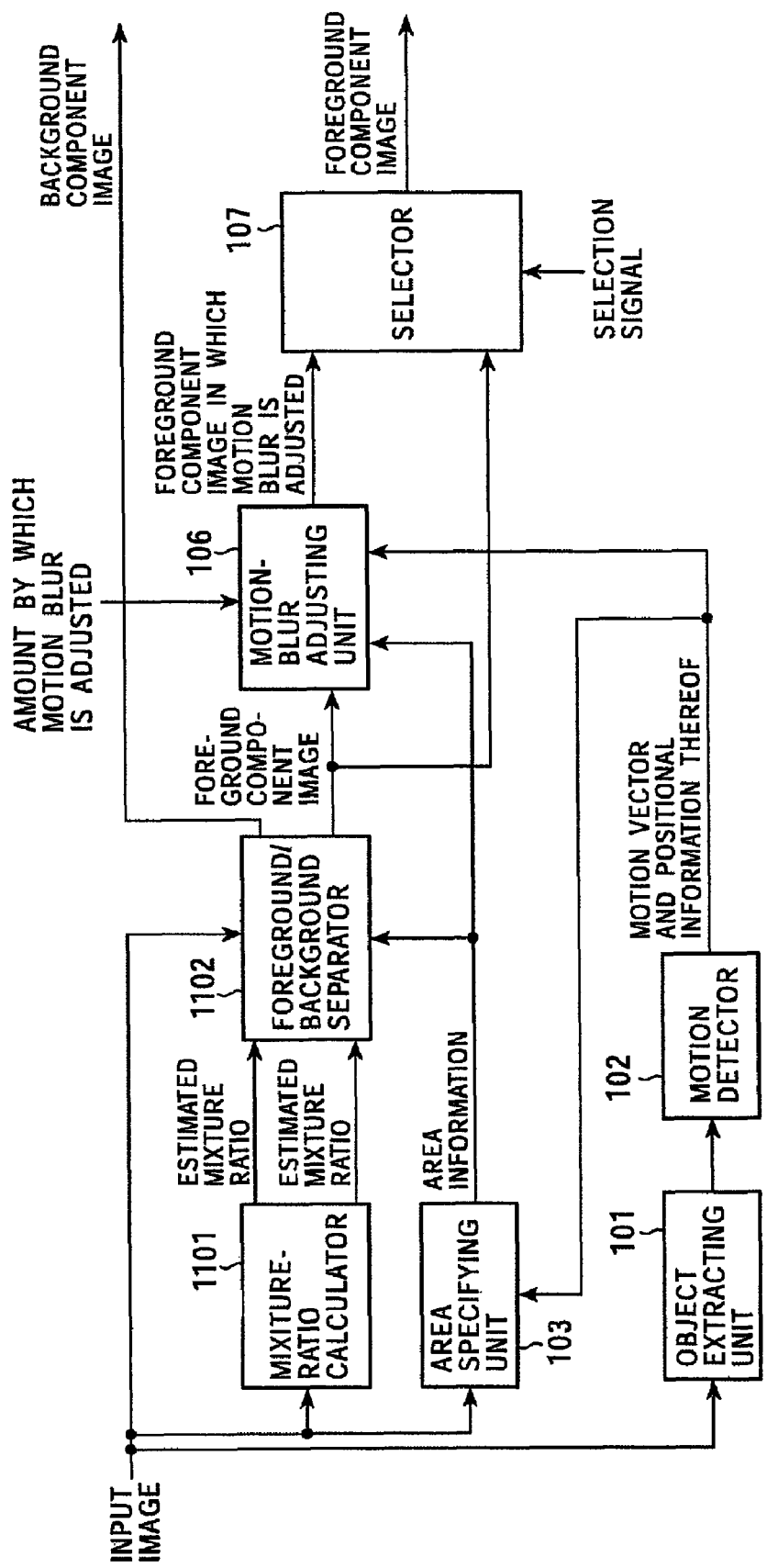

FIG. 112 is a block diagram showing another configuration of the separation server 11 which has adjusted the amount of motion blur. The separation server 11 shown in FIG. 27 performs the area specification and calculates of the mixture ratio $\alpha$ serially, while the separation server 11 shown in FIG. 112 performs the area specification and calculates of the mixture ratio $\alpha$ in parallel.

The same portions as those in FIG. 27 are given with the same reference numerals and the description thereof will be omitted.

The input image is supplied to the mixture ratio calculator 1101, the foreground/background separator 1102, the area specifying unit 103 and the object extracting unit 101.

The mixture ratio calculator 1101 calculates an estimated mixture ratio supposing that the pixel belongs to the covered background area and calculates an estimated mixture ratio supposing that the pixel belongs to the uncovered background area for each pixel belonging to the input image on the basis of the input image, and supplies the estimated mixture ratio for the case supposing that the pixel belongs to the covered background area and the estimated mixture ratio in the case that supposes the pixel belongs to the uncovered background area to the foreground/background separator 1102.

Figure 113:
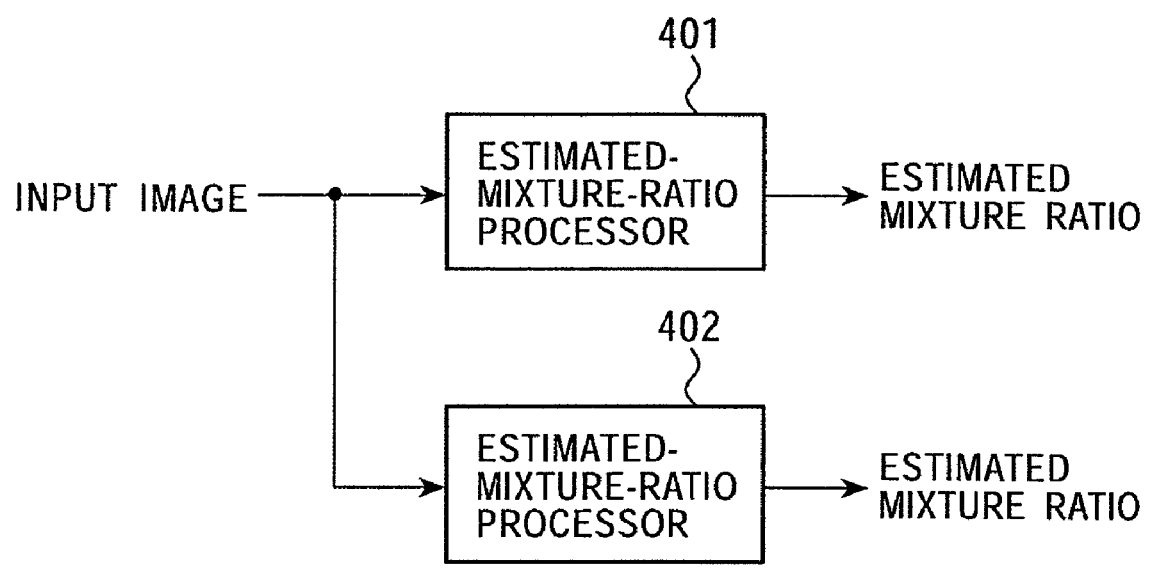

FIG. 113 is a block diagram showing an example of a configuration of the estimated mixture ratio calculator 1101.

An estimated mixture ratio processor 401 shown in FIG. 113 is the same as the estimated mixture ratio processor 401 shown in FIG. 72. An estimated mixture ratio processor 402 shown in FIG. 113 is the same as the estimated mixture ratio processor 402 shown in FIG. 72.

The estimated mixture ratio processor 401 calculates an estimated mixture ratio for each pixel using the calculation corresponding to a model of the covered background area based on the input image, and then outputs the calculated estimated mixture ratio.

The estimated mixture ratio processor 402 calculates an estimated mixture ratio for each pixel using the calculation corresponding to a model of the uncovered background area based on the input image, and then outputs the calculated estimated mixture ratio.

The foreground/background separator 1102 generates a foreground component image from the input image, based on the estimated mixture ratio for the case that supposes the pixel belongs to the covered background area, the estimated mixture ratio for the case that supposes the pixel belongs to the uncovered background area which are supplied from the mixture ratio calculator 1101, and based on the area information supplied from the area specifying unit 103, and then supplies the generated foreground component image to the motion blur adjusting unit 106 and the selector 107.

Figure 114:
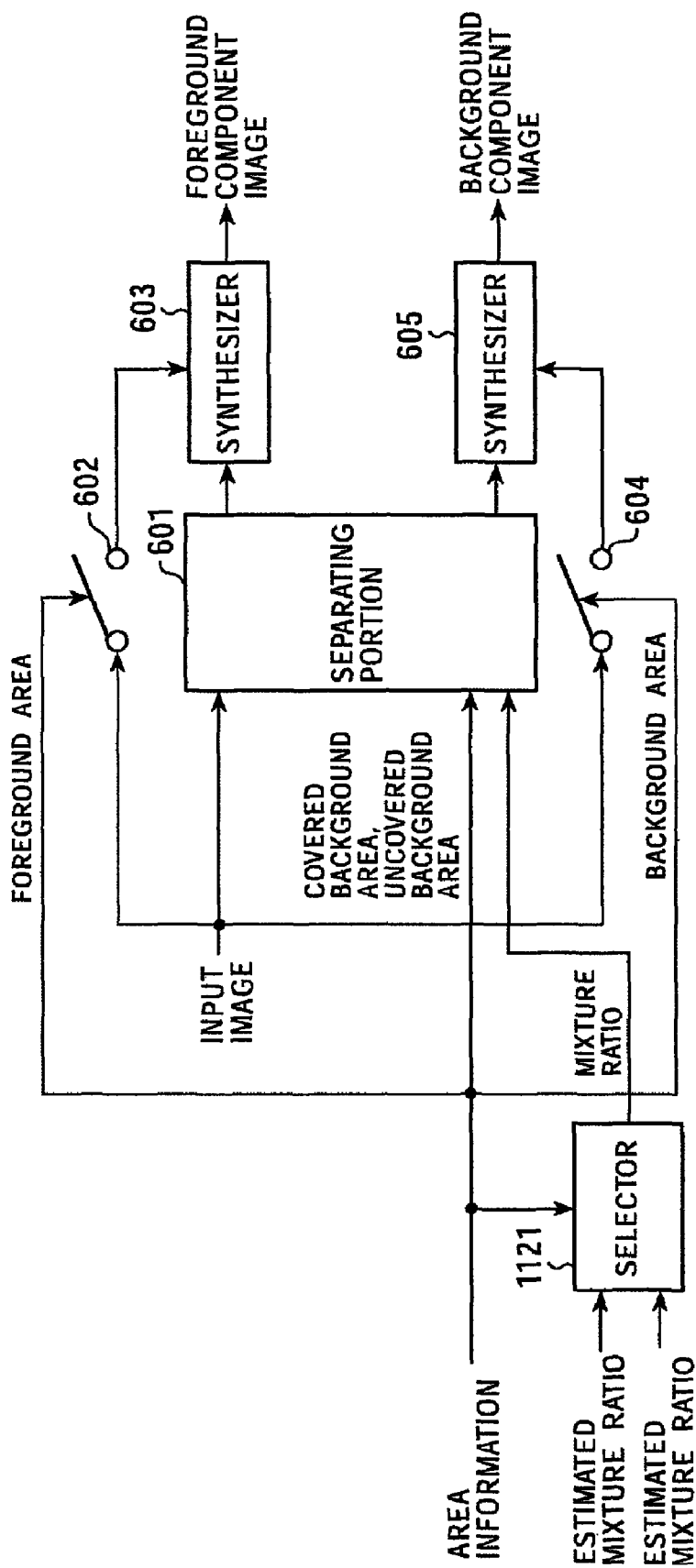

FIG. 114 is a block diagram showing an example of a configuration the foreground/background separator 1102.

The same portions as those in the foreground/background separator 105 shown in FIG. 89 are given with the same reference numerals and the description thereof will be omitted.

The selector 1121 selects the estimated mixture ratio for the case that supposes the pixel belongs to the covered background area or the estimated mixture ratio for the case that supposes the pixel belongs to the uncovered background area which are supplied from the mixture ratio calculator 1101, based on the area information supplied from the area specifying unit 103, and then supplies the selected estimated mixture ratio as the mixture ratio α to the separating portion 601.

The separating portion 601 extracts the foreground component and background component from the pixel values of the pixel belonging to the mixed area based on the mixture ratio and the area information supplied from the selector 1121, supplies the extracted foreground component to the synthesizer 603 and supplies the extracted background component to the synthesizer 605.

The separating portion 601 can have the same configuration shown in FIG. 94.

The synthesizer 603 synthesizes and outputs the foreground component image. The synthesizer 605 synthesizes and outputs the background component image.

The motion blur adjusting unit 106 shown in FIG. 112, which may have the same structure as the configuration shown in FIG. 27, adjusts the amount of motion blur belonging to the foreground component image supplied from the foreground/background separator 1102 based on the area information and the motion vector, and then outputs the foreground component image where the amount of motion blur is adjusted.

The selector 107 shown in FIG. 112 selects either the foreground component image supplied from the foreground/background separator 1102 or the foreground component image in which the motion blur is adjusted supplied from the motion blur adjusting unit 106 based on the selection signal corresponding the selection of a user, and then output the selected foreground component image.

Like the above, the separation server 11 having the configuration shown in FIG. 112 can adjust the amount of motion blur included in the image corresponding to the foreground object included in the input image and outputs it. The separation server 11 having the configuration shown in FIG. 112 can calculate a mixture ratio α of buried information and output the calculated mixture ratio α as the same manner in the first embodiment.

Figure 115:
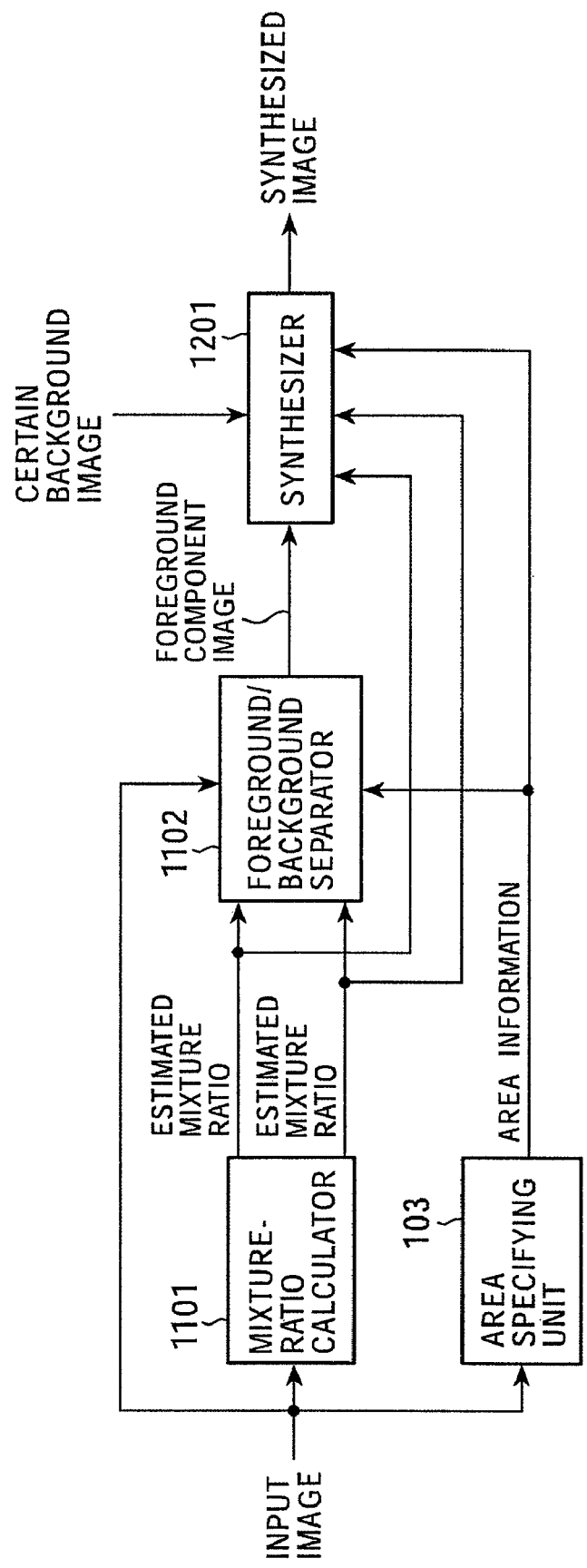

FIG. 115 is a block diagram showing another configuration of the separation server 11 for synthesizing the foreground component image and any background image. The separation server 11 shown in FIG. 110 performs the area specification and the calculation of the mixture ratio α serially. But the separation server 11 shown in FIG. 115 performs the area specification and the calculation of the mixture ratio α in parallel.

The same portions as those in FIG. 112 are given with the same reference numerals and the description thereof will be omitted.

The mixture ratio calculator 1101 shown in FIG. 115 calculates an estimated mixture ratio for the case that supposes the pixel belongs to the covered background area and an estimated mixture ratio for the case that supposes the pixel belongs to the uncovered background area for each pixel belonging to the input image on the basis of the input image, and supplies the estimated mixture ratio for the case that supposes the pixel belongs to the covered background area and the estimated mixture ratio for the case that supposes the pixel belongs to the uncovered background area to the foreground/background separator 1102 and the synthesizer 1201.

The foreground/background separator 1102 shown in FIG. 115 generates a foreground component image from the input image based on the estimated mixture ratio for the case that supposes the pixel belongs to the covered background area and the estimated mixture ratio for the case that supposes the pixel belongs to the uncovered background area which are supplied from the mixture ratio calculator 1101, and based on the area information supplied from the area specifying unit 103, and then supplies the generated foreground component image to the synthesizer 1201.

The synthesizer 1201 synthesizes any background image and the foreground component image supplied from the foreground/background separator 1102 based on the estimated mixture ratio for the case that supposes the pixel belongs to the covered background area and the estimated mixture ratio for the case that supposes the pixel belongs to the uncovered background area which are supplied from the mixture ratio calculator 1101, and based on the area information supplied from the area specifying unit 103, and then outputs the synthesized image corresponding to the background image or the foreground image.

Figure 116:
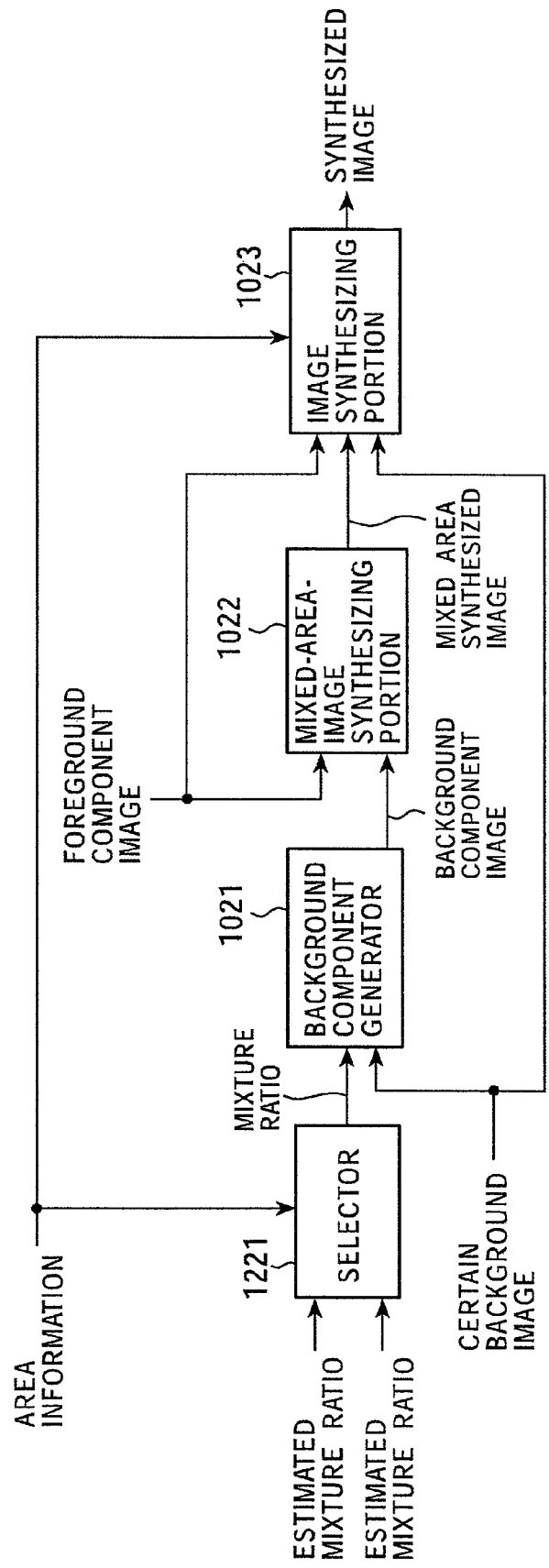

FIG. 116 is a drawing showing a configuration of the synthesizer 1201. The same portions as those in the block diagram of FIG. 111 are given with the same reference numerals and the description thereof will be omitted.

The selector 1221 selects the estimated mixture ratio for the case that supposes the pixel belongs to the covered background area or the estimated mixture ratio for the case that supposes the pixel belongs to the uncovered background area which are supplied from the mixture ratio calculator 1101, based on the information supplied from the area specifying unit 103, and then supplies the selected estimated mixture ratio as the mixture ratio α to the background component generator 1021.

The background component generator 1021 shown in FIG. 116 generates a background component image based on the mixture ratio α supplied from the selector 1221 and any background image, and then supplies the generated background component image to the mixed area image synthesizing portion 1022.

The mixed area image synthesizing portion 1022 shown in FIG. 116 generates a mixed area synthesized image by synthesizing the background component image supplied from the background component generator 1021 and the foreground component image, and then supplies the generated mixed area synthesized image to the image synthesizing portion 1023.

The image synthesizing portion 1023 synthesizes the foreground component image, the mixed area synthesized image supplied from the mixed area image synthesizing portion 1022 and any background image, based on the area information to generate and output the synthesized image.

Like the above, the synthesizer 1201 can synthesize the foreground component image and any background image.

Further, the mixture ratio α is explained as the ratio of the background component belonging to the pixel value but it may be a ratio of the foreground component belonging to the pixel value.

Further, it has been explained that the moving direction of the object to be the foreground was from the left to right. But, of course, the direction is not limited to that direction.

In above, the case when projecting the real space image having the information of the 3-dimensional space and time axis to the space-time having the information of the 2-dimensional space and time axis by using a video camera was explained as an example, but the present invention is not limited to this example and is applicable to the cases where the distortion originated from the projection is corrected, the significant information is extracted or image is synthesized more naturally when the first information of the first dimension are projected to the second information of the second dimension which is less than the first information quantitatively.

Further, the sensor 76a is not limited to the CCD and may be a solid state image pickup element, for example, BBD (Bucket Brigade Device), CID (Charge Injection Device), CPD (Charge Priming Device), or CMOS (Complementary Mental Oxide Semiconductor) sensor. And the sensor is not limited to the sensor where the detecting elements are arranged on the matrix, it may be a sensor where the detecting elements are adjacent in a row.

Each function of the separation server 11 explained above may be achieved by distributing the image processing to the various servers on the network shown in FIG. 1. That is, the object extracting unit 101 and the motion detector 102, may function as the motion detecting server 12 the area specifying unit 103 may function as the area specifying server 13, the mixture ratio calculator 104 may function as the mixture ratio calculating server 14, the foreground/background separator 105 may function as the foreground/background image separating server 15 and the motion blur adjusting unit 106 may function as the motion blur adjusting server 16. Therefore, the block diagram of the separation server 11 shown in FIG. 27 can be performed by hardware, software or network. Further, in the same manner, the synthesizing server 19 may function as the synthesizer 1201 and the block diagram of the synthesizing process can be performed by hardware, software or network.

Each processing of the object extracting unit 101, the motion detector 102, the area specifying unit 103, the mixture ratio calculator 104, the foreground/background separation processor 105 and the motion blur adjusting unit 106 may be replaced with each processing of the motion detecting server 12, the area specifying server 13, the mixture ratio calculating server 14, the foreground/background image separating server 15 and the motion blur adjusting server 16, and therefore the explanation thereof is omitted.

Further, when performed by the hardware or software, the separation server 11 may comprise of a portion included in the various servers, the client computer 27 and the camera terminal units 28 which are connected to the network in FIG. 1 as a separation processor. Thus, in the following explanation, when the separation server 11 is explained as one device having the function for separating the input image into a foreground component image and a background component image, it is referred to as the separation processor 11.

Next, referring the flow chart in FIG. 117, a process of separating service for the image input from the client computer 27 via the network 1 of FIG. 1 by the separation server 11 will be explained.

In step S1001, the client computer 27 outputs the information for specifying an image to the separation server 11. That is, a specific image or an image ID specifying an image is output to the separation server 11 as the information specifying an image desired by a user to be separated.

In step S1011, the separation server 11 obtains a specified image. That is, the separation server 11 reads out and obtains the very image transmitted from the client computer 27, and reads out and obtains an image corresponding to an image ID when specifying information is transmitted from the client computer 27, via the network 1.

In step S1012, the charge processor 11a of the separation server 11 performs the charge processing via the network 1 by cooperating with the account charge server 24. Further, at the same time, in step S1021, the account charge server 24 performs the charge processing by cooperating with the separation server 11.

Figure 118:
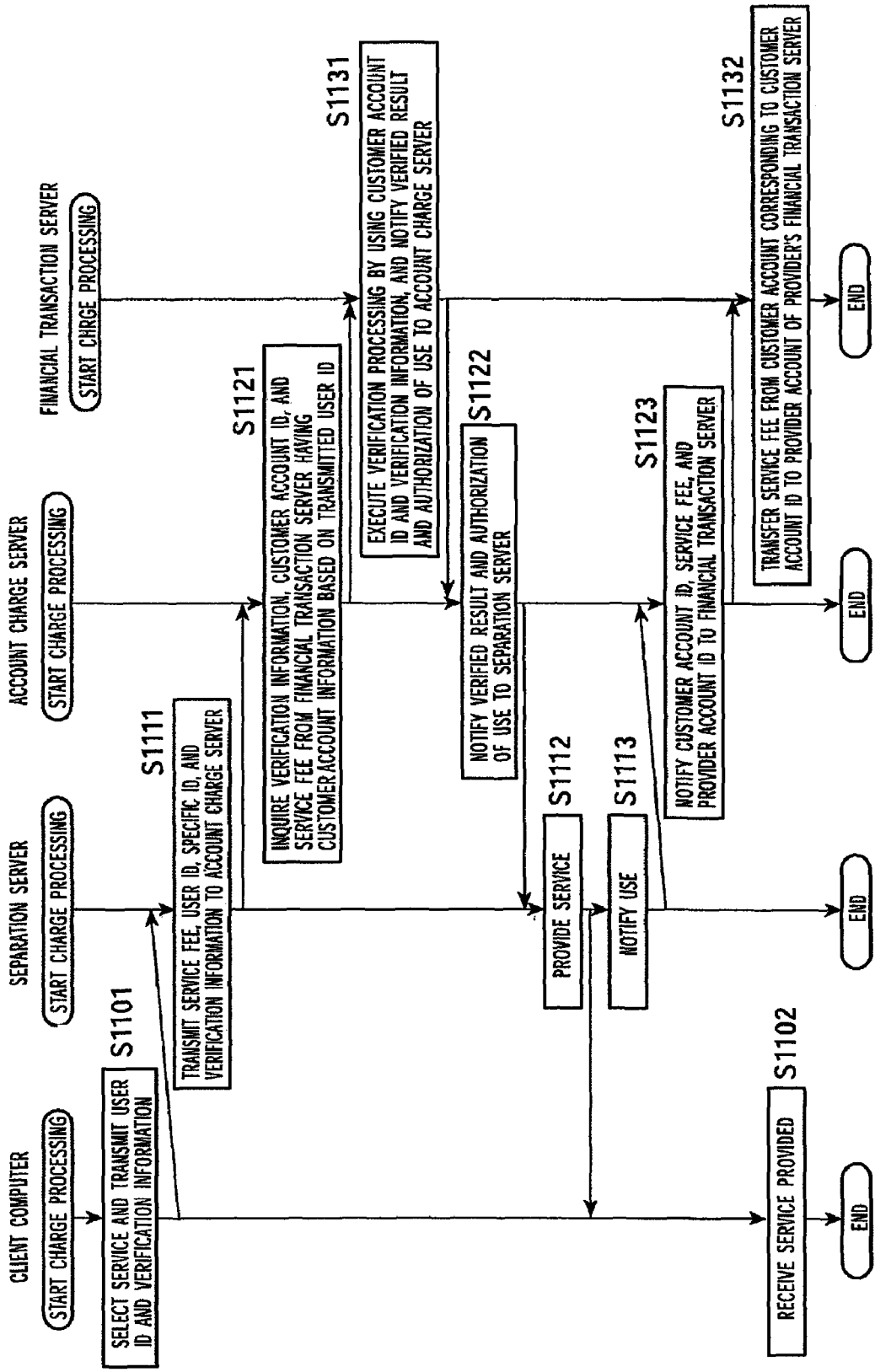

Here, referring to the flowchart of FIG. 118, the aforementioned charge processing will be explained. Further, the real charge processing is performed by the separation server 11 and the account charge server 24. However, since the information required for various processes is also output from the client computer 27, here, the processing of the client computer 27 will be explained together.

Figure 119:
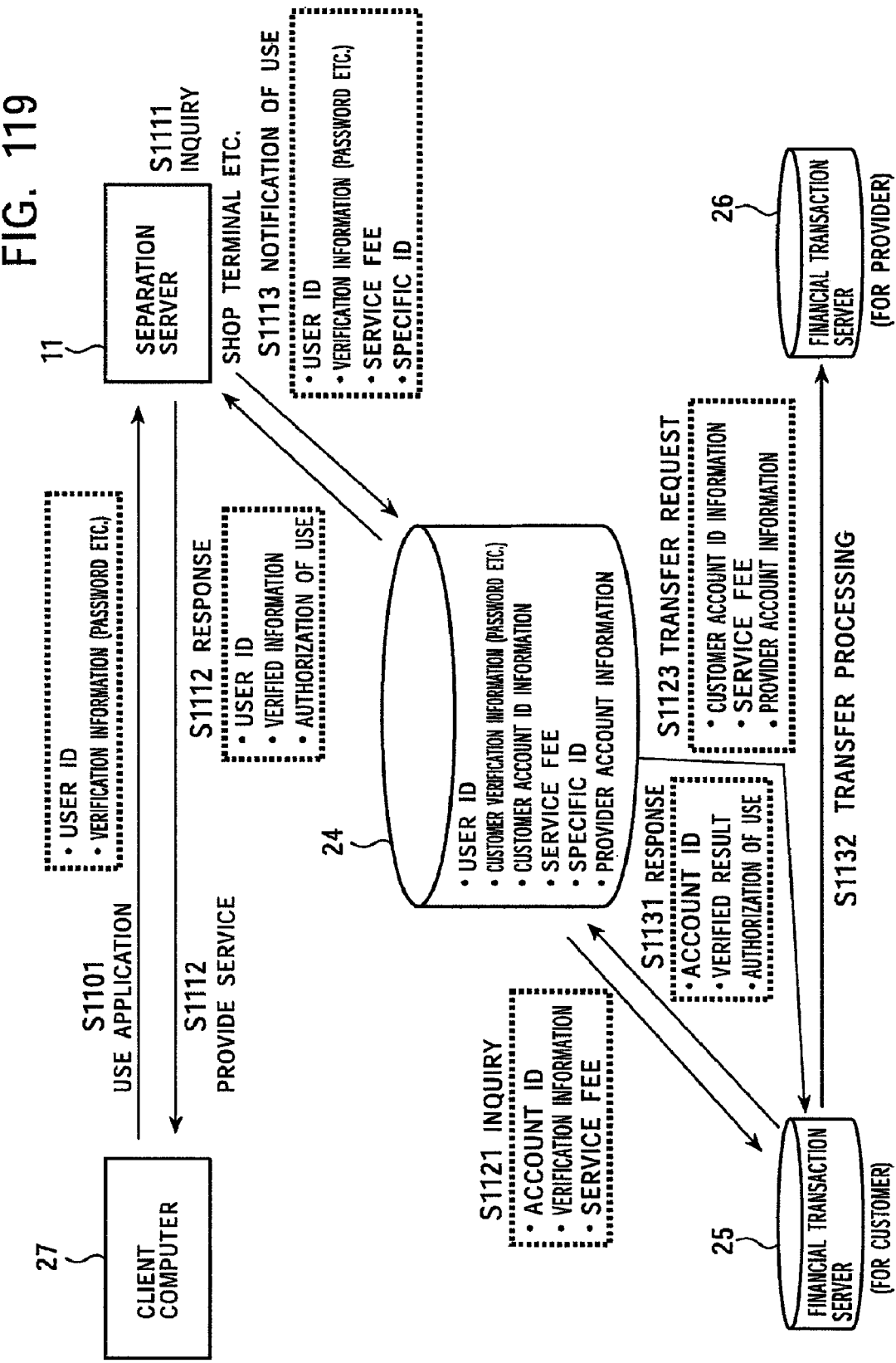

In step S1101, as shown in FIG. 119, the client computer 27 selects the service and transmits a corresponding service fee to the separation server 11 along with ID information for discerning the user (user provided with image separating service) and the verification information (password, etc.) via the network 1. That is, at this time, when the information for specifying image is transmitted by means of the processing of step S1001 in FIG. 117, the processing in this step S1101 is performed. Further, the service fee means the cost for the separating service.

In step S1111, as shown in FIG. 119, the charge processor 11a of the separation server 11 receives the ID information and the verification information and transmits the service fee and its own ID to the account charge server 24.

In step S1121, as shown in FIG. 119, the account charge server 24 inquires the verification information, the customer account ID and the service fee from the financial transaction server 25 that is managed by a financial institution of the customer account on the basis of ID transmitted from the separation server 11.

In step S1131, as shown in FIG. 119, the financial transaction server (for customer) 25 executes the verification processing on the basis of the customer account ID and the verification information and notifies the verified result and the information of authorization of use to the account charge server 24.

In step S1122, as shown in FIG. 119, the account charge server 24 transmits the verified result and the information of authorization of use to the separation server 11. Further, in the following description, explanation will be given when the verified result is available. Further, when information about the non-availability of verified result is received, the process ends.

In step S1112, as shown in FIG. 119, when the verified result and the financial institution is available, the separation server 11 provides the client computer 27 with the service. In step S1102, the client computer 27 receives the service provided. That is, at this time, in step S1112, the separation server 11 separates the specified image into a foreground component image and a background component image to be output to the client computer 27 and in step S1102, the client computer 27 receives the separated foreground component image and background component image.

In step S1113, the separation server 11 transmits the notification of use of the service to the account charge server 24. In step S1123, the account charge server 24 notifies the customer account ID, the service fee and the provider account ID to the financial transaction server (for customer) 25.

In step S1132, the financial transaction server (for customer) 25 transfers the service fee from the account of the customer account ID to the financial transaction server (for provider) 26.

Figure 117:
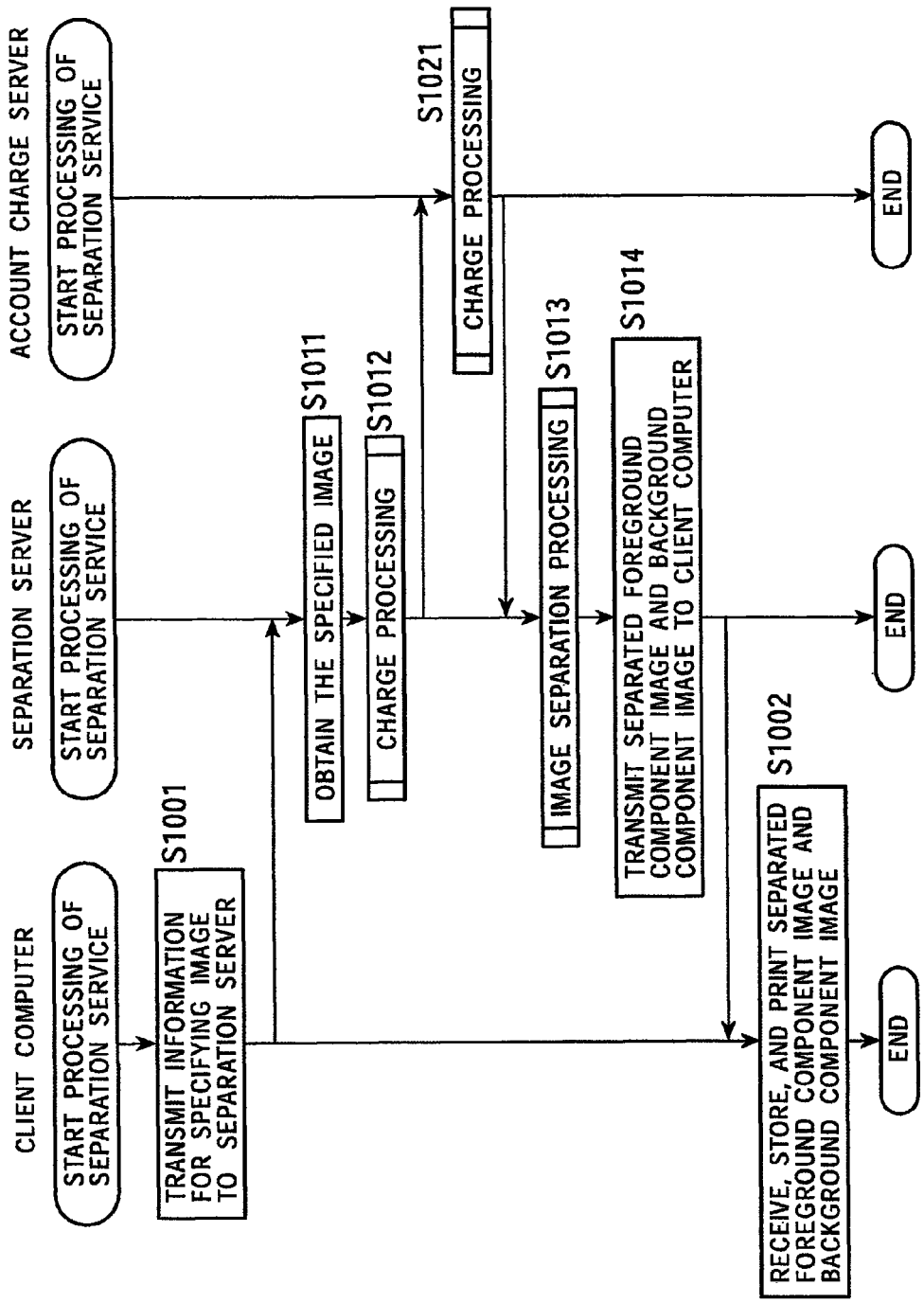

Here, the procedure returns to the explanation of the flowchart of FIG. 117.

After the charge processing is performed by the separation server 11 and the account charge server 24 in steps S1012, S1021, the separation server 11 performs the image separation in step S1013. That is, the area specifying unit 103 of the separation server 11 perform the area specifying processing explained referring to the flowchart of FIG. 53, the mixture ratio calculator 104 performs the mixture ratio calculation processing explained by referring to the flowchart of FIG. 81, the foreground/background separator 105 performs the foreground/background separation processing explained referring to the flowchart of FIG. 96 and the motion blur adjusting unit 106 performs the process of adjusting the amount of motion blur explained referring to the flowchart of FIG. 44, respectively, to separate the specified image. Further, since the amount-of-motion blur adjusting process, the area specifying process, the mixture ratio calculating process and the foreground/background separating process are similar to those described above, explanation thereof will be omitted.

In step S1014, the separation server 11 generates ID to the separated foreground component image and the background component image and then, transmits it to the client computer 27. In step S1002, the client computer 27 receives the foreground component image, the background component image and ID thereof transmitted from the separation server 11, stores them in its own storage unit 48 (see FIG. 2) and prints out them as needed. Further, the client computer 27 may make the separation server 11 store in its own storage unit the foreground component image and the background component image separated by the separation server 11 or output them to the storage server 18 via the network 1 so as to store them according to the instructions of a user.

In the above explanation, the separating process has been described when the service fee has been paid to the financial transaction servers 25, 26 by the account charge server 24. However, the charge processing may be performed, by storing points; such as pre-paid points, indicating that the user has previously paid the service fee to the provider of the separating service in the storage unit 48 (see FIG. 2) and deducting the points at every time the user is provided with the separating service.

Figure 120:
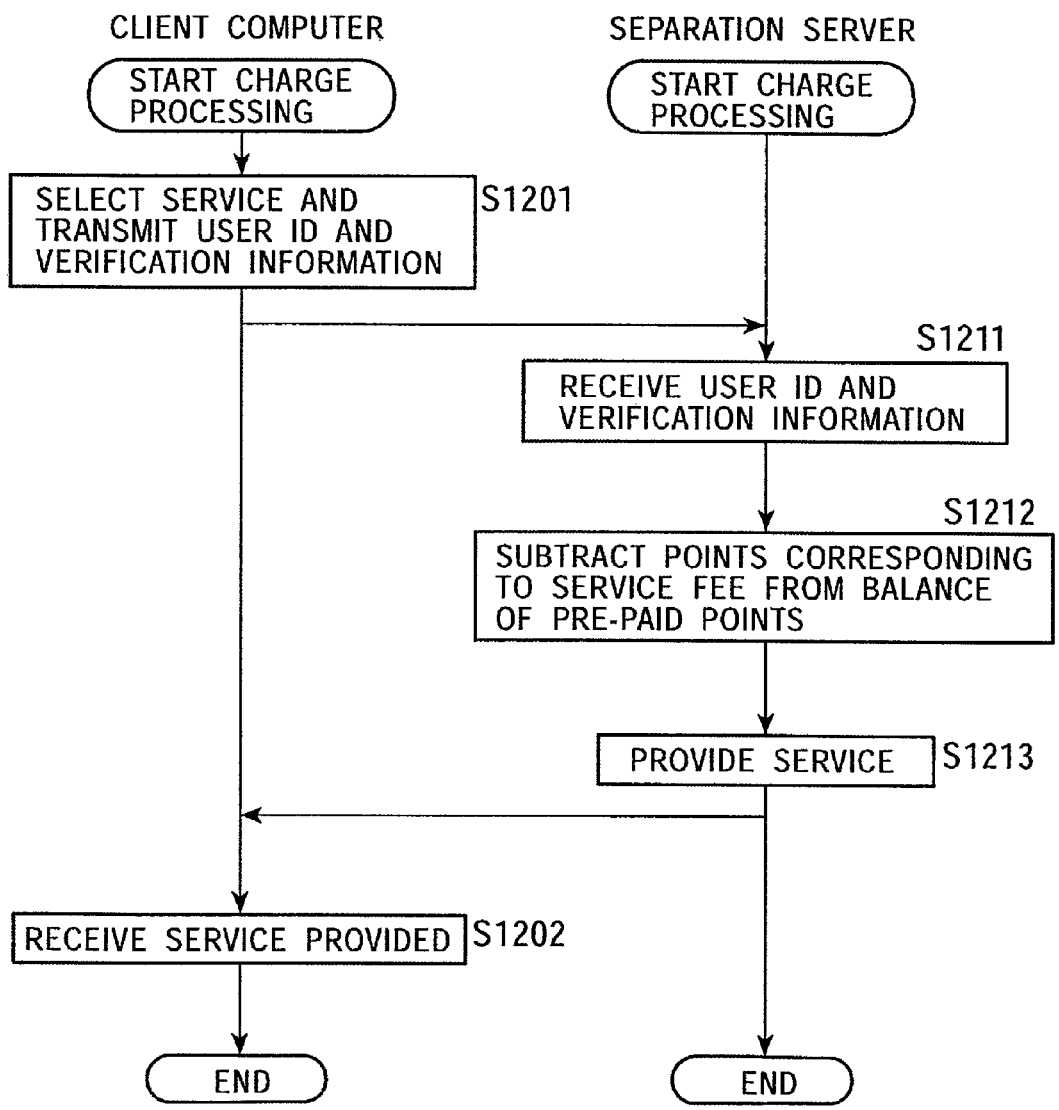

Here, referring to a flowchart of FIG. 120, the charge processing using the pre-paid points will be explained.

In step S1201, the client computer 27 specifies the service and transmits the ID information and the verification information. That is, the client computer 27 performs the same processing as that in step S1101 of FIG. 117.

In step S1211, the charge processor 11a of the separation server 11 receives the ID information and the verification information. In step S1212, the charge processor 11a subtracts the points corresponding to the service fee for the separation processing from the pre-paid points which is stored in storage unit 48 corresponding to the amount of money previously paid by the user of the client computer 27 and stores it. In step S1213, the separation server 11 provides the service. That is, at this time, the separation server 11 performs the separation processing of the input image and transmits the foreground component image and the background component image separated to the client computer 27.

In step S1202, the client computer 27 receives the provided service. That is, at this time, the client computer 27, receives the foreground component image and the background component image transmitted from the separation server 11.

Further, in the above explanation, a case that the separation server 11 stores the pre-paid points in its own storage unit 48 (see FIG. 2) has been described but for example, when a card in which the pre-paid points are stored, so called a pre-paid card is used, the same processing is performed. In this case, it is required that the client computer 27 read out and transmits the pre-paid points stored in the pre-paid card in step S1201, the separation server 11 subtract the points corresponding to the service fee from the points received by the charge processing and the points subtracted is transmitted to the client computer to update the pre-paid card.

Figure 121:
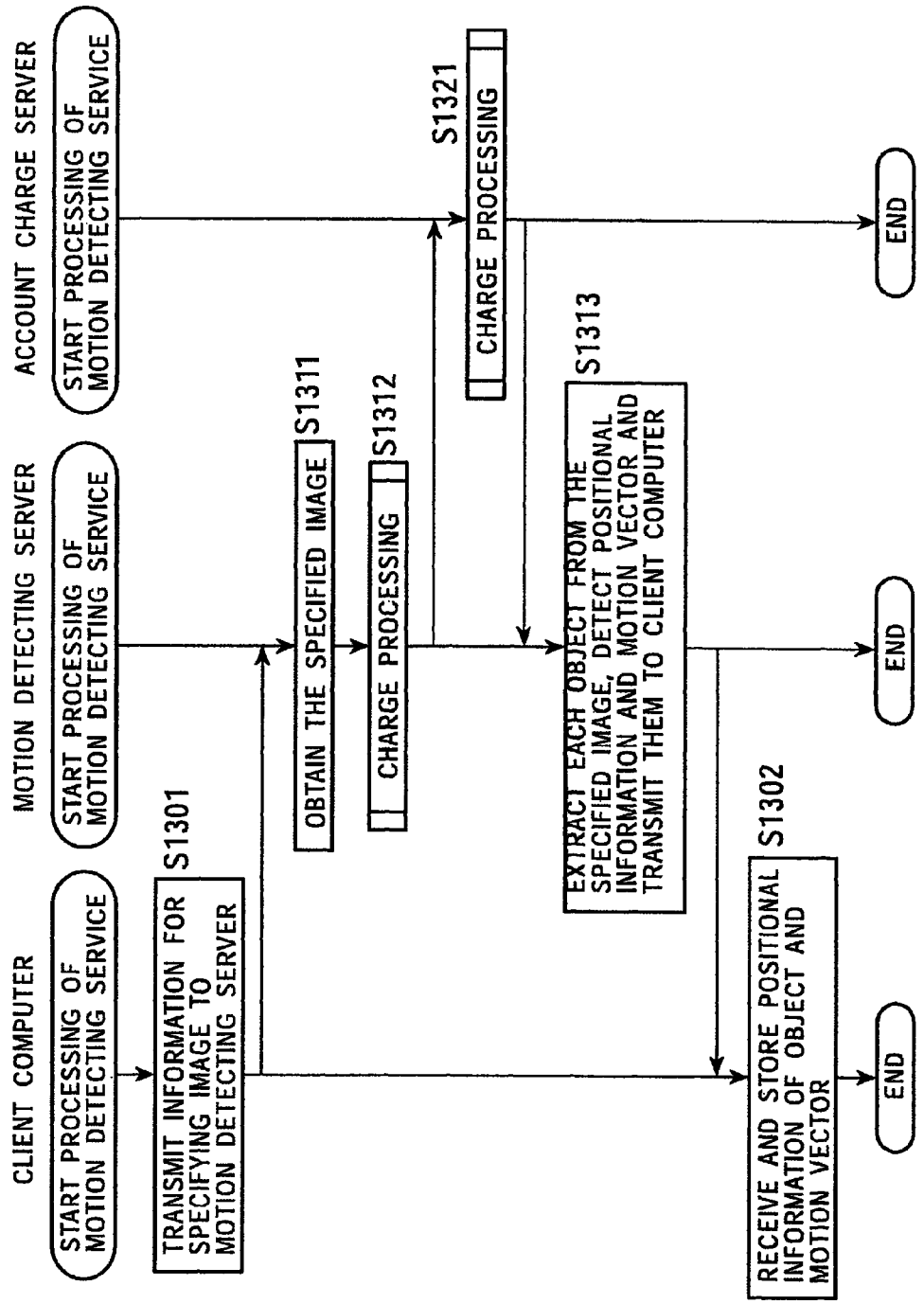

Next, referring to the flowchart of FIG. 121, the processing of the motion detecting service for obtaining the motion vector and the positional information of the image specified by the client computer 27 will be explained.

In step S1301, the client computer 27 outputs the information specifying an image to the motion detecting server 12. That is, as the information specifying the image desired by a user to be processed by the motion detecting process, the specific image or the image ID specifying the image is output to the motion detecting server 12.

In step S1311, the motion detecting server 12 obtains the specified image. That is, the motion detecting server 12 reads out and obtains the very image when an image is transmitted from the client computer 27 or the image corresponding to the image ID when the specification information is transmitted, via the network 1.

In steps S1312 and S1321, the charge processor 12c of the motion detecting server 12 and the account charge server 24 perform the charge processing. Further, the charge processing is similar to that in the separating service in FIG. 118 and FIG. 120 and thus, explanation thereof will be omitted.

In step S1313, the object extracting unit 12a of the motion detecting server 12 extracts each object from the specified image obtained, and the motion detector 12b detects the positional information and the motion vector, to transmit it to the client computer 27.

In step S1302, the client computer 27 receives and stores the positional information and the motion vector of the object transmitted from the motion detecting server 12.

Further, the client computer 27 may store the positional information and the motion vector detected by the motion detecting server 12 in its own storage unit or output them to the storage server 18 via the network 1 so as to store them, in accordance with instructions of the user.

Figure 122:
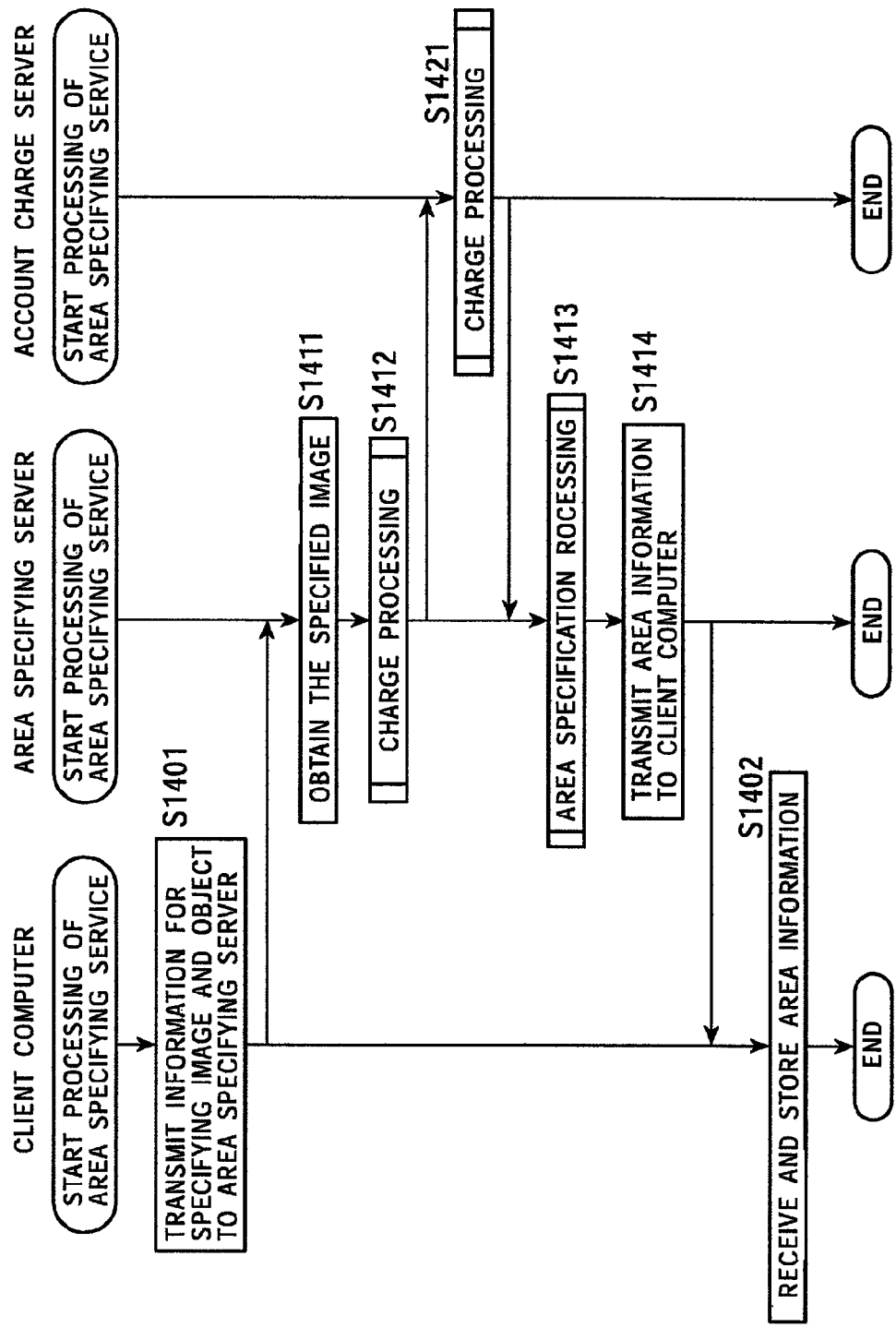

Next, referring to the flowchart of FIG. 122, the processing of the area specifying service specifying area from the information specifying the image and object input from the client computer 27, which is performed by the area specifying server 13, will be explained.

In step S1401, the client computer 27 outputs the information specifying the image and the object to the area specifying server 13. That is, the information specifying the object is output to the area specifying server 13 along with the specific image or the image ID specifying the image as the information specifying an image desired by a user to area specify.

In step S1411, the area specifying server 13 obtains the specified image. That is, the area specifying server 13 reads out and obtains the very image when the image is transmitted from the client computer 27 and the image corresponding to the image ID when the image ID specifying an image is transmitted, via the network 1.

In steps S1412 and S1421, the charge processor 13a of the area specifying server 13 and the account charge server 24 performs the charge processing. Further, the charge processing is similar to that in the separating service in FIG. 118 and FIG. 120 and thus, explanation thereof will be omitted.

In step S1413, the area specifying server 13 performs the area specifying processing on the basis of the information specifying the object. Further, the area specifying processing is similar to the processing explained referring to the flowchart of FIG. 53 and thus, explanation thereof will be omitted.

In step S1414, the area specifying server 13 transmits the area information obtained through the processing in step S1413 to the client computer 27.

In step S1402, the client computer 27 receives and stores the area information transmitted from the area specifying server 13.

Further, the client computer 27 may store the area information obtained by the area specifying server 13 in its own storage unit or output it to the storage server 18 via the network 1 so as to store it, in accordance with instructions of the user.

Figure 123:
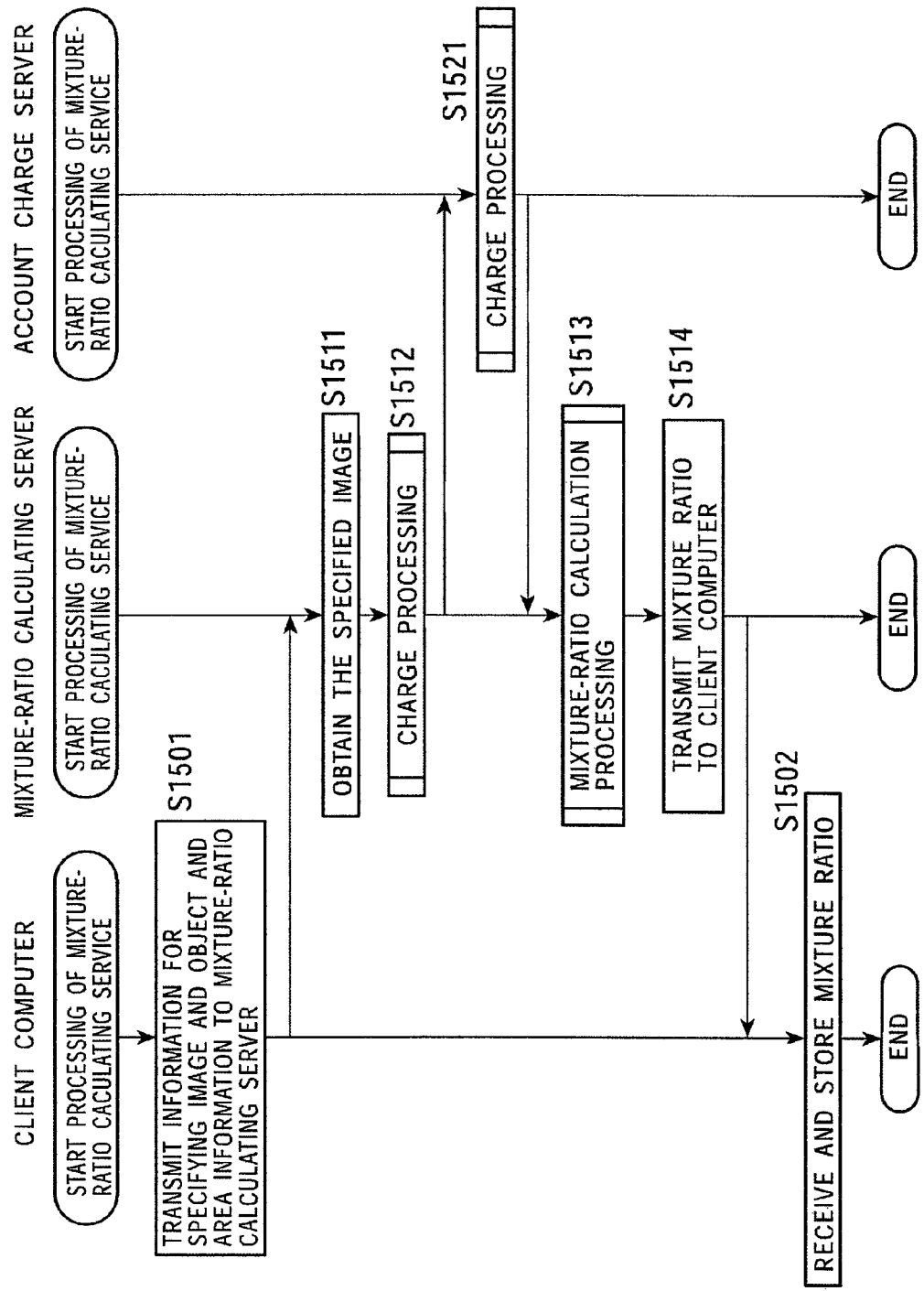

Next, referring to a flowchart of FIG. 123, the processing of the mixture ratio calculating service of calculating the mixture ratio from the information specifying the image and the object and the area information input from the client computer 27, which is performed by the mixture ratio calculating server 14, will be explained.

In step S1501, the client computer 27 outputs, the information specifying the image and the object and the area information to the mixture ratio calculating server 14. That is, as the information specifying an image of which mixture ratio is desired by a user to specify, the specific image or the image ID specifying the image, the information specifying the object and the area information are output to the mixture ratio calculating server 14.

In step S1511, the mixture ratio calculating server 14 obtains the specified image. That is, the mixture ratio calculating server 14 reads out and obtains the very image when the image is transmitted from the client computer 27 and the image corresponding to the image ID when the image ID specifying an image is transmitted, via the network 1.

In steps S1512 and S1521, the charge processor 14a of the mixture ratio calculating server 14 and the account charge server 24 performs the charge processing. Further, the charge processing is similar to that in the separating service in FIG. 118 and FIG. 120 and thus, explanation thereof will be omitted.

In step S1513, the mixture ratio calculating server 14 performs the mixture ratio calculation processing on the basis of the information specifying the object and the area information. Further, the mixture ratio calculation processing is similar to the processing explained referring to the flowchart of FIG. 81 and thus, explanation thereof will be omitted.

In step S1514, the mixture ratio calculating server 14 transmits the mixture ratio obtained through the processing in step S1513 to the client computer 27.

In step S1502, the client computer 27 receives and stores the mixture ratio transmitted from the mixture ratio calculating server 14.

Further, the client computer 27 may store the mixture ratio obtained by the mixture ratio calculating server 14 in its own storage unit or output it to the storage server 18 via the network 1 so as to store it, in accordance with instructions of the user.

Next, referring to the flowchart of FIG. 124, the processing of service for separating the foreground component image and the background component image from the information specifying the image and the object, the area information and the mixture ratio input from the client computer 27, which is performed by the foreground/background image separating server 15, will be explained.

In step S1601, the client computer 27 outputs, the information specifying the image and the object, the area information and the information of mixture ratio to the foreground/background image separating server 15. That is, as the information specifying an image desired by a user to separate into foreground and background, the concrete image or the image ID specifying the image, the information specifying the object, the area information and the information of mixture ratio are output to the foreground/background image separating server 15.

In step S1611, the foreground/background image separating server 15 obtains the specified image. That is, the foreground/background image separating server 15 reads out and obtains the very image when the image is transmitted from the client computer 27 and the image corresponding to the image ID when the image ID specifying an image is transmitted, via the network 1.

In steps S1612 and S1621, the charge processor 15a of the foreground/background image separating server 15 and the account charge server 24 performs the charge processing. Further, the charge processing is similar to that in the separating service in FIG. 118 and FIG. 120 and thus, explanation thereof will be omitted.

In step S1613, the foreground/background image separating server 15 performs the foreground/background separating processing on the basis of the information specifying the object, the area information and the mixture ratio. Further, the foreground/background separating processing is similar to the processing explained referring to the flowchart of FIG. 96 and thus, explanation thereof will be omitted.

In step S1614, the foreground/background image separating server 15 generates IDs to the foreground component image and the background component image obtained through the processing in step S1613 and transmits them to the client computer 27.

In step S1602, the client computer 27 receives and stores the foreground component image and the background component image transmitted from the foreground/background image separating server 15.

Further, the client computer 27 may store the foreground component image and the background component image transmitted from the foreground/background image separating server 15 in its own storage unit or output it to the storage server 18 via the network 1 so as to store it, in accordance with instructions of the user.

Next, referring to the flowchart of FIG. 125, the processing of service for adjusting the motion blur of the specified image from the information specifying the image, the motion vector and the amount by which motion blur is adjusted input from the client computer 27, which is performed by the motion blur adjusting server 16, will be explained.

In step S1701, the client computer 27 outputs the information specifying the image, the motion vector and the amount by which motion blur is adjusted to the motion blur adjusting server 16. That is, as the information specifying the image of which the motion blur is desired by a user to adjust, the specific image or the image ID specifying the image, the information specifying the object, the motion vector and information of the amount by which motion blur is adjusted are output to the motion blur adjusting server 16.

In step S1711, the motion blur adjusting server 16 obtains the specified image. That is, the motion blur adjusting server 16 reads out and obtains the very image when the image is transmitted from the client computer 27 and the image corresponding to the image ID when the image ID specifying an image is transmitted, via the network 1.

In steps S1712 and S1721, the charge processor 16a of the motion blur adjusting server 16 and the account charge server 24 performs the charge processing. Further, the charge processing is similar to that in the separating service in FIG. 118 and FIG. 120 and thus, explanation thereof will be omitted.

In step S1713, the motion blur adjusting server 16 performs the motion blur adjusting processing on the basis of the motion vector and the amount by which motion blur is adjusted. Further, the motion blur adjusting processing is similar to the processing explained referring to the flowchart of FIG. 104 and thus, explanation thereof will be omitted.

In step S1714, the motion blur adjusting server 16 generates ID for the motion blur adjusted image obtained through the processing in step S1713 and transmits it to the client computer 27.

In step S1702, the client computer 27 receives and stores the motion blur adjusted image transmitted from the motion blur adjusting server 16.

Further, the client computer 27 may store the motion blur adjusted image transmitted from the motion blur adjusting server 16 in its own storage unit or output it to the storage server 18 via the network 1 so as to store it, in accordance with instructions of the user.

Next, referring to FIG. 126, detailed configuration of the encoding server 17 will be explained. The separating portion 2002 of the encoding server 17 separates the input image (including the image of which the image ID specifying the image is input and which is read out from the storage server 18 via the network 1) into the foreground component image and the background component image and outputs it to the encoder 2001 along with the mixture ratio, the motion vector and the positional information. The separation processing portion 2002 has configuration similar to that of the separation server (separator) 11 explained referring to FIG. 27 and its processing of obtaining the mixture ratio, the motion vector and the positional information is similar to that of the separation server 11 and thus, explanation thereof will be omitted.

The encoder 2001 outputs the foreground component image and the background component image input from the separation processing portion 2002 to the storage server 18 via the network 1 to make store them, converts them into the positional information stored on the network of the storage server 18, that is, the information such as URL and outputs it as the positional information of foreground component image and the positional information of background component image. At that time, the encoder 2001 outputs the mixture ratio, the motion vector and the positional information extracted by separating the foreground component image and the background component image.

When the foreground component image and the background component image are converted into the positional information of foreground component image and the positional information of background component image, respectively, by the encoder 2001, the charge processor 17a (see FIG. 16 and FIG. 17) performs the charge processing with respect to the account charge server 24 via the network 1. Further, the charge processing may be performed by the user to be provided with the synthesizing service for generating the synthesized image, using the synthesizing server 19 to be described later. Further, inversely, the user using the encoding service may previously pay the service fee in advance, so that paying for the service fee at the time of using the synthesizing service, may be avoided by the user.

Next, referring to a flowchart of FIG. 127, the processing of the encoding service for encoding the image input from the client computer 27, which is performed by the encoding server 17, will be explained. Further, in this explanation, a case that the user of the encoding service pays the service fee will be described.

In step S1801, the client computer 27 outputs the information specifying the image to the encoding server 17. That is, as the information specifying the image desired by a user to encode, the specific image or the image ID specifying the image and the information specifying the object are output to the encoding server 17.

In step S1811, the encoding server 17 obtains the specified image. That is, the encoding server 17 reads out and obtains the very image when the image is transmitted from the client computer 27 and the image corresponding to the image ID when the image ID specifying an image is transmitted, via the network 1.

In steps S1812 and S1821, the charge processor 17a of the encoding server 17 and the account charge server 24 perform the charge processing. Further, the charge processing is similar to that in the separating service in FIG. 118 and FIG. 120 and thus, explanation thereof will be omitted.

In step S1813, the separation portion 2002 of the encoding server 17 performs the image separating processing. Further, the image separating processing is similar to the processing explained referring to step S1013 in the flowchart of FIG. 117 and thus, explanation thereof will be omitted.

In step S1814, the encoding server 17 outputs the foreground component image and the background component image obtained through the processing in step S1813 to the storage server 18 so as to store them. In step S1813, the storage server 18 stores the foreground component image and the background component image transmitted.

In step S1815, the encoding server 17 adds the motion vector and the positional information to the positional information of foreground component image and the positional information of background component image generated through the encoding processing and transmits them to the client computer 27.

In step S1802, the client computer 27 receives and stores the positional information of foreground component image, the positional information of background component image, the motion vector and the positional information transmitted from the encoding server 17.

Further, in a case of separating and encoding the input image, the encoder 2001 may add only data corresponding to the difference to the code (positional information of the image) of the image already encoded to output it when image similar to a pre-encoded image is encoded. For example, in a case of synthesizing the image shown in FIG. 128, when the encoding information of a first image including encoding information of a foreground component image 1, a foreground component image 2 and a mixture ratio 1 and the encoding information of a second image including encoding information of a foreground component image 1, a foreground component image 3 and a mixture ratio 2 are synthesized, since the foreground component image 1 is also included in any image information, the foreground component image 1 of any of the images may be omitted when synthesizing and consequently, the compression rate can be improved as much as the information of the foreground component image 1 to be omitted, compared with a case that both images are simply synthesized.

Consequently, when the first image and the second image shown in FIG. 128 are stored, if the first image is first stored, only the encoding information of the mixture ratio 2 and the foreground component image 3 that is a difference may be stored for the second image. For this reason, when the encoding information of the same image is stored repeatedly, the compression rate improves as the number of the stored images increases.

Further, the mixture ratio, the motion vector and the positional information to be encoded by the encoding server 17 may be the information specified by a user, as shown in FIG. 129. Further, as shown in FIG. 129, for the image to be encoded, the foreground component image and the background component image corresponding to the image ID specified by the user may be read out from the storage server 18 and encoded. In this case, the encoding server 17 may not be provided with the separation portion 2002.

Further, although the image ID has been employed as the information specifying image in the present invention, the image positional information may be employed instead.

Next, referring to a flowchart of FIG. 130, the processing of service for synthesizing the specified images A and B from the information specifying the images A and B input from the client computer 27, the motion vector, the mixture ratio, the positional information and the amount by which motion blur is adjusted, which is performed by the synthesizing server 19, will be explained.

In step S1901, the client computer 27 outputs the information specifying the images A and B, the motion vector, the mixture ratio, the positional information and the information of amount by which motion blur is adjusted to the synthesizing server 19. That is, as the information specifying the images A and B desired by a user to synthesize, the specific image or the image A ID and B ID (may be the aforementioned positional information of encoded images) specifying the images A and B, the motion vector, the mixture ratio, the positional information and the information of amount by which motion blur is adjusted are output to the synthesizing server 19.

In step S1911, the synthesizing server 16 obtains the specified images. That is, the synthesizing server 19 reads out and obtains the very image when the images are transmitted from the client computer 27 and the images corresponding to the image IDs when the image IDs specifying images are transmitted, via the network 1.

In steps S1912 and S1921, the charge processor 19a of the synthesizing server 19 and the account charge server 24 perform the charge processing. Further, the charge processing is similar to that in the separating service in FIG. 118 and FIG. 120 and thus, explanation thereof will be omitted. Further, the charge processing may be omitted in a case that the user accepting the encoding service has been charged by using the encoding server 16. Inversely, in place of the user accepting the encoding service, the user accepting the synthesizing service may be charged.

In step S1913, the synthesizing server 19 performs the processing of synthesizing the images A and B on the basis of the motion vector, the mixture ratio, the positional information and the information of amount by which motion blur is adjusted.

In step S1914, the synthesizing server 19 generates ID for the synthesized image (A+B) obtained through the processing in step S1913 and transmits it to the client computer 27.

In step S1902, the client computer 27 receives and stores the synthesized image (A+B) transmitted from the synthesizing server 19.

Further, the client computer 27 may store the synthesized image (A+B) transmitted from the synthesizing server 19 in its own storage unit or output it to the storage server 18 via the network 1 so as to store it, in accordance with instructions of the user.

As described above, although the synthesizing server 20 is made to be able to synthesize a plurality of images it may generate the encrypted image by adding the motion blur of the synthesized image using the amount by which motion blur is adjusted as a key. FIG. 131 shows a configuration of the motion blur adder 2021 for encryption, provided to make the synthesizing server 20 generate the encrypted image.

The input information processor 2031 of the motion blur adder for encryption 2021 outputs the input signal to be encrypted to the imaging portion 2032, outputs information of an encrypting key to the motion blur adder 2033 and outputs the image selection information for selecting image (background component image) desired to synthesize by using the signal to be encrypted as the foreground component image to the synthesizing server 20, respectively.

When the signal to be encrypted input from the input information processor 2031 is not image signal, the imaging portion 2032 converts the signal into the image signal to output it to the motion blur adder 2033. That is, since the encrypted signal is supposed to be image signal, the imaging portion 2032 images the signal that is not image signal in order to correspond with such processing.

The motion blur adder 2033 generates the amount by which motion blur is adjusted on the basis of the information such as speed or direction input from the input information processor 2031 and adds the motion blur to the image signal input from the imaging portion 2032 to output it to the synthesizing server 20. The synthesizing server 20 obtains the background component image on the basis of the image selection information input from the input information processor 2031 and synthesizes the image input from the motion blur adder 2033 as the foreground component image with the obtained background component image to generate and display the synthesized image. At this time, the image selection information specifying the background component image may be the background component image itself and may be the positional information of background component image or ID of the background component image.

Next, referring to FIG. 132, the motion blur eliminating portion for encryption 2041 for decrypting the synthesized image encrypted by the motion blur adder for encryption 2021 provided in the synthesizing server 20 to covert it into the original signal will be explained. Further, the motion blur adder for encryption 2021 and the motion blur eliminating portion for encryption 2041 shown in FIG. 131 and FIG. 132 may be thought, for example, to be a functional block diagram of software built-in to the client computer 27 and to be a block diagram of hardware. Further, the motion blur adder for encryption 2021 and the motion blur eliminating portion for encryption 2041 may be constructed as an exclusive server on the network 1.

The separation server 11 separates the encrypted synthesized image into the foreground component image and the background component image and outputs the foreground component image to which motion blur is added to the input information processor 2051.

When the encrypted foreground component image input from the separation server 11 and the information on speed and direction as a key for decrypting the encrypted foreground component image are input, the input information processor 2051 output them to the motion blur eliminating portion 2052. When the image is displayed in 2-dimensions of x direction and y direction, the speed and the direction of the key are set thereto, respectively.

The motion blur eliminating portion 2052 generates the amount of motion blur on the basis of the information of speed and direction input from the input information processor 2051, performs the motion blur adding processing inverse to the motion blur adding processing performed by the motion blur adder for encryption 2021 on the encrypted foreground component image, and decrypts the encrypted foreground component image to output it to the signal converter 2053. When the encrypted signal to be encrypted is not image signal, the signal converter 2053 coverts the image signal input from the motion blur eliminating portion 2052 into the original signal to output it.

That is, the motion blur adder 2033 (see FIG. 131) and the motion blur eliminating portion 2052 performs substantially the processing similar to the motion blur adder 806 in FIG. 97 and performs the motion blur adding processing inverse to each other using the amount by which motion blur is adjusted as the encrypting key. However, they are different in that gain-up processing is further performed on the motion blur adding processing first performed in the motion blur adding processes in x direction or y direction to be described below.

Here, principles in which the image signal is encrypted by adding the motion blur will be explained. For example, as shown in FIG. 133, when the subject is moving in the arrow direction, picture thereof is taken by the sensor 76a having CCD, etc., the mixed area (covered background area and uncovered background area) is generated ahead and behind in the moving direction as the motion blur of the picked up image (see FIG. 31A for details). FIG. 134 shows an example illustrating this phenomenon, in which for a case that the subject indicated by A in FIG. 134 is picked up by the sensor 76a, when the subject is moving in left or right direction in the drawing, area of motion blur is extended and the picked up color is spread according to the speed thereof. That is, when the subject is moving at speed of v in left or right direction, the image indicated by B in FIG. 134 is supposed to be picked up. At this time, if areas picked up when the subject is stationary are the areas a0 to a0' and areas where the subject indicated by B in FIG. 134 are a1 to a1', the colors of the areas of a0 to a0' at the original position get lighter and are spread in the areas a1 to a0 and the areas a0' to a1' where the motion blur is generated. Similarly, if the subject is moving at a speed of 2v (2 times v), as indicated by C in FIG. 134, it can be shown that the colors are spread in the areas a2 to a0 and the areas a0' to a2' where the motion blur is generated. Further, if the subject is moving at a speed of 3v, as indicated by D in FIG. 134, the colors are spread in the areas a3 to a0 and the areas a0' to a3' where the motion blur is generated and if the subject is moving at a speed of 4v, as indicated by E in FIG. 134, the colors are spread in the areas a4 to a0 and the areas a0' to a4' where the motion blur is generated and as a whole, the colors get lighter. That is, since the respective pixel values output from the sensor 76a result from integrating with respect to the shutter time, the portions of the picked up object having movement is spread spatially as the speed of the moving subject increases to cause the colors in that region to lighten, in comparison the whole integrated pixel value are spatially spread with a slight variation. Therefore, as the area where the colors get lighter is spread, and the area of motion blur expands, and resolution of the subject decreases. Here, color indicates resolution. As color becomes thicker, the resolution increases and as color becomes lighter, the resolution decreases.

The encryption using the motion blur adjustment employs this nature and is performed by generating motion blur in the image in the 2-dimensional direction, which cannot be generated in the real world. That is, as shown in FIG. 135, the image obtained by taking picture of a subject having a black circle shape in a stationary state is displayed in the leftmost column and uppermost row in the matrix. In this state, for example, if the motion blur in moving vertically is added, the black circle shaped subject is an image in which the motion blur is generated in the vertical direction, as shown in the center column and uppermost end. Further, if the motion blur is generated horizontally, the image in which the motion blur is generated in the vertical and horizontal directions of the subject is obtained as shown in the center column and center row.

In this state, furthermore, if movement (speed) in the horizontal direction increases to add the motion blur, as shown in the center column and lowermost row, the image in which the motion blur area is spread in the horizontal direction is further obtained. If the motion blur is generated in the vertical direction in this image, as shown in the rightmost column and lowermost row, the motion blur area of the black circle shaped subject is spread and as a whole, and the colors become lighter. As a result, since resolution of the subject is decreased, it is possible to encrypt the image itself.

Next, referring to the flowchart of FIG. 136, the encrypting processing using the amount by which motion blur is adjusted by the motion blur adder for encryption 2021 will be explained. Further, in the following explanation, as shown in FIG. 137, an example of encrypting the image obtained by taking picture of the subject comprised 5×5 pixels will be explained. Here, in FIG. 137, the respective pixels of 5×5 pixels are indicated by the pixel values a to y, the vertical direction is indicated by y, the horizontal direction is indicated by x and the time-axis is indicated by time t.

In step S2001, the input information processor 2031 determines whether the signal to be encrypted is input or not, the processing is repeated until it is input and if it is determined that it is input, the procedure proceeds to step S2002.

In step S2002, the input information processor 2031 outputs the input signal to be encrypted to the imaging portion 2032. In step S2003, the imaging portion 2032 determines whether the input signal to be encrypted is image signal or not. For example, if it is determined that the signal to be encrypted is not image signal, the imaging portion 2032 converts the signal to be encrypted into image signal to output it to the motion blur adder 2033 in step S2004. In step S2003, if it is determined that the information to be encrypted is image signal, the imaging portion 2032 outputs the input signal to be encrypted to the motion blur adder 2033.

In step S2005, the input signal processor 2031 determines whether the speed and direction information as a key is input or not and repeats the processing until it is input, and if the speed and direction as a key is input, the procedure proceeds to step S2006.

In step S2006, the motion blur adder 2033 encrypts the input image signal in the x direction (adds the motion blur).

Here, referring to FIGS. 137 to 149, a method for generating specific pixel values in encrypting the subject by adjusting the motion blur adjustment will be explained.

Here, as shown in FIG. 137, a method for encrypting the pixels a to e in the lowermost row by generating the motion blur in the x direction will be explained. At this time, if the amount of movement v indicating the speed as a key is 5 (the virtual division number is 5), the pixels in the lowermost row shown in FIG. 138 is shown similar to those in FIG. 139. That is, since the respective pixel values are divided by 5 in the time direction, the relationships of $a/5=a0=a1=a2=a3=a4$, $b/5=b0=b1=b2=b3=b4$, $c/5=c0=c1=c2=c3=c4$, $d/5=d0=d1=d2=d3=d4$ and $e/5=e0=e1=e2=e3=e4$ are satisfied. Here, the pixel values in the uppermost row in FIG. 139 are the pixel values for a time just ahead.

If movement in the x direction (in here, the right side in the drawing) is added to the subject, the arrangement of the pixel values shifts at a predetermined time interval and as a result, an arrangement shown in FIG. 140 is obtained. That is, the arrangement in which the pixel values are shifted according to movement of the subject is obtained such that at the time that movement starts, the pixel values a0 to e0 are at the original positions, the pixel values a1 to e1 shift by one pixel in the right direction at the next time interval, the pixel values a2 to e2 shift by one pixel in the right direction at the next time interval, the pixel values a3 to e3 shift by one pixel in the right direction at the next time interval and the pixel values a4 to e4 shift by one pixel in the right direction at the next time interval.

Further, the respective pixel values on the x y plane are obtained by summing the pixel values shown in FIG. 140 in the time direction. However, for example, since the leftmost column or the rightmost column comprises only the pixel value a0 or e4, there is a problem that the value of a pixel becomes very small. Then, after the same processing is performed in the y direction, the gain-up processing is further performed in order not to be very small pixel value. An example of the gain-up processing performed is shown in FIG. 141.

Here, $a0^*=5 \times a0$, $b0^*=(5/2) \times b0$, $a0^*=(5/2) \times a1$, $c0^*=(5/3) \times c0$, $b1^*=(5/3) \times b1$, $a2^*=(5/3) \times a2$, $d0^*=(5/4) \times d0$, $c1^*=(5/4) \times c1$, $b2^*=(5/4) \times b2$, $a3^*=(5/4) \times a3$, $e1^*=(5/4) \times e1$, $d2^*=(5/4) \times d2$, $c3^*=(5/4) \times c3$, $b4^*=(5/4) \times b4$, $e2^*=(5/3) \times e2$, $d3^*=(5/3) \times d3$, $c4^*=(5/3) \times c4$, $e3^*=(5/2) \times e3$, $d4^*=(5/2) \times d4$ and $e4^*=5 \times e4$. That is, the weight of each pixel adjusts the gain to be the pixel value by 1 pixel. As a result, if the pixels a to e shown in FIG. 138 are encrypted on a condition that the amount of movement v in the x direction is 5 (if the motion blur is added), they are converted into the pixels ax to dx' (are encrypted) as shown in FIG. 142 and the number of pixels of the subject in the horizontal direction is increased from 5 to 9. Here, the pixel number is $ax=ax^*$, $bx=(b0^*)+(a1^*)$, $cx=(c0^*)+(b1^*)+(a2^*)$, $dx=(d0^*)+(c1^*)+(b2^*)+(a3^*)$, $ex=(e0)+(d1)+(c2)+(b3)+(a4)$, $ax'=(e1^*)+(d2^*)+(c3^*)+(b4^*)$, $bx'=(e2^*)+(d3^*)+(c4^*)$, $cx'=(e3^*)+(d4^*)$ and $ex=ex^*$.

If the aforementioned processing encrypts all the rows in the y direction comprised of the 5×5 pixels shown in FIG. 137 in the x direction, the pixel values shown in FIG. 143 are obtained. That is, the pixels ax to yx and the pixels ax' to dx', fx' to ix', kx' to nx', px' to sx' and ux' to xx' are obtained, and spread in the x direction is generated due to generation of the motion blur in the x direction. Thus, the pixel values are obtained at every 9 pixels.

Here, returning to the flowchart of FIG. 136, the explanation will be continued.

In step S2007, the motion blur adder 2033 encrypts the image signal encrypted in the x direction with respect to the y direction.

Here, as shown in FIG. 144, a method for encrypting the pixels ax, fx, kx, px, ux in the rightmost column in FIG. 143 by generating the motion blur in the y direction will be explained. At that time, if the amount of movement v indicating the speed as a key is 5 (the virtual division number is 5), the pixels in the rightmost column in FIG. 143 is displayed as in FIG. 144. That is, since the respective pixel values are divided into 5 in the time direction, the relationships of $ax/5=ax0=ax1=ax2=ax3=ax4$, $fx/5=fx0=fx1=fx2=fx3=fx4$, $kx/5=kx0=kx1=kx2=kx3=kx4$, $px/5=px0=px1=px2=px3=px4$ and $ux/5=ux0=ux1=ux2=ux3=ux4$ are satisfied. Here, the pixel in the uppermost row in FIG. 145 are the pixel values for a time just ahead.

If movement in the y direction is added to the subject, the arrangement of the pixel values shifts at a predetermined time interval and as a result, an arrangement shown in FIG. 146 is obtained. That is, the arrangement in which the pixel values are shifted according to movement of the subject is obtained such that at the time that movement starts, the pixel values ax0, fx0, kx0, px0 and ux0 are at the original positions, the pixel values ax1, fx1, kx1, px1 and ux1 shift by one pixel in the right direction at the next time interval, the pixel values ax2, fx2, kx2, px2 and ux2 shift by one pixel in the right direction at the next time interval, the pixel values ax3, fx3, kx3, px3 and ux3 shift by one pixel in the right direction at the next time interval and the pixel values ax4, fx4, kx4, px4 and ux4 shift by one pixel in the right direction at the next time interval.

Here, returning to the flowchart of FIG. 136, the explanation will be continued.

In step S2008, the synthesizing server 19 synthesizes the synthesized background component image with the encrypted image (foreground component image). For example, if the background component image (image having pixels of one step in the x direction) comprised of the pixel values B0 to B9 arranged in the y direction in FIG. 147 is synthesized, the pixel values are values to which the pixel values shown in FIG. 148 are added. That is, the pixel values of the image (to which the motion blur is added) are encrypted in the x and y directions as the pixel values of the foreground component image, and the pixel values of the image to be synthesized as the pixel values of the background component image are synthesized. As a result, the pixel values A, F, K, P, U, Ay', Fy', Ky' and Py' shown in FIG. 149 are obtained and the respective pixel values are the pixel value $A=ax0+B0 \times 4/5$, the pixel value $F=fx0+ax0+B1 \times 3/5$, the pixel value $K=kx0+fx1+ax2+B2 \times 2/5$, the pixel value $P=px0+kx1+fx2+ax3+B3 \times 2/5$, the pixel value $U=ux0+px1+kx2+fx3+ax4$, the pixel value $Ay'=B5 \times 1/5+ux1+px2+kx3+fx4$, the pixel value $Fy'=B6 \times 2/5+ux2+px3+kx4$, the pixel value $Ky'=B7 \times 3/5+ux3+px4$ and the pixel value $Py'=B8 \times 4/5+ux4$.

By performing all these processes in all the y direction, the synthesized image of which the background component image is the encrypted foreground component image shown in FIG. 150 is generated. That is, the input image of 5×5 pixels is converted into the image of 9×9 pixels (the pixels A to Y, the pixels Ax to Dx, the pixels Fx to Ix, the pixels Kx to Nx, the pixels Px to Sx, the pixels Ux to Xx, the pixels Ay' to Ty', the pixels Ax' to Dx', the pixels Fx' to Ix', the pixels Kx' to Nx' and the pixels Px' to Sx').

Further, since is the motion blur adding processing in the motion blur eliminating portion for encryption 2041, in the reverse of the processing by the motion blur adder for encryption 2021, explanation of the decrypting processing will be omitted.

Further, in the processing of step S2006, when encryption in the x direction is performed; the gain-up processing is performed and then, encryption in the y direction is performed. Therefore, it is necessary that after decryption in the y direction is performed, the gain is lowered, and then the decryption in the x direction is performed. Further, the order of the encryptions in the x direction and the y direction may be changed. However, since the gain-up processing is performed in the direction where the encryption is formerly performed, it is necessary that the order of decryptions should correspond to the order of encryptions.

Next, referring to the flowchart of FIG. 151, the encrypting service by the synthesizing server 19 comprising the motion blur adder for encryption 2021 shown in FIG. 131 will be explained. Further, this is a processing that the client computer 27-1 connected to the network 1 transmits the signal to be encrypted to the synthesizing server 19, which encrypts it and transmits it to the client computer 27-2. Further, the client computer 27 may be provided with a hardware having a function of the image separation processing of the separation server 11 having the motion blur eliminating portion for encryption 2041 or installed with software having such function.

In step S2101, the client computer 27-1 transmits information desired to encrypt (signal to be encrypted), information of speed and direction as the encryption key and image selection information (information selecting the background component image) to the synthesizing server 19.

In step S2111, the motion blur adder for encryption 2021 of the synthesizing server 19 encrypts the information desired to encrypt (signal to be encrypted) on the basis of the encryption key input from the client computer 27-1 and performs the encrypting processing of synthesizing the selected background component image. Further, since the encrypting processing was explained referring to the flowchart of FIG. 136, explanation thereof will be omitted.

In step S2112, the synthesizing server 19 transmits a synthesized image encrypted by adding the motion blur to the client computer 27-1.

In step S2102, the client computer 27-1 displays the synthesized image received from the synthesizing server 19 to determine whether the image is desired by the user or not and if it is determined that the image is the desired image, it is notified to the synthesizing server 19 that the image is the desired image in step S2103. In step S2113, the synthesizing server 19 determines whether the image is the desired image or not and for example, in this case, since it is notified to the synthesizing server 19 that the image is the desired image in step S2103, the procedure proceeds to step S2114.

In step S2114, the charge processor 19*a* of the synthesizing server 19 and the account charge server 24 perform the charge processing. Further, the charge processing is similar to that of the separating service in FIGS. 118 and 120 and thus, explanation thereof will be omitted.

In step S2115, the synthesizing server 19 transmits the synthesized image encrypted to the client computer 27-1. In step S2104, the client computer 27-1 receives the encrypted synthesized image and transmits it to the client computer 27-2.

In step S2141, the client computer 27-2 receives the encrypted synthesized image. In step S2142, the client computer 27-2 determines whether the key is input or not and repeats this processing until the encryption key is input. If the information of speed and direction as the encryption key is input in step S2142, the motion blur eliminating portion 2041 performs the motion blur processing on the basis of the speed and the direction input in step 2143. In step S2144, the image in which the motion blur is eliminated is displayed.

If it is determined that the image was not the desired image in step S2102, it is notified to the synthesizing server 19 in step S2015 that the image is not the desired image and the procedure returns to step S2101. Further, since it is determined by this processing that the image is not the desired image, the processing of the synthesizing server 19 returns to step S2111.

That is, by this processing, when the key of speed and direction specified by a user is correctly input to the client computer 27-1, an image that the encrypted image has been correctly decrypted is displayed. Further, through the same system as the aforementioned encrypting service, the decrypting service can be provided.

Next, referring to FIG. 152, the correcting server 20 will be explained.

The separation processor 11 of the correcting server 20 separates the input image (which is may be the image ID and when the image is specified by the image ID, the corresponding image retrieved from the network 1) into the foreground component image and the background component image to output the foreground component image to the motion blur adjusting portion 2101 and to output the background component image to the synthesizer. The motion blur adjusting portion 2101 adjusts the motion blur of the input foreground component image by the specified amount of motion blur (adjusting amount of correction) and outputs it to the synthesizer 2101. The synthesizer 2101 synthesizes the foreground component image in which motion blur is adjusted and the input background component image and output it as the corrected image.

For example, the image shown in FIG. 153A is supposed to be input to the correcting server 20. That is, as shown in right portion of FIG. 153A, when the foreground is moved over the background in the arrow direction, the motion blur is generated in the moving direction of the foreground and the reverse direction thereof. This portion of motion blur is the mixed area, the mixed area occurring in the leading portion in the moving direction is the CB (covered background) and the mixed area occurring in the trailing portion in the moving direction is UB (uncovered background) as shown in the left portion of FIG. 153A. Further, since the time axis t is set in the vertical direction in the left portion of FIG. 153A, the relation between the state that the pixel values of pixels are stored and the time lapse is shown with movement. The separation processor 11 separates this input image into the foreground and the background as shown in FIG. 153B. At that time, the mixed area of the input image is extracted simultaneously.

The motion blur adjusting portion 2101 adjusts the motion blur of the foreground component image shown in FIG. 153B to generate, for example, the foreground component image such as that in FIG. 153C. That is, in this case, the motion blur is set to be small (CB and UB is set to be small). Further, the amount of motion blur to be adjusted for adjusting the motion blur may be input several times by the repeated operations of the user or may be set to a predetermined value by the motion blur adjusting portion 2101.

The synthesizer 2102 synthesizes the foreground component image adjusted as shown in FIG. 153C and the input background component image and synthesizes and outputs the foreground component image in which the motion blur is adjusted with the background component image as shown in FIG. 153D.

Further, when the background component image is to be changed into other background component image different from that of the input image, the separated background component image is not input to the synthesizer 2102 and the background component image desired to be changed is input to the synthesizer 2102. Further, the correcting server 20 may be constructed by replacing the separation processor 11, the motion blur adjusting portion 2101 and the synthesizer 2102 with the separation server 11, the motion blur adjusting server 16 and the synthesizing server 19 on the network 1.

Next, referring to a flowchart of FIG. 154, the processing of the correcting service for correcting the image input from the client computer 27, which is performed by the correcting server 20, will be explained.

In step S2201, the client computer 27 outputs the information specifying the image to the correcting server 20. That is, as the information specifying the image desired by a user to correct, the specific image or the image ID specifying the image are output to the correcting server 20.

In step S2211, the correcting server 20 obtains the specified image desired to correct and the background component images, and the separation processor 11 separates the image desired to correct into a foreground component image and a background component image. That is, the correcting server 20 reads out and obtains the very image when the image is transmitted from the client computer 27 and the image corresponding to the image ID when the image ID specifying an image is transmitter via the network 1. Further, the separation processor 11 separates the obtained image into a foreground component image and the background component image.

In steps S2212 and S2221, the charge processor 20a of the correcting server 20 and the account charge server 24 perform the charge processing. Further, the charge processing is similar to that in the separating service in FIGS. 118 and 120 and thus, explanation thereof will be omitted.

In step S2213, the motion blur adjusting portion 2101 of the correcting server 20 performs the process of motion blur adjustment of foreground component image. Further, the processing of adjusting motion-blur is similar to the processing explained referring to the flowchart of FIG. 104 and thus, explanation thereof will be omitted.

In step S2214, the synthesizer 2102 synthesizes the foreground component image in which motion blur is adjusted and the specified background component image. In step S2215, the correcting server 20 transmits the synthesized image through the processing in step S2214, that is, the corrected image to the client computer 27.

In step S2202, the client computer 27 stores the corrected image transmitted from the correcting server 20.

Further, the client computer 27 may store the image corrected by the correcting server 20 in its own storage unit or output the corrected image to the storage server 18 so as to store it via the network 1 in accordance with instructions of a user.

Next, referring to a flowchart of FIG. 155, the processing of the image purchasing service for purchasing the image specified by the client computer 27, which is performed by the purchasing server 21, will be explained.

In step S2301, the client computer 27 outputs the information specifying the image desired to purchase to the purchasing server 21. That is, as the information specifying the image desired by a user to purchase, the image ID specifying the image is output to the purchasing server 21.

In step S2311, the purchasing server 21 obtains the image desired to purchase. That is, the purchasing server 21 reads out and obtains the image corresponding to the image ID transmitted from the client computer 27 via the network 1.

In steps S2312 and S2321, the charge processor 21a of the purchasing server 21 and the account charge server 24 perform the charge processing. Further, the charge processing is similar to that in the separating service in FIGS. 118 and 120 and thus, explanation thereof will be omitted.

In step S2313, the purchasing server 21 transmits the image obtained through the processing in step S2311 to the client computer 27.

In step S2302, the client computer 27 receives and stores the image transmitted from the purchasing server 21.

Also, the client computer 27 may store the image purchased by the purchasing server 21 in its own storage unit or output it to the storage server 18 so as to store it via the network 1 in accordance with instructions of a user. Further, the client computer 27 may transmit the image to another client computer 27, for example, to present it. Furthermore, another user may purchase the foreground component image, the background component image, the synthesized image, the corrected image or the like each of which is separated by the separation processing service, the synthesizing service or the correcting service.

Next, referring to a flowchart of FIG. 156, the processing of the image selling service for selling the image specified by the client computer 27, which is performed by the selling server 22, will be explained.

In step S2401, the client computer 27 outputs the information specifying the image desired to sell to the purchasing server 21. That is, the image desired by user to sell is output to the selling server 22.

In step S2411, the selling server 22 obtains the image desired to sell. That is, the selling server 22 obtains the image transmitted from the client computer 27.

In steps S2422, the selling server 22 sets a proper price on the image desired to sell. The price may be set, for example, by user in advance, or through an auction on the network 1. Further, if an image is a person, the price may be set according to whether the person is a well-known figure or not when the image is selected.

In steps S2413 and S2431, the charge processor 22a of the selling server 22 and the account charge server 24 perform the charge processing.

Here, referring to the flowchart of FIG. 157, the processing of the charge will be explained. Further, the real processing of the charge is performed by the selling server 22 and the account charge server 24. But, the information needed for various processing is also output from the client computer 27 and therefore the processing of the client computer 27 will also be explained here.

In step S2501, an ID for discerning a user (who user who is selling an image) is transmitted to the selling server 22 via the network 1.

In step S2511, the selling server 22 transmits a cost and an ID for discerning the selling server 22 to the account charge server 24 on the basis of the ID information transmitted from the client computer 27.

In step S2521, the account charge server 24 requests the financial transaction server 26 having provider account to pay the cost to the financial transaction server 25 having customer account on the basis of the transmitted ID for discerning the selling server 22.

In step S2531, the financial transaction server for provider 26 transfers the cost corresponding to the amount of sale from the provider account to the financial transaction server for customer 25 having account of the customer.

Here, the flowchart of FIG. 156 will be explained again.

In step S2424, the selling server 22 notifies the end of sale to the client computer 27. In step S2402, the client computer 27 receives the notification of the end of sale.

Also, the selling server 22 may make the selling server 21 store the image sold by the user in its own storage unit or output the image to the storage server 18 so as to store it. Further, when the price is set through an auction system as mentioned above, the selling server 22 may make the image sold by the user to the client computer of a successful bidder 27.

Next, referring to the flowchart of FIG. 158, the retrieving server 23 will be explained.

The retrieving server 23 retrieves the image which has been picked up on the camera terminal unit 1 connected to the network 1 on the basis of the retrieving conditions input from the client computer 27 and output the request image. The retrieving condition is time, season, weather, area, position, subject or the like.

The control unit 2161 of the retrieving server 23 controls the whole operation of the retrieving server 23. In database 2162, position data which is obtained by GPS 76*b* provided with a camera terminal unit 28 corresponding to the camera ID of each camera terminal unit 28 which the retrieving server 23 recognizes, weather data, subject data or the like 2062*b* are stored as database. The contents of the database 2162 are obtained and updated from the camera terminal unit 28 via the network 1 by controlling the communication unit 2165 at a predetermined time interval through the control unit 2161.

The storage unit 2163 stores the image obtained from the camera terminal unit 28 on the network 1 from the communication unit 2165 or stores information needed for the processing of various images.

The requested information generator 2164 arranges the retrieving conditions input from the client computer 27 on the network 1, and then generates the condition for retrieving the database 2162. That is, for example, when season is put as the retrieving condition, the season may be specified by the position data of each camera terminal unit 28 and the time information calculated by the time calculator 2166. So, the requested information generator 2164, for example, in the case when 'spring', is input as the retrieving condition, generates the position data of the latitude and longitude of the earth in which it is spring at the present time. The control unit 2161 controls the communication unit 2165, and then obtains the image corresponding to the 'spring' by reading out the pick up images of the camera terminal unit 28 of the camera ID corresponding to the position data from the network 1.

The separation processor 2167 obtains the image desired to retrieve, belonging to the image which has been read out through the separation processing. Further, the separation processor 2167 has same functions as those of the separation processor 11.

Next, referring to a flowchart of FIG. 159, the processing of the retrieving service for retrieving the image based on the retrieving conditions input from the client computer 27, which is performed by the retrieving server 23, will be explained.

In step S2601, the client computer 27 outputs the retrieving conditions to the retrieving server 23. In step S2611, the retrieving server 23 receives the retrieving conditions from the communication unit 2165.

In steps S2612 and S2631, the charge processor 23*a* of the retrieving server 23 and the account charge server 24 perform the charge processing. Further, the charge processing is similar to that in the separating service in FIGS. 118 and 120 and thus, explanation thereof will be omitted. Further, the charge processing in steps S2612 and S2631 is the change processing relating to the cost for performing the retrieval process.

In step S2613, the retrieving server 23 retrieves the image corresponding to the retrieving conditions and calls out the corresponding image in step S2614. In step S2641, the camera terminal unit 28 transmits the image shown to the retrieving server 23.

That is, for example, supposing that the client computer 27-1 to 27-5, the retrieving server 23 and the camera terminal unit 28-1 to 28-5 were connected to the network 1 as shown in FIG. 160. At this time if the client computer 27-2 transmits 'person', 'car' and 'building' as the retrieving conditions by the operation of a user to the processing of step 2611, the retrieving server 23 retrieves the objects of 'person', 'car' and 'building' as the retrieving conditions in the database 2162 in step 2613. That is, in case of FIG. 160, the retrieving server 23 retrieves a car 2172 being picked up by the camera terminal unit 28-1 whose ID is 1, a person 2183 being picked up by the camera terminal unit 28-2 whose ID is 2 and a building being picked up by the camera terminal unit 28-5 whose ID is 5, and then obtains the images from each camera terminal unit 28 in step S2614.

In step S2515, the retrieving server 23 determines whether the called out image is separated or not, that is whether the image (object) which does not satisfy the desired conditions is included or not.

In the case of FIG. 160, since a cloud 2172 which does not satisfy the retrieving conditions is included in the image transmitted from the camera terminal unit 28-1 and a house which does not satisfy the desired conditions is included in the image transmitted from the camera terminal unit 28-2, these images are not separated images corresponding to the retrieving conditions, and the procedure proceeds to the step S2616.

In step S2616, the separation processor 2167 performs the separation processing. Further, the separation processor is similar to the processing of the flowchart in FIG. 117 and thus, explanation thereof will be omitted.

In step S2617, the called out images is synthesized and transmitted to the client computer 27. In step S2602, the client computer 27 obtains the image transmitted from the retrieving server 23. In step S2603, the client computer 27 determines whether the received image is the desired image or not. As shown in FIG. 160, in the case of the image shown in display 27*a*-1, 'person', 'car' and 'building' as the retrieving conditions are included in the image as person 2182, car 2172 and building 2211 because these images are the desired image, it is notified to the retrieving server 23 that the image is the desired image in step S2604.

In step S2618, the retrieving server 23 determines whether it is the desired image or not based on the notification transmitted from the client computer 27. In the case of the FIG. 160, because it is desired image, the procedure proceeds to the step S2619.

In steps S2619 and S2632, the charge processor 23*a* of the retrieving server 23 and the account charge server 24 perform the charge processing. Further, the charge processing is similar to that in the separating service in FIG. 118 and FIG. 120 and thus, explanation thereof will be omitted. Further, the charge processing in steps S2619 and S2632 is the charge processing relating to the service fee for transmitting the retrieved image. Further, in step S2515, if all are the images for the retrieving conditions, the processing of step S2616 is skipped.

In step S2603, for example, although 'house', 'cloud' and 'face' are specified as the retrieving conditions by the client computer 27-4 when house 2181 and cloud 2071 are displayed and face 2201 is not displayed on the image as shown in display 27a-4, the image is not the desired image and then the procedure proceeds to the step S2605 and it is notified to the retrieving server 23 that it is not the desired image and then the process ends.

At this time, in step S2618, it is notified to the retrieving server 23 that it is not the desired image and the process ends.

In this case, the service fee for the retrieving processing is charged, but the service fee for transmitting the retrieved image is not paid.

According to above description, it is possible to improve the speed of image processing by distributing the image processing to a plurality of server on the network and it is also possible to reduce cost for the service by providing only the processing requested by a user be.

Further, following inventions may be considered.

That is, the present invention may relate to a communication apparatus and method and a communication system and more specifically, a communication apparatus and method and a communication system capable of improving the processing speed by distributing the image processing to a plurality of servers on a network to perform it, reducing the cost for the service by making it possible to perform only the processes desired by a user by means of the distributed processing, in regard to the differences between the real world and the signal detected by a sensor, and regard to the called out images and previous image data which are utilized as needed even without storing it in its own communication apparatus.

The techniques of detecting events in the real world with a sensor and processing the sampling data output from the image sensor is widely employed. However, for example, in the image obtained by taking picture of a body moving in front of a predetermined background being stationary with a video camera, when moving speed of the body is relatively fast, the motion blur occurs.

As a technique for encrypting the aforementioned image in which the motion blur is present, a burying, method for not recognizing the encrypted image in a flat portion of the image or a method for burying information using correlation of the image have been suggested.

Further, when a body is moving in front of the stationary background, the motion blur occurs when the image of the moving body is mixed by its own motion and also by the mixture of the background image and the image of moving body. However, conventionally, the processing corresponding to mixture of the background image and the image of moving body was not considered.

Further, in elimination or adjustment of the motion blur in the aforementioned image, after adjusting the shutter, the motion blur may be tolerated to certain extent to use the motion blur for visual effect. However, in general, when the motion blur is significant, Wiener filter is used for eliminating the motion blur.

Also, a conventional user printed out the aforementioned image as needed through selection of the images taken by the user using his own computer, etc.

For this reason, the image obtained by separating, synthesizing or correcting an image on the basis of the mixture of images is not widely used except for on the user's computer.

Further, when an image of body in which the motion blur occurred and other background image are combined to be synthesized, conventional users obtained the desired background image through a number of searches for being input into the user's computer to be displayed.

For this reason, in retrieving images as described above, it poses a problem that until the desired image was put into the user computer, the same processing was repeated.

Also, in the techniques for synthesizing the desired images via the network, these synthesized images have been generated by overlapping and joining a plurality of pre-existing images such as specified images obtained from images stored in the storage server, etc. on the network or images taken with a digital still camera.

By the way, in order to synthesize images by using the aforementioned techniques, it is premised that images which are bases for synthesizing are previously prepared. However, since there are various know-hows the image pickup techniques, it is difficult to obtain or generate images themselves that are satisfactory bases. For this reason, there is a problem that a user cannot easily obtain or generate desired image databases in generating synthesized image.

Further, in consideration of the above problem, if a user could obtain the desired images, the images having large data capacity must be stored in the user computer without being erased because it is not easy to obtain them again. In this case, it is suggested to perform the optimal encoding in accordance with the feature amounts by separating the image data into the feature amounts of the object and the mixture ratio. However, in general, since the feature amounts of the image object and the mixture ratio have many differences such that the encoding cannot be performed in the optimal state, there are problems in that the optimal encoding cannot be implemented and the image data cannot be stored efficiently.

In consideration of the foregoing situations, the present invention makes it possible to encrypt images using mixed images; eliminate motion blurs by establishing and adjusting the mixture of motion blur to obtain clear images and to correct images more naturally by synthesizing both the image in which the motion blur is adjusted and the background image; use effectively via the network the images obtained by separating, synthesizing or correcting images on the basis of utilizing mixture of images; and retrieve via the network images obtained by separating, synthesizing or correcting images on the basis of utilizing mixture of images; call out and use as needed pre-existing image data without storing the image data in the user computer by storing the images in a predetermined storage server and reading out and utilizing images as needed by using positional information of the storage server.

A $1^{st}$ system of the present invention is characterized in that a first communication apparatus comprises: a requested information input means for inputting requested information of a user of a plurality of encoded data which are generated on the basis of a predetermined image data that is obtained by an image pickup element having a predetermined number of pixels, each having a time integration effect, and that is comprised of pixel values determined for every pixels in accordance with an amount of light forming an image integrated over time; a requested information transmitting means for transmitting the requested information which is input by the requested information input means to a second communication apparatus; and an encoded data receiving means for receiving the encoded data which are generated on the basis of the image data corresponding to the requested information transmitted from the second communication apparatus, and the second communication apparatus comprises: a requested information receiving means for receiving the requested information transmitted from the first communication apparatus; a separating means for separating the predetermined image data into a foreground component image having foreground object components constituting a foreground object and a background component image having background object components constituting a background object; and an encoded data transmitting means for transmitting to the first communication apparatus the encoded data which is generated when the image is separated into the foreground component image and the background component image by the separating means on the basis of the requested information received by the requested information receiving means.

Each of the first communication apparatus and the second communication apparatus may further comprise a first charging means and a second charging means for performing charge processing in accordance with the requested information.

The second charging means may generates charge information including user ID, the second communication apparatus ID and cost information corresponding to the requested information in accordance with the requested information.

The second charging means may perform the charge processing with respect to a financial account of the user on the basis of the charge information by cooperating with the first charging means.

The first charging means of the first communication apparatus may perform the charge processing by deducting the number of points corresponding to the cost information from the number of point of each user used in the charge processing.

The encoded data transmitting means may transmit the encoded data only to the first communication apparatus after the charge processing has been finished by the first charging means and the second charging means.

The requested information input means may input the predetermined image data in addition to the requested information of the user, the requested information transmitting means may transmit the predetermined image data in addition to the requested information to the second communication apparatus, the requested information receiving means may receive the predetermined image data in addition to the requested information transmitted from the first communication apparatus, the separating means may separate the predetermined image data into a foreground component image having foreground object components constituting a foreground object and a background component image having background object components constituting a background object, and the encoded data transmitting means may transmit the encoded data as significant information generated when the separating means separates the predetermined image into the foreground component image and the background component image on the basis of the predetermined image data and the requested information received by the requested information receiving means, only to the first communication apparatus after the charge processing has been finished by the first charging means and the second charging means.

The second communication apparatus may further comprise an area information generating means for generating area information discerning any of a foreground area having foreground object components constituting a foreground object of the predetermined image data, a background area having background object components constituting a background object of the predetermined image data and a mixed area in which the foreground area and the background area are mixed, wherein the significant information includes area information, and wherein the encoded data transmitting means may transmit the encoded data as area information generated by area information generating means when the separating means separates the predetermined image into the foreground component image and the background component image on the basis of the predetermined image data and the requested information transmitted by the requested information input means, only to the first communication apparatus after the charge processing has been finished by the first charging means and the second charging means.

The second communication apparatus may further comprise a mixture ratio generating means for generating a mixture ratio indicating a ratio in which the foreground area and the background area are mixed in the mixed area of the predetermined image data, wherein the significant information includes the mixture ratio, and wherein the encoded data transmitting means may transmit the encoded data as mixture ratio generated by the mixture ratio generating means when the predetermined image is separated into the foreground component image and the background component image by the separating means on the basis of the predetermined image data and the requested information received by the requested information receiving means, only to the first communication apparatus after the charge processing has been finished by the first charging means and the second charging means.

The significant information may include the foreground component image and the background component image, the encoded data transmitting means may transmit the requested information received by the requested information receiving means and the encoded data as the foreground component image and the background component image generated by the separating means when the predetermined image is separated into the foreground component image and the background component image by the separating means, only to the first communication apparatus after the charge processing has been finished by the first charging means and the second charging means.

The requested information input means may input an image data ID discerning a predetermined image data in addition to the requested information of the user, and the encoded data transmitting means may transmit the encoded data as significant information generated when the separating means separates the predetermined image into the foreground component image and the background component image on the basis of the requested information and the predetermined image data corresponding to the image data ID only to the first communication apparatus after the charge processing has been finished by the first charging means and the second charging means.

The second communication apparatus may further comprise an area information generating means for generating area information discerning any of a foreground area having foreground object components constituting a foreground object of the predetermined image data corresponding to the image data ID, a background area having background object components constituting a background object of the predetermined image data corresponding to the image data ID and a mixed area in which the foreground area and the background area are mixed, wherein the significant information includes area information, and wherein the encoded data transmitting means may transmit the encoded data as area information generated by area information generating means when the separating means separates the predetermined image into the foreground component image and the background component image on the basis of the requested information and the predetermined image data corresponding to the image data ID, only to the first communication apparatus after the charge processing has been finished by the first charging means and the second charging means.

The second communication apparatus may further comprise a mixture ratio generating means for generating a mixture ratio indicating a ratio of the mixed area of the predetermined image data corresponding to the image data ID on the basis of area information, wherein the significant information includes the mixture ratio, and the encoded data transmitting means may transmit the encoded data as mixture ratio generated by the mixture ratio generating means when the separating means separates the predetermined image into the foreground component image and the background component image on the basis of the requested information and the predetermined image data corresponding to the image data ID only to the first communication apparatus after the charge processing has been finished by the first charging means and the second charging means.

The significant information may include the foreground component image and the background component image, the encoded data transmitting means may transmit the requested information and the encoded data as the foreground component image and the background component image generated by the separating means when the predetermined image corresponding to the image data ID is separated into the foreground component image and the background component image by the separating means, only to the first communication apparatus after the charge processing has been finished by the first charging means and the second charging means.

A communication method of the $1^{st}$ system of the present invention is characterized in that a communication method of the first communication apparatus comprises: a requested information input step of inputting requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmitting step of transmitting the requested information which is input in the requested information input step to the second communication apparatus; and an encoded data receiving step of receiving the encoded data which are generated on the basis of the image data corresponding to the requested information transmitted from the second communication apparatus, and a communication method of the second communication apparatus comprises: a requested information receiving step of receiving the requested information transmitted from the first communication apparatus; a separating step of separating the predetermined image data into a foreground component image having foreground object components constituting a foreground object and a background component image having background object components constituting a background object; and an encoded data transmitting step of transmitting to the first communication apparatus the encoded data which are generated when the image is separated into, the foreground component image and the background component image in the separating step on the basis of the requested information received in the requested information receiving step.

A program of a $2^{nd}$ recording medium of the present invention is characterized in that a program controlling the first communication apparatus comprises: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmission control step of controlling transmission of the requested information which is input in the requested information input control step to the second communication apparatus; and an encoded data reception control step of controlling reception of the encoded data which are generated on the basis of the image data corresponding to the requested information transmitted from the second communication apparatus, and a program controlling the second communication apparatus comprises: a requested information reception control step of controlling reception of the requested information transmitted from the first communication apparatus; a separation control step of controlling separation of the predetermined image data into a foreground component image having foreground object components constituting a foreground object and a background component image having background object components constituting a background object; and an encoded data transmission control step of controlling transmission of the encoded data which are generated when the image is separated into the foreground component image and the background component image in the separation control step on the basis of the requested information received in the requested information reception control step to the first communication apparatus.

A $2^{nd}$ program of the present invention is characterized by making a computer for controlling the first communication apparatus perform: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated overtime; a requested information transmission control step of controlling transmission of the requested information which is input in the requested information input control step to the second communication apparatus; and an encoded data reception control step of controlling reception of the encoded data which are generated on the basis of the image data corresponding to the requested information transmitted from the second communication apparatus and by making a computer for controlling the second communication apparatus perform: a requested information reception control step of controlling reception of the requested information transmitted from the first communication apparatus; a separation control step of controlling separation of the predetermined image data into a foreground component image having foreground object components constituting a foreground object and a background component image having background object components constituting a background object; and an encoded data transmission control step of controlling transmission of the encoded data which are generated when the image is separated into the foreground component image and the background component image in the separation control step on the basis of the requested information received in the requested information reception control step, to the first communication apparatus.

A $2^{nd}$ communication apparatus of the present invention is characterized by comprising: a requested information input means for inputting requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmitting means for transmitting the requested information which is input by the requested information input means to other communication apparatus; and an encoded data receiving means for receiving the encoded data which are generated on the basis of the image data corresponding to the requested information transmitted from other communication apparatus.

A $2^{nd}$ communication method of the present invention is characterized by comprising: a requested information input step of inputting requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmitting step of transmitting the requested information which is input in the requested information input step to other communication apparatus; and an encoded data receiving step of receiving the encoded data which are generated on the basis of the image data corresponding to the requested information transmitted from other communication apparatus.

A program of a $3^{rd}$ recording medium of the present invention is characterized by comprising: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmission control step of controlling transmission of the requested information which is input in the requested information input control step to other communication apparatus; and an encoded data reception control step of controlling reception of the encoded data which are generated on the basis of the image data corresponding to the requested information transmitted from other communication apparatus.

A $3^{rd}$ program of the present invention is characterized by making a computer perform: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmission control step of controlling transmission of the requested information which is input in the requested information input control step to other communication apparatus; and an encoded data reception control step of controlling reception of the encoded data which are generated on the basis of the image data corresponding to the requested information transmitted from other communication apparatus.

A $3^{rd}$ communication apparatus of the present invention is characterized by comprising: a requested information receiving means for receiving the requested information transmitted from other communication apparatus; a separating means for separating the image data that is obtained by an image pickup element having a predetermined number of pixels, each having a time integration effect, and that is comprised of pixel values determined for every pixels in accordance with an amount of light forming an image integrated over time into a foreground component image having foreground object components constituting a foreground object and a background component image having background object components constituting a background object; and an encoded data transmitting means for transmitting to other communication apparatus the encoded data which are generated when the image is separated into the foreground component image and the background component image by the separating means on the basis of the requested information received by the requested information receiving means.

A $3^{rd}$ communication method of the present invention is characterized by comprising: a requested information receiving step of receiving the requested information transmitted from other communication apparatus; a separating step of separating the image data that is obtained by an image pickup element having a predetermined number of pixels, each having a time integration effect, and that is comprised of pixel values determined for every pixels in accordance with an amount of light forming an image integrated over time into a foreground component image having foreground object components constituting a foreground object and a background component image having background object components constituting a background object; and an encoded data transmitting step of transmitting to other communication apparatus the encoded data which is generated when the image is separated into the foreground component image and the background component image in the separating step on the basis of the requested information received in the requested information receiving step.

A program of a $4^{th}$ recording medium of the present invention is characterized by comprising: a requested information receiving step of receiving the requested information transmitted from other communication apparatus; a separating step of separating the image data that is obtained by an image pickup element having a predetermined number of pixels, each having a time integration effect, and that is comprised of pixel values determined for every pixels in accordance with an amount of light forming an image integrated over time into a foreground component image having foreground object components constituting a foreground object and a background component image having background object components constituting a background object; and an encoded data transmitting step of transmitting to other communication apparatus the encoded data which is generated when the image is separated into the foreground component image and the background component image in the separation control step on the basis of the requested information received in the requested information reception control step.

A $4^{th}$ program of the present invention is characterized by making a computer perform: a requested information receiving step of receiving the requested information transmitted from other communication apparatus; a separating step of separating the image data that is obtained by an image pickup element having a predetermined number of pixels, each having a time integration effect, and that is comprised of pixel values determined for every pixels in accordance with an amount of light forming an image integrated over time into a foreground component image having foreground object components constituting a foreground object and a background component image having background object components constituting a background object; and an encoded data transmitting step of transmitting to other communication apparatus the encoded data which is generated when the image is separated into the foreground component image and the background component image in the separation control step on the basis of the requested information received in the requested information reception control step.

A $2^{nd}$ communication system of the present invention is characterized in that the first communication apparatus comprises: a requested information input means for inputting requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmitting means for transmitting the requested information which is input by the requested information input means to one of the second communication apparatus to the fourth communication apparatus; and an encoded data receiving means for receiving the encoded data which are generated on the basis of the image data corresponding to the requested information transmitted from one of the second communication apparatus to the fourth communication apparatus, the second communication apparatus comprises: the first request information receiving means for receiving the requested information transmitted from the first communication apparatus; a separating means for separating the predetermined image data into a foreground component image having foreground object components constituting a foreground object and a background component image having background object components constituting a background object; and the first encoded data transmitting means for transmitting to the first communication apparatus the foreground component image and the background component image which are separated from the image by the separating means on the basis of the requested information received by the first request information receiving means as the encoded data, the third communication apparatus comprises: the second request information receiving means for receiving the requested information transmitted from the first communication apparatus; an area information generating means for generating area information discerning any of a foreground area having foreground object components constituting a foreground object of the predetermined image data, a background area having background object components constituting a background object of the predetermined image data and a mixed area in which the foreground area and the background area are mixed; and the second encoded data transmitting means for transmitting to the first communication apparatus area information generated by area information generating means on the basis of the requested information received by the second request information receiving means as the encoded data, and the fourth communication apparatus comprises: the third request information receiving means for receiving the requested information transmitted from the first communication apparatus; a mixture ratio generating means for generating a mixture ratio indicating a ratio in which the foreground area and the background area are mixed in the mixed area of the predetermined image data; and the third encoded data transmitting means for transmitting the mixture ratio generated by the mixture ratio generating means to the first communication apparatus on the basis of the requested information received by the requested information receiving means as encoded data.

A communication method of the $2^{nd}$ system of the present invention is characterized in that a communication method of the first communication apparatus comprises: a requested information input step of inputting requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmitting step of transmitting the requested information which is input in the requested information input step to one of the second communication apparatus to the fourth communication apparatus; and an encoded data receiving step of receiving the encoded data which are generated on the basis of the image data corresponding to the requested information transmitted from one of the second communication apparatus to the fourth communication apparatus, a communication method of the second communication apparatus comprises: the first request information receiving step of receiving the requested information transmitted from the first communication apparatus; a separating step of separating the predetermined image data into a foreground component image having foreground object components constituting a foreground object and a background component image having background object components constituting a background object; and the first encoded data transmitting step of transmitting to the first communication apparatus the foreground component image and the background component image which are separated from the image in the separating step on the basis of the requested information received in the first request information receiving step as the encoded data, a communication method of the third communication apparatus comprises; the second request information receiving step of receiving the requested information transmitted from the first communication apparatus; an area information generating step of generating area information discerning any of a foreground area having foreground object components constituting a foreground object of the predetermined image data, a background area having background object components constituting a background object of the predetermined image data and a mixed area in which the foreground area and the background area are mixed; and the second encoded data transmitting step of transmitting to the first communication apparatus area information generated in area information generating step on the basis of the requested information received in the second request information receiving step as the encoded data, and a communication method of the fourth communication apparatus comprises: the third request information receiving step of receiving the requested information received from the first communication apparatus; a mixture ratio generating step of generating a mixture ratio indicating a ratio in which the foreground area and the background area are mixed in the mixed area of the predetermined image data; and the third encoded data transmitting step of transmitting the mixture ratio generated in the mixture ratio generating step to the first communication apparatus on the basis of the requested information received in the requested information receiving step as the encoded data.

A program of a $5^{th}$ recording medium of the present invention is characterized in that a program controlling the first communication apparatus comprises: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmission control step of controlling transmission of the requested information which is input in the requested information input control step to one of the second communication apparatus to the fourth communication apparatus; and an encoded data reception control step of controlling reception of the encoded data which are generated on the basis of the image data corresponding to the requested information transmitted from one of the second communication apparatus to the fourth communication apparatus, a program controlling the second communication apparatus comprises: the first request information reception control step of controlling reception of the requested information transmitted from the first communication apparatus; a separation control step of controlling separation of the predetermined image data into a foreground component image having foreground object components constituting a foreground object and a background component image having background object components constituting a background object; and the first encoded data transmission control step of controlling transmission of the foreground component image and the background component image which are separated from the image in the separation control step on the basis of the requested information received in the first request information reception step as the encoded data to the first communication apparatus, program controlling the third communication apparatus comprises; the second request information reception control step of controlling reception of the requested information transmitted from the first communication apparatus; an area information generation control step of controlling generation of area information discerning any of a foreground area having foreground object components constituting a foreground object of the predetermined image data, a background area having background object components constituting a background object of the predetermined image data and a mixed area in which the foreground area and the background area are mixed; and the second encoded data transmission control step of controlling transmission of area information generated in area information generation control step on the basis of the requested information received in the second request information reception control step as the encoded data to the first communication apparatus, and a program controlling the fourth communication apparatus comprises: the third request information reception control step of controlling reception of the requested information received from the first communication apparatus; a mixture ratio generation control step of controlling generation of a mixture ratio indicating a ratio in which the foreground area and the background area are mixed in the mixed area of the predetermined image data; and the third encoded data transmission control step of controlling transmission of the mixture ratio generated in the mixture ratio generation control step on the basis of the requested information received in the requested information reception control step to the first communication apparatus as the encoded data.

A $5^{th}$ program of the present invention is characterized by making a computer for controlling the first communication apparatus perform: a requested information input control step of controlling input of requested information of a user from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; a requested information transmission control step of controlling transmission of the requested information which is input in the requested information input step to one of the second communication apparatus to the fourth communication apparatus; and an encoded data reception control step of controlling reception of the encoded data which are generated on the basis of the image data corresponding to the requested information transmitted from one of the second communication apparatus to the fourth communication apparatus, by making a computer for controlling the second communication apparatus perform: the first request information reception control step of controlling reception of the requested information transmitted from the first communication apparatus; a separation control step of controlling separation of the predetermined image data into a foreground component image having foreground object components constituting a foreground object and a background component image having background object components constituting a background object; and the first encoded data transmission control step of controlling transmission of the foreground component image and the background component image which are separated from the image in the separation control step on the basis of the requested information received in the first request information reception control step as the encoded data to the first communication apparatus, by making a computer for controlling the third communication apparatus perform; the second request information reception control step of controlling reception of the requested information transmitted from the first communication apparatus; an area information generation control step of controlling generation of area information discerning any of a foreground area having foreground object components constituting a foreground object of the predetermined image data, a background area having background object components constituting a background object of the predetermined image data and a mixed area in which the foreground area and the background area are mixed; and the second encoded data transmission control step of controlling transmission of area information generated in area information generation control step on the basis of the requested information received in the second request information reception control step as the encoded data to the first communication apparatus, and by making a computer for controlling the fourth communication apparatus perform: the third request information reception control step of controlling reception of the requested information received from the first communication apparatus; a mixture ratio generation control step of controlling generation of a mixture ratio indicating a ratio in which the foreground area and the background area are mixed in the mixed area of the predetermined image data; and the third encoded data transmission control step of controlling transmission of the mixture ratio generated in the mixture ratio generation control step on the basis of the requested information received in the requested information reception control step as the encoded data to the first communication apparatus.

A $4^{th}$ communication apparatus of the present invention is characterized by comprising: a requested information input means for inputting the requested information of user; a synthesizing means for synthesizing a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time, to generate a synthesized image; and a synthesized image output means for outputting the synthesized image generated by the synthesizing means.

The synthesized image output means may output the synthesized image to the communication apparatus of the user.

The requested information input means may input a predetermined foreground component image, a predetermined background component image and the significant information used when synthesizing the predetermined foreground component image and the predetermined background component image along with the requested information of the user, and the synthesizing means may synthesize the predetermined foreground component image and the predetermined background component image input by the requested information input means along with the requested information on the basis of the significant information and generate the synthesized image.

The requested information input means may input a predetermined foreground component image, a predetermined background component image and the mixture ratio of the mixed area where the predetermined foreground component image and the predetermined background component image are mixed as significant information used when synthesizing the predetermined foreground component image and the predetermined background component image along with the requested information of the user, and the synthesizing means may synthesize the predetermined foreground component image and the predetermined background component image input by the requested information input means along with the requested information on the basis of the mixture ratio as significant information and generate the synthesized image.

The requested information input means may input a predetermined foreground component image, a predetermined background component image, and amount of movement and the moving direction of the foreground component image as significant information used when synthesizing the predetermined foreground component image and the predetermined background component image along with the requested information of the user, and the synthesizing means may adjust of the motion blur of the predetermined foreground component image input by the requested information input means along with the requested information on the basis of amount of movement and the moving direction of the foreground component image as the significant information, synthesize the predetermined foreground component image of which motion blur is adjusted and the predetermined background component image, and generate the synthesized image.

The requested information input means may input a predetermined foreground component image, a predetermined background component image and initial positional information, amount of movement and moving direction of the foreground component image as significant information used when synthesizing the predetermined foreground component image and the predetermined background component image along with the requested information of the user, the synthesizing means may adjust the motion blur of the predetermined foreground component image input by the requested information input means along with the requested information on the basis of amount of movement and the moving direction as significant information, calculate the mixture ratio, synthesize the predetermined foreground component image where motion blur is adjusted and the predetermined background component image using the calculated mixture ratio on the basis of the initial positional information, amount of movement and the moving direction of the foreground component image as significant information, and then generate the synthesized image.

The requested information input means may input a foreground component image ID discerning a predetermined foreground component image, a background component image ID discerning a predetermined background component image and significant information along with the requested information of the user, and the synthesizing means may synthesize the foreground component image corresponding to the foreground component image ID and the background component image corresponding to the background component image ID on the basis of the significant information in accordance with the foreground component image ID discerning the predetermined foreground component image, the background component image ID discerning the predetermined background component image, and significant information along with the requested information of the user, and generate the synthesized image.

A charging means for performing charge processing in accordance with the requested information may be further comprised.

The charging means may generates charge information including user ID, the communication apparatus ID and cost information corresponding to the requested information in accordance with the requested information.

The charging means may perform the charge processing with respect to a financial account of the user on the basis of the charge information.

The charging means may perform the charge processing by deducting the number of points corresponding to the cost information from the number of point of each user used in the charge processing and corresponding to cash.

The output means may output the synthesized image to the communication apparatus of the user having finished the charge processing after the charge processing has been finished by the charging means.

A $4^{th}$ communication method of the present invention is characterized by comprising: a requested information input step of inputting the requested information of user; a synthesizing step of synthesizing a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with request information and generating a synthesized image; and a synthesized image output step of outputting the synthesized image generated in the synthesizing step.

A program of a $6^{th}$ recording medium of the present invention is characterized by comprising: a requested information input control step of controlling input of the requested information of user; a synthesization control step of controlling synthesization of a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with request information, to generate a synthesized image; and a synthesized image output control step of controlling output of the synthesized image generated in the synthesization control step.

A $6^{th}$ program of the present invention is characterized by making a computer perform: a requested information input control step of controlling input of the requested information of user; a synthesization control step of controlling synthesization of a foreground component image having foreground object components constituting foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with request information, to generate a synthesized image; and a synthesized image output control step of controlling output of the synthesized image generated in the synthesization control step.

A $3^{rd}$ communication system of the present invention is characterized in that the first communication apparatus comprises: a requested information input means for inputting request information of a user; a requested information transmitting means for transmitting the requested information which is input by the requested information input means to the second communication apparatus; and a synthesized data receiving means for receiving the synthesized data transmitted from the second communication apparatus in accordance with the requested information, and the second communication apparatus comprises: a requested information receiving means for receiving the requested information transmitted from the first communication apparatus; a synthesizing means for synthesizing a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmitting means for transmitting the synthesized image generated by the synthesizing means to the first communication apparatus.

The requested information input means may input a predetermined foreground component image, a predetermined background component image and the significant information used when synthesizing the predetermined foreground component image and the predetermined background component image along with the requested information of the user, and the synthesizing means may synthesize the predetermined foreground component image and the predetermined background component image input by the requested information input means along with the requested information on the basis of the significant information and generate the synthesized image.

The requested information input means may input a predetermined foreground component image, a predetermined background component image and the mixture ratio of the mixed area where the predetermined foreground component image and the predetermined background component image are mixed as significant information used when synthesizing the predetermined foreground component image and the predetermined background component image along with the requested information of the user, and the synthesizing means may synthesize the predetermined foreground component image and the predetermined background component image input by the requested information input means along the requested information on the basis of the mixture ratio as significant information and generate the synthesized image.

The requested information input means may input a predetermined foreground component image, a predetermined background component image, and amount of movement and moving direction of the foreground component image as significant information used when synthesizing the predetermined foreground component image and the predetermined background component image along with the requested information of the user, and the synthesizing means may adjust of the predetermined foreground component image input by the requested information input means along with the requested information on the basis of amount of movement and the moving direction of the foreground component image as significant information, synthesize the predetermined foreground component image in which the motion blur is adjusted and the predetermined background component image and generate the synthesized image.

The requested information input means may input a predetermined foreground component image, a predetermined background component image and initial positional information, amount of movement and moving direction of the foreground component image as significant information used when synthesizing the predetermined foreground component image and the predetermined background component image along with the requested information of the user, and the synthesizing means may adjust the motion blur of the predetermined foreground component image input by the requested Information input means along with the requested information on the basis of amount of movement and the moving direction as significant information, calculate the mixture ratio, synthesize the predetermined foreground component image where motion blur is adjusted and the predetermined background component image using the calculated mixture ratio on the basis of the initial positional information, amount of movement and the moving direction of the foreground component image as significant information, and then generate the synthesized image.

The requested information input means may input a foreground component image ID discerning a predetermined foreground component image, a background component image ID discerning a predetermined background component image and significant information along with the requested information of the user, and the synthesizing means may synthesize the foreground component image corresponding to the foreground component image ID and the background component image corresponding to the background component image ID on the basis of the significant information in accordance with the foreground component image ID discerning the predetermined foreground component image, the background component image ID discerning the predetermined background component image, and significant information along with the requested information of the user, and generate the synthesized image.

The charging means for performing charge processing in accordance with the requested information may be further comprised.

The charging means may generates charge information including user ID, the communication apparatus ID and charge information including the cost information corresponding to the requested information in accordance with the requested information.

The charging means may perform the charge processing with respect to a financial account of the user on the basis of the charge information.

The charging means may perform the charge processing by deducting the number of points corresponding to the cost information from the number of points of each user used in the charge processing.

The output means may output the synthesized image to the communication apparatus of the user having finished the charge processing after the charge processing has been finished by the charging means.

A communication method of the $3^{rd}$ communication system of the present invention is characterized in that a communication method of the first communication apparatus comprises: a requested information input step of inputting request information of a user; a requested information transmitting step of transmitting the requested information which is input in the requested information input step to the second communication apparatus; and a synthesized data receiving step of receiving the synthesized data transmitted from the second communication apparatus in accordance with the requested information, and a communication method of the second communication apparatus comprises: a requested information receiving step of receiving the requested information transmitted from the first communication apparatus; a synthesizing step of synthesizing a foreground component image having foreground object components constituting a foreground object and a background component image having background object components constituting background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmitting step of transmitting the synthesized image generated in the synthesizing step to the first communication apparatus.

A program of a $7^{th}$ recording medium of the present invention is characterized in that a program controlling the first communication apparatus comprises: a requested information input control step of controlling input of request information of a user; a requested information transmission control step of controlling transmission of the requested information which is input in the requested information input control step to the second communication apparatus; and a synthesized data reception control step of controlling reception of the synthesized data transmitted from the second communication apparatus in accordance with the requested information, and a program controlling the second communication apparatus comprises: a requested information reception control step of controlling reception of the requested information transmitted from the first communication apparatus; a synthesization control step of controlling synthesization of a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmission control step of controlling transmission of the synthesized image generated in the synthesizing step to the first communication apparatus.

A $7^{th}$ program of the present invention is characterized by making a computer for controlling the first communication apparatus perform: a requested information input control step of controlling input of request information of a user; a requested information transmission control step of controlling transmission of the requested information which is input in the requested information input control step to the second communication apparatus; and a synthesized data reception control step of controlling reception of the synthesized data transmitted from the second communication apparatus in accordance with the requested information, and by making a computer for controlling the second communication apparatus perform: a requested information reception control step of controlling reception of the requested information transmitted from the first communication apparatus; a synthesization control step of controlling synthesization of a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmission control step of controlling transmission of the synthesized image generated in the synthesization control step to the first communication apparatus.

A $5^{th}$ communication apparatus of the present invention is characterized by comprising: a requested information input means for inputting request information of a user; a requested information transmitting means for transmitting the requested information which is input by the requested information input means to other communication apparatus; and a synthesized data receiving means for receiving the synthesized data transmitted from other communication apparatus in accordance with the requested information.

A $5^{th}$ communication method of the present invention is characterized by comprising: a requested information input step of inputting request information of a user; a requested information transmitting step of transmitting the requested information which is input in the requested information input step to other communication apparatus; and a synthesized data receiving step of receiving the synthesized data transmitted from other communication apparatus in accordance with the requested information.

A program of an $8^{th}$ recording medium of the present invention is characterized by comprising: a requested information input control step of controlling input of request information of a user; a requested information transmission control step of controlling transmission of the requested information which is input in the requested information input control step to other communication apparatus; and a synthesized data reception control step of controlling reception of the synthesized data transmitted from other communication apparatus in accordance with the requested information.

An $8^{th}$ program of the present invention is characterized by making a computer perform: a requested information input control step of controlling input of request information of a user; a requested information transmission control step of controlling transmission of the requested information which is input in the requested information input control step to other communication apparatus; and a synthesized data reception control step of controlling reception of the synthesized data transmitted from other communication apparatus in accordance with the requested information.

A $6^{th}$ communication apparatus of the present invention is characterized by comprising: a requested information receiving means for receiving the requested information transmitted from other communication apparatus; a synthesizing means for synthesizing a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmitting means for transmitting the synthesized image generated by the synthesizing means to other communication apparatus.

A 6$^{th}$ communication method of the present invention is characterized by comprising: a requested information receiving step of receiving the requested information transmitted from other communication apparatus; a synthesizing step of synthesizing a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmitting step of transmitting the synthesized image generated in the synthesizing step to other communication apparatus.

A program of a 9$^{th}$ recording medium of the present invention is characterized by comprising: a requested information reception control step of controlling reception of the requested information transmitted from other communication apparatus; a synthesization control step of controlling synthesization of a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmission control step of controlling transmission of the synthesized image generated in the synthesization control step to other communication apparatus.

A 9$^{th}$ program of the present invention is characterized by making a computer perform: a requested information reception control step of controlling reception of the requested information transmitted from other communication apparatus; a synthesization control step of controlling synthesization of a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time in accordance with the requested information and generating the synthesized image; and a synthesized image transmission control step of controlling transmission of the synthesized image generated in the synthesization control step to other communication apparatus.

A 7$^{th}$ communication apparatus of the present invention is characterized by comprising: a requested information input means for inputting the requested information of a user; a mixture ratio estimating means for estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values=determined for every pixels in accordance with an amount of light forming an image integrated over time are mixed on the basis of the requested information; a separating means for separating the image data into the foreground component image and the background component image on the basis of the mixture ratio; a synthesizing means for synthesizing the foreground component image separated by the separating means and any background component image, or the background component image separated by the separating means and any foreground component image in a predetermined mixture ratio and generating the synthesized image; and a output means for outputting the synthesized image synthesized by the synthesizing means.

The requested information input means may input amount of motion blur adjustment for adding motion blur to the foreground component image in addition to the requested information of the user and further comprise a motion blur adding means which adds motion blur corresponding to amount by which motion blur is adjusted to the foreground component image, and the synthesizing means may synthesize the foreground component image in which motion blur is added by the motion blur adding means and any background component image in a predetermined mixture ratio and generate the synthesized image.

The requested information input means may also input any background component image in addition to the requested information of the user, and the synthesizing means may synthesize the foreground component image and any background component image in a ratio estimated by the mixture ratio estimating means and generate the synthesized image.

The charging means for performing charge processing in accordance with the requested information may be further comprised.

The charging means may generates charge information including user ID, the communication apparatus ID and cost information corresponding to the requested information in accordance with the requested information.

The charging means may perform the charge processing with respect to a financial account of the user on the basis of the charge information.

The charging means may perform the charge processing by deducting the number of points corresponding to the cost information from the number of points of each user used in the charge processing.

The output means may output the synthesized image to the communication apparatus of the user having finished the charge processing after the charge processing has been finished by the charging means.

The requested information input means may input a predetermined image data in addition to the requested information of the user, and the output means may output the image synthesized by the synthesizing means to the communication apparatus of the user having finished the charge processing after the charge processing has been finished by the charging means.

A 7$^{th}$ communication method of the present invention is characterized by comprising: a requested information input step of inputting the requested information of a user; a mixture ratio estimating step of estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separating step of separating the image data into the foreground component image and the background component image on the basis of the mixture ratio; a synthesizing step of synthesizing the foreground component image separated in the separating step and any background component image, or the background component image separated in the separating step and any foreground component image in a predetermined mixture ratio and generating the synthesized image; and an output step of outputting the synthesized image synthesized in the synthesizing step.

A program of a $10^{th}$ recording medium of the present invention is characterized by comprising: a requested information input control step of controlling input of the requested information of a user; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a output control step of controlling output of the synthesized image synthesized in the synthesization control step.

A $10^{th}$ program of the present invention is characterized by making a computer perform: a requested information input control step of controlling input of the requested information of a user; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a output control step of controlling output of the synthesized image synthesized in the synthesization control step.

A $4^{th}$ communication system of the present invention is characterized in that the first communication apparatus comprises: a requested information input means for inputting request information of a user; a requested information transmitting means for transmitting the requested information which is input by the requested information input means to the second transmitting apparatus; and a receiving means for receiving the synthesized image transmitted from the second communication apparatus, and the second communication apparatus comprises: a requested information receiving means for receiving the requested information which is transmitted from the first transmitting apparatus; a mixture ratio estimating means for estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separating means for separating the image data into the foreground component image and the background component image on the basis of the mixture ratio; a synthesizing means for synthesizing the foreground component image separated by the separating means and any background component image, or the background component image separated by the separating means and any foreground component image in a predetermined mixture ratio and generating the synthesized image; and a synthesized image transmitting means for transmitting the synthesized image synthesized by the synthesizing means to the first communication apparatus.

The requested information input means may input amount of motion blur adjustment for adding motion blur to the foreground component image in addition to the requested information of the user, the second communication apparatus may further comprise a motion blur adding means which adds motion blur corresponding to amount by which motion blur is adjusted to the foreground component image, and the synthesizing means may synthesize the foreground component image where motion blur is added by the motion blur adding means and any background component image in a predetermined mixture ratio and generate the synthesized image.

The requested information input means may also input any background component image in addition to the requested information of the user, the synthesizing means may synthesize the foreground component image and any background component image in a mixture ratio estimated by the mixture ratio estimating means and generate the synthesized image.

The second communication apparatus may further comprise the charging means for performing charge processing in accordance with the requested information.

The charging means may generates charge information including user ID, the second communication apparatus ID and cost information corresponding to the requested information in accordance with the requested information.

The charging means may perform the charge processing with respect to a financial account of the user on the basis of the charge information.

The charging means of the second communication apparatus may perform the charge processing by deducting the number of points corresponding to the cost information from the number of point of each user used in the charge processing.

The synthesized image transmitting means may transmit the synthesized image to the first communication apparatus of the user having finished the charge processing after the charge processing has been finished by the charging means.

The requested information input means may input a predetermined image data in addition to the requested information of the user, and the output means may output the image synthesized by the synthesizing means to the first communication apparatus of the user having finished the charge processing after the charge processing has been finished by the charging means.

A communication method of the $4^{th}$ communication system of the present invention is characterized by a communication method of the first communication apparatus comprises: a requested information input step of inputting request information of a user; a requested information transmitting step of transmitting the requested information which is input in the requested information input step to the second transmitting apparatus; and a receiving step of receiving the synthesized image transmitted from the second communication apparatus, and a communication method of the second communication apparatus comprises: a requested information receiving step of receiving the requested information which is transmitted from the first transmitting apparatus; a mixture ratio estimating step of estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separating step of separating the image data into the foreground component image and the background component image on the basis of the mixture ratio; a synthesizing step of synthesizing the foreground component image separated in the separating step and any background component image, or the background component image separated in the separating step and any foreground component image in a predetermined mixture ratio and generating the synthesized image; and a synthesized image transmitting step of transmitting the synthesized image synthesized in the synthesizing step to the first communication apparatus.

A program of an $11^{th}$ recording medium of the present invention is characterized in that a program controlling the first communication apparatus comprises: a requested information input control step of controlling input of the requested information of a user; a requested information transmission control step of controlling transmission of the requested information which is input in the requested information input control step to the second transmitting apparatus; and a reception control step of controlling reception of the synthesized image transmitted from the second communication apparatus, and a program controlling the second communication apparatus comprises: a requested information reception control step of controlling reception of the requested information which is transmitted from the first transmitting apparatus; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a synthesized image transmission control step of controlling transmission of the synthesized image synthesized in the synthesization control step to the first communication apparatus.

An $11^{th}$ program of the present invention is characterized by making a computer for controlling the first communication apparatus perform: a requested information input control step of controlling input of the requested information of a user; a requested information transmission control step of controlling transmission of the requested information which is input in the requested information input control step to the second transmitting apparatus; and a reception control step of controlling reception of the synthesized image transmitted from the second communication apparatus, and by making a computer for controlling the second communication apparatus perform: a requested information reception control step of controlling reception of the requested information which is transmitted from the first transmitting apparatus; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a synthesized image transmission control step of controlling transmission of the synthesized image synthesized in the synthesization control step to the first communication apparatus.

An $8^{th}$ communication apparatus of the present invention is characterized by comprising: a requested information input means for inputting request information of a user; a requested information transmitting means for transmitting the requested information which is input by the requested information input means to other communication apparatus; and a receiving means for receiving the synthesized image transmitted from other communication apparatus.

An $8^{th}$ communication method of the present invention is characterized by comprising: a requested information input step of inputting request information of a user; a requested information transmitting step of transmitting the requested information which is input in the requested information input step to other communication apparatus; and a receiving step of receiving the synthesized image transmitted from other communication apparatus.

A program of a $12^{th}$ recording medium of the present invention is characterized by comprising: a requested information input control step of controlling input of request information of a user; a requested information transmission control step of controlling transmission of the requested information which is input in the requested information input control step to other communication apparatus; and a reception control step of controlling reception of the synthesized image transmitted from other communication apparatus.

A $12^{th}$ program of the present invention is characterized by making a computer perform: a requested information input control step of controlling input of request information of a user; a requested information transmission control step of controlling transmission of the requested information which is input in the requested information input control step to other communication apparatus; and a reception control step of controlling reception of the synthesized image transmitted from other communication apparatus.

A $9^{th}$ communication apparatus of the present invention is characterized by comprising: a requested information receiving means for receiving the requested information which is transmitted from other communication apparatus; a mixture ratio estimating means for estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separating means for separating the image data into the foreground component image and the background component image on the basis of the mixture ratio; a synthesizing means for synthesizing the foreground component image separated by the separating means and any background component image, or the background component image separated by the separating means and any foreground component image in a predetermined mixture ratio and generating the synthesized image; and a synthesized image transmitting means for transmitting the synthesized image synthesized by the synthesizing means to other communication apparatus.

A $9^{th}$ communication method of the present invention is characterized by comprising: a requested information receiving step of receiving the requested information which is transmitted from other communication apparatus; a mixture ratio estimating step of estimating a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separating step of separating the image data into the foreground component image and the background component image on the basis of the mixture ratio; a synthesizing step of synthesizing the foreground component image separated in the separating step and any background component image, or the background component image separated in the separating step and any foreground component image in a predetermined mixture ratio and generating the synthesized image; and a synthesized image transmitting step of transmitting the synthesized image synthesized in the synthesizing step to other communication apparatus.

A program of a $13^{th}$ recording medium of the present invention is characterized by comprising: a requested information reception control step of controlling reception of the requested information which is transmitted from other communication apparatus; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a synthesized image transmission control step of controlling transmission of the synthesized image synthesized in the synthesization control step to other communication apparatus.

A $13^{th}$ program of the present invention is characterized by making a computer perform: a requested information reception control step of controlling reception of the requested information which is transmitted from other communication apparatus; a mixture ratio estimation control step of controlling estimation of a mixture ratio indicating a ratio in which a foreground component image having foreground object components constituting a foreground object and a background component image having background object components constituting a background object of the image data that is obtained by an image pickup element having a predetermined number of pixels, each having a time integration effect, and that is comprised of pixel values determined for every pixels in accordance with an amount of light forming an image integrated over time are mixed on the basis of the requested information; a separation control step of controlling separation of the image data into the foreground component image and the background component image on the basis of the mixture ratio; a synthesization control step of controlling synthesization of the foreground component image separated in the separation control step and any background component image, or the background component image separated in the separation control step and any foreground component image in a predetermined mixture ratio and generating the synthesized image; and a synthesized image transmission control step of controlling transmission of the synthesized image synthesized in the synthesization control step to other communication apparatus.

A $10^{th}$ communication apparatus of the present invention is characterized by comprising; an image ID input means for inputting the ID discerning an image requested by a user; a storing means for storing the image having at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving an image corresponding to an image ID input by the image ID input means of the images stored in the storing means; an output means for outputting the image retrieved by the retrieving means to the communication apparatus of the user; and a charging means for performing charge processing in accordance with the image retrieved by the retrieving means.

A separating means may be further comprised for separating the image into a foreground component image having foreground object components constituting a foreground object and a background component image having background object components constituting a background object and the storing means may store the foreground component image and the background component image separated from the image by the separating means.

A synthesized image generating means may be further comprised for synthesizing the foreground component image having foreground object components constituting a foreground object and the background component image having background object components constituting a background object separated from the image in a predetermined mixture ratio and generating the synthesized image and the storing means may store the synthesized image generated by the synthesized image generating means.

A separating means for separating the image into the foreground component image having foreground object components constituting a foreground object and the background component image having background object components constituting a background object and a synthesized image generating means for synthesizing the foreground component image and the background component image separated by the separating means in a predetermined mixture ratio and generating the synthesized image may be further comprised, and the storing means may store the synthesized image generated by the synthesized image generating means.

The charging means may generates charge information including, user ID, the communication apparatus ID and cost information corresponding to the image retrieved by the retrieving means in accordance with the image retrieved by the retrieving means.

The charging means may perform the charge processing with respect to a financial account of the user on the basis of the charge information.

The charging means may perform the charge processing by deducting the number of points corresponding to the cost information from the number of point of each user used in the charge processing.

The output means may output the synthesized image to the first communication apparatus of the user having finished the charge processing after the charge processing has been finished by the charging means.

A $10^{th}$ communication method of the present invention is characterized by comprising; an image ID input step of inputting the ID discerning an image requested by a user; a storing step of storing the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving step of retrieving an image corresponding to an image ID input in the image ID input step of the images stored in the storing step; an output step of outputting the image retrieved in the retrieving step to the communication apparatus of the user; and a charging step of performing charge processing according to the image retrieved in the retrieving step.

A program of a $14^{th}$ recording medium of the present invention is characterized by comprising; an image ID input control step of controlling input of the ID discerning an image requested by a user; a storage control step of controlling storage of the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of an image corresponding to an image ID input in the image ID input control step of the images stored in the storage control step; an output control step of controlling output of the image retrieved in the retrieval control step to the communication apparatus of the user; and a charge control step of controlling performance of charge processing according to the image retrieved in the retrieval control step.

A $14^{th}$ program of the present invention is characterized by making a computer perform; an image ID input control step of controlling input of the discerning an image requested by a user; a storage control step of controlling storage of the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of an image corresponding to an image ID input in the image ID input control step of the images stored in the storage control step; an output control step of controlling output of the image retrieved in the retrieval control step to the communication apparatus of the user; and a charge control step of controlling performance of charge processing according to the image retrieved in the retrieval control step.

A $5^{th}$ communication system of the present invention is characterized in that a first communication apparatus comprises: an image ID input means for inputting an ID discerning an image requested by a user; an image ID transmitting means for transmitting the image ID to a second communication apparatus; and an image receiving means for receiving the image retrieved according to the image ID, and the second communication apparatus comprises: an image ID receiving means for receiving the image ID transmitted from the first communication apparatus; a storing means for storing the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving the image corresponding to the image ID received by the image ID receiving means among images stored in the storing means; an output means for outputting the image retrieved by the retrieving means to the first communication apparatus; and a charging means for performing a charge processing according to the image retrieved by the retrieving means.

The second communication apparatus may further comprise a separating means for separating the image into the foreground component image having foreground object components constituting the foreground object and the background component image having background object components constituting the background object.

The storing means may store the foreground component image and the background component image separated by the separating means.

The second communication apparatus may further comprise a synthesized image generating means for synthesizing the foreground component image having foreground object components constituting the foreground object and the background component image having background object components constituting the background object separated from the image and generating the synthesized image in a predetermined mixture ratio and the storing means may store the synthesized image generated by the synthesized image generating means.

The second communication apparatus may further comprise: a separating means for separating the image into the foreground component image having foreground object components constituting the foreground object and the background component image having background object components constituting the background object; and a synthesized image generating means for synthesizing the foreground component image having foreground object components constituting the foreground object and the background component image having background object components constituting the background object separated by the separating means and generating the synthesized image in a predetermined mixture ratio and the storing means may store the synthesized image generated by the synthesized image generating means.

The charging means may generate charge information including a user ID, a second communication apparatus ID and cost information corresponding to the image retrieved by the retrieving means in accordance with the image retrieved by the retrieving means.

The charging means may perform the charge processing with respect to a financial account of the user on the basis of the charge information.

The charging means of the second communication apparatus may perform the charge processing by subtracting the number of points corresponding to the cost information from the number of points of each user used in the charge processing.

The output means may output the image to the first communication apparatus of the user having finished the charge processing after the charge processing has been finished by the charging means.

A communication method of the $5^{th}$ communication system of the present invention is characterized in that a communication method of the first communication apparatus comprises: an image ID input step of inputting an ID discerning an image requested by a user; an image ID transmitting step of transmitting the image ID to the second communication apparatus; and an image receiving step of receiving the image retrieved in accordance with the image ID, and a communication method of the second communication apparatus comprises: a storing step of storing the image comprised of at least one image of a foreground component image having foreground object components constituting a foreground object and a background component image having background object components constituting a background object separated from the image data that is obtained by an image pickup element having a predetermined number of pixels, each having a time integration effect, and that is comprised of pixel values determined for every pixels in accordance with an amount of light forming an image integrated over time; a retrieving step of retrieving the image corresponding to the image ID received in the image ID receiving step among images stored in the storing step; an output step of outputting the image retrieved in the retrieving step to the first communication apparatus; and a charging step of performing a charge processing in accordance with the image retrieved in the retrieving step.

A program of a $15^{th}$ recording medium of the present invention is characterized in that a program for controlling the first communication apparatus comprises: an image ID input control step of controlling input of an ID discerning an image requested by a user; an image ID transmission control step of controlling transmission of the image ID to the second communication apparatus; and an image reception control step of controlling reception of the image retrieved in accordance with the image ID, and a program for controlling the second communication apparatus comprises: a storage control step of controlling storage of the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the image ID received in the image ID reception control step among images stored in the storage control step; an output control step of controlling output of the image retrieved in the retrieval control step to the first communication apparatus; and a charge control step of controlling performance of a charge processing in accordance with the image retrieved in the retrieval control step.

A $15^{th}$ program of the present invention is characterized by making a computer for controlling the first communication apparatus perform: an image ID input control step of controlling input of an ID discerning an image requested by a user; an image ID transmission control step of controlling transmission of the image ID to the second communication apparatus; and an image reception control step of controlling reception of the image retrieved in accordance with the image ID, and by making a computer for controlling the second communication apparatus perform: a storage control step of controlling storage of the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the image ID received in, the image ID reception control step among images stored in the storage control step; an output control step of controlling output of the image retrieved in the retrieval control step to the first communication apparatus; and a charge control step of controlling performance of a charge processing in accordance with the image retrieved in the retrieval control step.

An 11$^{th}$ communication apparatus of the present invention is characterized by comprising: an image ID input means for inputting an ID discerning an image requested by a user; an image ID transmitting means for transmitting the image ID to other communication apparatus; and an image receiving means for receiving the image retrieved correspondingly to the image ID.

An 11$^{th}$ communication method of the present invention is characterized by comprising: an image ID input step of inputting an ID discerning an image requested by a user; an image ID transmitting step of transmitting the image ID to other communication apparatus; and an image receiving step of receiving the image retrieved correspondingly to the image ID.

A program of a 16$^{th}$ recording medium of the present invention is characterized by comprising: an image ID input control step of controlling input of an ID discerning an image requested by a user; an image ID transmission control step of controlling transmission of the image ID to other communication apparatus; and an image reception control step of controlling reception of the image retrieved correspondingly to the image ID.

A 16$^{th}$ program of the present invention is characterized by making a computer perform: an image ID input control step of controlling input of an ID discerning an image requested by a user; an image ID transmission control step of controlling transmission of the image ID to other communication apparatus; and an image reception control step of controlling reception of the image retrieved correspondingly to the image ID.

A 12$^{th}$ communication apparatus of the present invention is characterized by comprising: an image ID receiving means for receiving an image ID transmitted from other communication apparatus; a storing means for storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving the image corresponding to the image ID received by the image ID receiving means among images stored in the storing means; an output means for outputting the image retrieved by the retrieving means to other communication apparatus; and a charging means for performing a charge processing in accordance with the image retrieved by the retrieving means. A 12$^{th}$ communication method of the present invention is characterized by comprising: an image ID receiving step of receiving an image ID transmitted from other communication apparatus; a storing step of storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving step of retrieving the image corresponding to the image ID received in the image ID receiving step among images stored in the storing step; an output step of outputting the image retrieved in the retrieving step to other communication apparatus; and a charging step of performing a charge processing in accordance with the image retrieved in the retrieving step.

A program of a 17$^{th}$ recording medium of the present invention is characterized by comprising: an image ID reception control step of controlling reception of an image ID transmitted from other communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the image ID received in the image ID reception control step among images stored in the storage control step; an output control step of controlling output of the image retrieved in the retrieval control step to other communication apparatus; and a charge control step of controlling performance of a charge processing in accordance with the image retrieved in the retrieval control step.

A 17$^{th}$ program of the present invention is characterized by making a computer perform: an image ID reception control step of controlling reception of an image ID transmitted from other communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the image ID received in the image ID reception control step among images stored in the storage control step; an output control step of controlling output of the image retrieved in the retrieval control step to other communication apparatus; and a charge control step of controlling performance of a charge processing in accordance with the image retrieved in the retrieval control step.

A 13$^{th}$ communication apparatus of the present invention is characterized by comprising: an input means for inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a storing means for storing the image input by the input means; and a paying means for performing a payment processing in accordance with the image stored in the storing means.

A separating means for separating the image into the foreground component image having foreground object components constituting the foreground object and the background component image having background object components constituting the background object may be further comprised and the input means may input the foreground component image and the background component image separated by the separating means.

A synthesized image generating means for synthesizing in a predetermined mixture ratio the foreground component image having foreground object components constituting the foreground object and the background component image having background object components constituting the background object separated from the image and generating a synthesized image may be further comprised and the input means may input the synthesized image generated by the synthesized image generating means.

A separating means for separating the image into the foreground component image having foreground object components constituting the foreground object and the background component image having background object components constituting the background object and a synthesized image generating means for synthesizing in a predetermined mixture ratio the foreground component image and the background component image separated by the separating means and generating a synthesized image may be further comprised and the input means may input the synthesized image generated by the synthesized image generating means.

A $13^{th}$ communication method of the present invention is characterized by comprising: an input step of inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a storing step of storing the image input in the input step; and a paying step of performing a payment processing in accordance with the image stored in the storing step.

A program of an $18^{th}$ recording medium of the present invention is characterized by comprising: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a storage control step of controlling storage of the image input in the input control step; and a payment control step of controlling performance of a payment processing in accordance with the image stored in the storage control step.

A $18^{th}$ program of the present invention is characterized by making a computer perform: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a storage control step of controlling storage of the image input in the input control step; and a payment control step of controlling performance of a payment processing in accordance with the image stored in the storage control step.

A $6^{th}$ communication system of the present invention is characterized in that a first communication apparatus comprises: an input means for inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmitting means for transmitting the image input by the input means to a second communication apparatus, and the second communication apparatus comprises: an image receiving means for receiving the image transmitted from the first communication apparatus; a storing means for storing the image received by the image receiving means; and a paying means for performing a payment processing in accordance with the image stored in the storing means.

The first communication apparatus may further comprise a separating means for separating the image into the foreground component image having foreground object components constituting the foreground object and the background component image having background object components constituting the background object and the input means may input the foreground component image and the background component image separated by the separating means.

The first communication apparatus may further comprise a synthesized image generating means for synthesizing in a predetermined mixture ratio the foreground component image having foreground object components constituting the foreground object and the background component image having background object components constituting the background object separated from the image and generating a synthesized image and the input means may input the synthesized image generated by the synthesized image generating means.

The first communication apparatus may further comprise a separating means for separating the image into the foreground component image having foreground object components constituting the foreground object and the background component image having background object components constituting the background object and a synthesized image generating means for synthesizing in a predetermined mixture ratio the foreground component image and the background component image separated by the separating means and generating a synthesized image and the input means may input the synthesized image generated by the synthesized image generating means.

A communication method of the $6^{th}$ communication system is characterized in that a communication method of the first communication apparatus comprises: an input step of inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmitting step of transmitting the image input in the input step to a second communication apparatus, and a communication method of the second communication apparatus comprises: an image receiving step of receiving the image transmitted from the first communication apparatus; a storing step of storing the image received in the image receiving step; and a paying step of performing a payment processing in accordance with the image stored in the storing step. A program of the $19^{th}$ recording medium of the present invention is characterized in that a program for controlling the first communication apparatus comprises: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmission control step of controlling transmission of the image input in the input control step to a second communication apparatus, and a program for controlling the second communication apparatus comprises: an image reception control step of controlling reception of the image transmitted from the first communication apparatus; a storage control step of controlling storage of the image received in the image reception control step; and a payment control step of controlling performance of a payment processing in accordance with the image stored in the storage control step.

A $19^{th}$ program of the present invention is characterized by making a computer for controlling a first communication apparatus perform: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmission control step of controlling transmission of the image input in the input control step to a second communication apparatus, and by making a computer for controlling the second communication apparatus perform: an image reception control step of controlling reception of the image transmitted from the first communication apparatus; a storage control step of controlling storage of the image received in the image reception control step; and a payment control step of controlling performance of a payment processing in accordance with the image stored in the storage control step.

A $14^{th}$ communication apparatus of the present invention is characterized by comprising: an input means for inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmitting means for transmitting the image input by the input means to other communication apparatus.

A $14^{th}$ communication method of the present invention is characterized by comprising: an input step of inputting an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmitting step of transmitting the image input in the input step to other communication apparatus.

A program of a $20^{th}$ recording medium of the present invention is characterized by comprising: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmission control step of controlling transmission of the image input in the input control step to other communication apparatus.

A $20^{th}$ program of the present invention is characterized by making a computer perform: an input control step of controlling input of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; and an image transmission control step of controlling transmission of the image input in the input control step to other communication apparatus.

A $15^{th}$ communication apparatus of the present invention is characterized by comprising: an image receiving means for receiving an image transmitted from other communication apparatus; a storing means for storing the image received by the image receiving means; and a paying means for performing a payment processing in accordance with the image stored in the storing means.

A $15^{th}$ communication method of the present invention is characterized by comprising: an image receiving step of receiving an image transmitted from other communication apparatus; a storing step of storing the image received in the image receiving step; and a paying step of performing a payment processing in accordance with the image stored in the storing step.

A program of a 21$^{st}$ recording medium of the present invention is characterized by comprising: an image reception control step of controlling reception of an image transmitted from other communication apparatus; a storage control step of controlling storage of the image received in the image reception control step; and a payment control step of controlling performance of a payment processing in accordance with the image stored in the storage control step.

A 21$^{st}$ program of the present invention is characterized by making a computer perform: an image reception control step of controlling reception of an image transmitted from other communication apparatus; a storage control step of controlling storage of the image received in the image reception control step; and a payment control step of controlling performance of a payment processing in accordance with the image stored in the storage control step.

A 16$^{th}$ communication apparatus of the present invention is characterized by comprising: a retrieval request information input means for inputting retrieval request information of a user; a storing means for storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving the image corresponding to the retrieval request information input by the retrieval request information input means among images stored in the storing means; an output means for outputting a retrieval result of the retrieving means; and a charging means for performing a charge processing in accordance with the retrieval result.

The storing means may comprise a plurality of image storage units, respectively, provided with an image pickup element for picking up image for updating image picked up by the image pickup element at a predetermined time interval to store them and being capable of communication by a wire or wirelessly.

The retrieval request information may include information specifying a foreground object, the storing means may further comprise a database for indicating relationship between an ID discerning the image pickup elements provided in the plurality of image storage units and an image object stored in the corresponding image storage unit and the retrieving means may retrieve the image corresponding to the information specifying the foreground object input by the retrieval request information input means among images stored in the storing means with reference to the database.

A separating means for separating image data of the image into the foreground component image having foreground object components constituting the foreground object and the background component image having background object components constituting the background object may be further comprised and the storing means may store the foreground component image and the background component image separated by the separating means.

A synthesized image generating means for synthesizing in a predetermined mixture ratio the foreground component image having foreground object components constituting the foreground object and the background component image having background object components constituting the background object separated from the image data of the image and generating a synthesized image may be further comprised and the storing means may store the synthesized image generated by the synthesized image generating means.

A separating means for separating image data of the image into the foreground component image having foreground object components constituting the foreground object and the background component image having background object components constituting the background object and a synthesized image generating means for synthesizing in a predetermined mixture ratio the foreground component image and the background component image separated by the separating means and generating a synthesized image may be further comprised and the storing means may store the synthesized image generated by the synthesized image generating means.

The output means may output existence and nonexistence of the image corresponding to the retrieval request information or the retrieved image along with existence and nonexistence of the image corresponding to the retrieval request information as the retrieval result, and the charging means may perform the charge processing on the basis of the retrieval result output by the output means.

The charging means may generate charge information including a user ID, a communication apparatus ID and cost information corresponding to the retrieval request information in accordance with the retrieval request information.

The charging means may perform the charge processing based on the retrieval result output by the output means with respect to a financial account of the user on the basis of the charge information.

The charging means may perform the charge processing by subtracting the number of points corresponding to the cost information from the number of points of each user used for the charge processing.

The output means may output the retrieval result to a communication apparatus of the user having finished the charge processing after the charge processing has been finished by the charging means.

A 16$^{th}$ communication method of the present invention is characterized by comprising: a retrieval request information input step of inputting retrieval request information of a user; a storing step of storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving step of retrieving image corresponding to the retrieval request information input in the retrieval request information input step among images stored in the storing step; an output step of outputting a retrieval result of the retrieving step; and a charging step of performing a charge processing in accordance with the retrieval result.

A program of a 22$^{nd}$ recording medium of the present invention is characterized by comprising: a retrieval request information input control step of controlling input of a retrieval request information of a user; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the retrieval request information input in the retrieval request information input control step among images stored in the storage control step; an output control step of controlling output of a retrieval result of the retrieval control step; and a charge control step of controlling performance of a charge processing in accordance with the retrieval result.

A $22^{nd}$ program of the present invention is characterized by making a computer perform: a retrieval request information input control step of controlling input of a retrieval request information of a user; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of image corresponding to the retrieval request information input in the retrieval request information input control step among images stored in the storage control step; an output control step of controlling output of a retrieval result of the retrieval control step; and a charge control step of controlling performance of a charge processing in accordance with the retrieval result.

A $7^{th}$ communication system of the present invention is characterized in that a first communication apparatus comprises: a retrieval request information input means for inputting a retrieval request information of a user; a retrieval request information transmitting means for transmitting the retrieval request information to a second communication apparatus; and a retrieval result receiving means for receiving a retrieval result transmitted from the second communication apparatus, and the second communication apparatus comprises: a retrieval request information receiving means for receiving the retrieval request information transmitted from the first communication apparatus; a storing means for storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving the image corresponding to the retrieval request information received by the retrieval request information receiving means among images stored in the storing means; an retrieval result transmitting means for transmitting the retrieval result of the retrieving means to the first communication apparatus; and a charging means for performing a charge processing in accordance with the retrieval result.

The storing means may comprise a plurality of image storage units, respectively, provided with an image pickup element for picking up image for updating image picked up by the image pickup element at a predetermined time interval to store them and being capable of communication by a wire or wirelessly.

The retrieval request information may include information specifying a foreground object, the storing means may further comprise a database for indicating relationship between an ID discerning the image pickup elements provided in the plurality of image storage units and an image object stored in the corresponding image storage unit and the retrieving means may retrieve the image corresponding to the information specifying the foreground object input by the retrieval request information input means among images stored in the storing means with reference to the database.

The second communication apparatus may further comprise a separating means for separating image data of the image into the foreground component image having foreground object components constituting the foreground object and the background component image having background object components constituting the background object and the storing means may store the foreground component image and the background component image separated by the separating means.

The second communication apparatus may further comprise a synthesized image generating means for synthesizing in a predetermined mixture ratio the foreground component image having foreground object components constituting the foreground object and the background component image having background object components constituting the background object separated from image data of the image and generating a synthesized image and the storing means may store the synthesized image generated by the synthesized image generating means.

The second communication apparatus may further comprise a separating means for separating image data of the image into the foreground component image having foreground object components constituting the foreground object and the background component image having background object components constituting the background object and a synthesized image generating means for synthesizing in a predetermined mixture ratio the foreground component image and the background component image separated by the separating means and generating a synthesized image and the storing means may store the synthesized image generated by the synthesized image generating means.

The output means may output existence and nonexistence of the image corresponding to the retrieval request information or the retrieved image along with existence and nonexistence of the image corresponding to the retrieval request information as the retrieval result and the charging means may perform the charge processing on the basis of the retrieval result output by the output means.

The charging means may generate charge information including a user ID, a communication apparatus ID and cost information corresponding to the retrieval request information in accordance with the retrieval request information.

The charging means may perform the charge processing based on the retrieval result output by the output means with respect to a financial account of the user on the basis of the charge information.

The charging means may perform the charge processing by subtracting the number of points corresponding to the cost information from the number of points of each user used for the charge processing.

The output means may output the retrieval result to a communication apparatus of the user having finished the charge processing after the charge processing has been finished by the charging means.

A communication method of the $7^{th}$ communication system of the present invention is characterized in that a communication method of the first communication apparatus comprises: a retrieval request information input step of inputting retrieval request information of a user; a retrieval request information transmitting step of transmitting the retrieval request information to a second communication apparatus; and a retrieval result receiving step of receiving a retrieval result transmitted from the second communication apparatus, and a communication method of the second communication apparatus comprises: a retrieval request information receiving step of receiving the retrieval request information transmitted from the first communication apparatus; a storing step of storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving step of retrieving the image corresponding to the retrieval request information received in the retrieval request information receiving step among images stored in the storing step; an retrieval result transmitting step of transmitting the retrieval result of the retrieving step to the first communication apparatus; and a charging step of performing a charge processing in accordance with the retrieval result.

A program of a $23^{rd}$ recording medium of the present invention is characterized in that a program for controlling the first communication apparatus comprises: a retrieval request information input control step of controlling input of retrieval request information of a user; a retrieval request information transmission control step of controlling transmission of the retrieval request information to a second communication apparatus; and a retrieval result reception control step of controlling reception of a retrieval result transmitted from the second communication apparatus, and a program for controlling the second communication apparatus comprises: a retrieval request information reception control step of controlling reception of the retrieval request information transmitted from the first communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the retrieval request information received in the retrieval request information reception control step among images stored in the storage control step; an retrieval result transmission control step of controlling transmission of the retrieval result of the retrieval control step to the first communication apparatus; and a charge control step of controlling performance of a charge processing in accordance with the retrieval result.

A $23^{rd}$ program of the present invention is characterized by making a computer for controlling the first communication apparatus perform: a retrieval request information input control step of controlling input of retrieval request information of a user; a retrieval request information transmission control step of controlling transmission of the retrieval request information to a second communication apparatus; and a retrieval result reception control step of controlling reception of a retrieval result transmitted from the second communication apparatus, and by making a computer for controlling the second communication apparatus perform: a retrieval request information reception control step of controlling reception of the retrieval request information transmitted from the first communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the retrieval request information received in the retrieval request information reception control step among images stored in the storage control step; an retrieval result transmission control step of controlling transmission of the retrieval result of the retrieval control step to the first communication apparatus; and a charge control step of controlling performance of a charge processing in accordance with the retrieval result.

A $17^{th}$ communication apparatus of the present invention is characterized by comprising: a retrieval request information input means for inputting retrieval request information of a user; a retrieval request information transmitting means for transmitting the retrieval request information to other communication apparatus; and a retrieval result receiving means for receiving a retrieval result transmitted from the other communication apparatus.

A $17^{th}$ communication method of the present invention is characterized by comprising: a retrieval request information input step of inputting retrieval request information of a user; a retrieval request information transmitting step of transmitting the retrieval request information to other communication apparatus; and a retrieval result receiving step of receiving a retrieval result transmitted from the other communication apparatus.

A program of a $24^{th}$ recording medium of the present invention is characterized by comprising: a retrieval request information input control step of controlling input of retrieval request information of a user; a retrieval request information transmission control step of controlling transmission of the retrieval request information to other communication apparatus; and a retrieval result reception control step of controlling reception of a retrieval result transmitted from the other communication apparatus.

A $24^{th}$ program of the present invention is characterized by making a computer perform: a retrieval request information input control step of controlling input of retrieval request information of a user; a retrieval request information transmission control step of controlling transmission of the retrieval request information to other communication apparatus; and a retrieval result reception control step of controlling reception of a retrieval result transmitted from the other communication apparatus.

An $18^{th}$ communication apparatus of the present invention is characterized by comprising: a retrieval request information receiving means for receiving retrieval request information transmitted from other communication apparatus; a storing means for storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving means for retrieving the image corresponding to the retrieval request information received by the retrieval request information receiving means among images stored in the storing means; an retrieval result transmitting means for transmitting a retrieval result of the retrieving means to the other communication apparatus; and a charging means for performing a charge processing in accordance with the retrieval result.

An 18$^{th}$ communication apparatus of the present invention is characterized by comprising: a retrieval request information receiving step of receiving retrieval request information transmitted from other communication apparatus; a storing step of storing an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieving step of retrieving the image corresponding to the retrieval request information received in the retrieval request information receiving step among images stored in the storing step; an retrieval result transmitting step of transmitting a retrieval result of the retrieving step to the other communication apparatus; and a charging step of performing a charge processing in accordance with the retrieval result.

A program of a 25$^{th}$ recording medium of the present invention is characterized by comprising: a retrieval request information reception control step of controlling reception of retrieval request information transmitted from other communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the retrieval request information received in the retrieval request information reception control step among images stored in the storage control step; an retrieval result transmission control step of controlling transmission of a retrieval result of the retrieval control step to the other communication apparatus; and a charge control step of control performance of a charge processing in accordance with the retrieval result.

A 25$^{th}$ program of the present invention is characterized by making a computer perform: a retrieval request information reception control step of controlling reception of retrieval request information transmitted from other communication apparatus; a storage control step of controlling storage of an image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time; a retrieval control step of controlling retrieval of the image corresponding to the retrieval request information received in the retrieval request information reception control step among images stored in the storage control step; an retrieval result transmission control step of controlling transmission of a retrieval result of the retrieval control step to the other communication apparatus; and a charge control step of control performance of a charge processing in accordance with the retrieval result.

A 19$^{th}$ communication apparatus of the present invention is characterized by comprising: a foreground component image discerning information input means for inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input means for inputting a background component image discerning information indicative of a background component image having background object components constituting a background object of the image data; an image positional information generating means for generating a foreground component image positional information and a background component image positional information corresponding to the foreground component image discerning information and the background component image discerning information; and an output means for outputting the foreground component image positional information and the background component image positional information generated by the image positional information generating means.

A mixture ratio generating means for generating a mixture ratio of an area in which the foreground component image and the background component image are mixed from the image data that is obtained by the image pickup element having the predetermined number of pixels, each having a time integration effect, and that is comprised of pixel values determined for every pixels in accordance with an amount of light forming the image integrated over time, a separating means for separating the image data into the foreground component image and the background component image according to the mixture ratio, a discerning information generating means for generating the foreground component image discerning information based on the foreground component image and the background component image discerning information based on the background component image, respectively, and a discerning information supplying means for supplying the foreground component image discerning information generated by the discerning information generating means to the foreground component image discerning information input means and the background component image discerning information generated by the discerning information generating means to the background component image discerning information input means, respectively, may be further comprised.

A storing means for storing at a predetermined position the foreground component image and the background component image separated from the image data by the separating means and a positional information storing means for storing each positional information of the foreground component image and the background component image of the image data stored by the storing means may be further comprised and the image positional information generating means may generate the foreground component image positional information and the background component image positional information corresponding to the foreground component image discerning information and the background component image discerning information on the basis of the positional information stored by the positional information storing means and indicative of positions at which the foreground component image and the background component image are stored.

The storing means may store the foreground component image and the background component image separated from the image data by the separating means in other communication apparatus connected through a network, the positional information storing means may store each positional information on the network of the foreground component image and the background component image of the image data stored in the other communication apparatus connected via the network by the storing means, and the image positional information generating means may generate the foreground component image positional information and the background component image positional information corresponding to the foreground component image discerning information and the background component image discerning information on the basis of the positional information on the network of the foreground component image and the background component image of the image data stored by the positional information storing means.

The storing means may store at a predetermined position the foreground component image and the background component image separated from the image data by the separating means along with IDs corresponding to the foreground component image and the background component image, respectively.

A comparing means for comparing the respective IDs of the foreground component image and the background component image separated from the image data by the separating means with IDs of the foreground component image or the background component image previously stored by the storing means may be further comprised, and the storing means may store at a predetermined position the foreground component image and the background component image separated from the image data by the separating means along with IDs corresponding to the foreground component image and the background component image, respectively, on the basis of the comparison result of the comparing means.

When the comparison results of the comparing means are matched, the image positional information generating means may generate the foreground component image positional information and the background component image positional information corresponding to the foreground component image discerning information and the background component image discerning information on the basis of the positional information of the foreground component image or the background component image previously stored by the positional information storing means.

The foreground component image discerning information input means may input the foreground component image having the foreground object components constituting the foreground object of the image data as the foreground component image discerning information and the background component image discerning information input means may input the background component image having the background object components constituting the background object of the image data as the background component image discerning information.

A charging means for performing a charge processing corresponding to output of the foreground component image positional information and the background component image positional information may be further comprised.

The charging means may generate charge information including a user ID, an ID of itself and cost information corresponding to output of the foreground component image positional information and the background component image positional information.

The charging means may perform the charge processing with respect to a financial account of the user on the basis of the charge information.

The charging means may perform the charge processing by subtracting the number of points corresponding to the cost information from the number of points of each user used for the charge processing.

The output means may output the foreground component image positional information and the background component image positional information after the charge processing has been finished by the charging means, in a way that only the user can obtain them.

A $19^{th}$ communication method of the present invention is characterized by comprising: a foreground component image discerning information input step of inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input step of inputting a background component image discerning information indicative of a background component image having background object components constituting a background object of the image data; an image positional information generating step of generating a foreground component image positional information and a background component image positional information corresponding to the foreground component image discerning information and the background component image discerning information; and an output step of outputting the foreground component image positional information and the background component image positional information generated in the image positional information generating step.

A program of a $26^{th}$ recording medium of the present invention is characterized by comprising: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; an image positional information generation control step of controlling generation of a foreground component image positional information and a background component image positional information corresponding to the foreground component image discerning information and the background component image discerning information; and an output control step of controlling output of the foreground component image positional information and the background component image positional information generated in the image positional information generation control step.

A $26^{th}$ program of the present invention is characterized by making a computer perform: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; an image positional information generation control step of controlling generation of a foreground component image positional information and a background component image positional information corresponding to the foreground component image discerning information and the background component image discerning information; and an output control step of controlling output of the foreground component image positional information and the background component image positional information generated in the image positional information generation control step.

A $8^{th}$ communication system of the present invention is characterized in that a first communication apparatus comprises: a foreground component image discerning information input means for inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input means for inputting a background component image discerning information indicative of a background component image having background object components constituting a background object of the image data; a first transmitting means for transmitting the foreground component image discerning information and the background component image discerning information to a second communication apparatus; and a positional information receiving means for receiving a foreground component image positional information and a background component image positional information transmitted from the second communication apparatus, and the second communication apparatus comprises: a foreground component image discerning information receiving means for receiving the foreground component image discerning information transmitted from the first communication apparatus; a background component image discerning information receiving means for receiving the background component image discerning information transmitted from the first communication apparatus; an image positional information generating means for generating a foreground component image positional information and a background component image positional information corresponding to the foreground component image discerning information and the background component image discerning information; and a second transmitting means for transmitting the foreground component image positional information and the background component image positional information generated by the image positional information generating means to the first communication apparatus.

The second communication apparatus may further comprise: a mixture ratio generating means for generating a mixture ratio of an area in which the foreground component image and the background component image are mixed from the image data that is obtained by the image pickup element having the predetermined number of pixels, each having a time integration effect, and that is comprised of pixel values determined for every pixels in accordance with an amount of light forming the image integrated over time; a separating means for separating the image data into the foreground component image and the background component image according to the mixture ratio; a discerning information generating means for generating the foreground component image discerning information on the basis of the foreground component image and the background component image discerning information on the basis of the background component image, respectively; and a discerning information supplying means for supplying the foreground component image discerning information generated by the discerning information generating means to the foreground, component image discerning information input means and the background component image discerning information generated by the discerning information generating means to the background component image discerning information input means, respectively.

A storing means for storing at a predetermined position the foreground component image and the background component image separated from the image data by the separating means and a positional information storing means for storing each positional information of the foreground component image and the background component image of the image data stored by the storing means may be further comprised, and the image positional information generating means may generate the foreground component image positional information and the background component image positional information corresponding to the foreground component image discerning information and the background component image discerning information on the basis of the positional information stored by the positional information storing means and indicative of positions at which the foreground component image and the background component image are stored.

The storing means may store the foreground component image and the background component image separated from the image data by the separating means in other communication apparatus connected through a network, the positional information storing means may store each positional information on the network of the foreground component image and the background component image of the image data stored in the other communication apparatus connected via the network by the storing means, and the image positional information generating means may generate the foreground component image positional information and the background component image positional information corresponding to the foreground component image discerning information and the background component image discerning information on the basis of each positional information on the network of the foreground component image and the background component image of the image data stored by the positional information storing means.

The storing means may store at a predetermined position the foreground component image and the background component image separated from the image data by the separating means along with IDs corresponding to the foreground component image and the background component image, respectively.

The second communication apparatus may further comprise a comparing means for comparing the respective IDs of the foreground component image and the background component image separated from the image data by the separating means with IDs of the foreground component image or the background component image previously stored by the storing means, and the storing means may store at a predetermined position the foreground component image and the background component image separated from the image data by the separating means along with IDs corresponding to the foreground component image and the background component image, respectively, on the basis of the comparison result of the comparing means.

When the comparison results of the comparing means are matched, the image positional information generating means may generate the foreground component image positional information and the background component image positional information corresponding to the foreground component image discerning information and the background component image discerning information on the basis of the positional information of the foreground component image or the background component image previously stored by the positional information storing means.

The foreground component image discerning information input means may input the foreground component image having the foreground object components constituting the foreground object of the image data as the foreground component image discerning information and the background component image discerning information input means may input the background component image having the background object components constituting the background object of the image data as the background component image discerning information.

The second communication apparatus may further comprise a charging means for performing a charge processing corresponding to output of the foreground component image positional information and the background component image positional information.

The charging means may generate charge information including a user ID, an ID of the second communication apparatus and cost information corresponding to output of the foreground component image positional information and the background component image positional information.

The charging means may perform the charge processing with respect to a financial account of the user on the basis of the charge information.

The charging means may perform the charge processing by subtracting the number of points corresponding to the cost information from the number of points of each user used for the charge processing.

The output means may output the foreground component image positional information and the background component image positional information to the user having finished the charge processing after the charge processing has been finished by the charging means.

A communication method of the $8^{th}$ communication system of the present invention is characterized in that a communication method of the first communication apparatus comprises: a foreground component image discerning information input step of inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input step of inputting a background component image discerning information indicative of a background component image having background object components constituting a background object of the image data; a first transmitting step of transmitting the foreground component image discerning information and the background component image discerning information to a second communication apparatus; and a positional information receiving step of receiving a foreground component image positional information and a background component image positional information transmitted from the second communication apparatus, and a communication method of the second communication apparatus comprises: a foreground component image discerning information receiving step of receiving the foreground component image discerning information transmitted from the first communication apparatus; a background component image discerning information receiving step of receiving the background component image discerning information transmitted from the first communication apparatus; an image positional information generating step of generating the foreground component image positional information and the background component image positional information corresponding to the foreground component image discerning information and the background component image discerning information; and a second transmitting step of transmitting the foreground component image positional information and the background component image positional information generated in the image positional information generating step to the first communication system.

A program of a $27^{th}$ recording medium of the present invention is characterized in that a program for controlling the first communication apparatus comprises: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; a first transmission control step of controlling transmission of the foreground component image discerning information and the background component image discerning information to a second communication apparatus; and a positional information reception control step of controlling reception of a foreground component image positional information and a background component image positional information transmitted from the second communication apparatus, and a program for controlling the second communication apparatus comprises: a foreground component image discerning information reception control step of controlling reception of the foreground component image discerning information transmitted from the first communication apparatus; a background component image discerning information reception control step of controlling reception of the background component image discerning information transmitted from the first communication apparatus; an image positional information generation control step of controlling generation of the foreground component image positional information and the background component image positional information corresponding to the foreground component image discerning information and the background component image discerning information; and a second transmission control step of controlling transmission of the foreground component image positional information and the background component image positional information generated in the image positional information generation control step to the first communication system.

A $27^{th}$ program of the present invention is characterized by making a computer for controlling a first communication apparatus perform: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; a first transmission control step of controlling transmission of the foreground component image discerning information and the background component image discerning information to a second communication apparatus; and a positional information reception control step of controlling reception of a foreground component image positional information and a background component image positional information transmitted from the second communication apparatus, and by making a computer for controlling the second communication apparatus perform: a foreground component image discerning information reception control step of controlling reception of the foreground component image discerning information transmitted from the first communication apparatus; a background component image discerning information reception control step of controlling reception of the background component image discerning information transmitted from the first communication apparatus; an image positional information generation control step of controlling generation of the foreground component image positional information and the background component image positional information corresponding to the foreground component image discerning information and the background component image discerning information; and a second transmission control step of controlling transmission of the foreground component image positional information and the background component image positional information generated in the image positional information generation control step to the first communication system.

A $20^{th}$ communication apparatus of the present invention is characterized by comprising: a foreground component image discerning information input means for inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input means for inputting a background component image discerning information indicative of a background component image having background object components constituting a background object of the image data; a transmitting means for transmitting the foreground component image discerning information and the background component image discerning information to other communication apparatus through a network; and a positional information receiving means for receiving a foreground component image positional information and a background component image positional information transmitted from the other communication apparatus through a network.

A $20^{th}$ communication method of the present invention is characterized by comprising: a foreground component image discerning information input step of inputting a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input step of inputting a background component image discerning information indicative of a background component image having background object components constituting a background object of the image data; a transmitting step of transmitting the foreground component image discerning information and the background component image discerning information to other communication apparatus through a network; and a positional information receiving step of receiving a foreground component image positional information and a background component image positional information transmitted from the other communication apparatus via the network.

A program of a $28^{th}$ recording medium of the present invention is characterized by comprising: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; a transmission control step of controlling transmission of the foreground component image discerning information and the background component image discerning information to other communication apparatus through a network; and a positional information reception control step of controlling reception of a foreground component image positional information and a background component image positional information transmitted from the other communication apparatus via the network.

A $28^{th}$ program of the present invention is characterized by making a computer perform: a foreground component image discerning information input control step of controlling input of a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time; a background component image discerning information input control step of controlling input of a background component image discerning information indicative of a background component image having background object components constituting a background object of the image data; a transmission control step of controlling transmission of the foreground component image discerning information and the background component image discerning information to other communication apparatus through a network; and a positional information reception control step of controlling reception of a foreground component image positional information and a background component image positional information transmitted from the other communication apparatus via the network.

A $21^{st}$ communication apparatus of the present invention is characterized by comprising: a foreground component image discerning information receiving means for receiving the foreground component image discerning information of image data transmitted from other communication apparatus through a network, the image data being obtained by an image pickup element having a predetermined number of pixels, each having a time integration effect, and that is comprised of pixel values determined for every pixels in accordance with an amount of light forming an image integrated over time; a background component image discerning information receiving means for receiving the background component image discerning information transmitted from the other communication apparatus; an image positional information generating means for generating a foreground component image positional information and a background component image positional information corresponding to the foreground component image discerning information and the background component image discerning information; and a transmitting means for transmitting the foreground component image positional information and the background component image positional information generated by the image positional information generating means to the other communication apparatus via the network.

A $21^{st}$ communication method of the present invention is characterized by comprising: a foreground component image discerning information receiving step of receiving the foreground component image discerning information of image data transmitted from other communication apparatus through a network, the image data being obtained by an image pickup element having a predetermined number of pixels, each having a time integration effect, and that is comprised of pixel values determined for every pixels in accordance with an amount of light forming an image integrated over time; a background component image discerning information receiving step of receiving the background component image discerning information transmitted from the other communication apparatus; an image positional information generating step of generating a foreground component image positional information and a background component image positional information corresponding to the foreground component image discerning information and the background component image discerning information; and a transmitting step of transmitting the foreground component image positional information and the background component image positional information generated in the image positional information generating step to the other communication apparatus via the network.

A program of a $29^{th}$ recording medium of the present invention is characterized by comprising: a foreground component image discerning information reception control step of controlling reception of the foreground component image discerning information of image data transmitted from other communication apparatus through a network, the image data being obtained by an image pickup element having a predetermined number of pixels, each having a time integration effect, and that is comprised of pixel values determined for every pixels in accordance with an amount of light, forming an image integrated over time; a background component image discerning information reception control step of controlling reception of the background component image discerning information transmitted from the other communication apparatus; an image positional information generation control step of controlling generation of a foreground component image positional information and a background component image positional information corresponding to the foreground component image discerning information and the background component image discerning information; and a transmission control step of controlling transmission of the foreground component image positional information and the background component image positional information generated in the image positional information generation control step to the other communication system via the network.

A $29^{th}$ program of the present invention is characterized by making a computer perform: a foreground component image discerning information reception control step of controlling reception of the foreground component image discerning information of image data transmitted from other communication apparatus through a network, the image data being obtained by an image pickup element having a predetermined number of pixels, each having a time integration effect, and that is comprised of pixel values determined for every pixels in accordance with an amount of light forming an image integrated over time; a background component image discerning information reception control step of controlling reception of the background component image discerning information transmitted from the other communication apparatus; an image positional information generation control step of controlling generation of a foreground component image positional information and a background component image positional information corresponding to the foreground component image discerning information and the background component image discerning information; and a transmission control step of controlling transmission of the foreground component image positional information and the background component image positional information generated in the image positional information generation control step to the other communication system via the network.

In the $1^{st}$ communication system and method and the $2^{nd}$ program of the present invention, by a first communication apparatus, requested information of a user is input from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; the input request information is transmitted to the second communication apparatus; and the encoded data generated on the basis of the image data corresponding to the requested information transmitted from the second communication apparatus is received, and by the second communication apparatus, the requested information transmitted from the first communication apparatus is received; the image data is separated into a foreground component image having foreground object components constituting a foreground object and a background component image having background object components constituting a background object; and the encoded data generated when the image is separated into the foreground component image and the background component image on the basis of the received request information is transmitted to the first communication apparatus.

In the $2^{nd}$ communication apparatus and method and the $3^{rd}$ program of the present invention, the request requested information of a user is input from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; the input request information is transmitted to other communication apparatus; and the encoded data generated on the basis of the image data corresponding to the requested information, transmitted from other communication apparatus, is received.

In the $3^{rd}$ communication apparatus and method and the $4^{th}$ program of the present invention, the requested information transmitted from other communication apparatus is received; the image data that is obtained by an image pickup element having a predetermined number of pixels, each having a time integration effect, and that is comprised of pixel values determined for every pixels in accordance with an amount of light forming an image integrated over time is separated into a foreground component image having foreground object components constituting a foreground object and a background component image having background object components constituting a background object; and the encoded data generated when the image is separated into the foreground component image and the background component image on the basis of the received request information is transmitted to other communication apparatus.

In the $2^{nd}$ communication system and method and the $5^{th}$ program of the present invention, by the first communication apparatus, the request requested information of a user is input from among a plurality of encoded data which are generated on the basis of predetermined image data that is obtained by an image pickup element having a predetermined number of pixels, each having a time integration effect, and that is comprised of pixel values determined for every pixels in accordance with an amount of light forming an image integrated over time; the input request information is transmitted to one of the second communication apparatus to the fourth communication apparatus; and the encoded data generated on the basis of the image data corresponding to the requested information, transmitted from the one of the second communication apparatus to the fourth communication apparatus, is received, by the second communication apparatus, the requested information transmitted from the first communication apparatus is received; the image data is separated into a foreground component image having foreground object components constituting a foreground object and a background component image having background object components constituting a background object; and the foreground component image and the background component image separated from the image on the basis of the received request information are transmitted as the encoded data to the first communication apparatus, by the third communication apparatus, the requested information transmitted from the first communication apparatus is received; area information discerning any of a foreground area having foreground object components constituting a foreground object of the image data, a background area having background object components constituting a background object of the predetermined image data and a mixed area in which the foreground area and the background area are mixed is generated; and the generated area information based on the received request information is transmitted as the encoded data to the first communication apparatus, and by the fourth communication apparatus, the requested information transmitted from the first communication apparatus is received; a mixture ratio indicating a ratio in which the foreground area and the background area are mixed in the mixed area of the image data is generated; and the mixture ratio generated on the basis of the received request information is transmitted to the first communication apparatus.

In the $4^{th}$ communication apparatus and method and the $6^{th}$ program of the present invention, the requested information of a user is input; in accordance with the requested information, a foreground component image having foreground object components constituting a foreground object and a background component image having background object components constituting a background object of the image data of a predetermined image data that is obtained by an image pickup element having a predetermined number of pixels, each having a time integration effect, and that is comprised of pixel values determined for every pixels in accordance with an amount of light forming an image integrated over time are synthesized and a synthesized image is generated; and the generated synthesized image is output.

In the $3^{rd}$ communication system and method and the $7^{th}$ program of the present invention, by the first communication apparatus, the requested information of a user is input; the input request information is transmitted to the second communication apparatus; and in accordance with the requested information, the synthesized image transmitted from the second communication apparatus is input, and by the second communication apparatus, the requested information transmitted from the first communication apparatus is received; in accordance with the requested information, a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time are synthesized and a synthesized image is generated; and the generated synthesized image is transmitted to the first communication apparatus.

In the $5^{th}$ communication apparatus and method and the $8^{th}$ program of the present invention, the requested information of a user is input; the input request information is transmitted to other communication apparatus; and the synthesized data transmitted from other communication apparatus in accordance with the requested information is received.

In the $6^{th}$ communication apparatus and method and the $9^{th}$ program of the present invention, the requested information transmitted from other communication apparatus is received; in accordance with the requested information, a foreground component image having foreground object components constituting a foreground object and a background component image having background object components constituting a background object of predetermined image data that is obtained by an image pickup element having a predetermined number of pixels, each having a time integration effect, and that is comprised of pixel values determined for every pixels in accordance with an amount of light forming an image integrated over time are synthesized and the synthesized image is generated; and the generated synthesized image is transmitted to other communication apparatus.

In the 7$^{th}$ communication apparatus and method and the 10$^{th}$ program of the present invention, the requested information of a user is input; in accordance with the requested information, a mixture ratio indicating a ratio in which a foreground component image having foreground object components constituting a foreground object to a background component image having background object components constituting a background object of the image data are mixed is estimated, the image data being is obtained by an image pickup element having a predetermined number of pixels, each having a time integration effect, and that is comprised of pixel values determined for every pixels in accordance with an amount of light forming an image integrated over time; on the basis of the mixture ratio, the image data is separated into the foreground component image and the background component image; the separated foreground component image and any background component image, or the separated background component image and any foreground component image are synthesized in a predetermined mixture ratio and a synthesized image is generated; and the synthesized image is output.

In the 4$^{th}$ communication system and method and the 11$^{th}$ program of the present invention, by the first communication apparatus, the requested information of a user is input; the input request information is transmitted to the second transmitting apparatus; and the synthesized image transmitted from the second communication apparatus is received, and by the second communication apparatus, the requested information transmitted from the first communication apparatus is received; a mixture ratio indicating a ratio in which a foreground component image having foreground object components constituting a foreground object and a background component image having background object components constituting a background object of the image data are mixed is estimated on the basis of the requested information, the image data being obtained by an image pickup element having a predetermined number of pixels, each having a time integration effect, and that is comprised of pixel values determined for every pixels in accordance with an amount of light forming an image integrated over time; the image data is separated into the foreground component image and the background component image on the basis of the mixture ratio; the separated foreground component image and any background component image or the separated background component image and any foreground component image are synthesized in a predetermined mixture ratio and the synthesized image is generated; and the synthesized image is transmitted to the first communication apparatus.

In the 8$^{th}$ communication apparatus and method and the 12$^{th}$ program of the present invention, the requested information of a user is input; the requested information is transmitted to other communication apparatus; and the synthesized image transmitted from other communication apparatus is received.

In the 9$^{th}$ communication apparatus and method and the 13$^{th}$ program of the present invention, the requested information transmitted from other communication apparatus is received; a mixture ratio indicating a ratio in which a foreground component image having foreground object components constituting a foreground object and a background component image having background object components constituting a background object of the image data are mixed is estimated on the basis of the requested information, the image data being obtained by an image pickup element having a predetermined number of pixels, each having a time integration effect, and that is comprised of pixel values determined for every pixels in accordance with an amount of light forming an image integrated over time; the image data is separated into the foreground component image and the background component image on the basis of the mixture ratio; the separated foreground component image and any background component image or the separated background component image and any foreground component image are synthesized in a predetermined ratio and the synthesized image is generated; and the synthesized image is transmitted to other communication apparatus.

In the 10$^{th}$ communication apparatus and method and the 14$^{th}$ program of the present invention, an ID discerning an image requested by a user is input; an image comprised of at least one image of a foreground component image having foreground object components constituting a foreground object and a background component image having background object components constituting a background object separated from the image data that is obtained by an image pickup element having a predetermined number of pixels, each having a time integration effect, and that is comprised of pixel values determined for every pixels in accordance with an amount of light forming an image integrated over time, is stored; the image corresponding to the input image ID is retrieved from among the stored images; the retrieved image is transmitted to the communication apparatus of the user; and the charge processing is performed in accordance with the retrieved image.

In the 5$^{th}$ communication system and method and the 15$^{th}$ program of the present invention, by the first communication apparatus, an ID discerning an image requested by a user is input; the image ID is transmitted to a second communication apparatus; and the image retrieved correspondingly to the image ID is received, and by the second communication apparatus, the image ID transmitted from the first communication apparatus is received; the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is stored; the image corresponding to the received image ID is retrieved from among the stored images; the retrieved image is output to the first communication apparatus; and a charge processing is performed in accordance with the retrieved image.

In the 11$^{th}$ communication apparatus and method and the 16$^{th}$ program of the present invention, an ID discerning an image requested by a user is input; the image ID is transmitted to other communication apparatus; and the image retrieved correspondingly to the image ID is received.

In the 12$^{th}$ communication apparatus and method and the 17$^{th}$ program of the present invention, an image ID transmitted from other communication apparatus is received; the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is stored; the image corresponding to the received image ID is retrieved from among the stored images;

the retrieved image is output to other communication apparatus; and a charge processing is performed in accordance with the retrieved image.

In the 13th communication apparatus and method and the 18th program of the present invention, the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated overtime, is input; the input image is stored; and a payment processing is performed in accordance with the stored image.

In the 6th communication system and method and the 19th program of the present invention, by a first communication apparatus, the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is input; and the input image is transmitted to a second communication apparatus, and by the second communication apparatus, the image transmitted from the first communication apparatus is received; the received image are stored; and a payment processing is performed in accordance with the stored image. In the 14th communication apparatus and method and the 20th program of the present invention, the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is input; and the input image is transmitted to other communication apparatus.

In the 15th communication apparatus and method and the 21st program of the present invention, an image transmitted from other communication apparatus is received; the received image is stored; and a payment processing is performed in accordance with the stored image.

In the 16th communication apparatus and method and the 22nd program of the present invention, a retrieval request information of a user is input; the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is input; the image corresponding to the input retrieval request information is retrieved from among the stored images; the retrieval result is output; and a charge processing is performed in accordance with the retrieval result.

In the 7th communication system and method and the 23rd program of the present invention, by a first communication apparatus, a retrieval request information of a user is input; the retrieval request information is transmitted to a second communication apparatus; and the retrieval result transmitted from the second communication apparatus is received, and by the second communication apparatus, the retrieval request information transmitted from the first communication apparatus is received; the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is stored; the image corresponding to the received retrieval request information is retrieved from among the stored images; the retrieval result is transmitted to the first communication apparatus; and a charge processing is performed in accordance with the retrieval result.

In the 17th communication apparatus and method and the 24th program of the present invention, retrieval request information of a user is input; the retrieval request information is transmitted to other communication apparatus; and the retrieval result transmitted from the other communication apparatus is received.

In the 18th communication apparatus and method and the 25th program of the present invention, the retrieval request information transmitted from other communication apparatus is received; the image comprised of at least one image of a foreground component image having foreground object components constituting a foreground object and a background component image having background object components constituting a background object separated from image data that is obtained by an image pickup element having a predetermined number of pixels, each having a time integration effect, and that is comprised of pixel values determined for every pixels in accordance with an amount of light forming an image integrated over time, is stored; the image corresponding to the received retrieval request information is retrieved from among the stored images; the retrieval result is transmitted to the other communication apparatus; and a charge processing is performed in accordance with the retrieval result.

In the 19th communication apparatus and method and the 26th program of the present invention, foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time, is input; background component image discerning information indicative of a background component image having background object components constituting a background object of the image data is input; foreground component image positional information and background component image positional information corresponding to the foreground component image discerning information and the background component image discerning information are generated; and the generated foreground component image positional information and the generated background component image positional information are output.

In the 8th communication system and method and the 27th program of the present invention, by a first communication apparatus, a foreground component image discerning information indicative of a foreground component image having foreground object components constituting a foreground object of image data that is obtained by an image pickup element having a predetermined number of pixels, each having a time integration effect; and that is comprised of pixel values determined for every pixels in accordance with an amount of light forming an image integrated over time, is input; a background component image discerning information indicative of a background component image having background object components constituting a background object of the image data is input; the foreground component image discerning information and the background component image discerning information are transmitted to a second communication apparatus; and a foreground component image positional information and a background component image positional information transmitted from the second communication apparatus are received, and by a second communication apparatus, the foreground component image discerning information transmitted from the first communication apparatus is received; the background component image discerning information transmitted from the first communication apparatus is received; the foreground component image positional information and the background component image positional information corresponding to the foreground component image discerning information and the background component image discerning information are generated; and the generated foreground component image positional information and the generated background component image positional information are transmitted to the first communication apparatus.

In the 20th communication apparatus and method and the 28th program of the present invention, a foreground component image discerning information indicative of a foreground component image having foreground object components constituting a foreground object of image data that is obtained by an image pickup element having a predetermined number of pixels, each having a time integration effect, and that is comprised of pixel values determined for every pixels in accordance with an amount of light forming an image integrated over time, is input; a background component image discerning information indicative of a background component image having background object components constituting a background object of the image data is input; the foreground component image discerning information and the background component image discerning information are transmitted to other communication apparatus through a network; a foreground component image positional information and a background component image positional information transmitted from the other communication apparatus through a network are received.

In the 21st communication apparatus and method and the 29th program of the present invention, the foreground component image discerning information of image data transmitted from other communication apparatus through a network is received, the image data being obtained by an image pickup element having a predetermined number of pixels, each having a time integration effect, and that is comprised of pixel values determined for every pixels in accordance with an amount of light forming an image integrated over time; the background component image discerning information transmitted from the other communication apparatus is received; a foreground component image positional information and a background component image positional information corresponding to the foreground component image discerning information and the background component image discerning information are generated; and the generated foreground component image positional information and the generated background component image positional information are transmitted to the other communication apparatus via the network.

As a result, it is possible to encrypt an image by adding motion blur to the image, and also to decrypt the encrypted image by eliminating the motion blur, that is, adding motion blur inverse to the motion blur added in the encryption process.

Further, it is possible to obtain a clear foreground component image having been eliminated with motion blur by adjusting the motion blur contained in the foreground component image, and to generate a synthesized image appearing seemingly natural by combining the motion blur adjusted foreground component image with a background component image. As a result, by adjusting the motion blur in the foreground component image and by synthesizing an image by processing the resulting foreground component with a background component, it is possible to correct images more naturally.

Moreover, since the image obtained by separating, synthesizing or correcting an image on the basis of mixed state of the image, can be purchased or sold via the network 1, the separated, synthesized or corrected image can be effectively utilized by selling the images processed by the users.

Furthermore, it is possible to retrieve the images which are being photographed, or have been photographed and stored by the camera terminal units 28-1 to 28-n by a simple input of the retrieval conditions.

Moreover, by storing images in a predetermined storage server rather than in user's computer, and by reading out and utilizing the images on the basis of positional information of the storage server as needed, pre-existing image data can be called out and utilized as needed without maintaining them in their own communication apparatus, such that images can be efficiently utilized.

According to above descriptions, it is possible to encrypt image by adding motion blur to the image and decrypt the image by eliminating the motion blur. Further, it is also possible to eliminate motion blur to generate a clear image and correct an image more naturally to synthesize an image in which motion blur is adjusted by combining the motion blur adjusted foreground component with a background image. Further, it is possible to effectively utilize via the network images separated, synthesized or corrected on the basis of mixed state of the image. Moreover, it is also possible to retrieve the separated, synthesized or corrected images via the network. In addition, it is possible to call out and utilize pre-existing images without maintaining them in their own communication apparatus.

The recording medium having a program for performing signal processing according to the present invention may be, as shown in FIG. 2 and FIG. 3, a package medium having magnetic discs 61, 91 (including flexible discs), optical discs 62, 92 (including CD-ROM (Compact Disc-Read Only Memory) and DVD (Digital Versatile Disc), magneto-optical discs 63, 93 (including MD [(Mini-Disc)(trademark)], semiconductor memories 64, 94, etc. recorded with the program for being able to be distributed to the users as an individual component separated from a computer. To be provided to the users by having already incorporated in a computer, the Above recording medium may also be a ROM 42, 72 in which the program is recorded, or a hard disc included in the storage units 48, 78.

Further, in the present specification, the steps for describing the program recorded in the recording medium comprise the processing to be performed in time sequence in the order of description and the processing to be performed simultaneously or separately, not necessarily in time sequence.

Furthermore, in the present specification, a system means the whole apparatus comprising a plurality of apparatuses.

INDUSTRIAL APPLICABILITY

According to the present invention, it is possible to improve the image processing speed and to reduce cost for service by distributing the image processing to perform only the requested processing.

The invention claimed is:

1. An image processing apparatus comprising:
an input unit configured to receive an input image; and
a first signal processor configured to estimate a first mixture ratio indicating the ratio at which foreground object components and background object components of the input image are mixed in a mixed area based on a covered background area; and
a second signal processor configured to estimate a second mixture ratio indicating the ratio at which foreground object components and background object components of the input image are mixed in a mixed area based on a uncovered background area;
wherein the first or the second mixture ratio is selectably output, and
wherein the covered background area is a mixed area corresponding to a front end portion in a direction in which a foreground object moves in respect to a foreground area and is an area in which a background component is hidden behind the foreground, and
wherein the uncovered background area is a mixed area corresponding to a rear end portion in a direction in which the foreground object moves in respect to the foreground area and is an area in which the background components appear.

2. The image processing apparatus according to claim 1, wherein said first or said second signal processor extracts desired components from the mixed area based on the first of the second estimated mixture ratio.

3. The image processing apparatus according to claim 2, wherein said first or said second signal processor separates the mixed area into the foreground object components and the background object components based on the first or second estimated mixture ratio.

4. An image processing apparatus comprising:
an input unit configured to input request information;
a signal processor configured to estimate a mixture ratio indicating the ratio at which foreground object components and background object components are mixed in a mixed area according to the request information inputted by said inputting unit;
a mixture ratio calculating unit that calculates a first mixture ratio for each pixel corresponding to a covered background area associated with the image data and calculating a second mixture ratio for each pixel corresponding to an uncovered background area associated with the image data; and
a separating unit that generates the foreground component image and the background component image based on the first and the second calculated mixture ratio;
wherein the foreground object components representing a foreground object and the background object components representing a background object of predetermined image data obtained from an image pickup element having a predetermined number of pixels, each pixel having a time integration effect, and
wherein the covered background area is a mixed area corresponding to a front end portion in a direction in which a foreground object moves in respect to a foreground area and is an area in which a background component is hidden behind the foreground, and
wherein the uncovered background area is a mixed area corresponding to a rear end portion in a direction in which the foreground object moves in respect to the foreground area and is an area in which the background components appear.

5. The image processing apparatus according to claim 4, wherein said signal processor extracts desired components from the mixed area based on the estimated mixture ratio.

6. The image processing apparatus according to claim 4, wherein said signal processor separates the mixed area into the foreground object components and the background object components based on the estimated mixture ratio.

* * * * *